(12) United States Patent
Tay

(10) Patent No.: US 7,722,490 B2
(45) Date of Patent: May 25, 2010

(54) CONES, CONFIGURATIONS, AND ADJUSTERS FOR FRICTION AND NON-FRICTION DEPENDENT CONTINUOUS VARIABLE TRANSMISSIONS

(76) Inventor: Armin Sebastian Tay, 2403 Nikki Ct., Apt. 2, West Covina, CA (US) 91792-1779

(*) Notice: Subject to any disclaimer, the term of this patent is extended or adjusted under 35 U.S.C. 154(b) by 77 days.

(21) Appl. No.: 11/978,456

(22) Filed: Oct. 29, 2007

(65) Prior Publication Data

US 2008/0058137 A1 Mar. 6, 2008

Related U.S. Application Data

(63) Continuation-in-part of application No. 11/039,297, filed on Jan. 20, 2005, now abandoned.

(60) Provisional application No. 60/696,588, filed on Jul. 5, 2005, provisional application No. 60/700,847, filed on Jul. 19, 2005, provisional application No. 60/724,098, filed on Oct. 6, 2005, provisional application No. 60/729,822, filed on Oct. 25, 2005, provisional application No. 60/773,916, filed on Feb. 16, 2006, provisional application No. 60/795,528, filed on Apr. 27, 2006, provisional application No. 60/845,617, filed on Nov. 28, 2006, provisional application No. 60/901,686, filed on Feb. 14, 2007.

(51) Int. Cl.
*F16H 9/00* (2006.01)

(52) U.S. Cl. ........................................ 474/83
(58) Field of Classification Search .............. 474/4, 474/8–46, 47–57, 83, 84–85
See application file for complete search history.

(56) References Cited

U.S. PATENT DOCUMENTS 4,875,389 A * 10/1989 Fragnito ..................... 475/212

(Continued)

FOREIGN PATENT DOCUMENTS

JP       2004183877 A  *  7/2004

*Primary Examiner*—Robert A Siconolfi
*Assistant Examiner*—Anna Momper

(57) ABSTRACT

Cones or cone assemblies with one or two oppositely positioned torque transmitting devices, such as torque transmitting arcs of constant pitch (formed by torque transmitting members) or teeth. The torque transmitting devices will be used for torque transmission between at least one means for coupling, such as transmission belt or chain, and a cone or cone assembly. The cones or cone assemblies can be used to construct CVT's for which significant circumferential sliding between the torque transmitting surfaces of the torque transmitting devices and the torque transmitting surfaces of the means for coupling engaged to them due to change in pitch diameter can be eliminated, as to reduce wear and frictional energy loses typical in similar devices of prior art and allow the usage of positive engagement devices, such as teeth, in coupling the torque transmitting devices with their means for coupling. CVT's that consist of at least one cone or one cone assembly of this invention that is coupled by a means for coupling to at least one means for conveying rotational energy, such as a pulley, a sprocket, a cone assembly of this invention, or a cone of this invention. Adjuster systems that can increase the performance of the CVT's of this invention and other CVT's that suffer from either or both transition flexing and a limited duration at which the transmission ratio can be changed, so that efficient non-friction dependent CVT's and efficient friction dependent CVT's that do not suffer from transition flexing and/or a limited duration at which the transmission ratio can be changed can be constructed.

2 Claims, 118 Drawing Sheets

U.S. PATENT DOCUMENTS

| | | | |
|---|---|---|---|
| 5,011,458 A * | 4/1991 | Kumm | 474/49 |
| 5,049,113 A * | 9/1991 | Graham, Jr. | 474/49 |
| 6,152,844 A * | 11/2000 | Daugherty | 474/49 |
| 6,224,514 B1 * | 5/2001 | Price | 482/50 |
| 6,656,070 B2 * | 12/2003 | Tay | 474/83 |
| 2002/0151396 A1 * | 10/2002 | Fragnito | 474/83 |
| 2004/0198542 A1 * | 10/2004 | Fuerle | 474/162 |
| 2005/0221926 A1 * | 10/2005 | Naude | 474/8 |

* cited by examiner

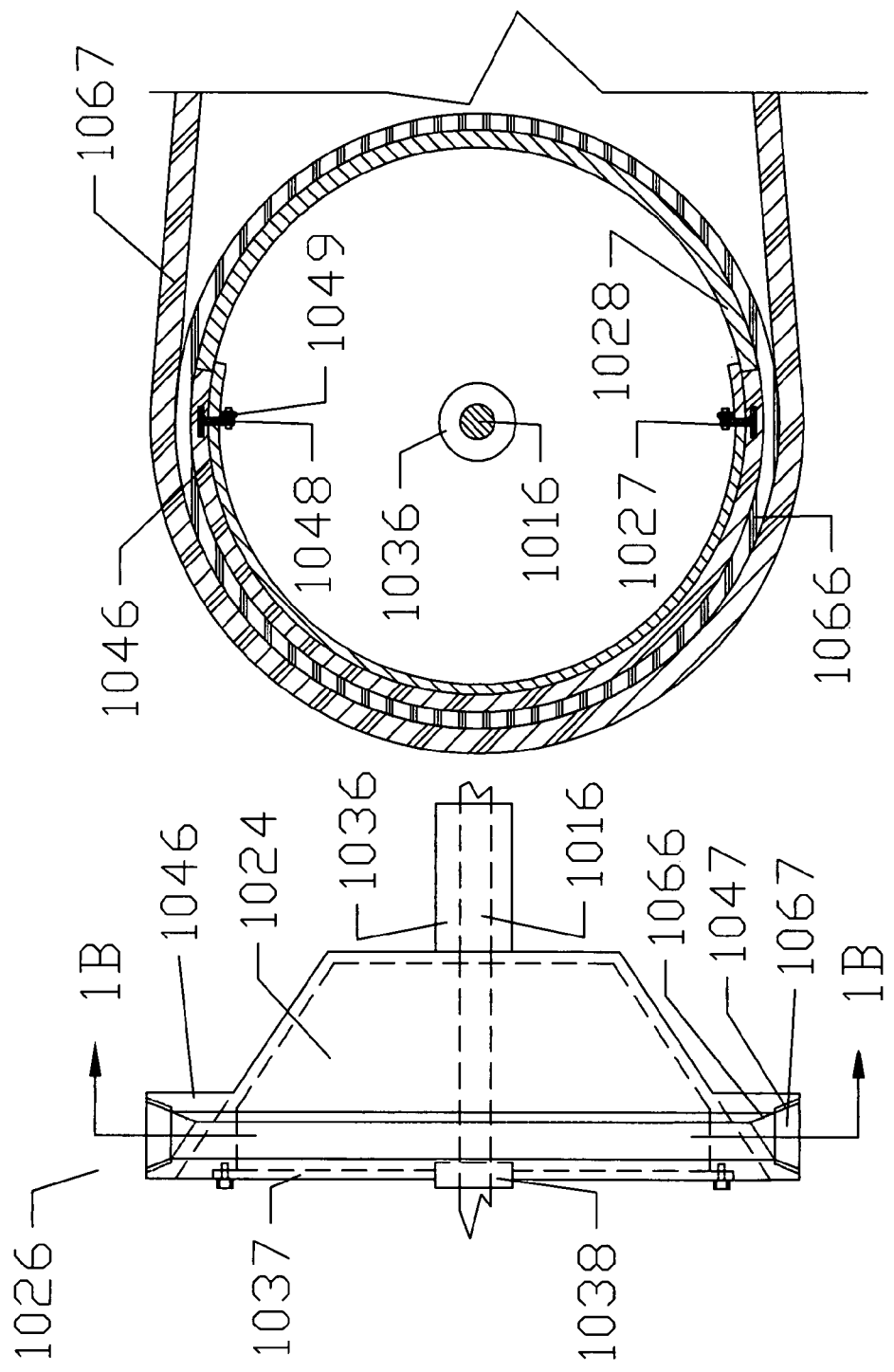

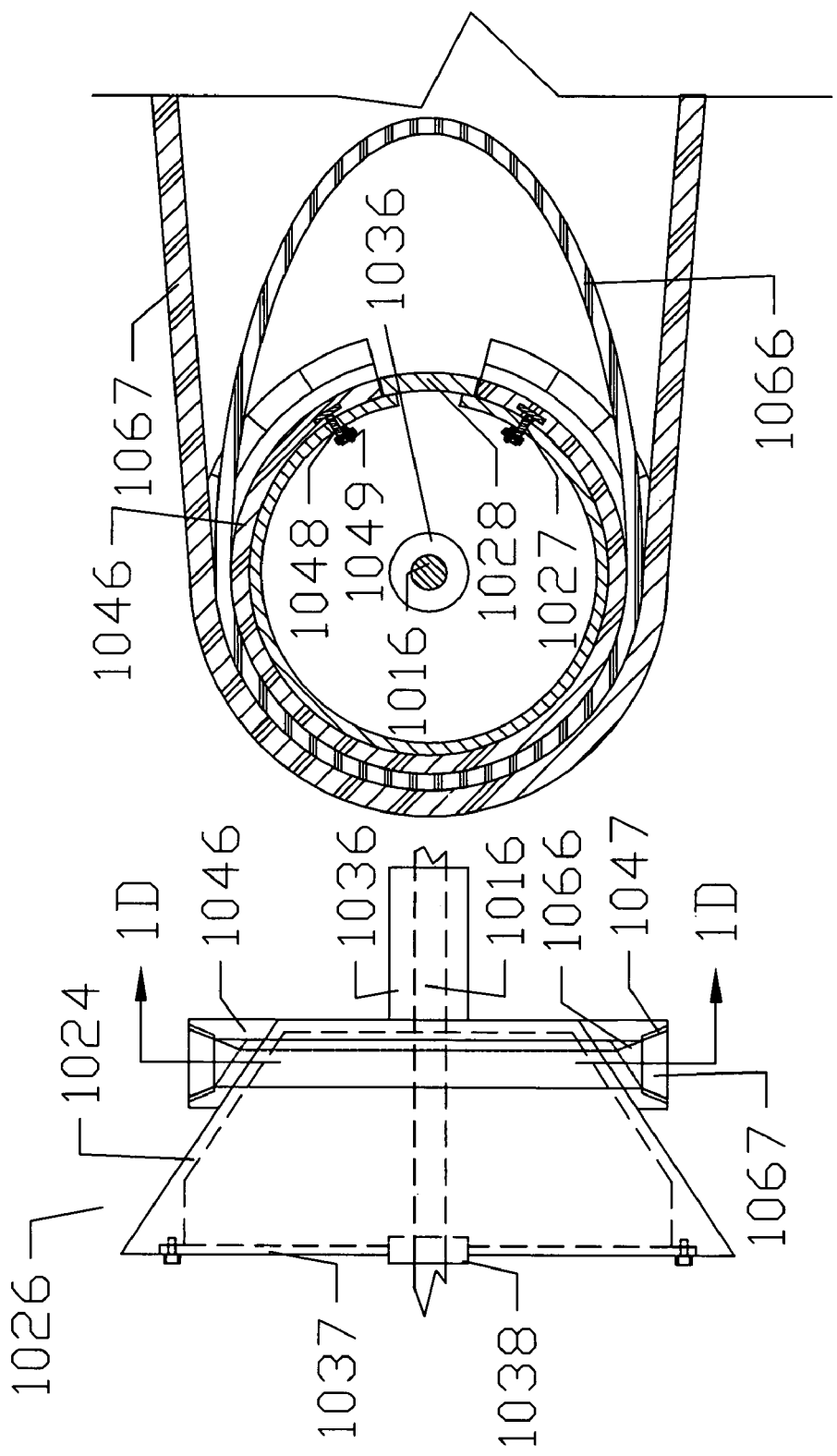

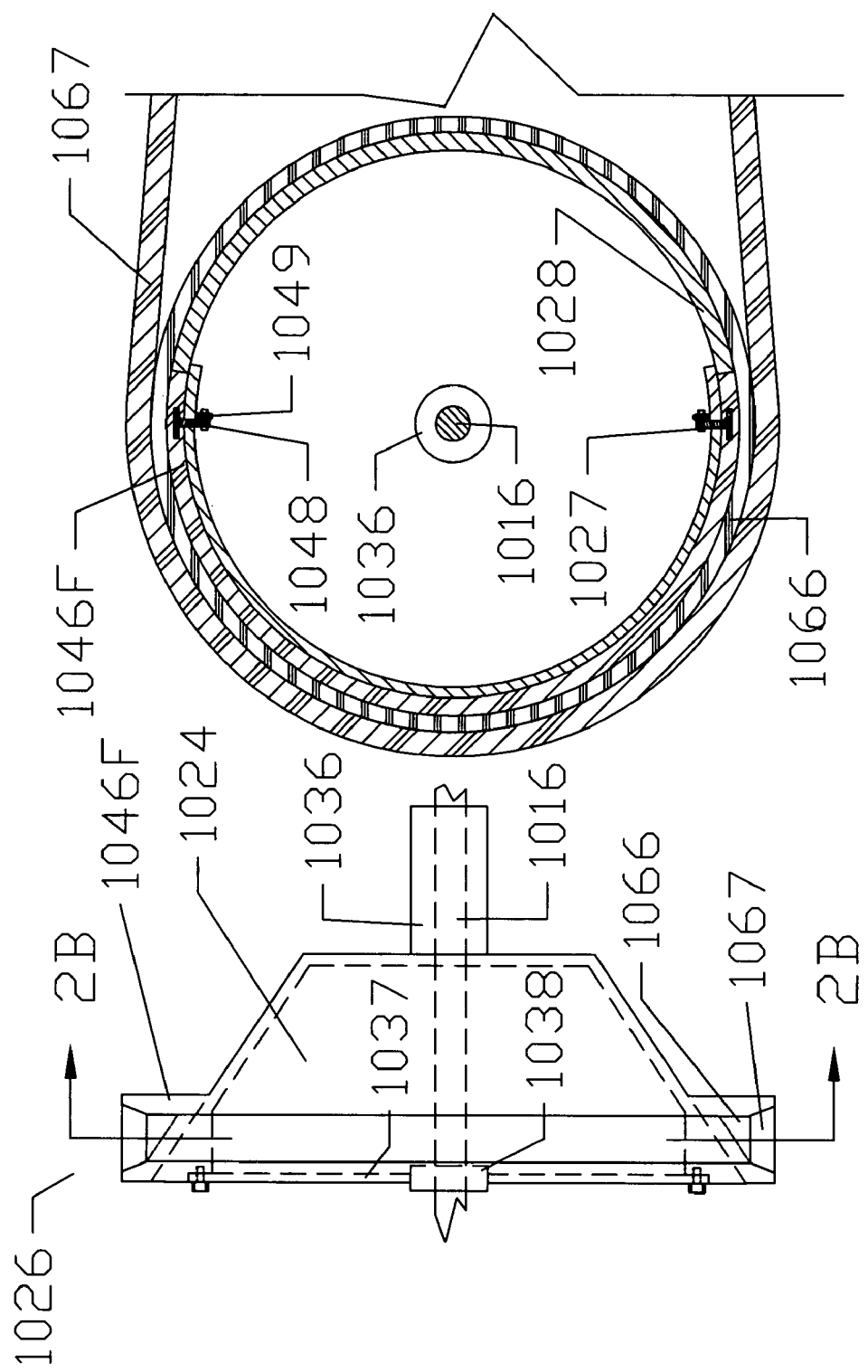

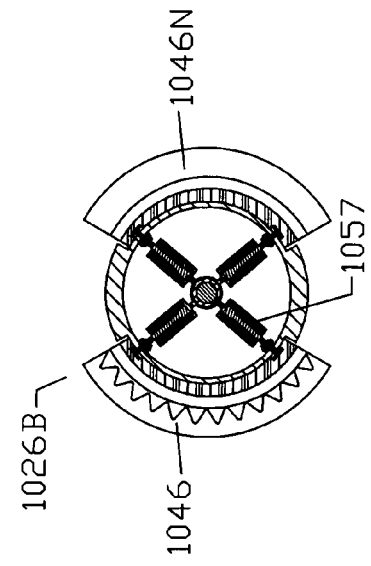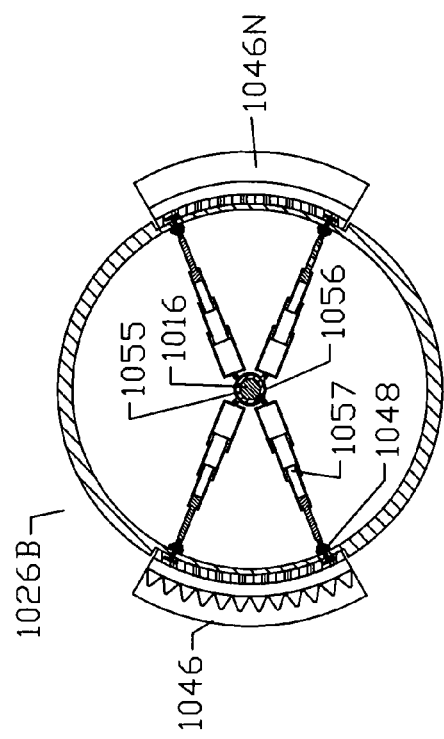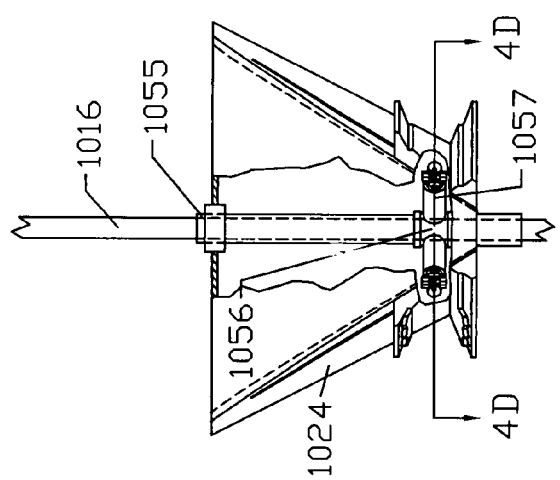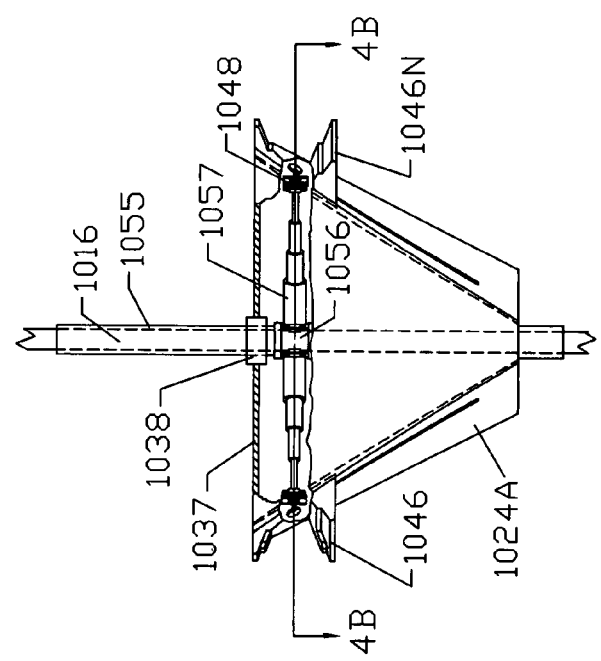

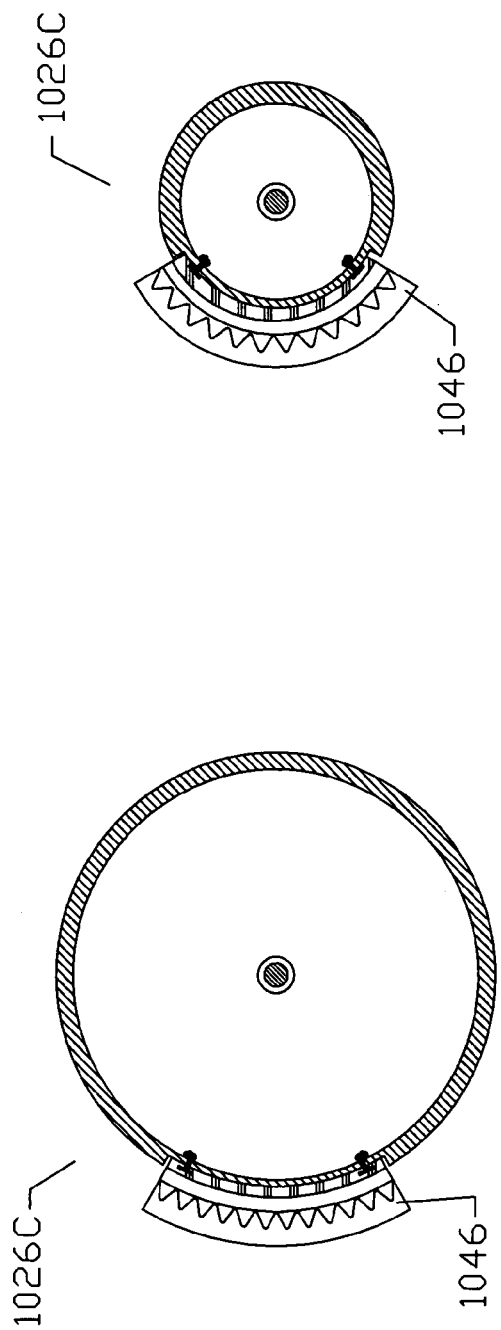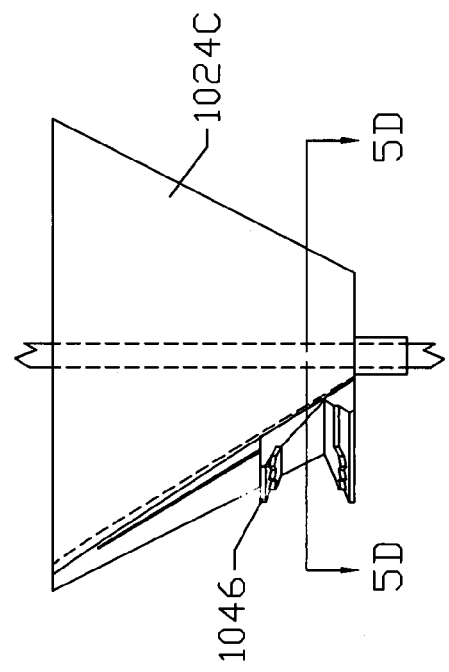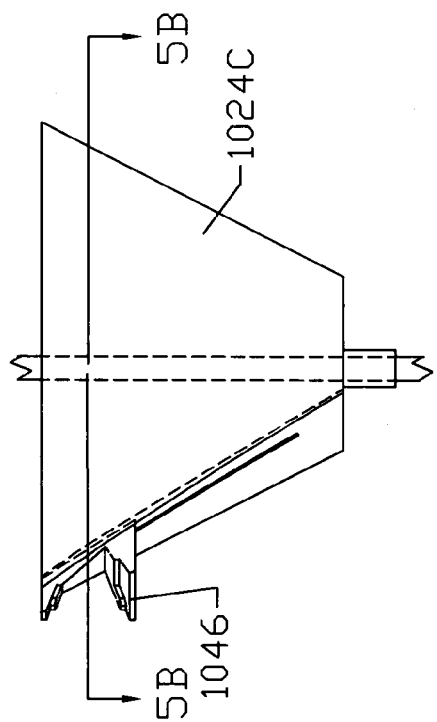
FIG. 5D
FIG. 5C
FIG. 5B
FIG. 5A

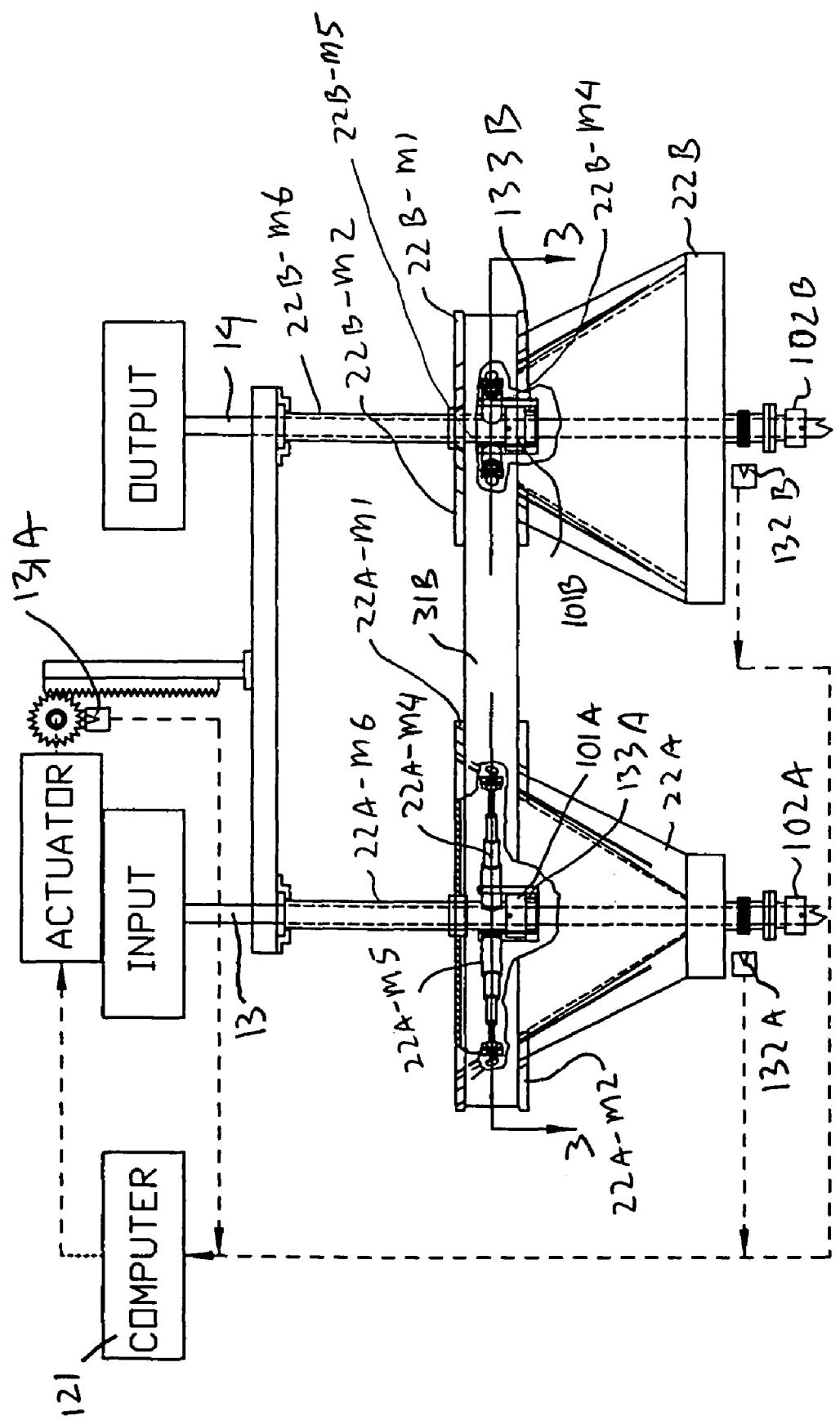

$$\theta_1 R_1 = \theta_2 R_2$$

$$\theta_2 = \frac{\theta_1 R_1}{R_2}$$

$$\Delta\theta = \theta_1 - \theta_2 = \theta_1 - \theta_1 \frac{R_1}{R_2}$$

$$\boxed{\Delta\theta = \theta_1 \left(1 - \frac{R_1}{R_2}\right)}$$

FIG. 25

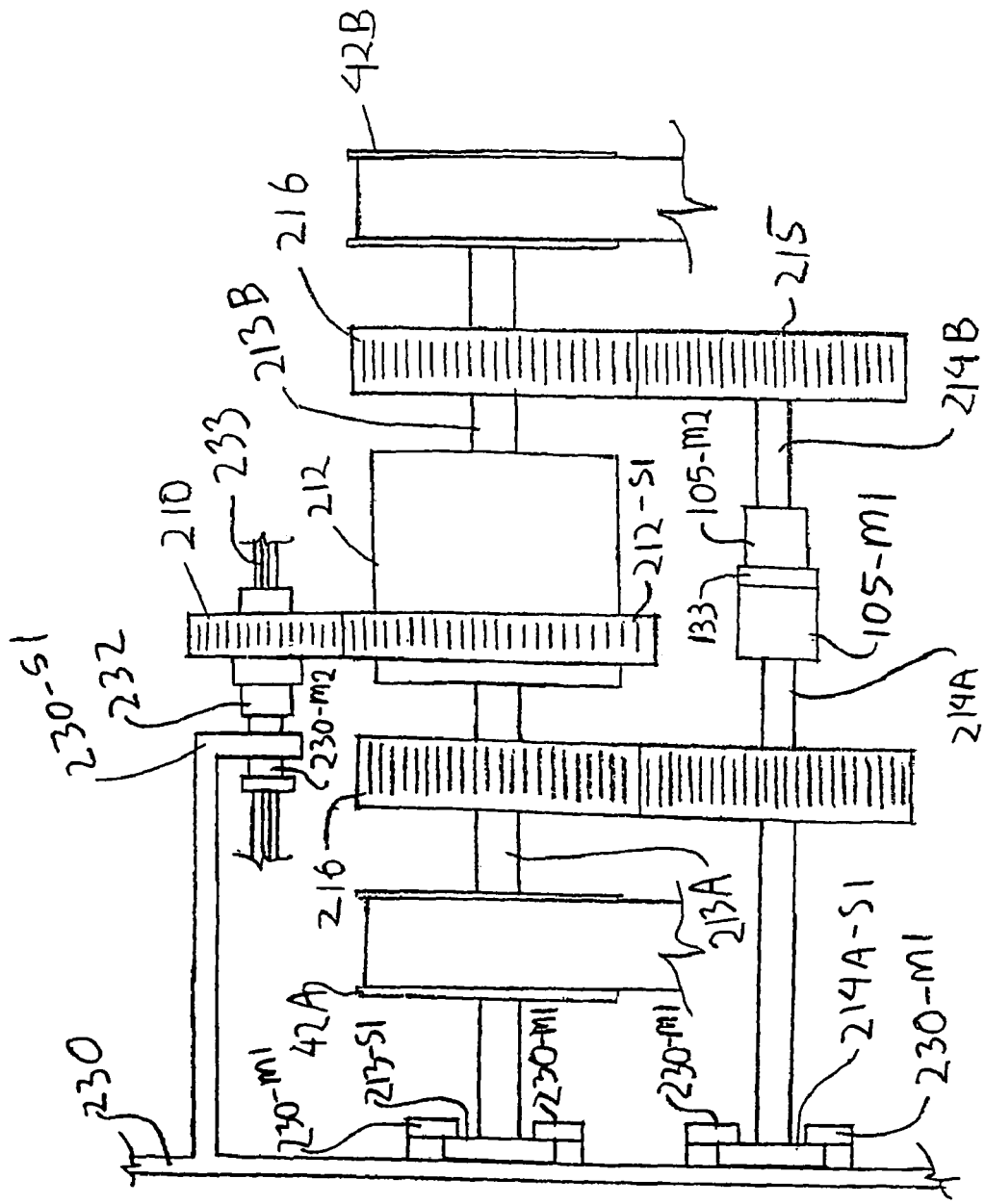

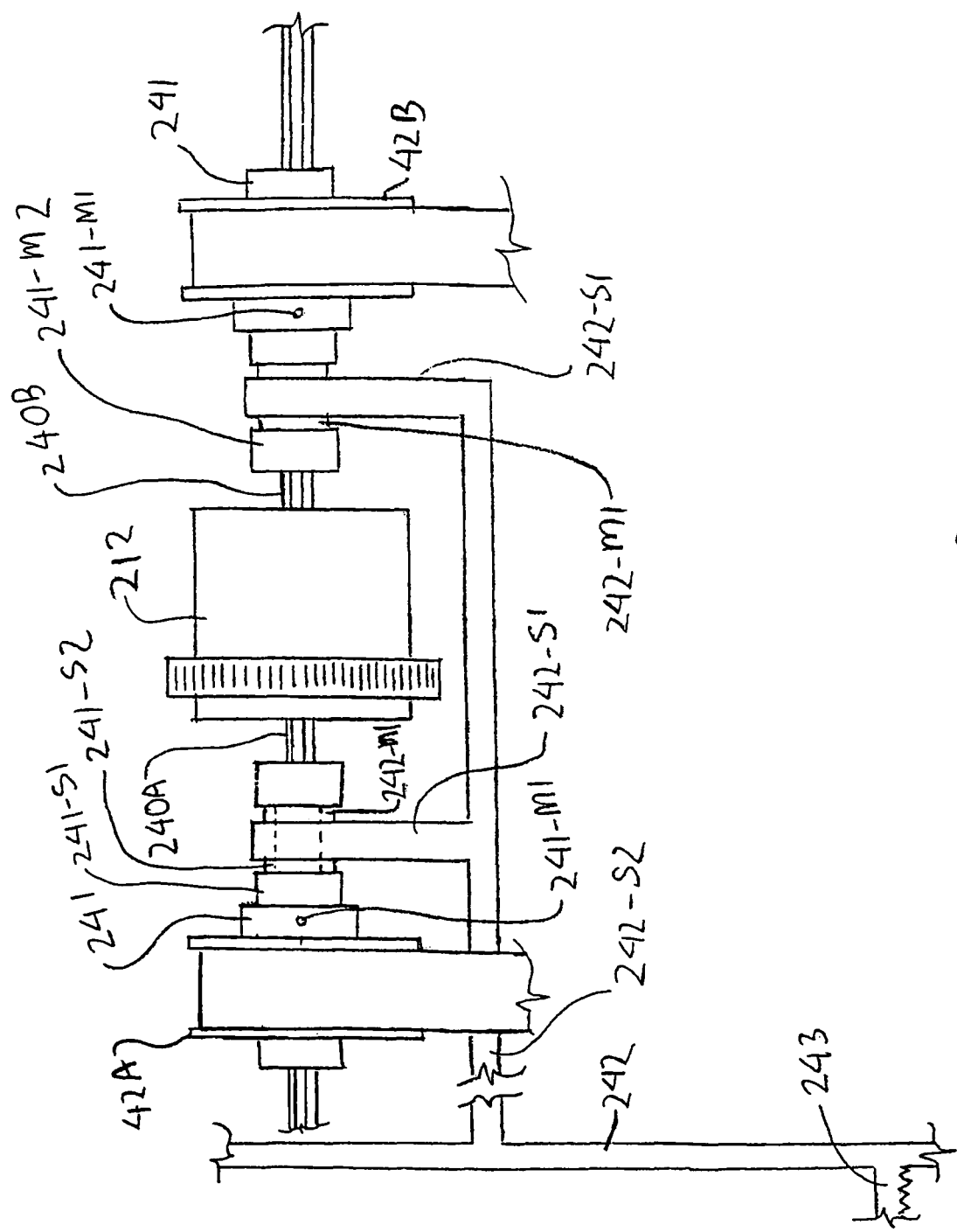

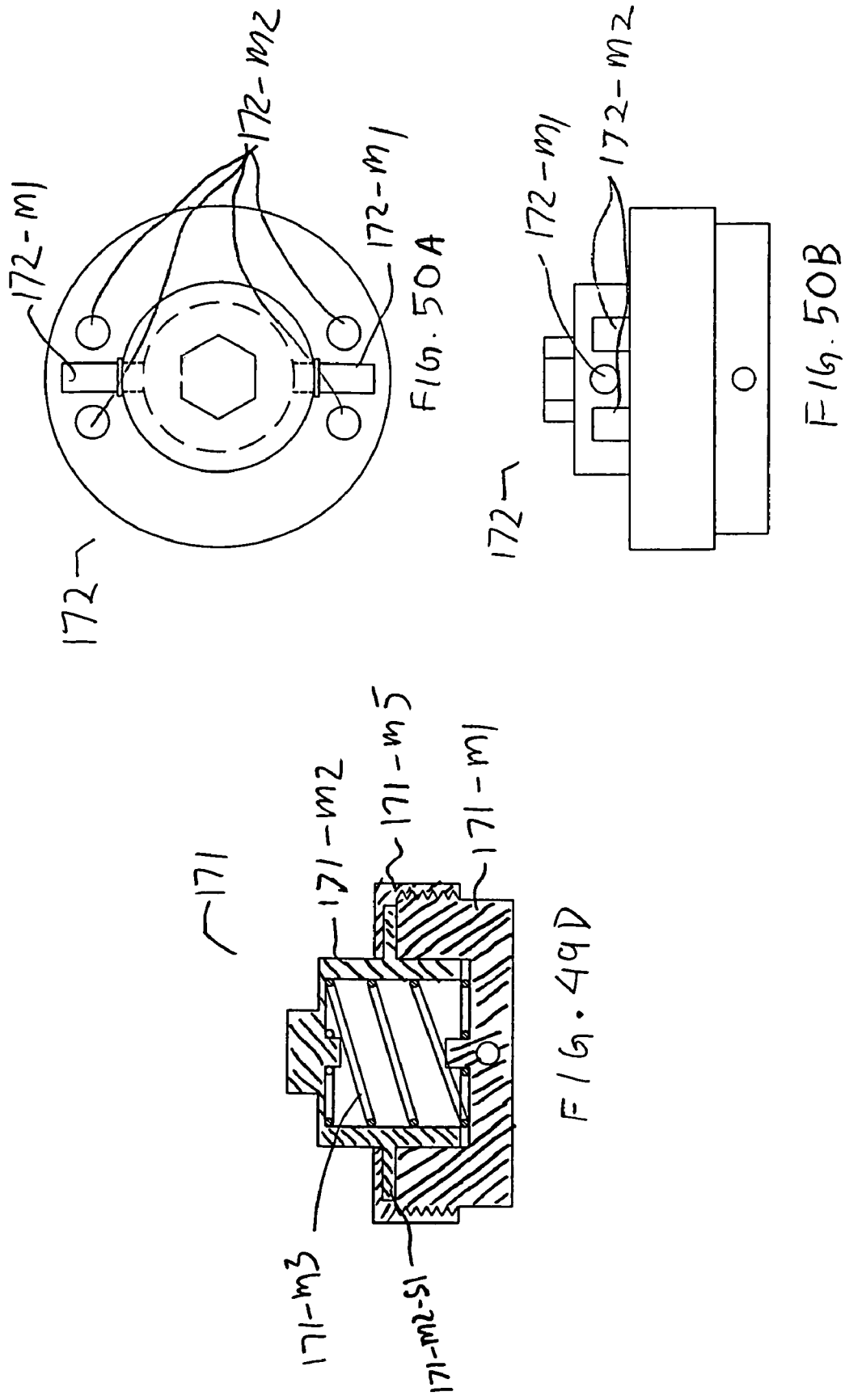

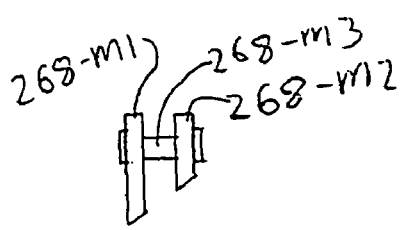
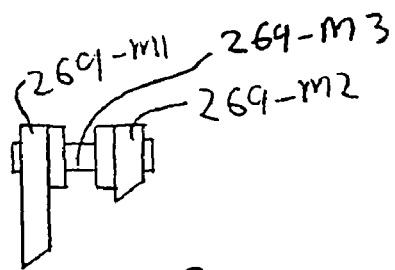
FIG. 61A    FIG. 61B
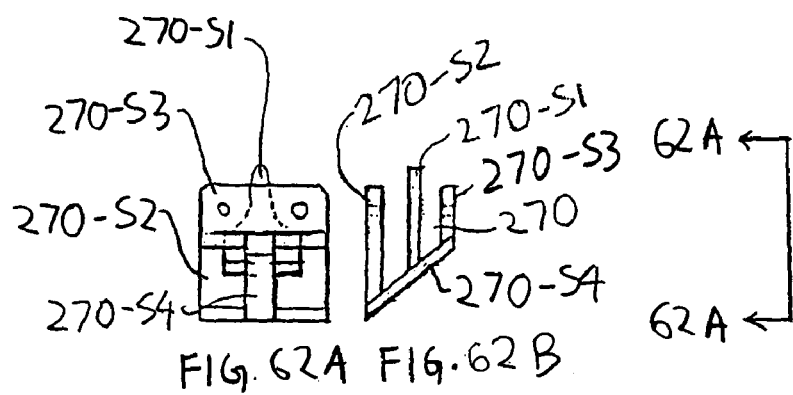
FIG. 62A    FIG. 62B
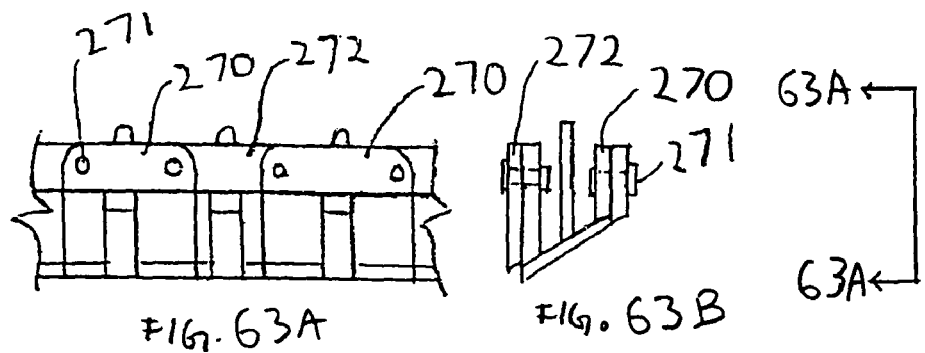
FIG. 63A    FIG. 63B

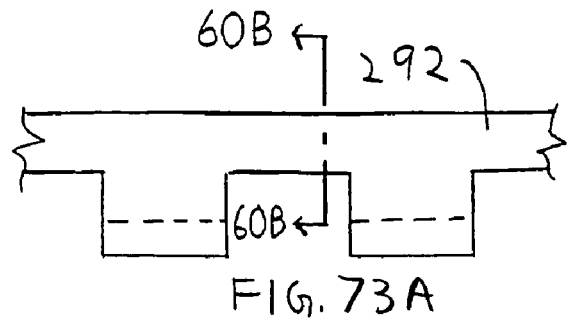
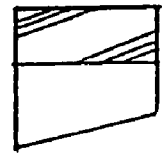
FIG. 73A    FIG. 73B
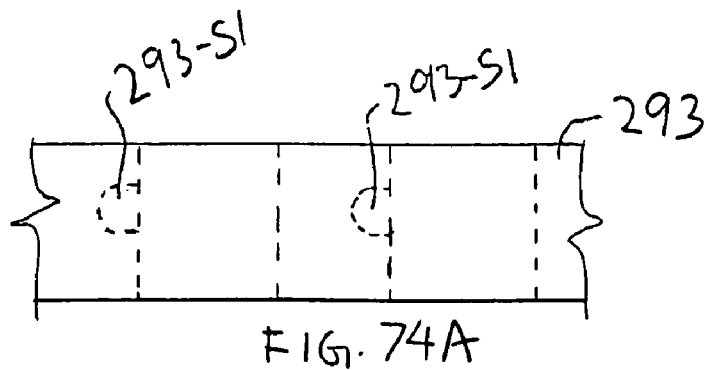
FIG. 74A
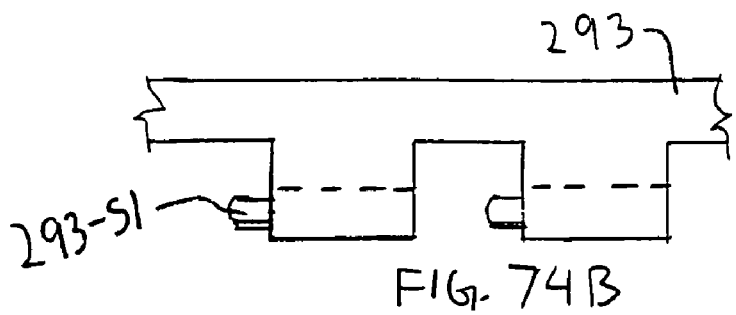
FIG. 74B
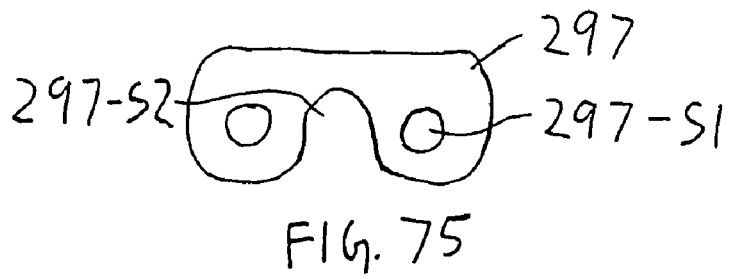
FIG. 75

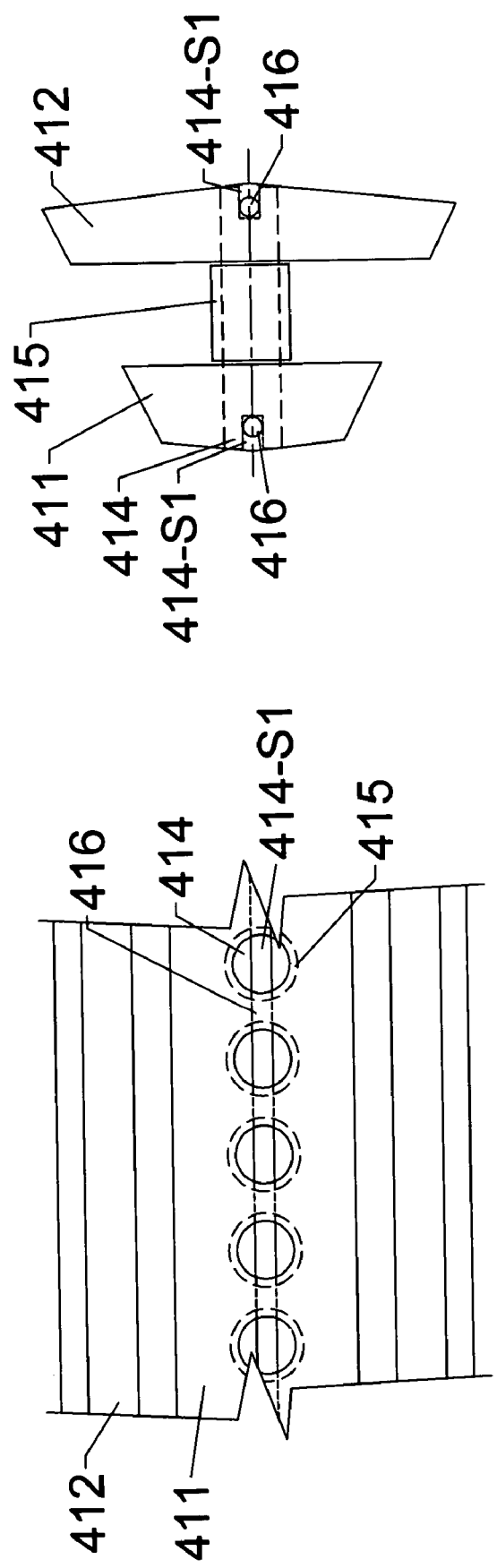

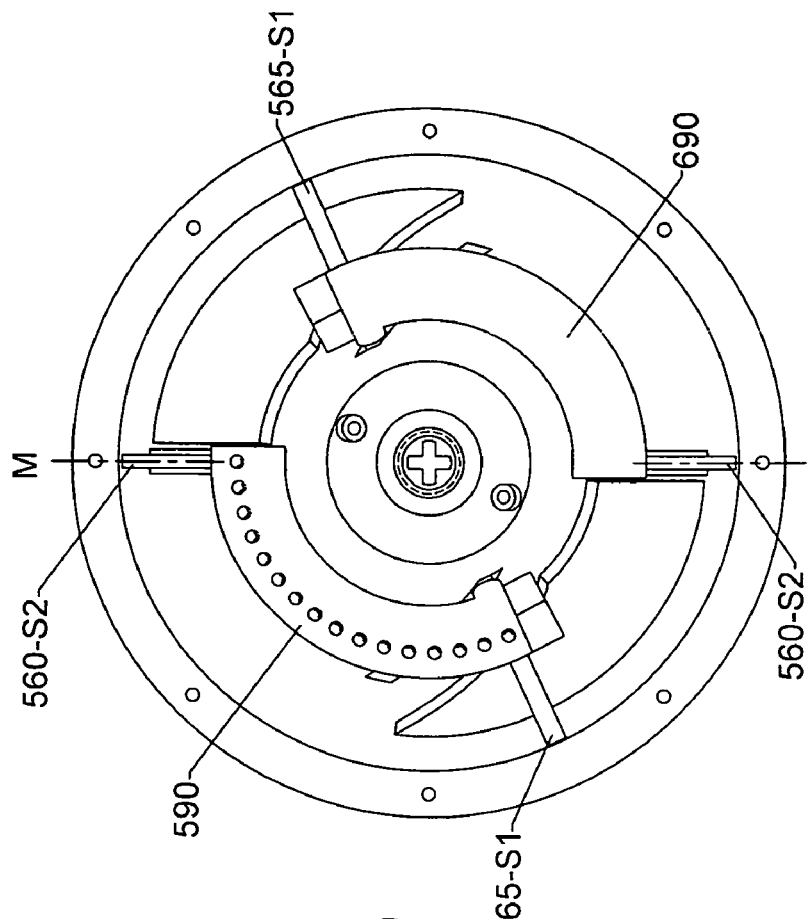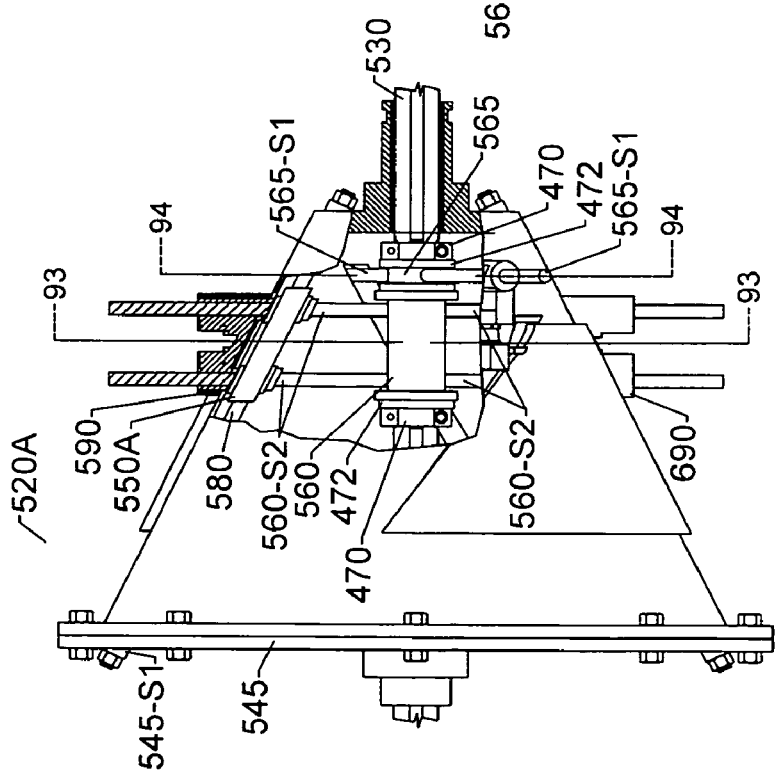

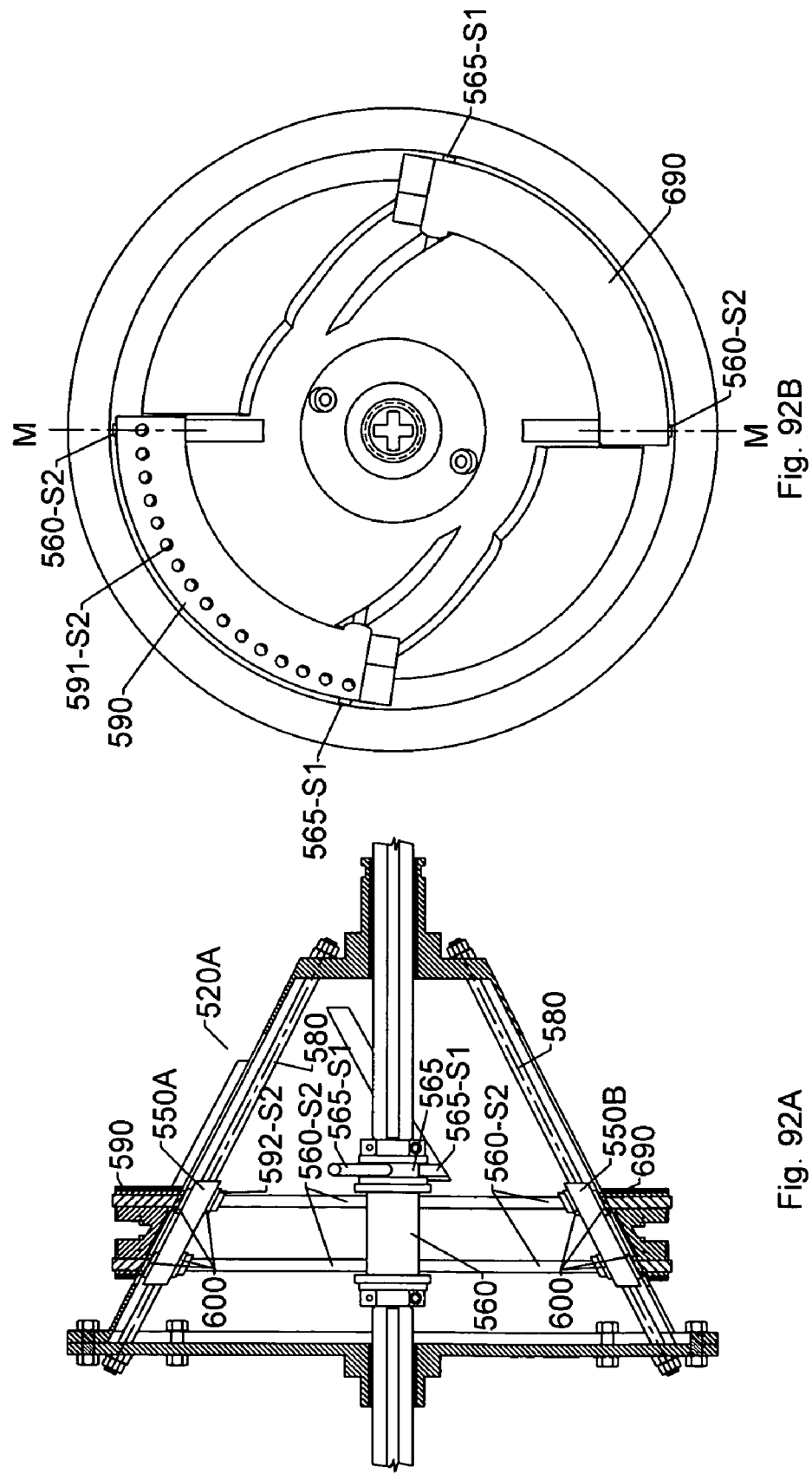

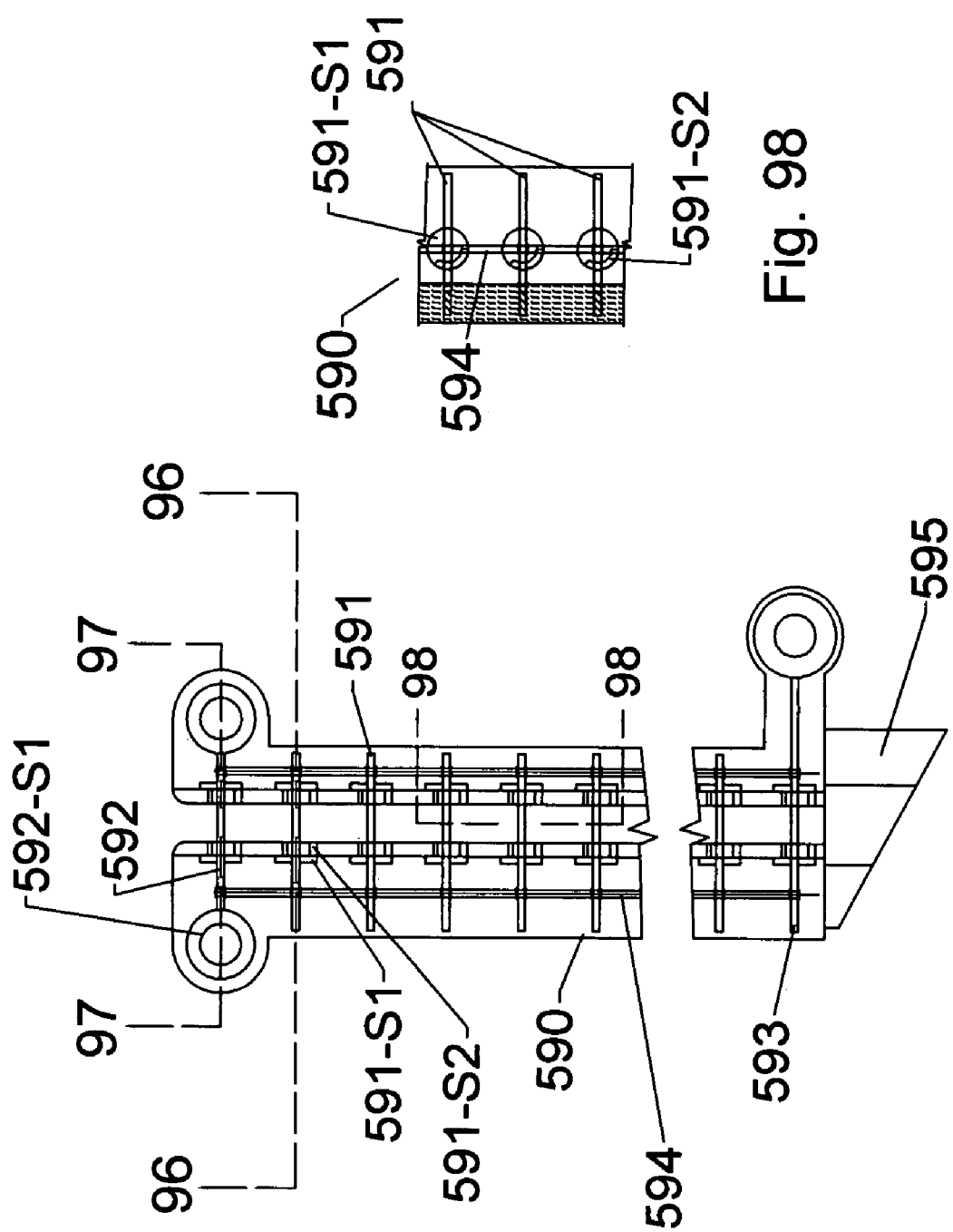

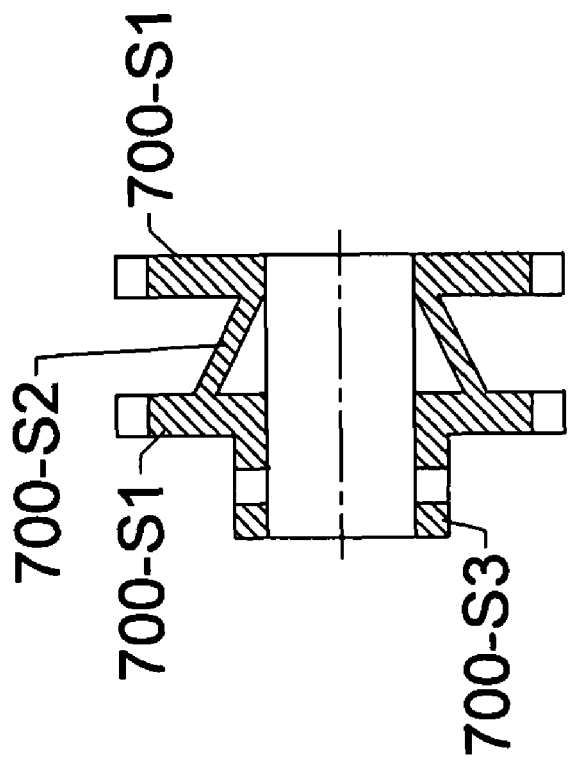
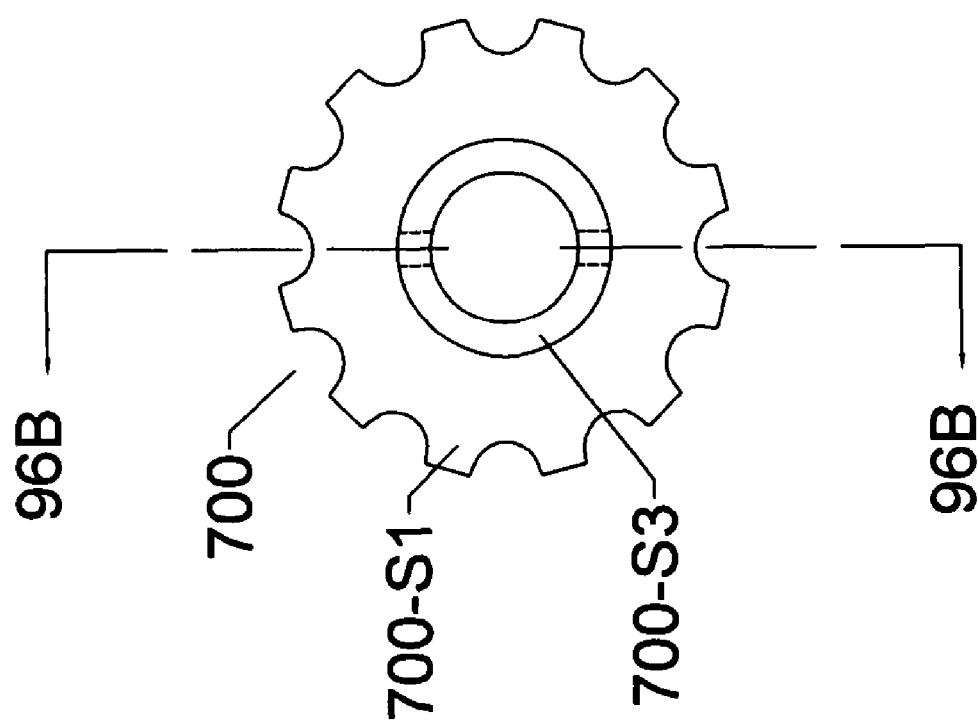
Fig. 116B
Fig. 116A

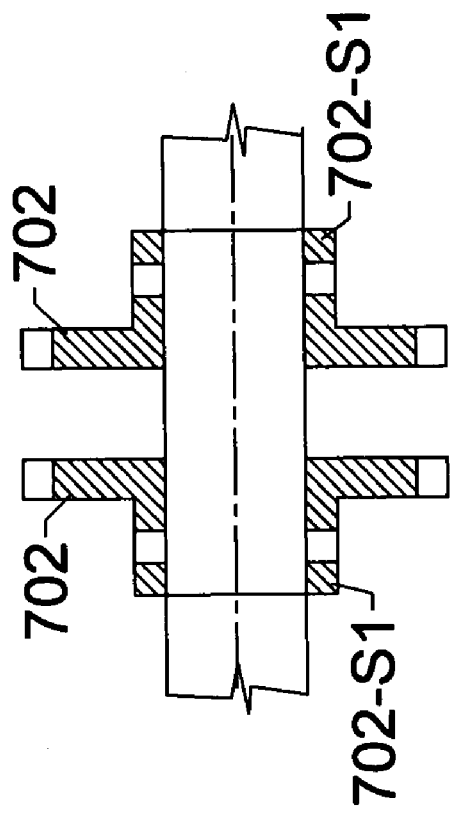
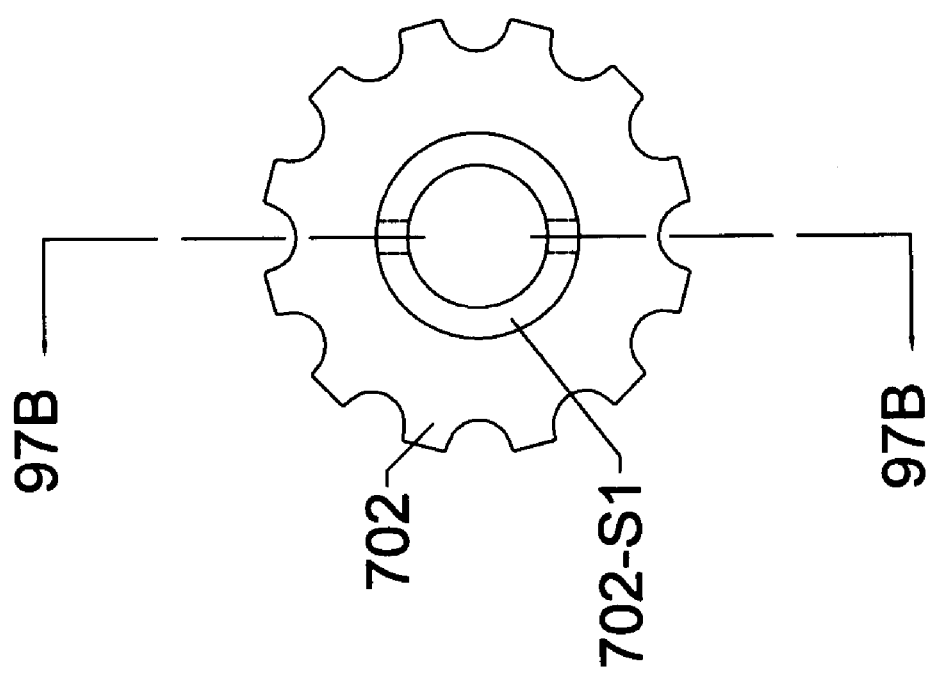
Fig. 117B
Fig. 117A

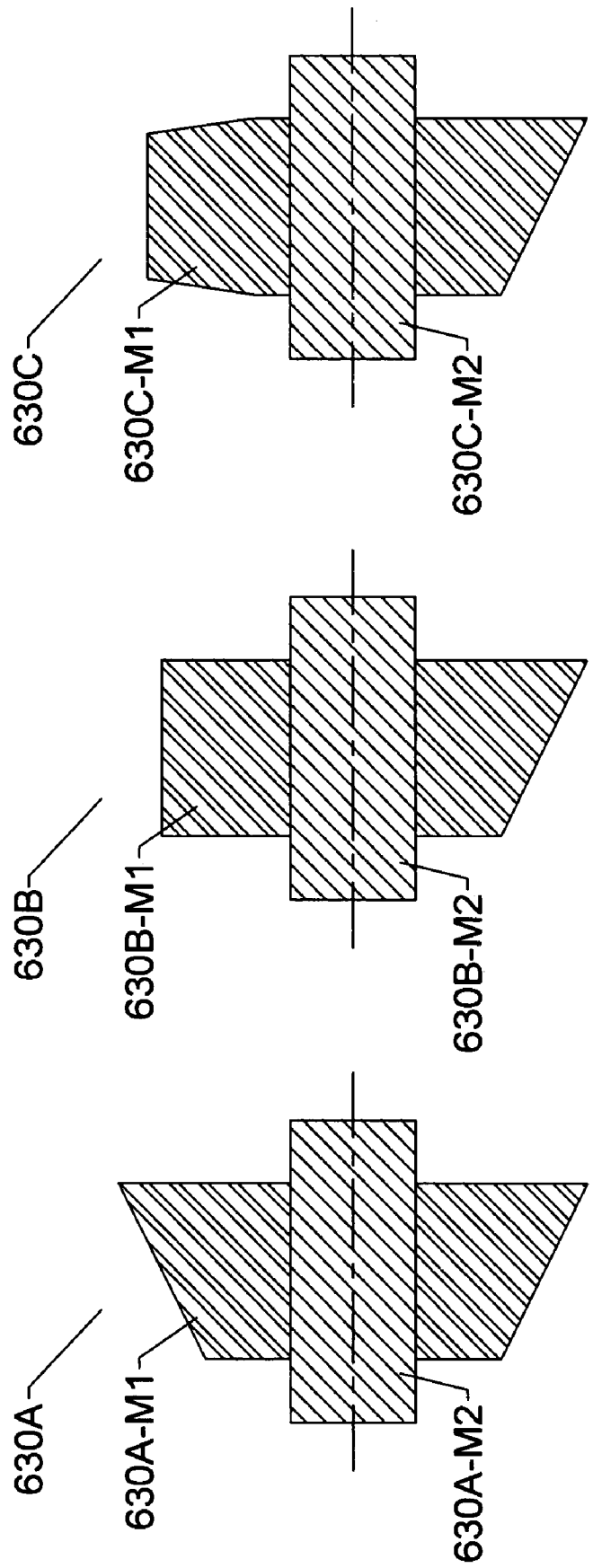

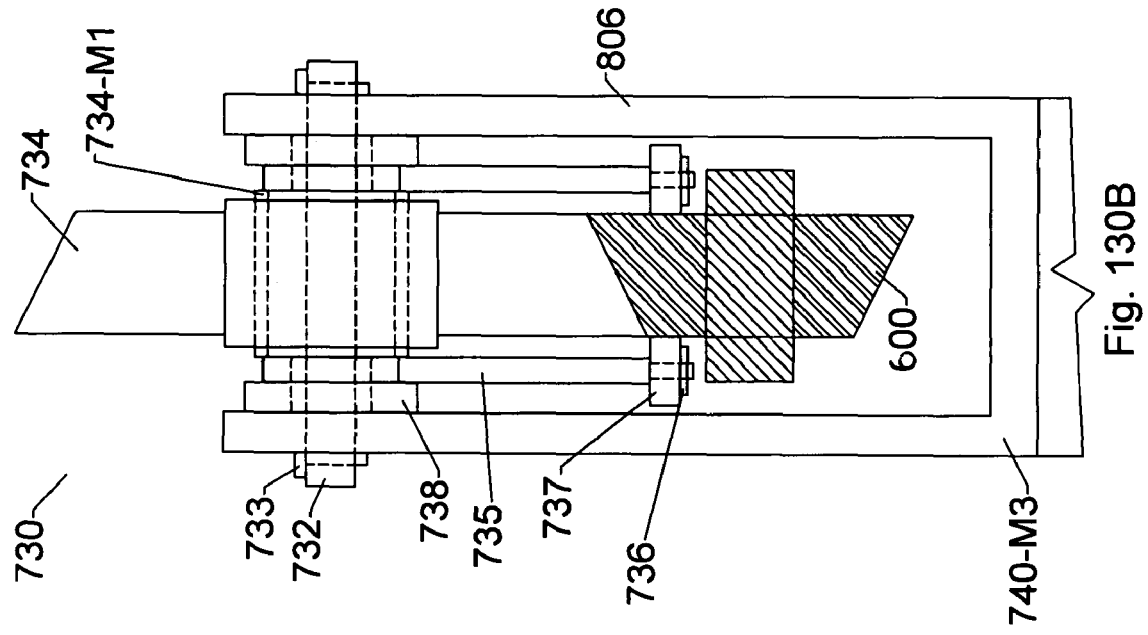
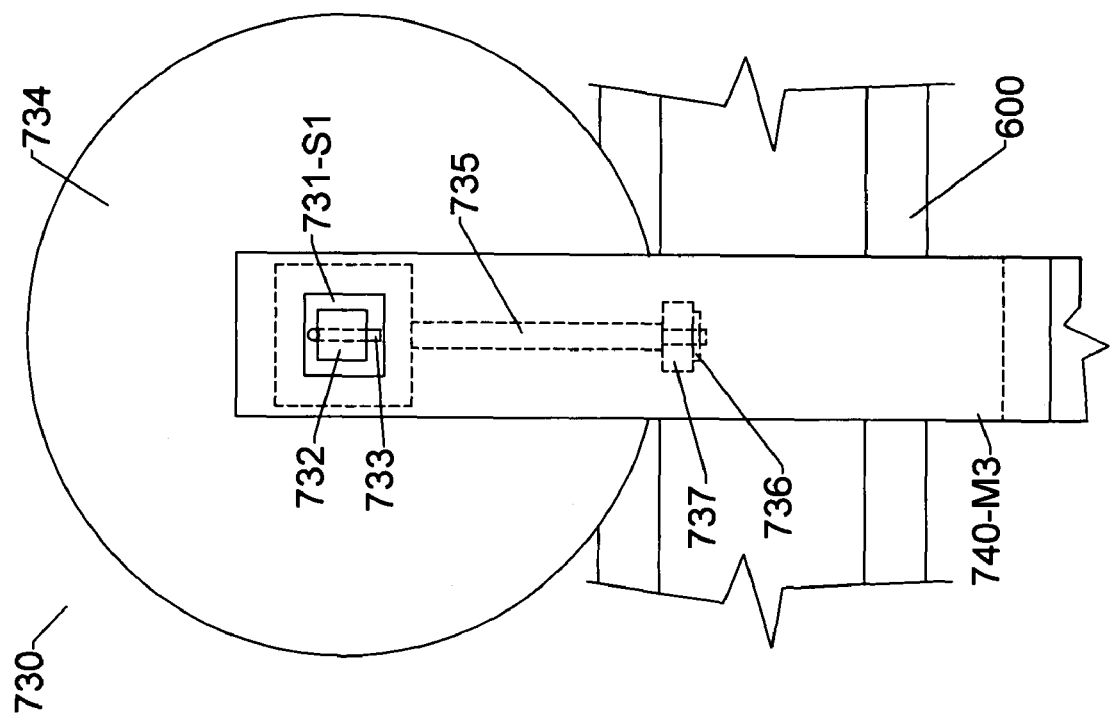

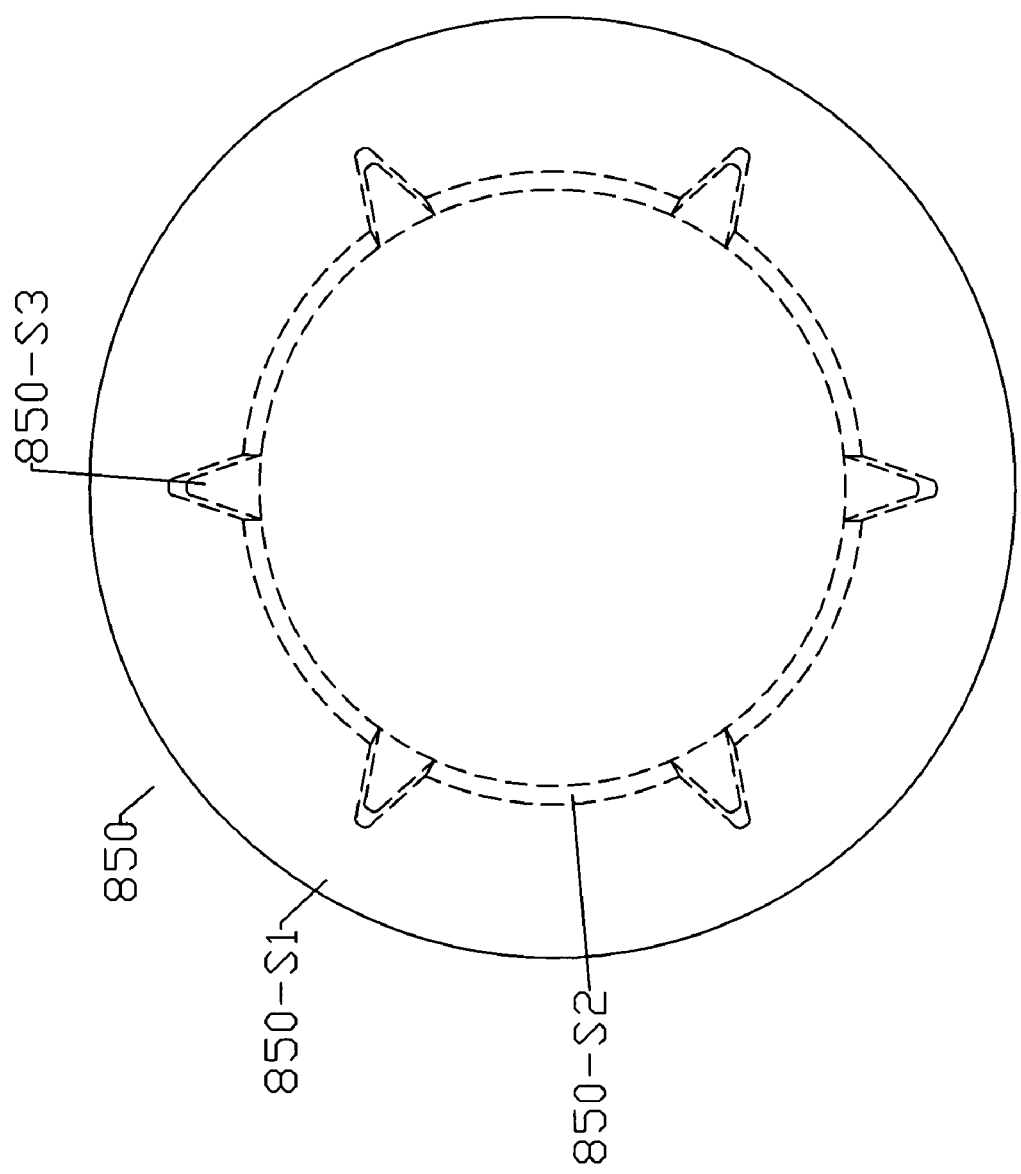
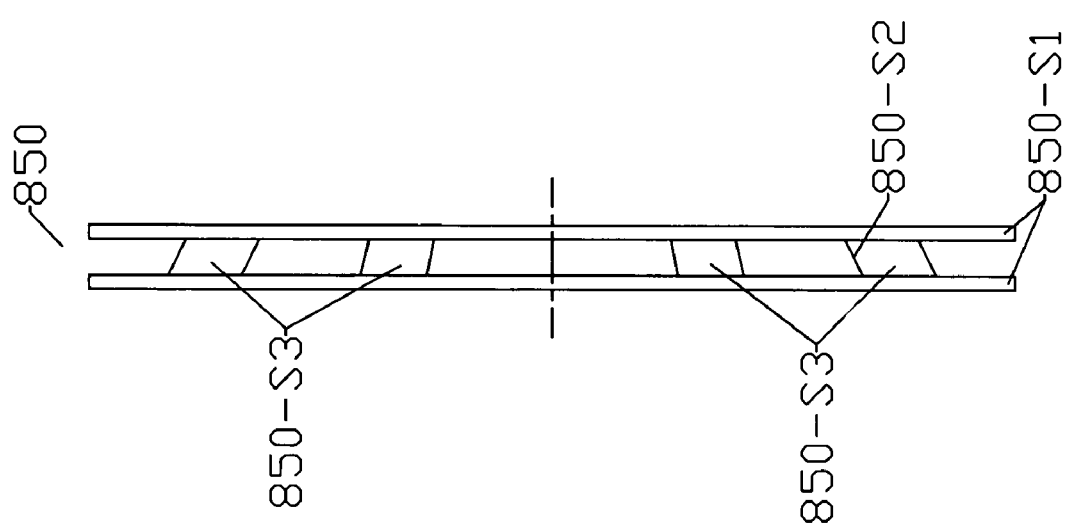
Fig. 139B
Fig. 139A

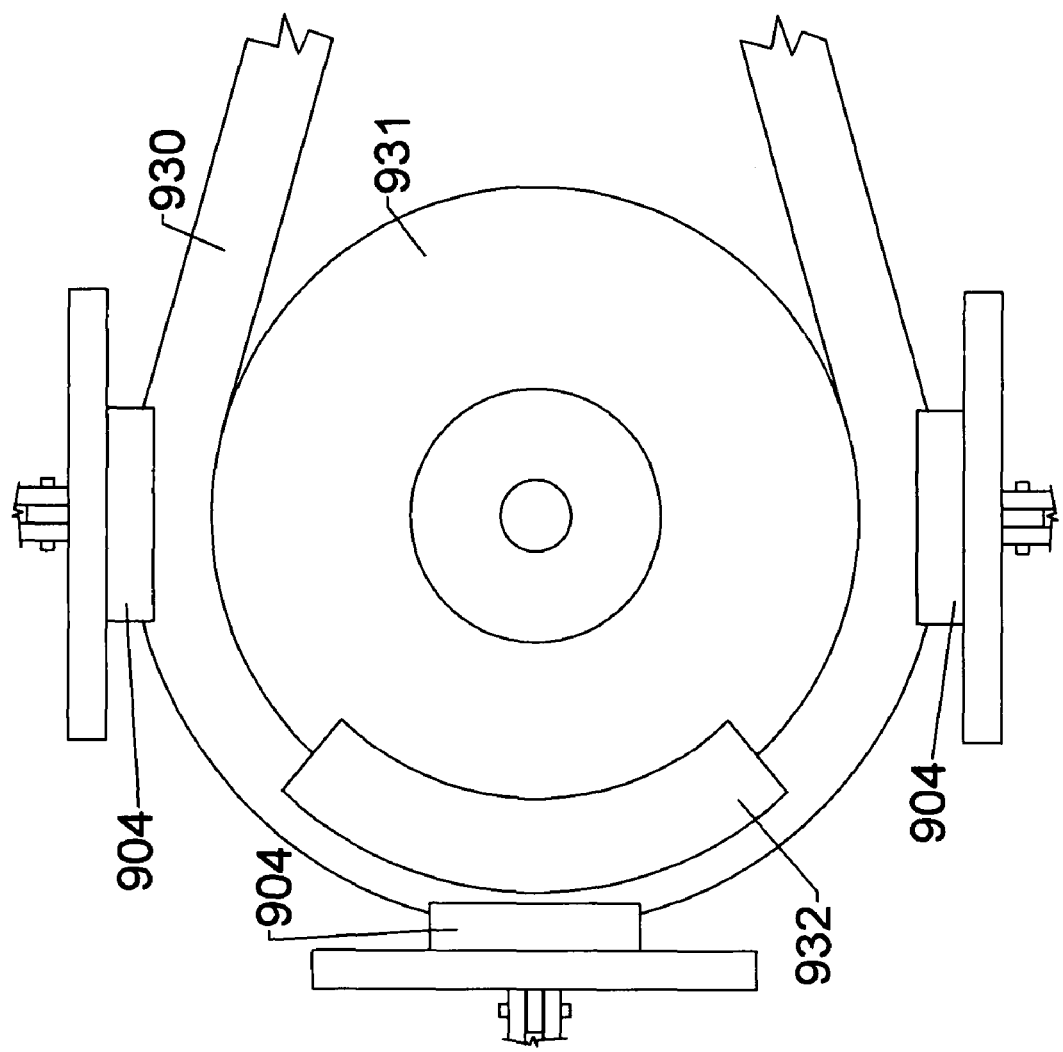

CONES, CONFIGURATIONS, AND ADJUSTERS FOR FRICTION AND NON-FRICTION DEPENDENT CONTINUOUS VARIABLE TRANSMISSIONS

CROSS REFERENCE TO RELATED APPLICATIONS

This invention is a Continuation-in-part (CIP) of U.S. patent application Ser. No. 11/039,297, which was filed on Jan. 20, 2005 now abandoned. In addition, this invention is entitled to the benefit of Provisional Patent Application (PPA) Ser. No. 60/696,588 filed on Jul. 5, 2005, PPA Ser. No. 60/700,847 filed on Jul. 19, 2005, PPA Ser. No. 60/724,098 filed on Oct. 6, 2005, PPA Ser. No. 60/729,822 filed on Oct. 25, 2005, PPA Ser. No. 60/773,916 filed on Feb. 16, 2006, PPA Ser. No. 60/795,528 filed on Apr. 27, 2006, PPA Ser. No. 60/845,617 filed on Nov. 28, 2006, and PPA Ser. No. 60/901,686 filed on Feb. 14, 2007.

BACKGROUND

1. Field of Invention

This invention relates to variable torque/speed transmission, specifically to a variable transmission where the transmission ratio can be varied continuously between any two predetermined values.

2. Description of Prior Art

In most applications the transmission ratio, which is the torque vs. speed ratio transmitted by a driving source, needs to be adjustable in order for the driving source to operate efficiently and effectively. For example, for a vehicle, during start-up, assuming that it is on a level road, the driving source needs to provide torque to accelerate the vehicle and torque to overcome the resisting forces mainly due to friction and wind resistance. Once the vehicle has reached its desired speed, again assuming that it is on level road, the engine only needs to provide torque to overcome the resisting forces, which in this case is likely to be greater than during start-up, but less than the total torque needed during start-up. Hence in this case the torque that the driving source needs to provide is less than the torque that it needs to provide during start-up. However, here the driving source needs to rotate the output shaft at a higher speed since the desired speed of the vehicle is assumed to be greater than the speed of the vehicle during start-up. From the example above, it can be seen that during start-up, the driving source needs to provide a relatively large torque and operate at a relatively low speed. And once the desired speed is reached, the driving source needs to provide a relatively small torque and operate at a relatively high speed. Here a relatively large torque would be wasteful. Hence in order to increase the efficiency of the driving source most vehicles have a transmission, which can vary the torque vs. speed ratio of the driving source.

Most vehicles, such as cars, bikes, or motorcycles use a discrete variable transmission. Here the operator can select between several discrete transmission ratios usually by selecting an input gear or sprocket that is coupled to an output gear or sprocket, which is selected from a set of output gears or sprockets of various pitch diameters. The main advantage of a Continuous Variable Transmission (CVT) over a discrete variable transmission is that a CVT can provide the driving source with a more efficient transmission ratio under most conditions.

One well know CVT, which principal of operation is similar with many CVT's of prior art, consists of two cones, each keyed to a separate shaft, that are coupled by a belt. Because the cones have a tapered surface, the pitch diameters of the cones, which depend on the diameters of the surface of the cones where the belt is axially positioned, changes as the axial position of the belt is changed. Since the apex of the cones point in the opposite direction, changing the axial position of the belt increases the pitch diameter of one cone while decreases the pitch diameter of the other cone. This fact is used to change the transmission ratio between the shafts. One problem with this CVT is that changing the transmission ratio causes wear and frictional energy loses, since the belt has to slide and/or stretch relative to the surfaces of the cones as the pitch diameters are changed.

Another problem with the CVT mentioned in the previous paragraph is that torque can only be transmitted by friction. The need of friction limits the torque that can be transmitted, without causing unpractical high stresses in the belt and in the CVT's supporting members.

SUMMARY

It is an object of this invention to present cones or cone assemblies with one or two oppositely positioned torque transmitting devices, such as torque transmitting arcs of constant pitch (formed by torque transmitting members) or teeth. The torque transmitting devices will be used for torque transmission between at least one means for coupling, such as transmission belt or chain, and a cone or cone assembly. The cones or cone assemblies can be used to construct CVT's for which significant circumferential sliding between the torque transmitting surfaces of the torque transmitting devices and the torque transmitting surfaces of the means for coupling engaged to them due to change in pitch diameter can be eliminated, as to reduce wear and frictional energy loses typical in similar devices of prior art and allow the usage of positive engagement devices, such as teeth, in coupling the torque transmitting devices with their means for coupling.

It is another object of this invention to present CVT's that consist of at least one cone or one cone assembly of this invention that is coupled by a means for coupling to at least one means for conveying rotational energy, such as a pulley, a sprocket, a cone assembly of this invention, or a cone of this invention.

It is another object of this invention to provide adjuster systems that can increase the performance of the CVT's of this invention and other CVT's that suffer from either or both transition flexing and a limited duration at which the transmission ratio can be changed, so that efficient non-friction dependent CVT's and efficient friction dependent and CVT's do not suffer from transition flexing and/or a limited duration at which the transmission ratio can be changed can be constructed. Several CVT's utilizing an adjuster system are described in this patent.

OBJECTS AND ADVANTAGES

Accordingly the objects and advantages of the present invention are:
(g) To provide cones or cone assemblies that can be used to construct various CVT's.
(h) To provide several CVT's for which frictional energy loses and wear due to change in transmission ratio can be significantly reduced over many CVT's of prior art.
(i) To provide several non-friction dependent CVT's that have better efficiency than many CVT's of prior art.
(j) To provide adjuster systems that can eliminate or significantly reduce transition flexing in some of the CVT's described in this patent as well as other CVT's that suffer from the same problem, as to increase the performance and live of those CVT's.

(k) To provide adjuster systems that can substantially increase the duration at which the transmission ratio can be changed for some of the CVT's described in this patent as well as other CVT's that suffer from the same problem, as to improve the transmission ratio changing responsiveness of those CVT's (l) To increase the efficiency of machines by introducing CVT's that have sufficient torque transmission efficiency to replace discrete variable transmissions.

Still further objects and advantages will become apparent from a consideration of the ensuing description and drawings.

DRAWING FIGURES

In the drawings, closely relayed figures have the same number but different alphabetic suffixes. Also because of time constraint some items are not drawn to scale, however with the accompanying description their intent should be clear.

FIGS. 1A and 1B show the general configuration for the cone with torque transmitting member(s), where a torque transmitting member is positioned at the larger end of its cone. This cone assembly is labeled as cone assembly 1026.

FIGS. 1C and 1D show the general configuration for the cone with torque transmitting member(s), where a torque transmitting member is positioned at the smaller end of its cone. This is another drawing of cone assembly 1026.

FIGS. 2A and 2B show a cone 1024 on which a friction torque transmitting member 1046F, which uses friction to transmit torque, is attached.

FIGS. 3A, 3B, 3C, and 3D are drawings of a cone with two torque transmitting members, which are placed opposite from each other. This cone assembly is labeled as cone assembly A 1026A.

FIGS. 4A, 4B, 4C, and 4D are drawings of a cone with one torque transmitting member and one maintaining member, which is placed opposite from the torque transmitting member. The arc length of its torque transmitting member is limited as will be discussed in the description for cone assembly B 1026B. This cone assembly will be referred to as cone assembly B 1026B. In addition, FIGS. 4A, 4B, 4C, and 4D also show a mover mechanism that will be used to move the torque transmitting members and the maintaining members relative to the surface of the cone to which they are attached in the axial direction.

FIGS. 5A, 5B, 5C, and 5D are drawings of a cone with one torque transmitting member, which arc length is limited. The arc length limitation will be discussed in the description for cone assembly C 1026C. This cone assembly will be referred to as cone assembly C 1026C.

FIGS. 6A to 6D shows a cone assembly AF 1026AF that uses friction torque transmitting members 1046F.

Figure 3B:
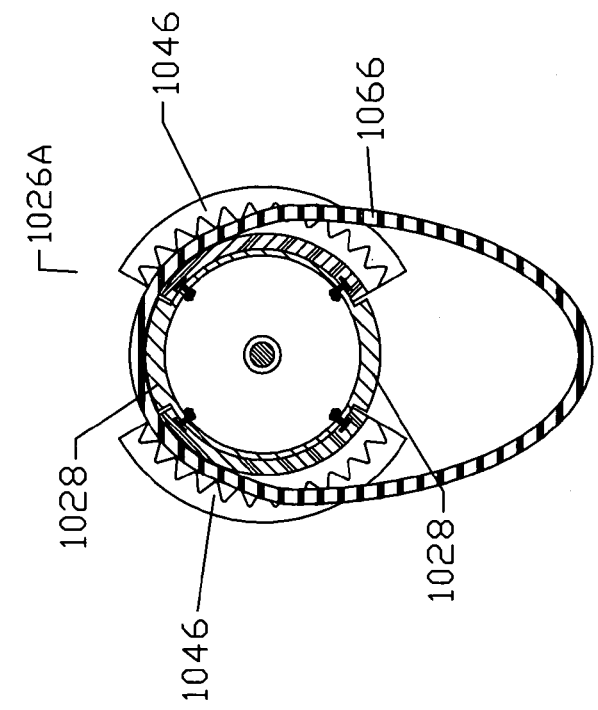
Figure 3A:
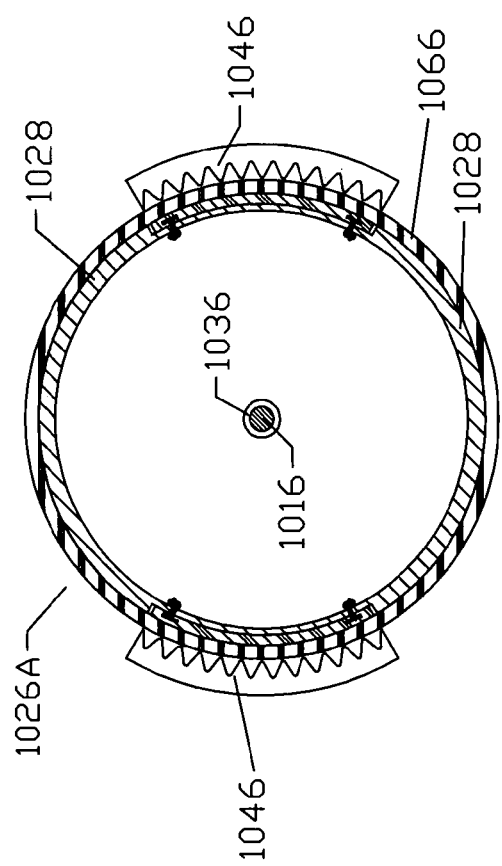
Figure 3D:
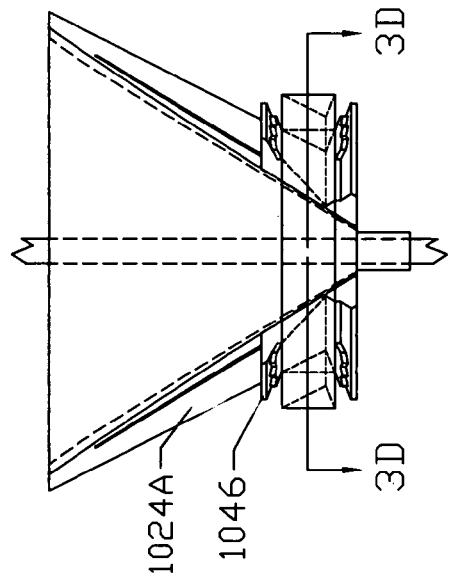
Figure 3C:
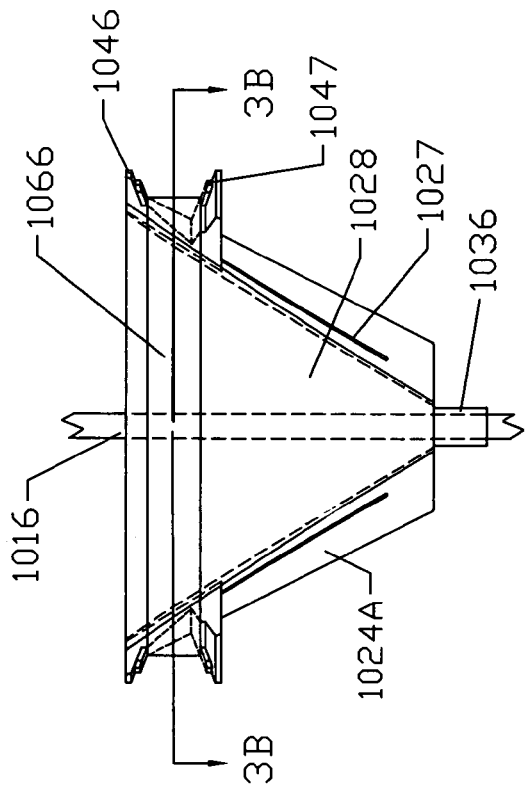
Figure 6D:
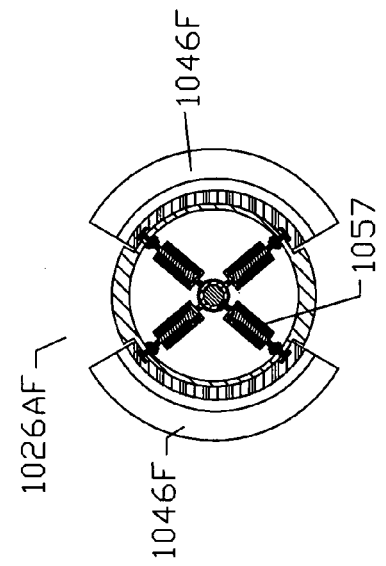
Figure 6B:
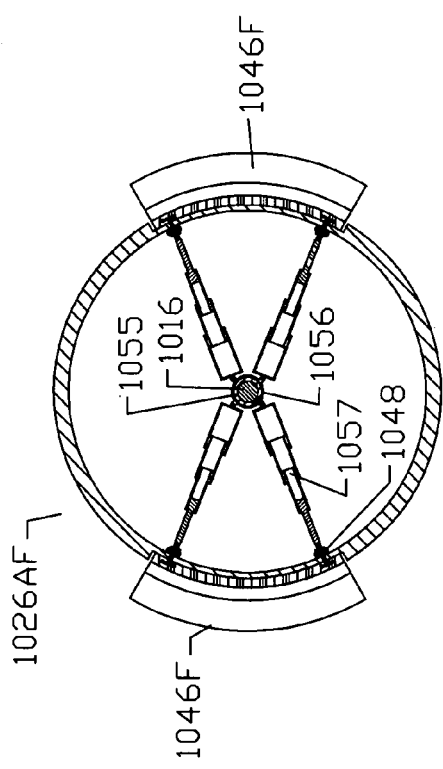
Figure 6C:
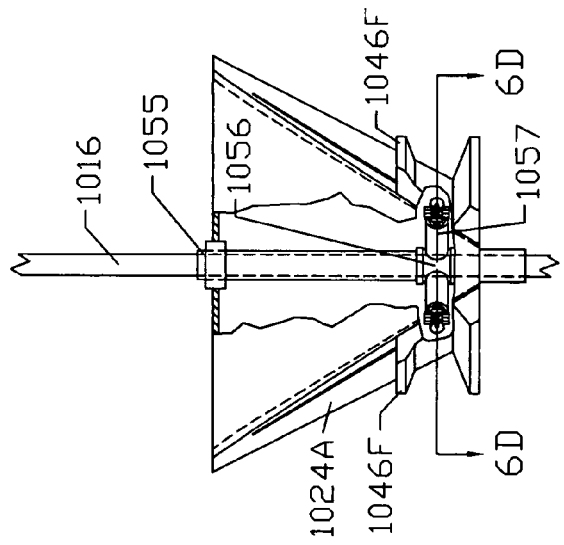
Figure 6A:
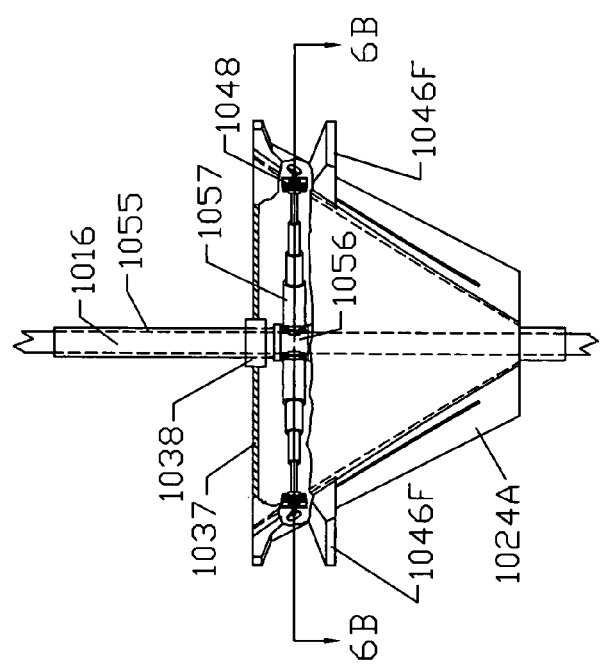
Figure 7A:
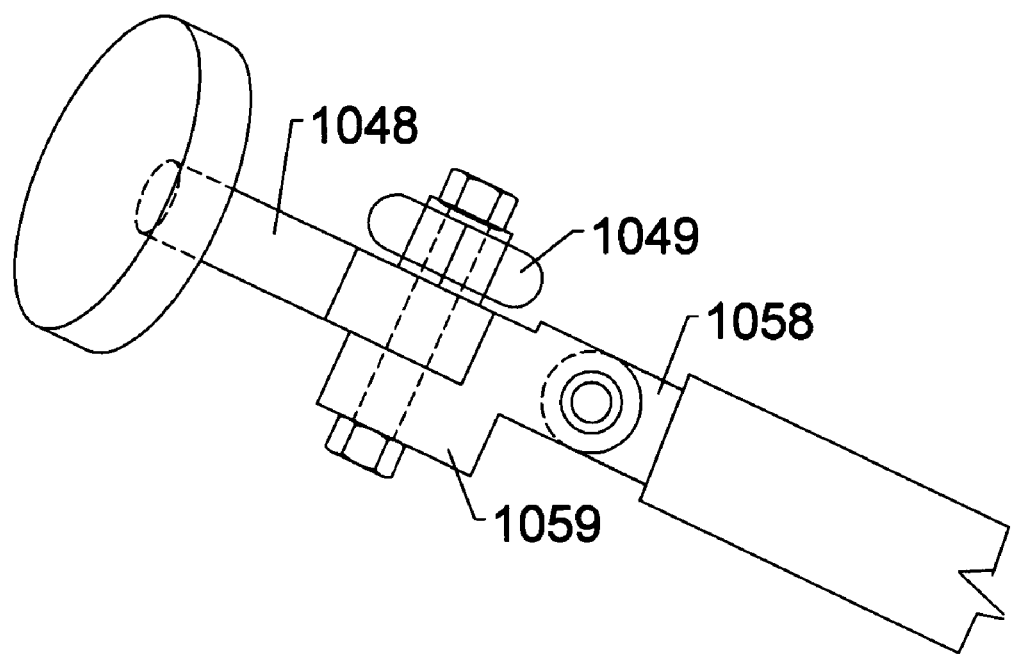

FIG. 7A shows a front-view of an attachment plate that is connected to its telescope.

Figure 7B:
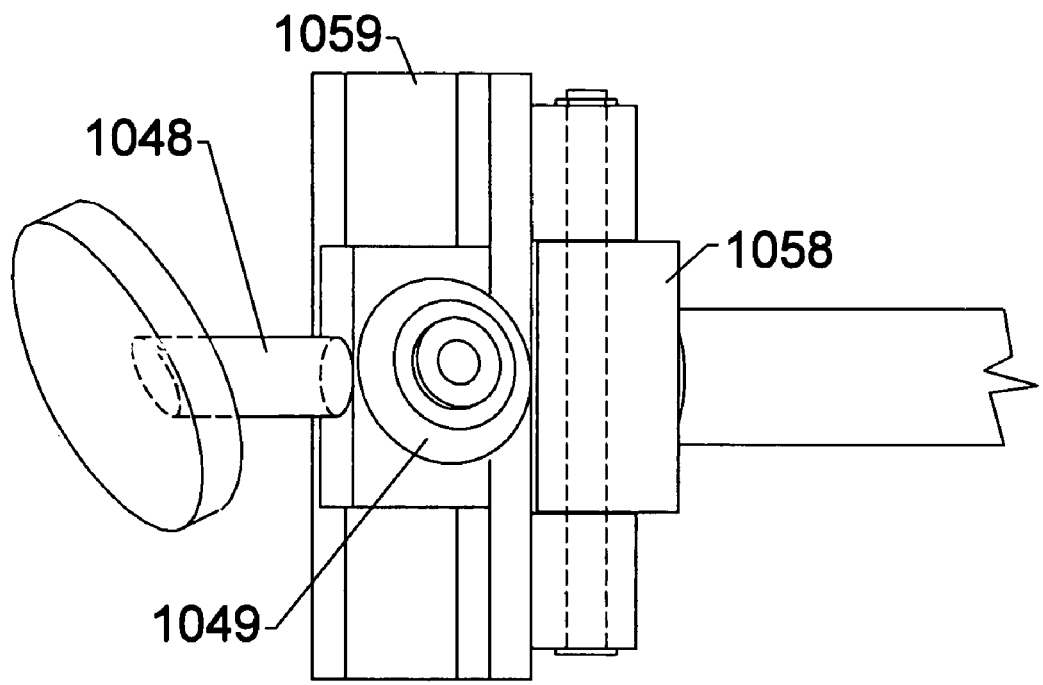

FIG. 7B shows a top-view of an attachment plate that is connected to its telescope.

Figure 8B:
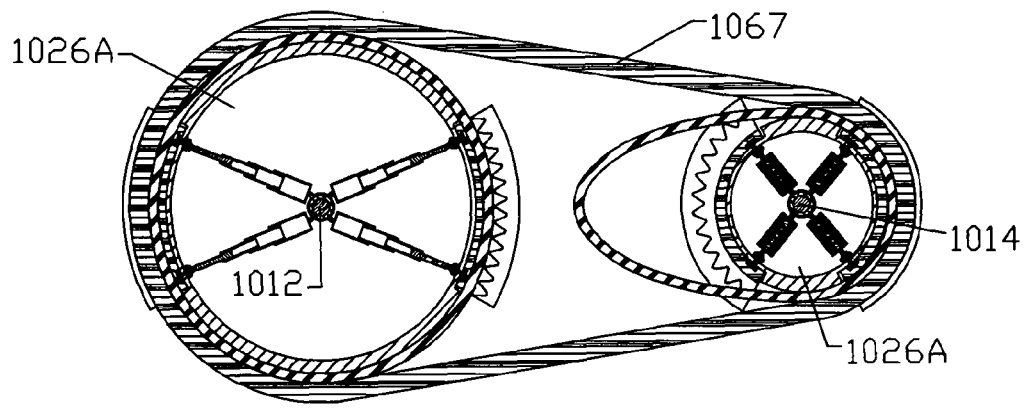
Figure 8A:
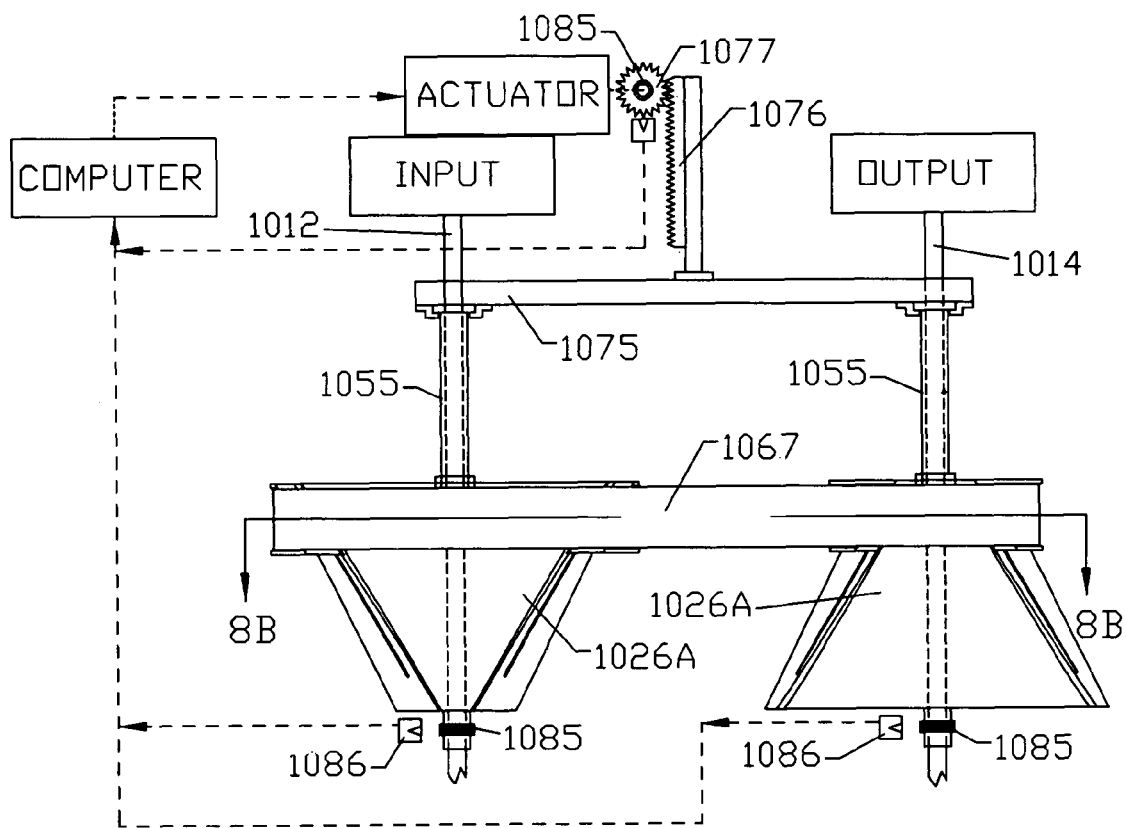

FIGS. 8A and 8B shows a CVT that uses two cone assemblies A 1026A. This CVT will be labeled as CVT 1.

Figure 9A:
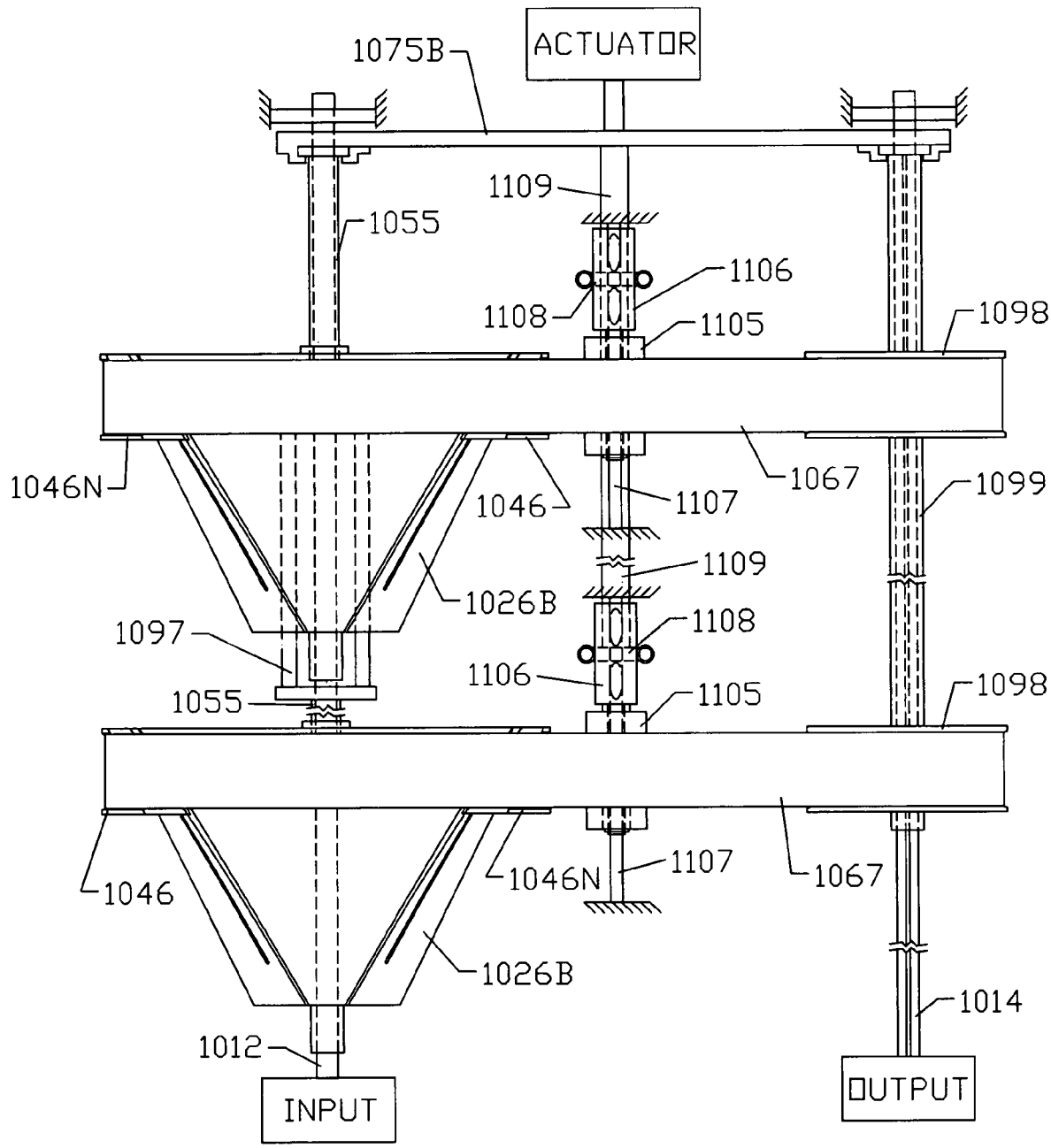

FIG. 9A is a top-view of a CVT that uses two cone assemblies B 1026B, which are coupled to two transmission pulleys. This CVT will be labeled as CVT 2.

Figure 9B:
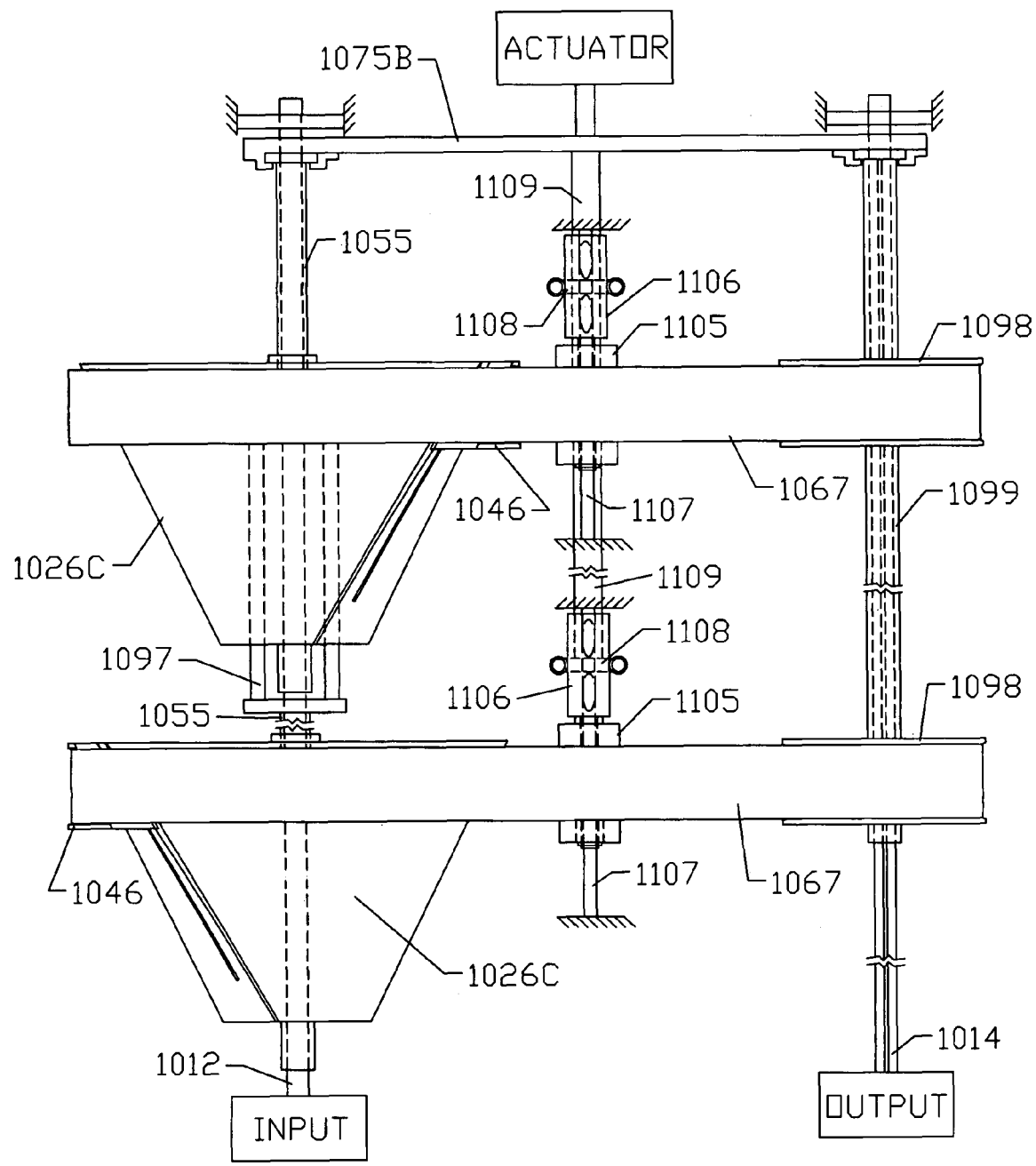

FIG. 9B is a top-view of a CVT that uses two cone assemblies C 1026C, which are coupled to two transmission pulleys. This CVT will also be labeled as CVT 2.

Figure 9D:
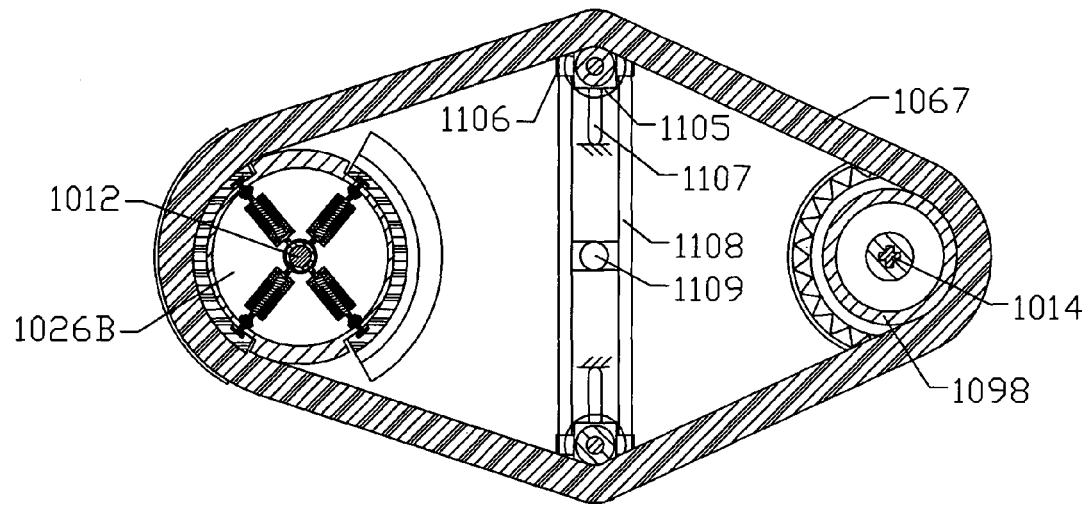
Figure 9C:
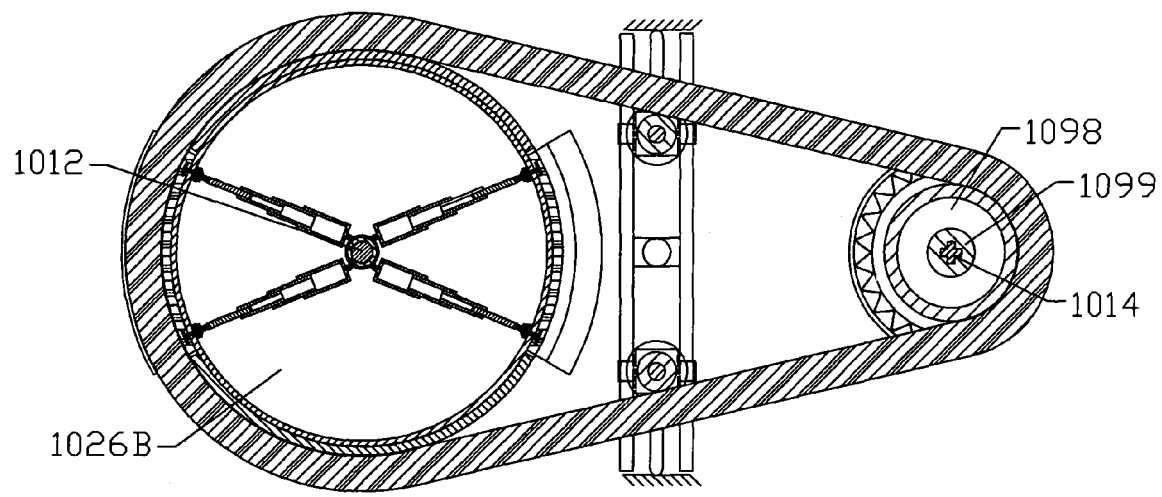

FIG. 9C is a cross-sectional front view of CVT 2 taken at the axial midpoint of a torque transmitting member, which is positioned at the larger end of cone assembly B 1026B.

FIG. 9D is a cross-sectional front view of CVT 2 taken at the axial midpoint of a torque transmitting member, which is positioned at the smaller end of cone assembly B 1026B.

Figure 9E:
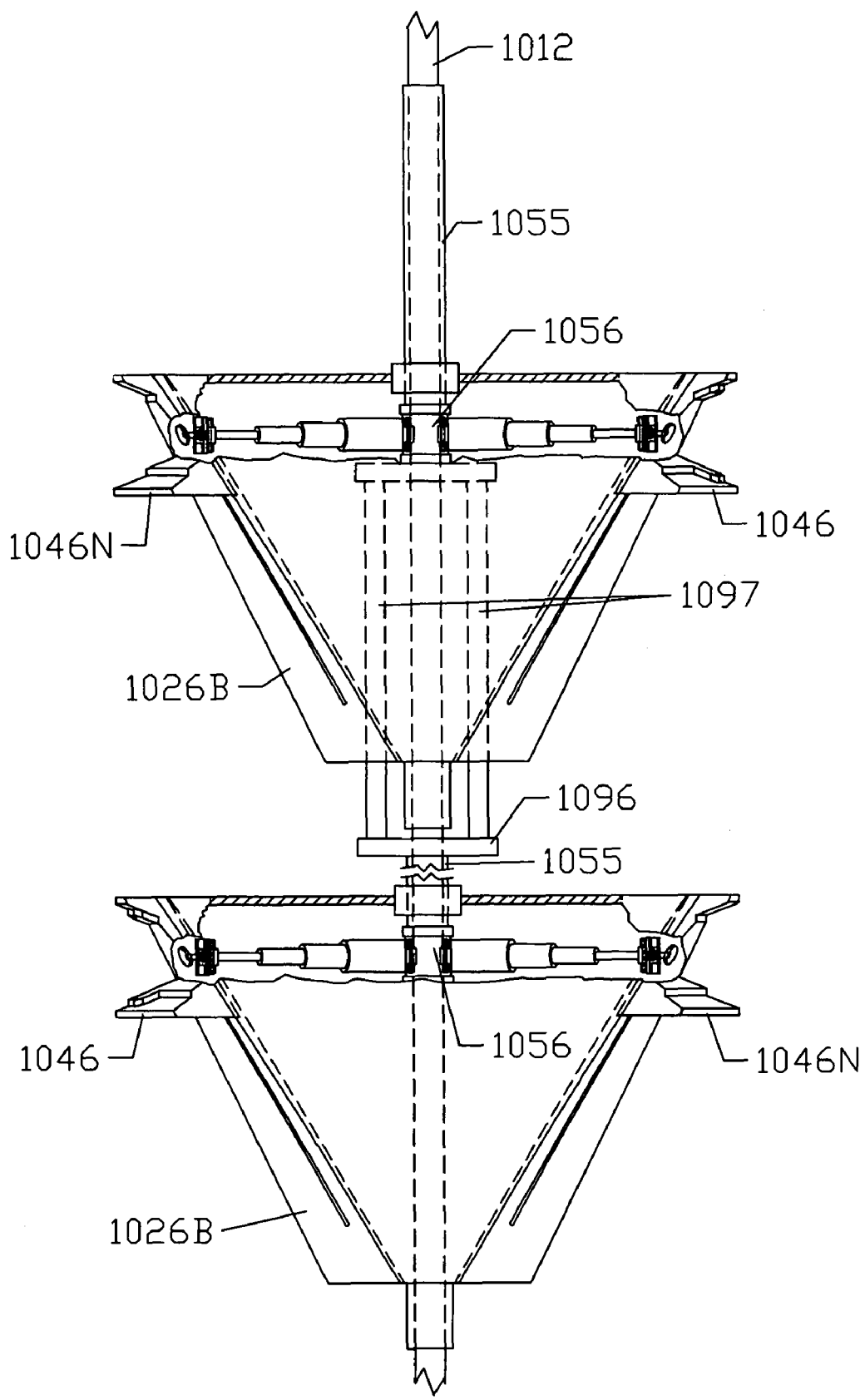

FIG. 9E shows a joiner mechanism that can be used to connect the slider bushings of cone assemblies B 1026B and cone assemblies C 1026C.

Figure 10:
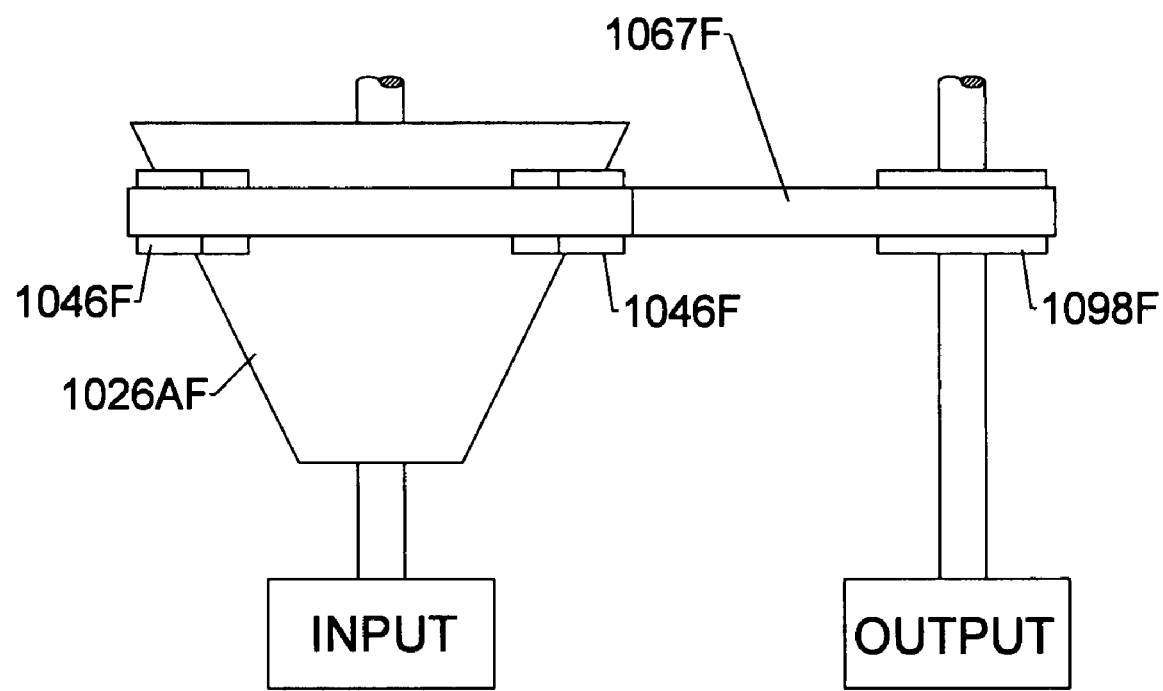

FIG. 10 shows a top-view of a CVT 3, which is a CVT where one cone assembly is coupled by a belt to a pulley.

Figure 11A:
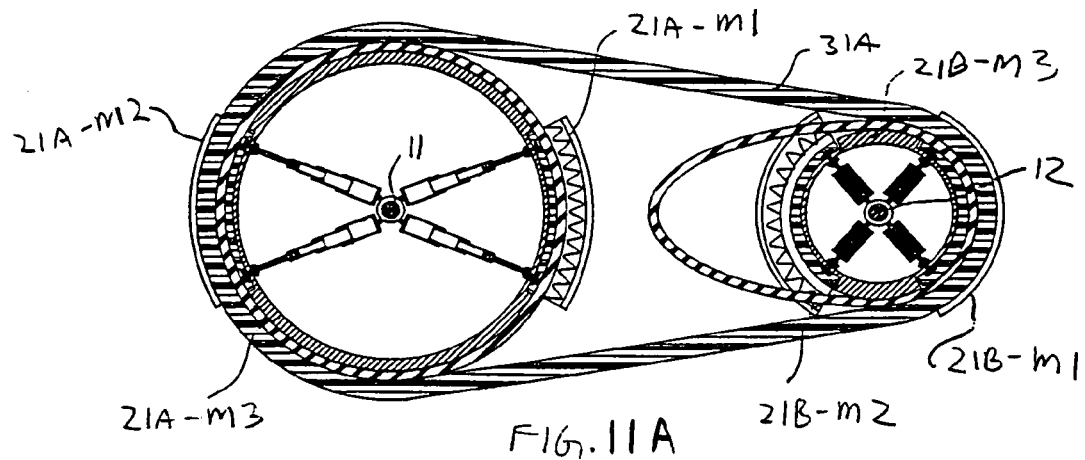

FIG. 11A is a sectional front-view of CVT 1.

Figure 11B:
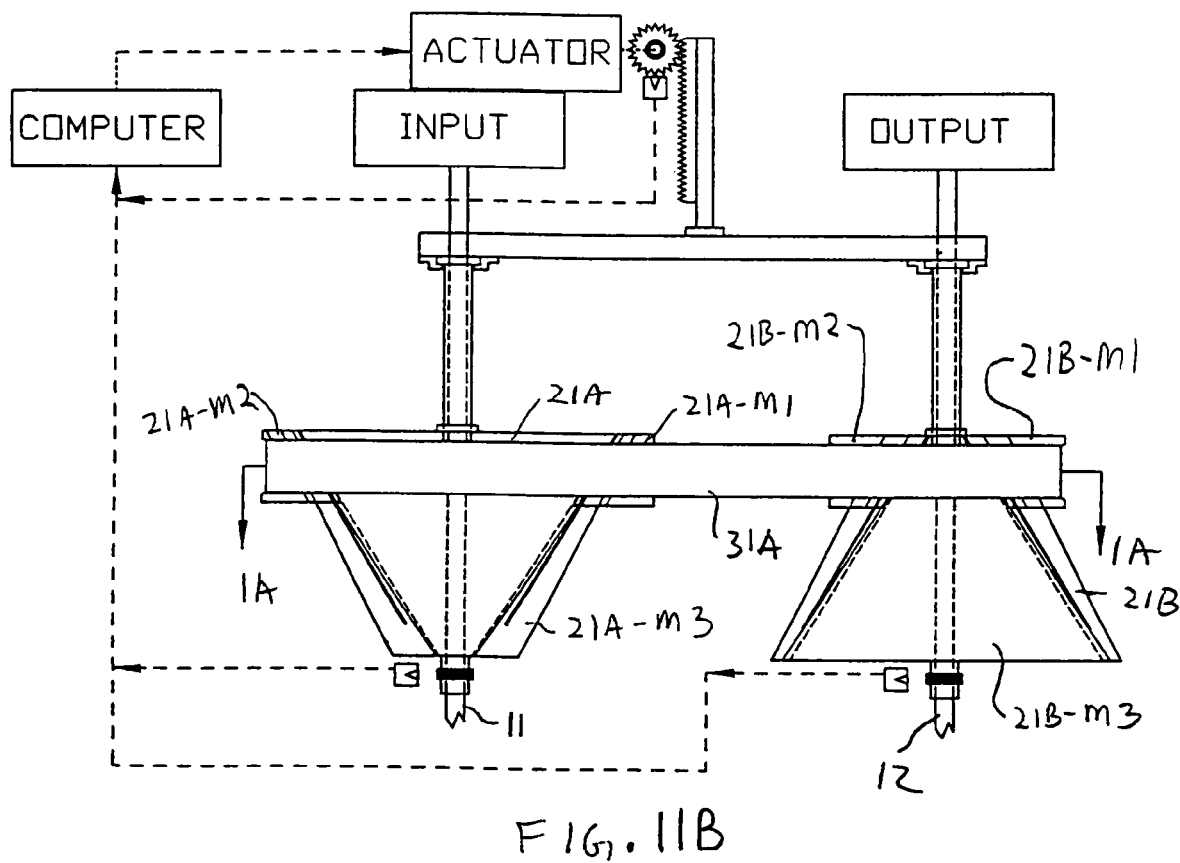

FIG. 11B is a top-view of CVT 1.

Figure 12A:
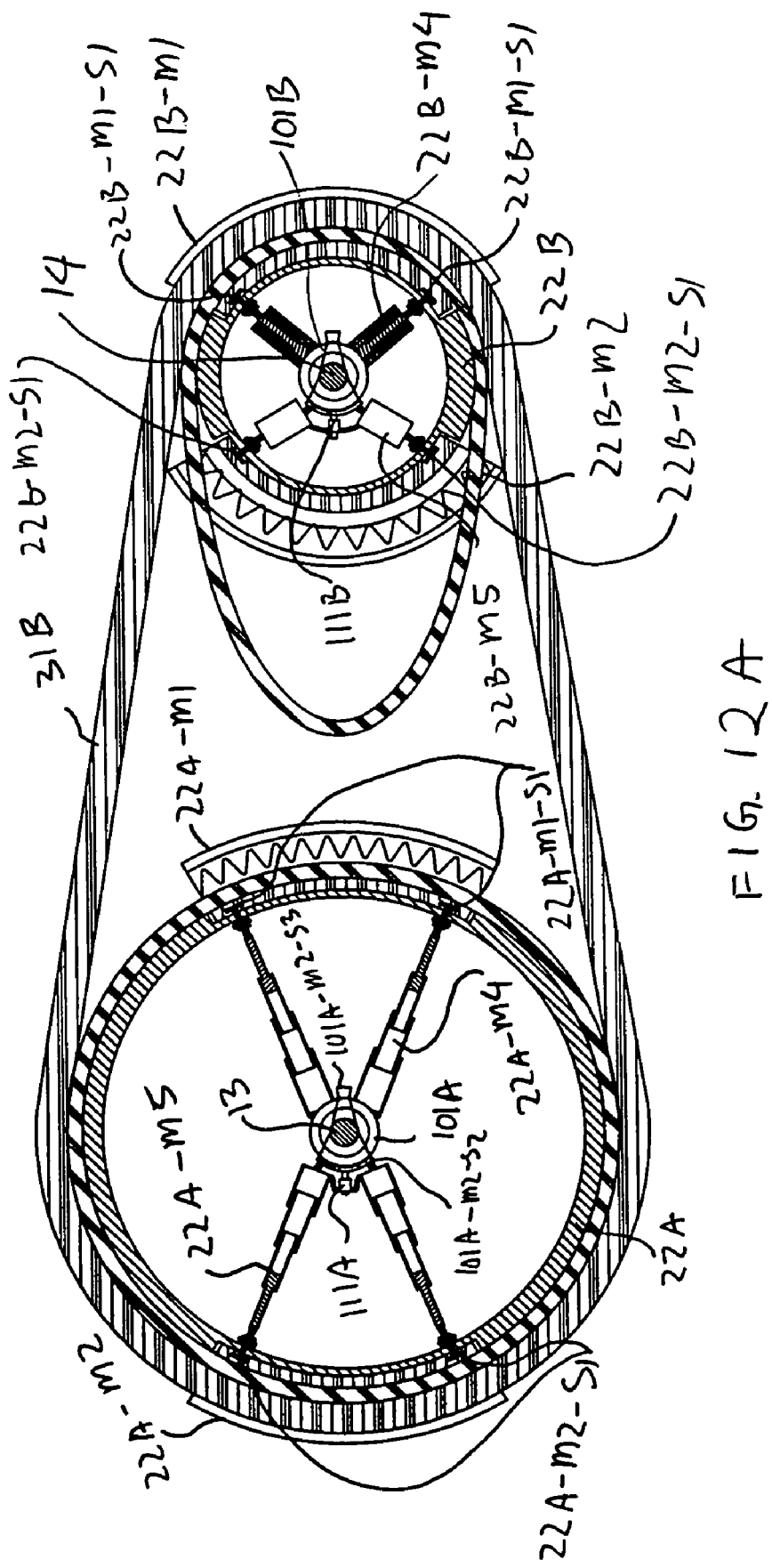

FIG. 12A is a sectional front-view of CVT 1.1.

FIG. 12B is a top-view of CVT 1.1.

Figure 13:
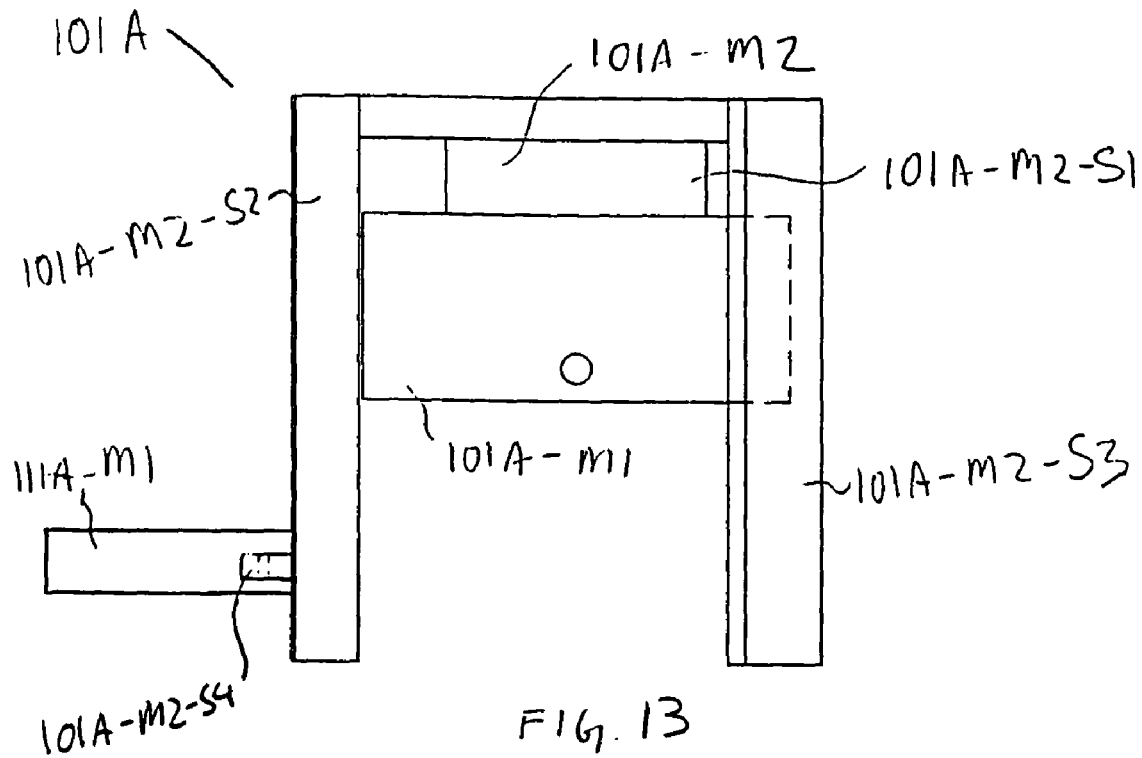

FIG. 13 is a top-view of transition flexing adjuster AD1A 101A.

Figure 14:
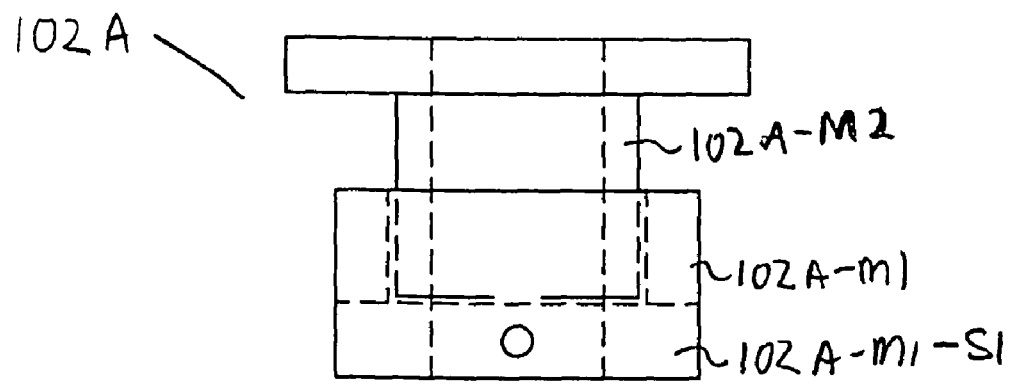

FIG. 14 is a top-view of mover adjuster AD2A 102A.

Figure 15:
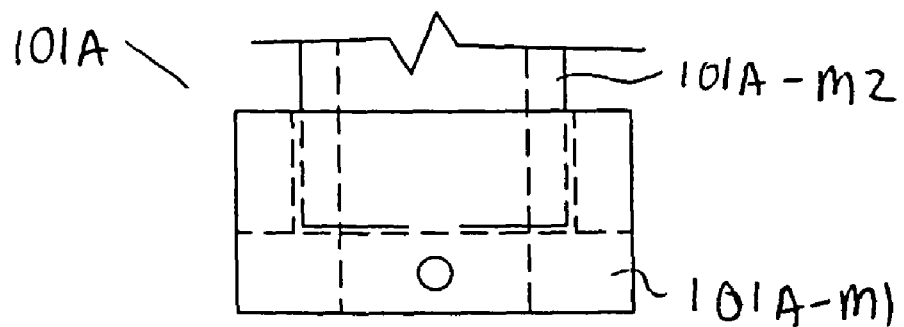

FIG. 15 is a partial top-view of transition flexing adjuster AD 101A.

Figure 16:
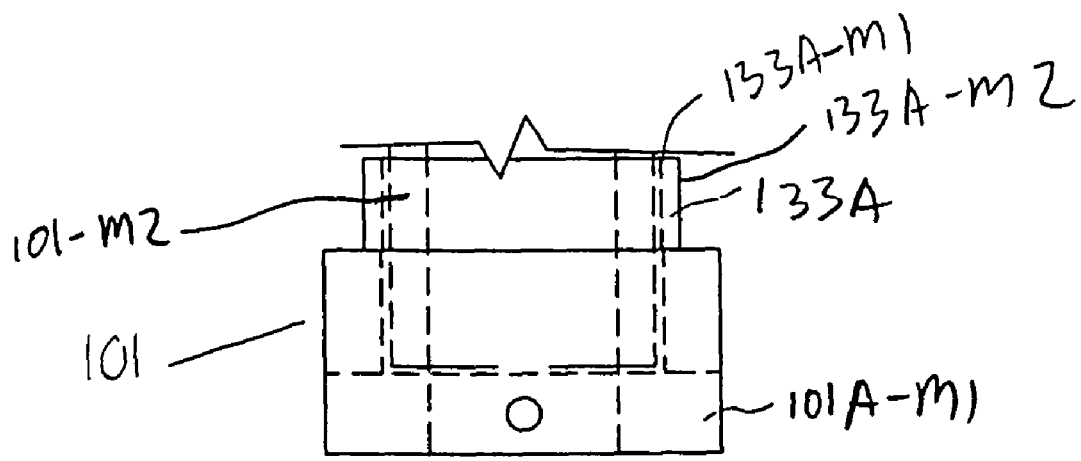

FIG. 16 is a partial top-view of transition flexing adjuster AD 101, on which a relative rotational position sensor SN3A 133A is mounted.

Figure 17:
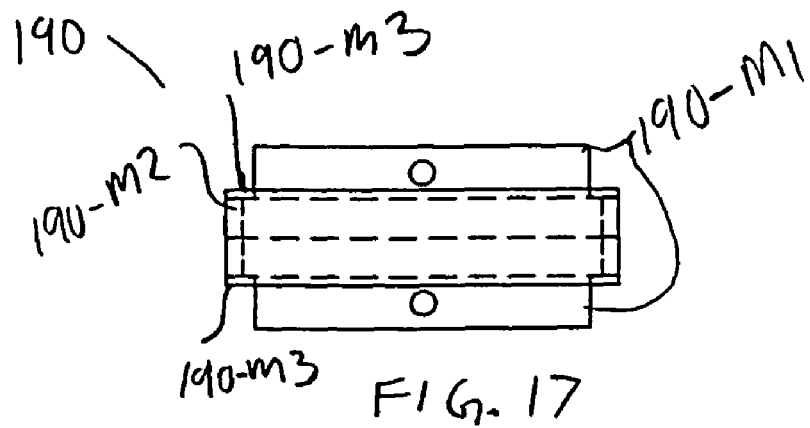

FIG. 17 is a top-view of rotatable coupling 190.

Figure 18:
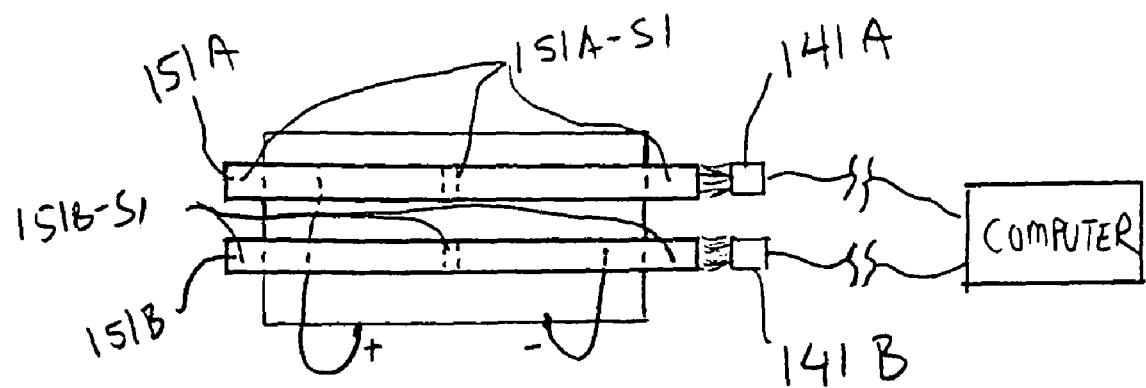

FIG. 18 is a top-view of a ring and brush electrical connection.

Figure 19:
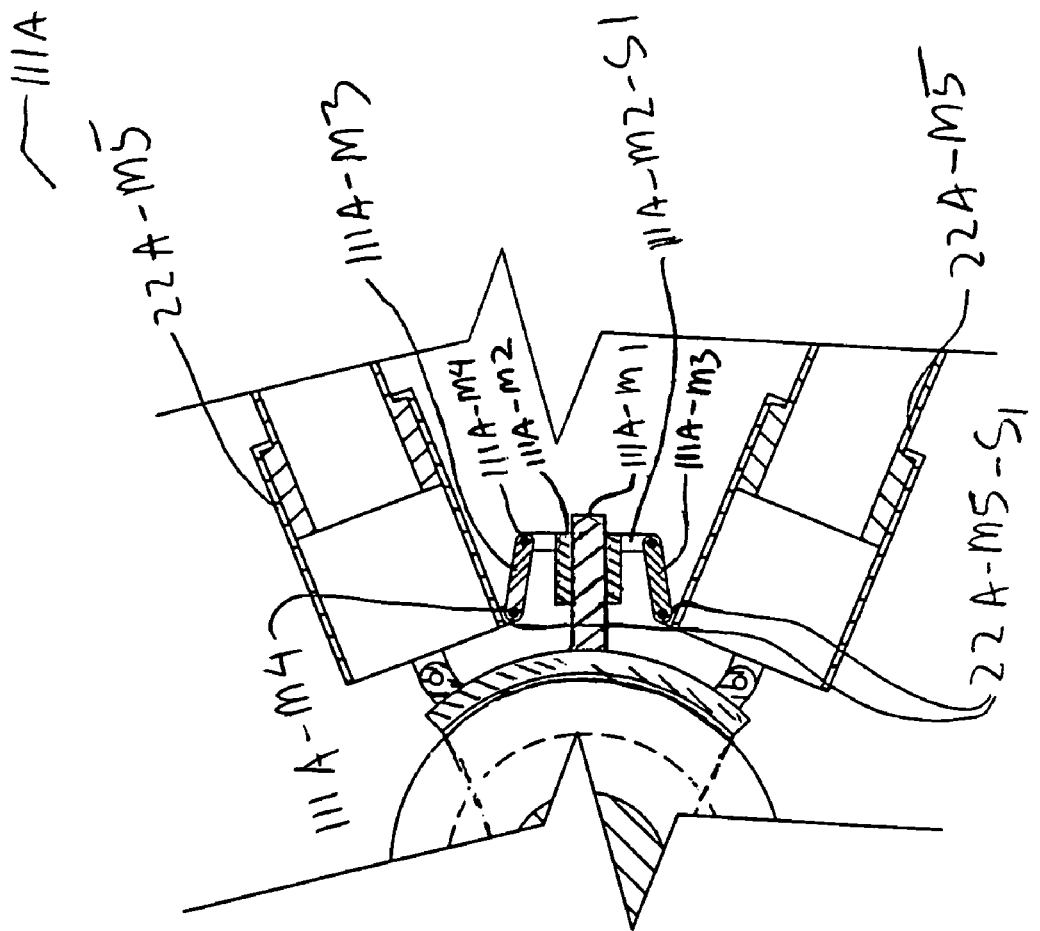

FIG. 19 is a sectional front-view of constrainer mechanism CN1A 111A.

FIGS. 20A-20D shows how the relative rotational position between the torque transmitting members need to be adjusted in order to reduce transition flexing.

Figure 21A:
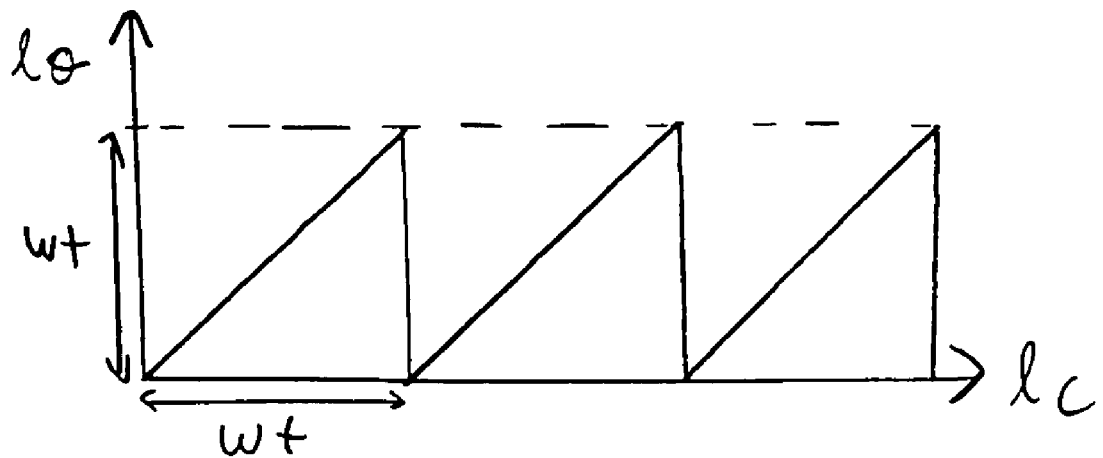
Figure 21B:
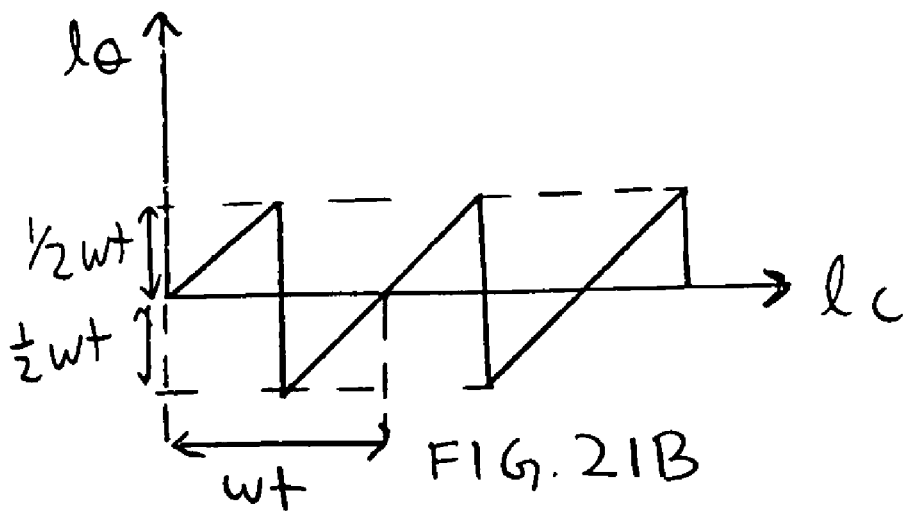
Figure 21C:
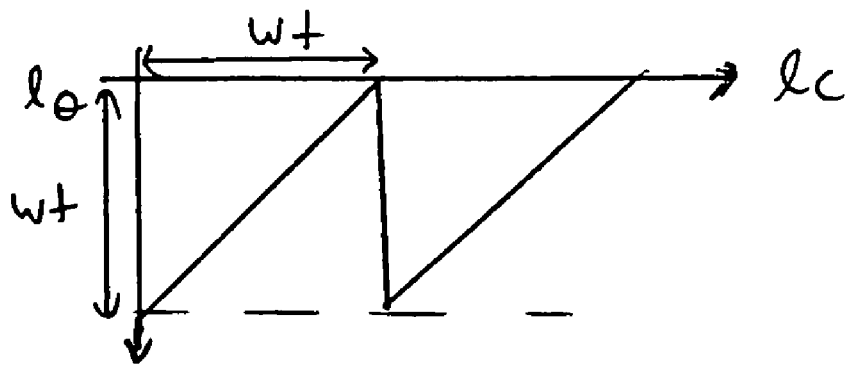

FIGS. 21A-21C show graphs that show the required rotational rotation, $l_\theta$, vs. arc length of the critical non-torque transmitting arc, $l_c$.

Figure 22:
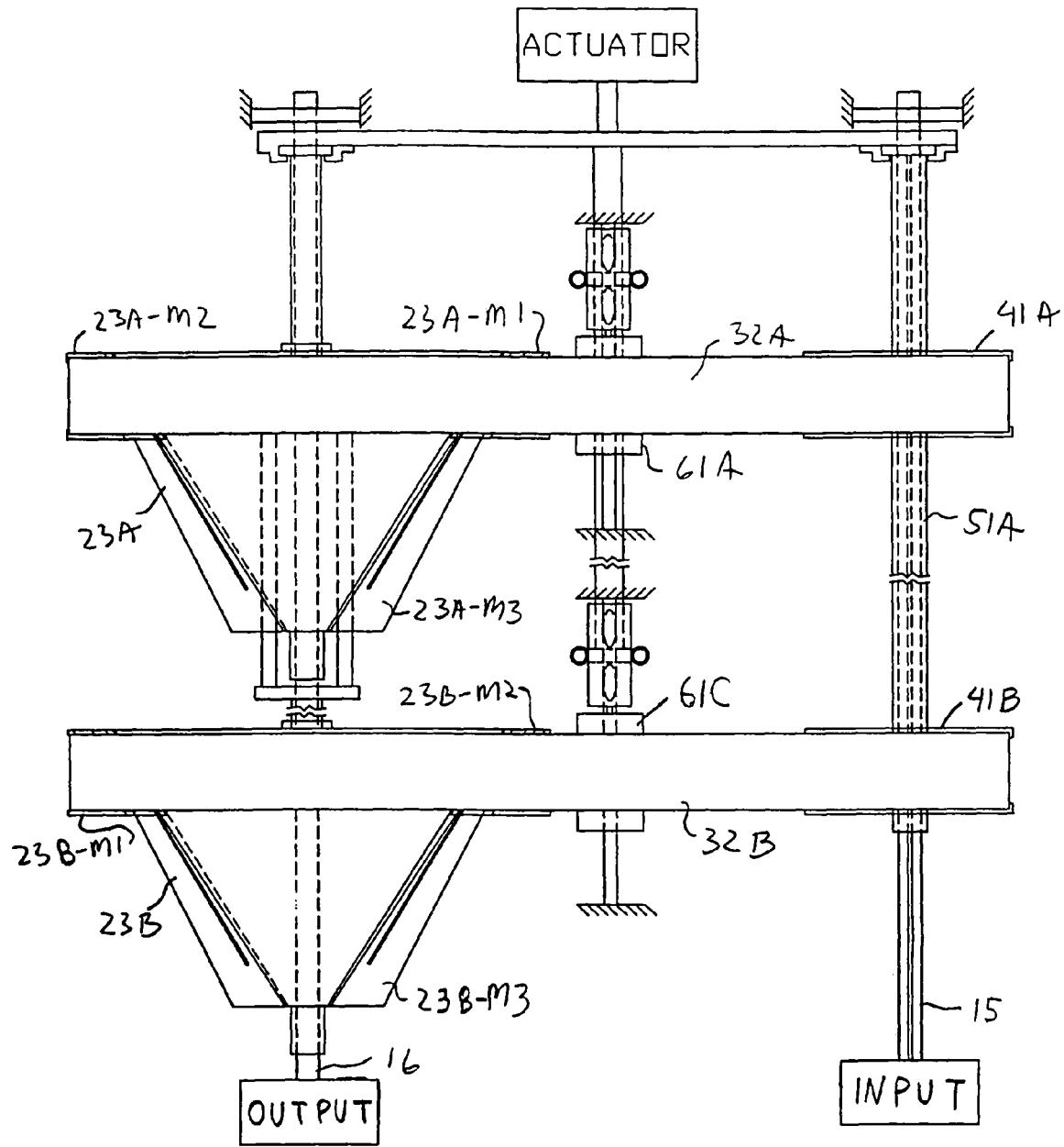

FIG. 22 is a top-view of CVT 2.

Figure 23:
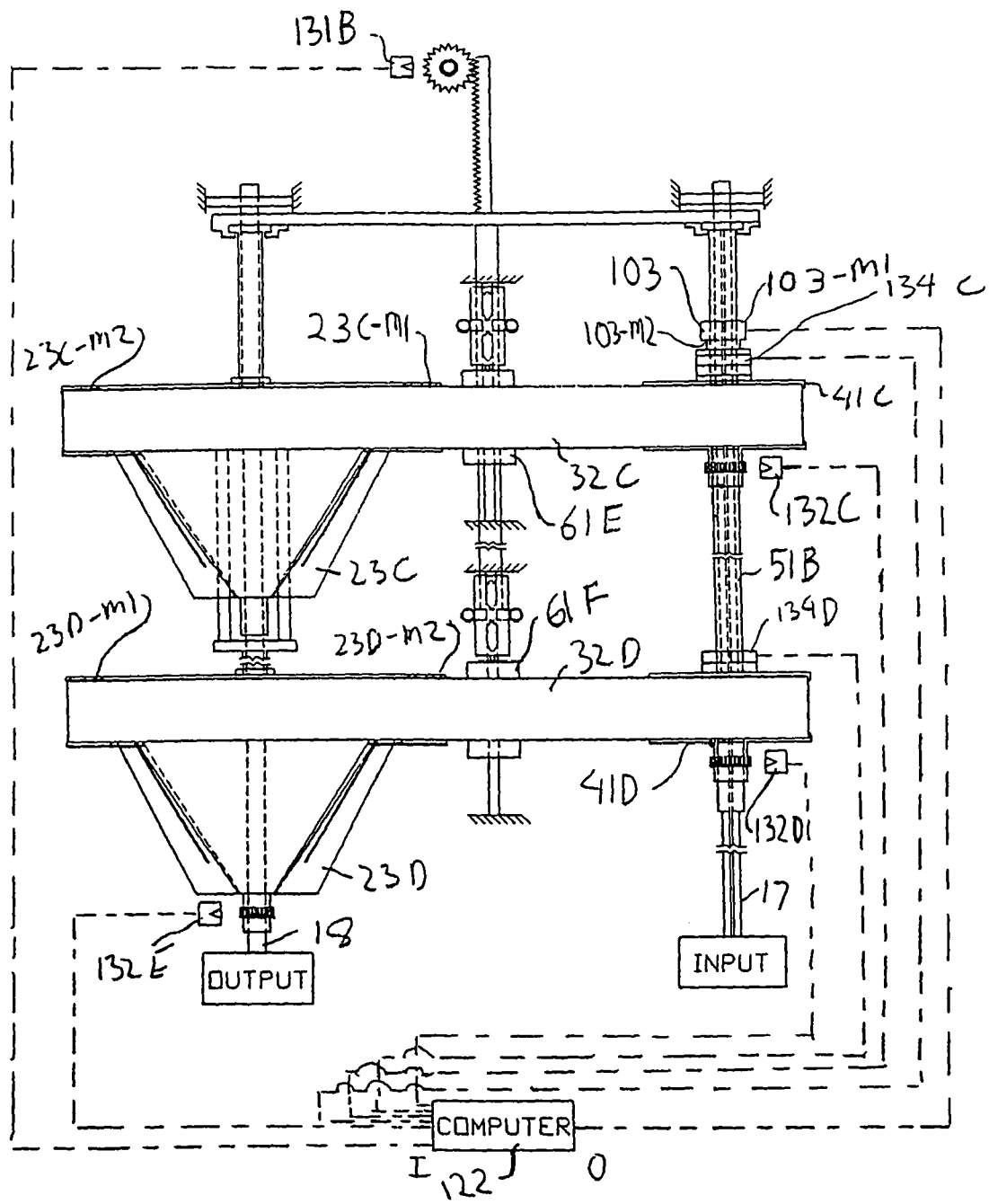
Figure 24A:
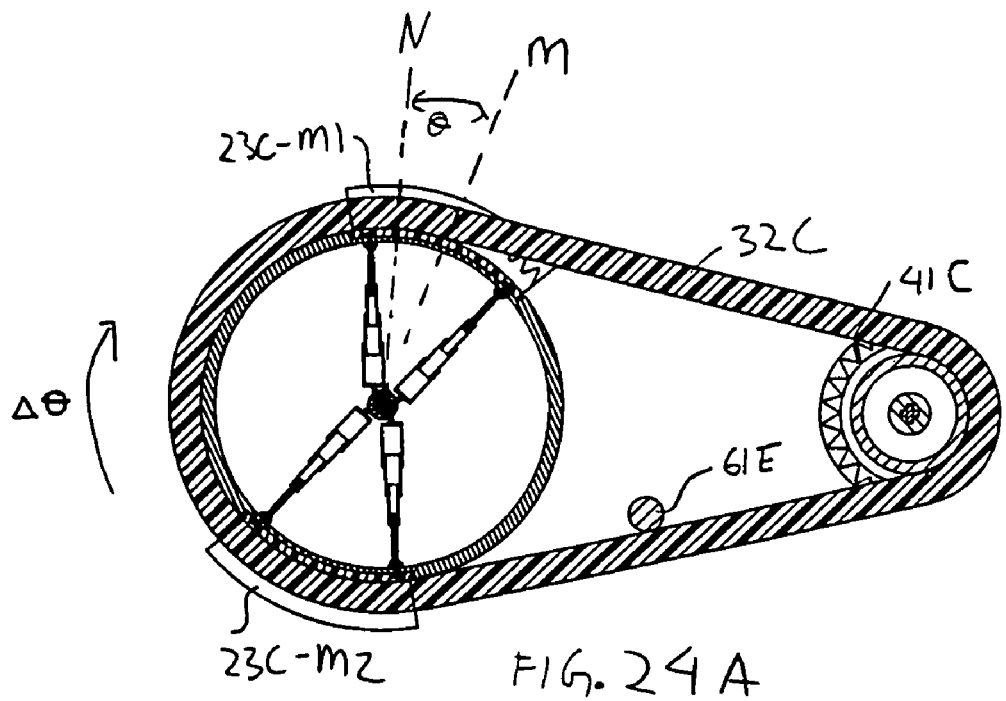
Figure 24B:
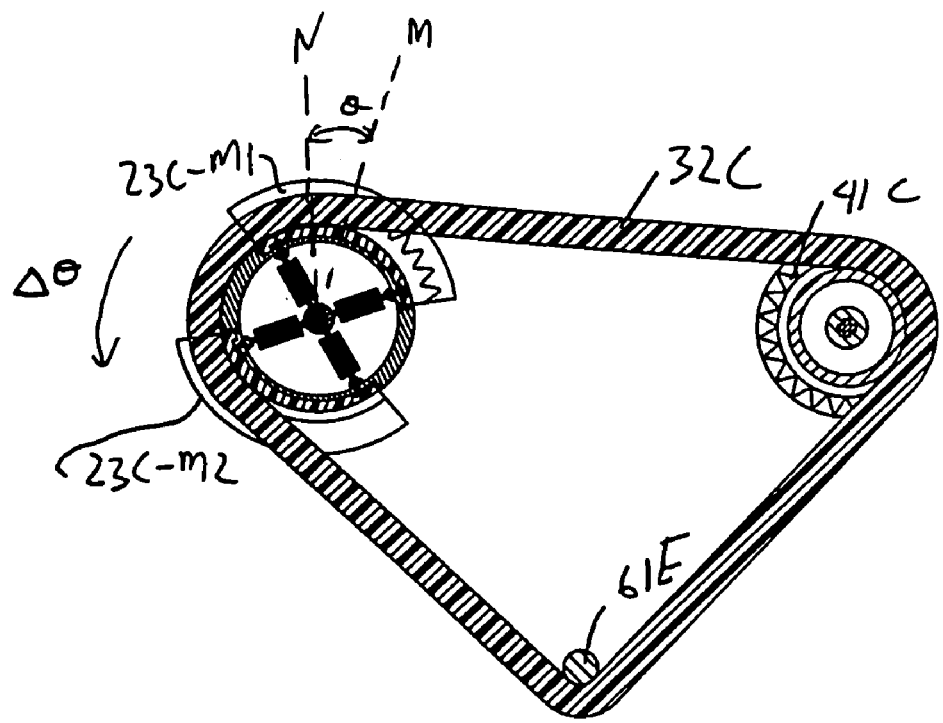
Figure 24C:
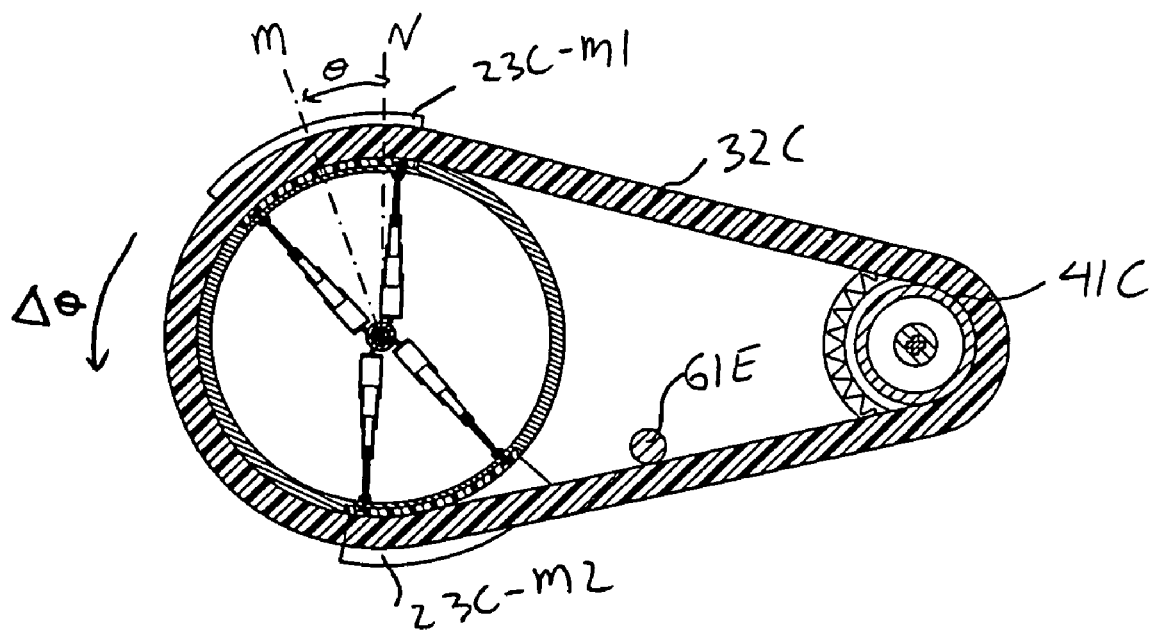
Figure 24D:
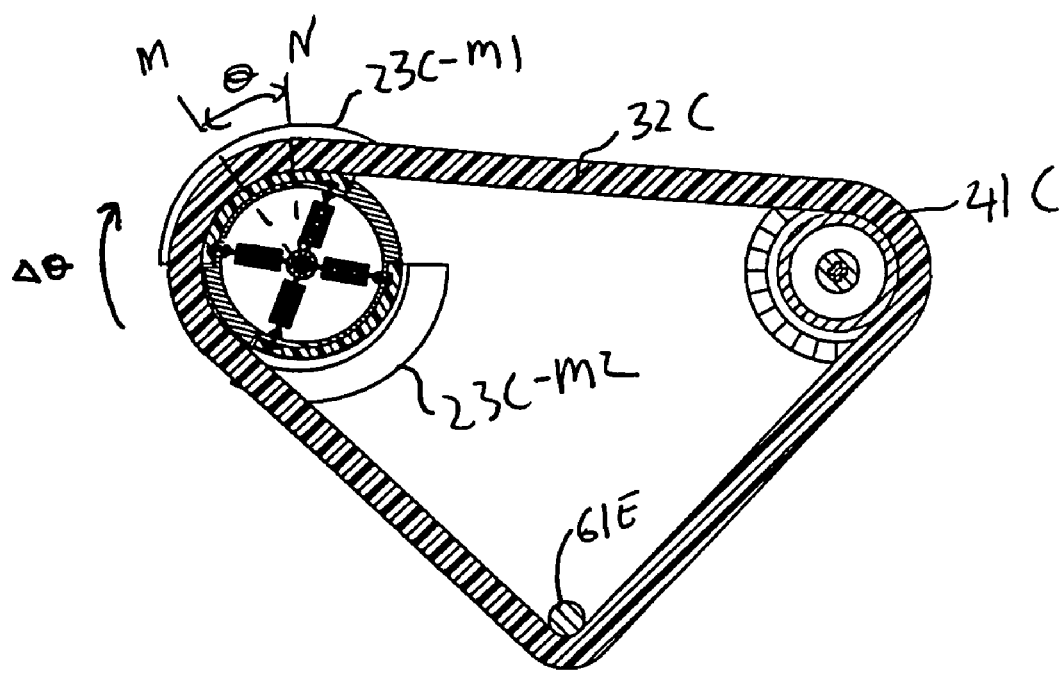

FIG. 23 is a top-view of CVT 2.1.

FIGS. 24A-24D show sectional front-views of CVT 2.1, which show the angle $\theta$, which is the angle between the neutral point, N, and the midpoint, M, of the upper positioned torque transmitting member, and the direction of transmission ratio change rotation, $\Delta\theta$.

FIG. 25 shows an equation that can be used in order to calculate transmission ratio change rotation.

FIGS. 26A-26C, 27A, 27B, 28A, 28B, 29A, 29B show sectional front-views of CVT 2.1, which are used in order to illustrate the required direction of the adjusting rotation, $\omega_A$, of transmission pulley 41C in order to compensate for transmission ratio change rotation.

Figure 30A:
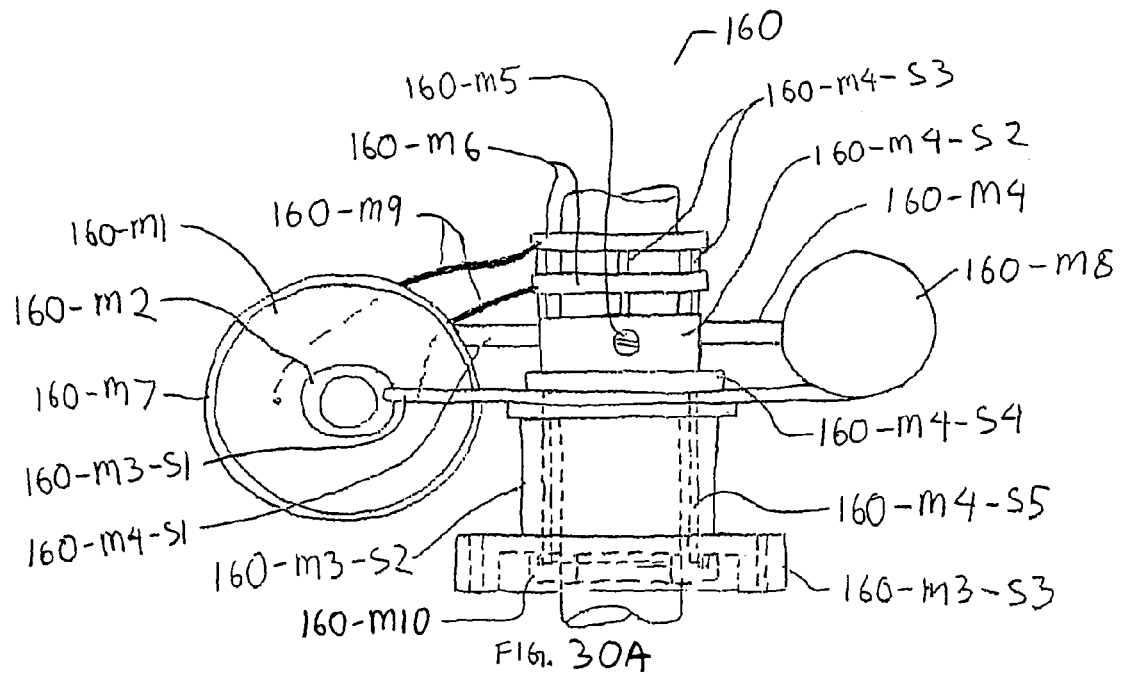

FIG. 30A shows a top-view of electrical adjuster 160.

Figure 30B:
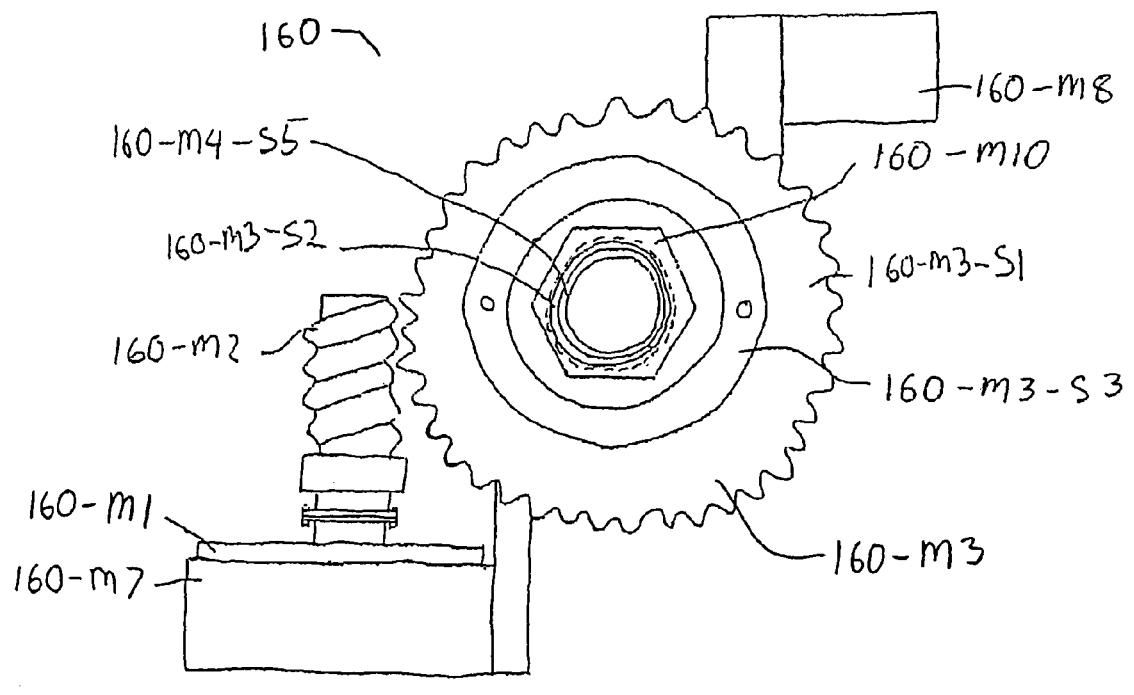

FIG. 30B shows a front-view of electrical adjuster 160.

Figure 31:
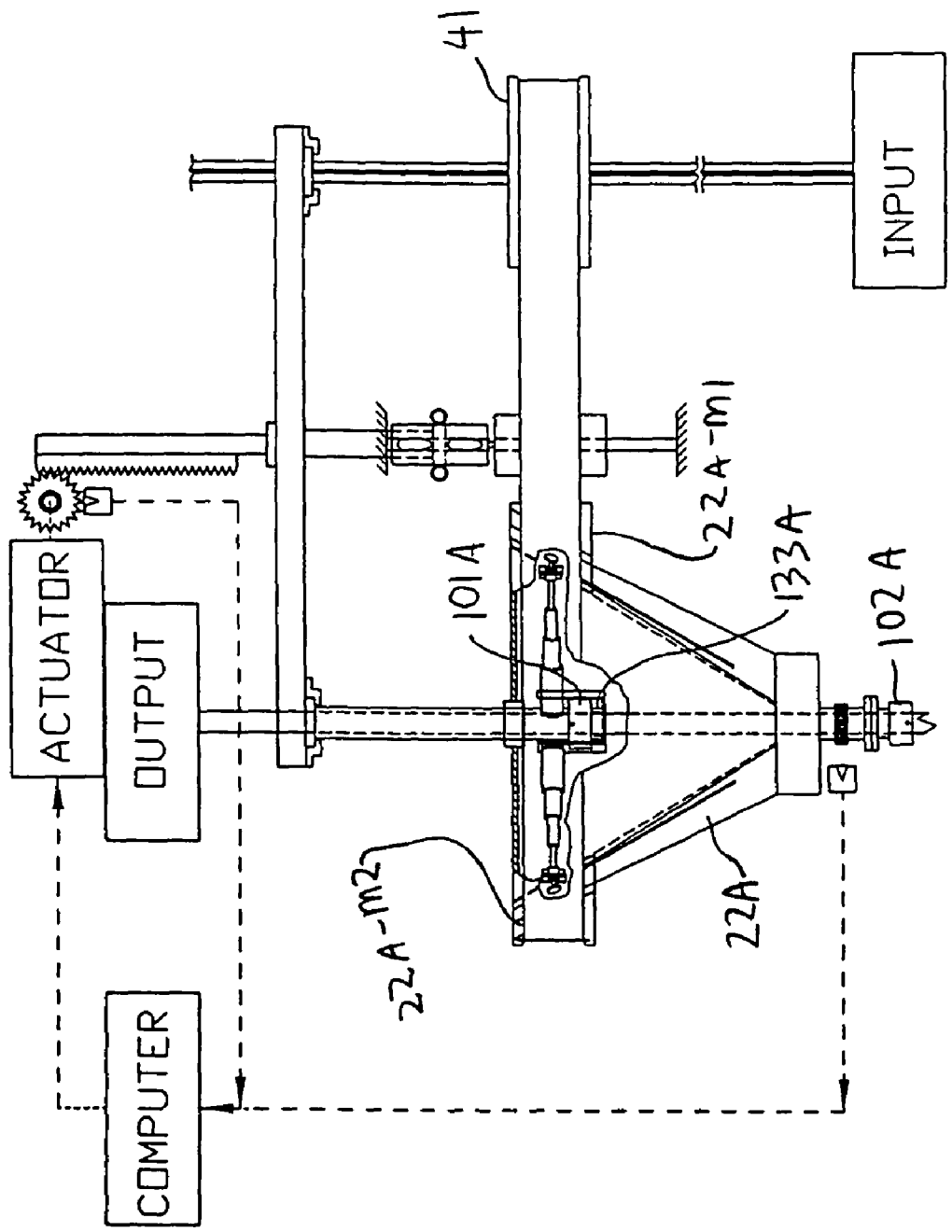

FIG. 31 shows a top-view of CVT 1.2.

Figure 32:
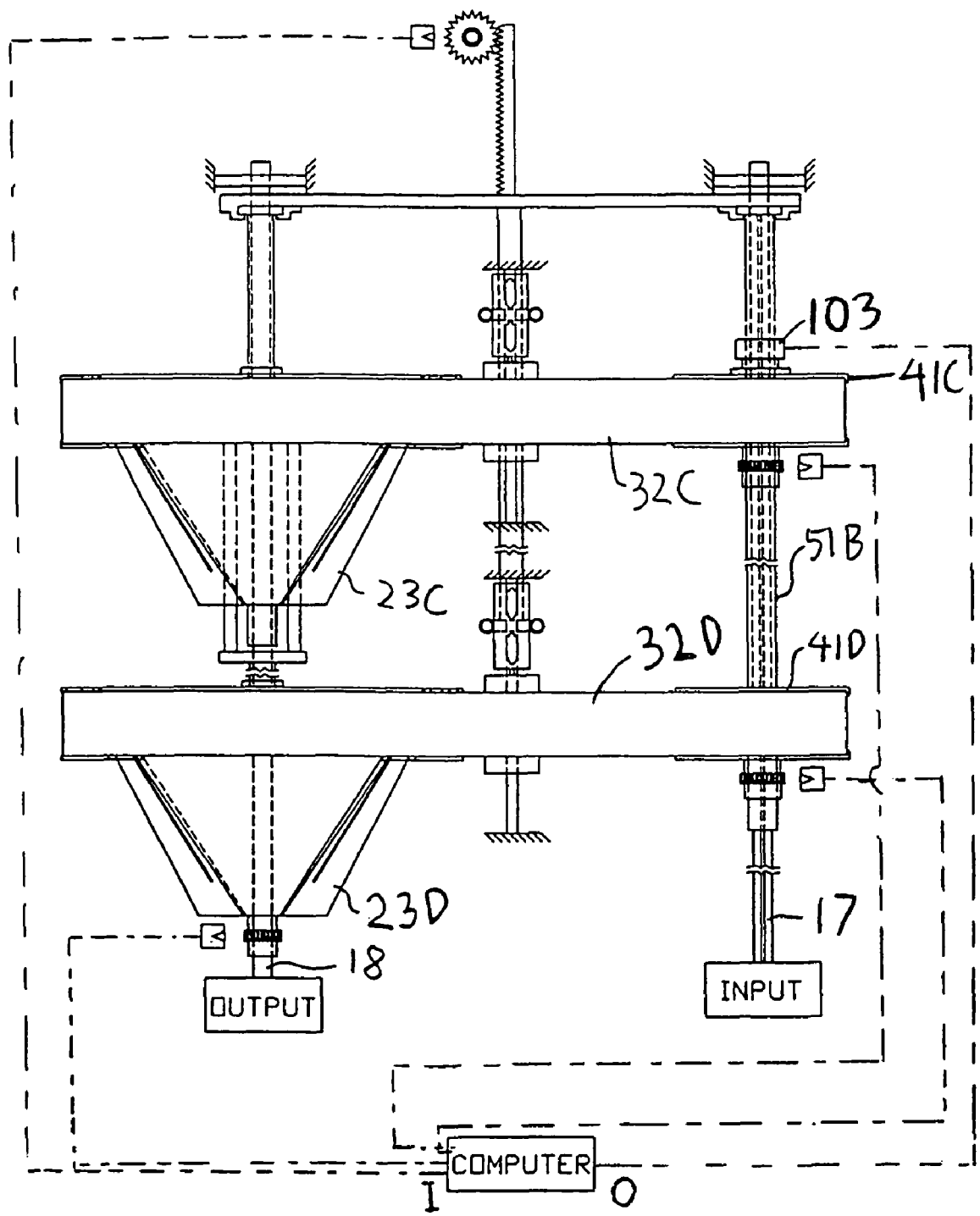

FIG. 32 shows a top-view of CVT 2.2.

Figure 33:
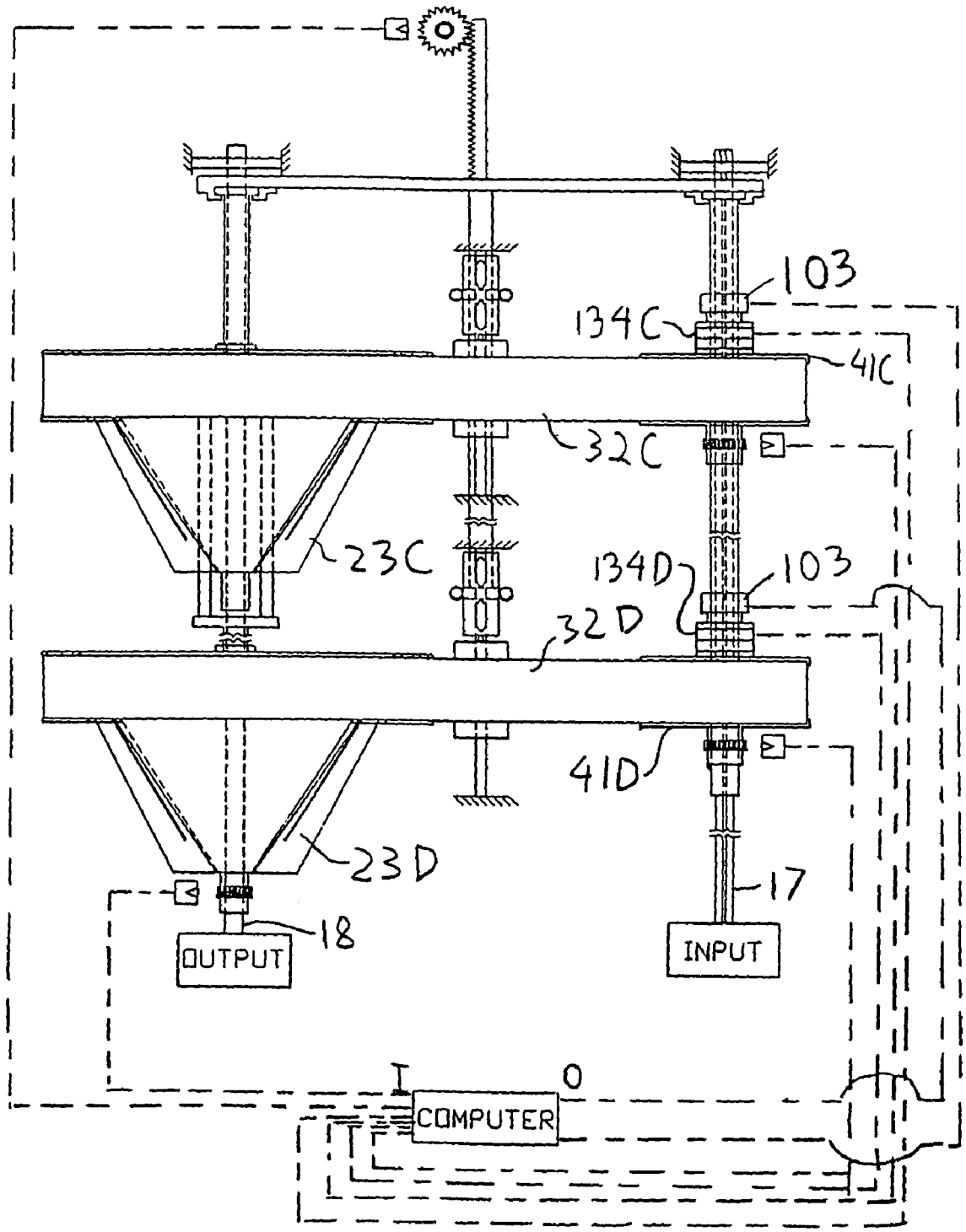

FIG. 33 shows a top-view of CVT 2.3.

Figure 34:
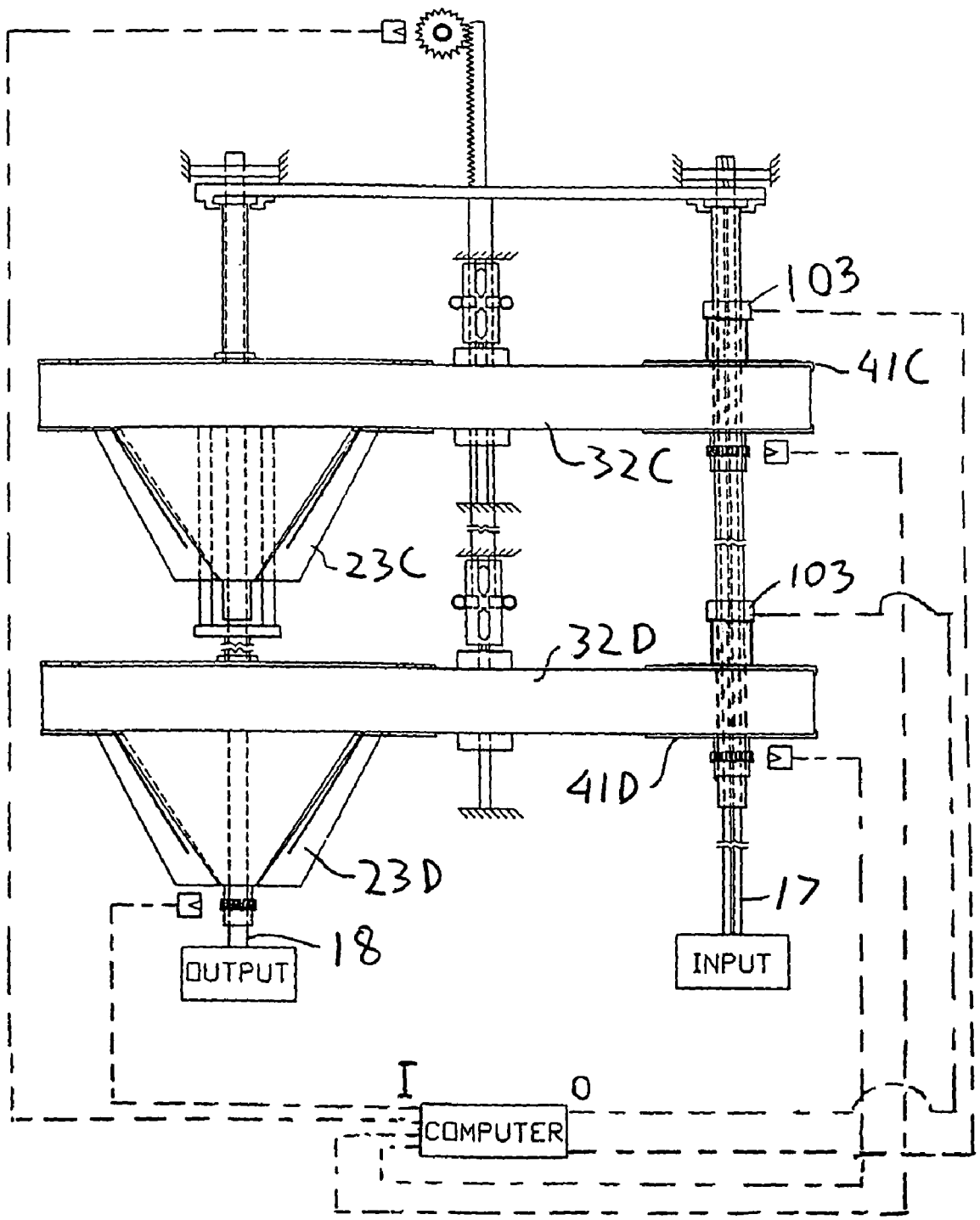

FIG. 34 shows a top-view of CVT 2.4.

Figure 35:
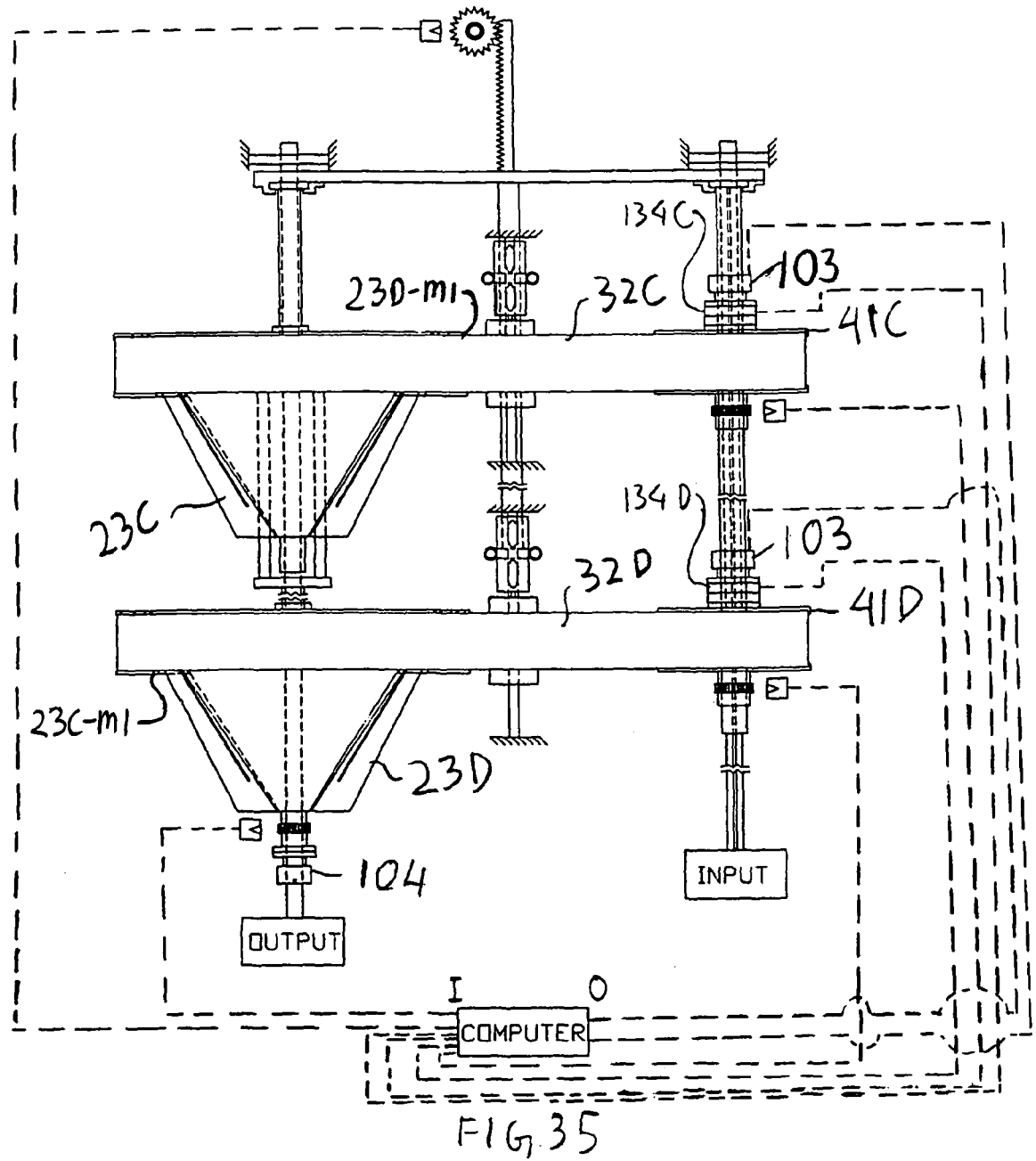

FIG. 35 shows a top-view of CVT 2.5.

Figure 36:
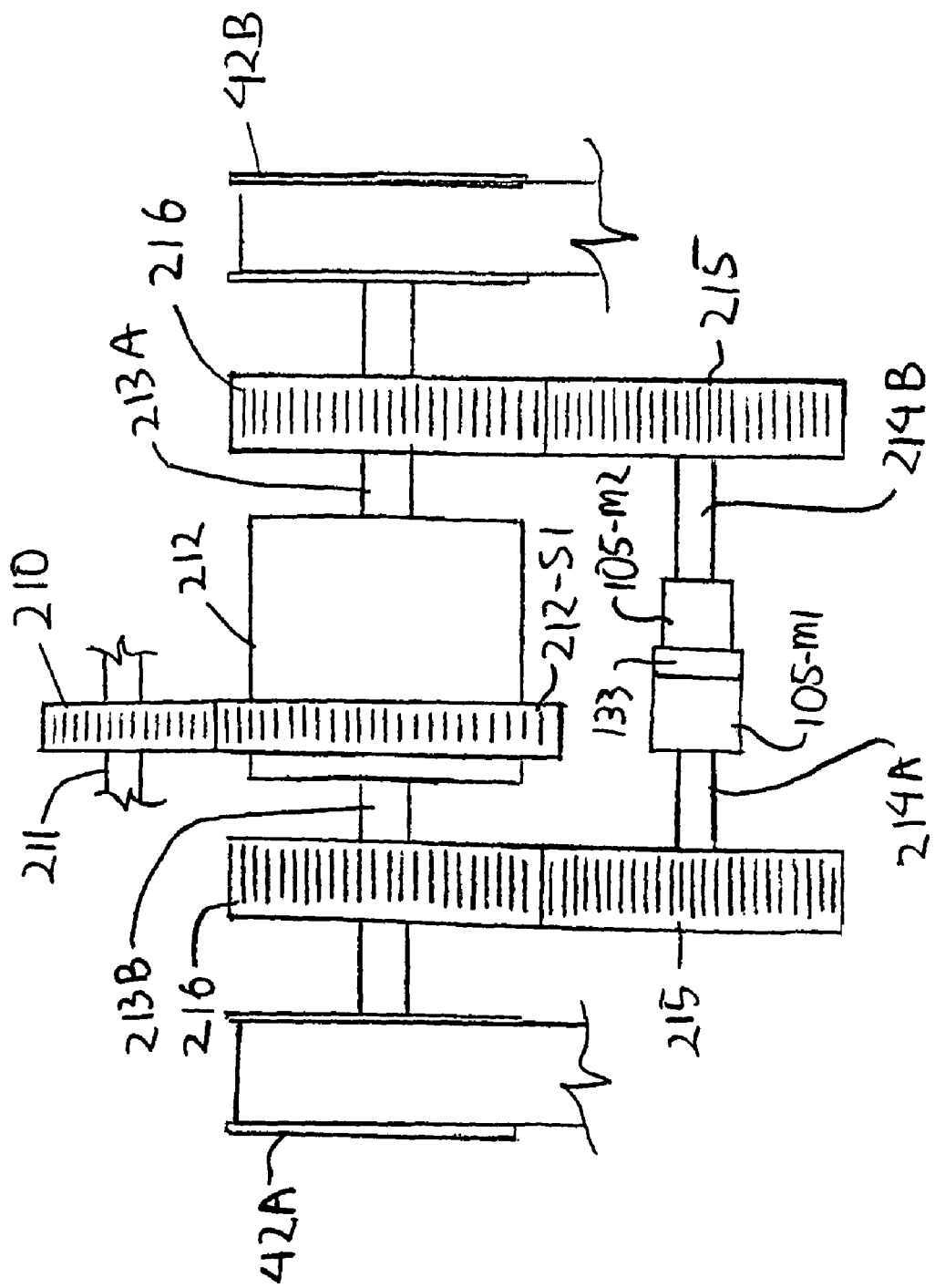

FIG. 36 show a top-view of differential adjuster shaft 1.

Figure 37:
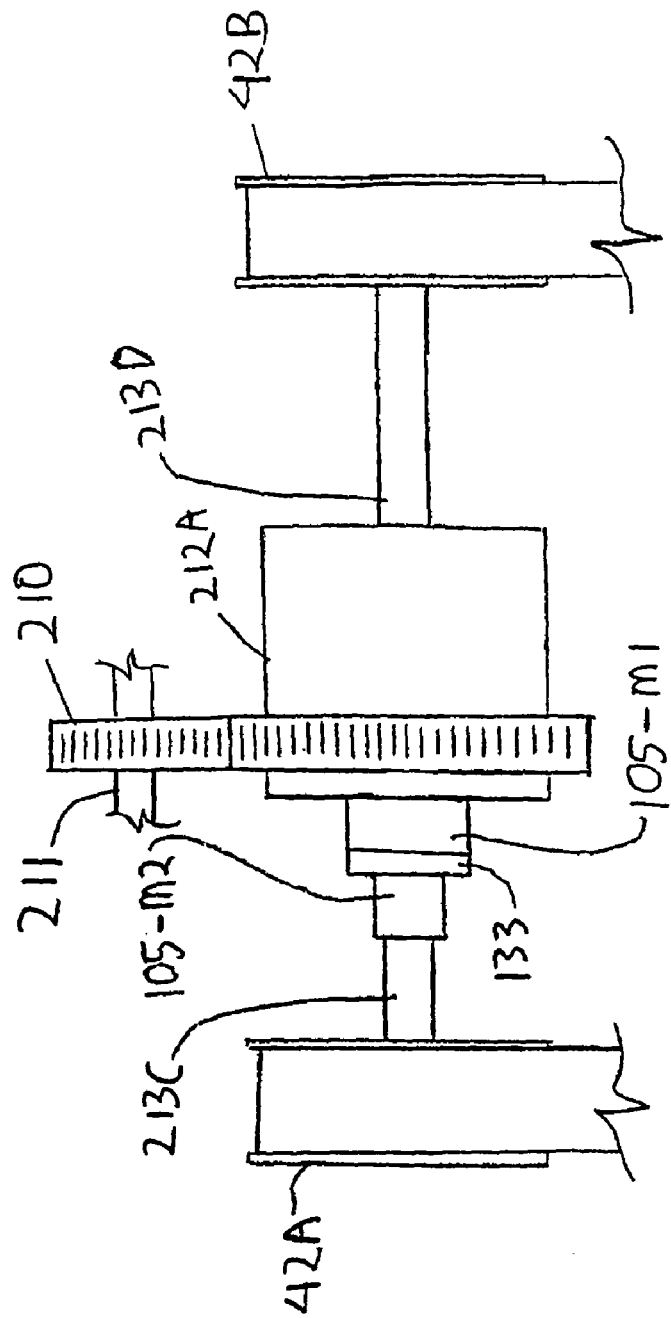

FIG. 37 show a top-view of differential adjuster shaft 2.

Figure 38:
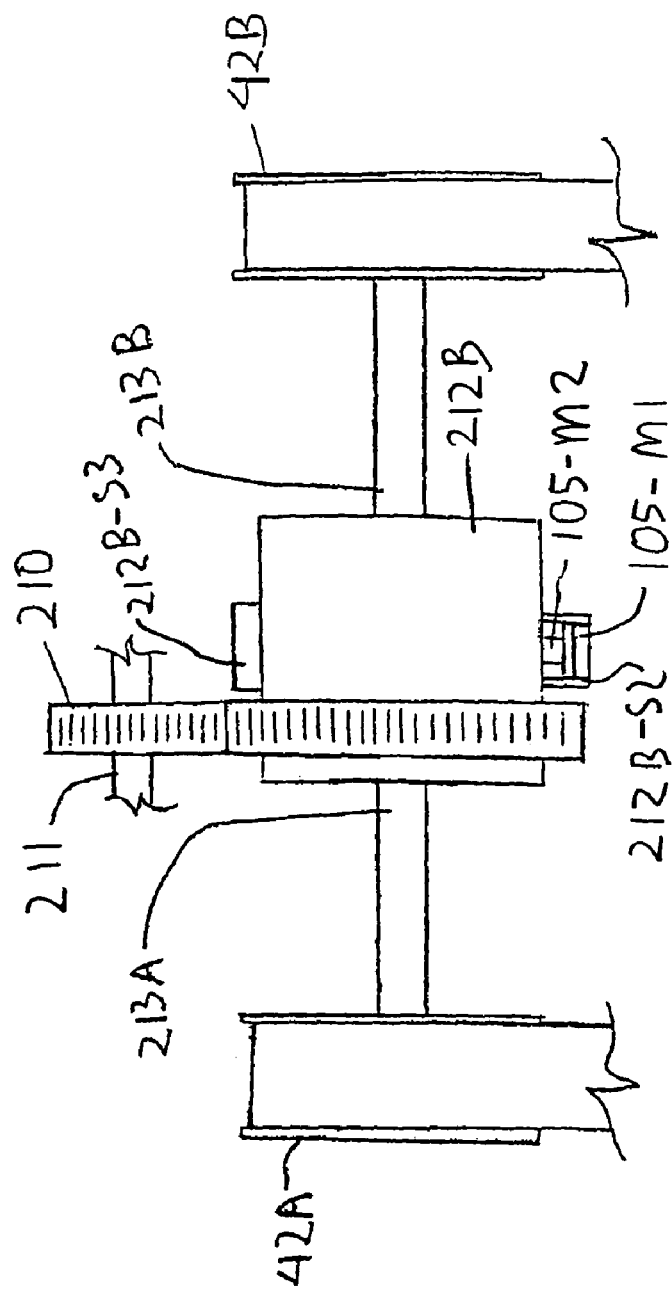

FIG. 38 show a top-view of differential adjuster shaft 3.

Figure 39:
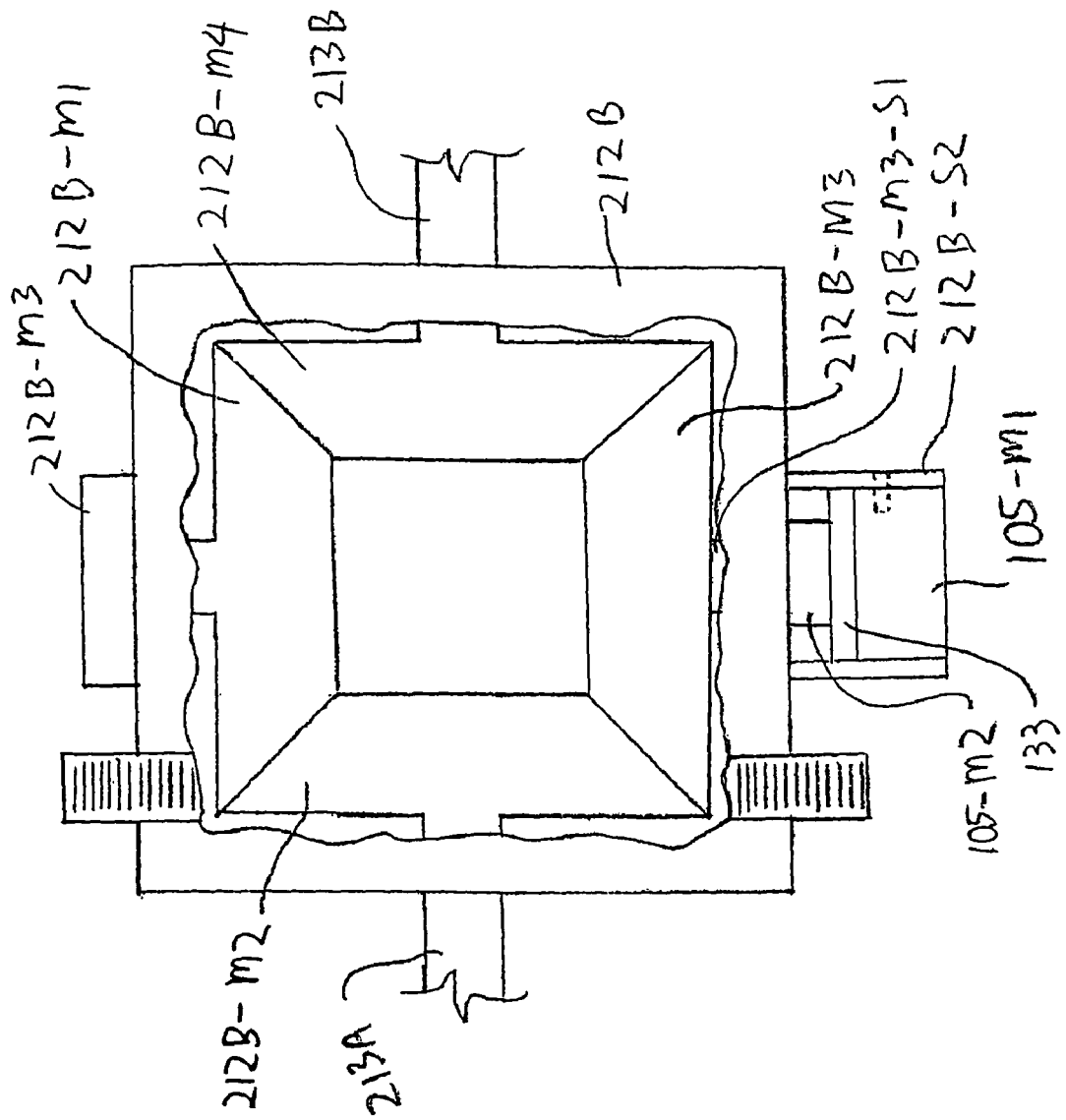

FIG. 39 show a partial phantom-view of the differential of differential adjuster shaft 3.

Figure 40:
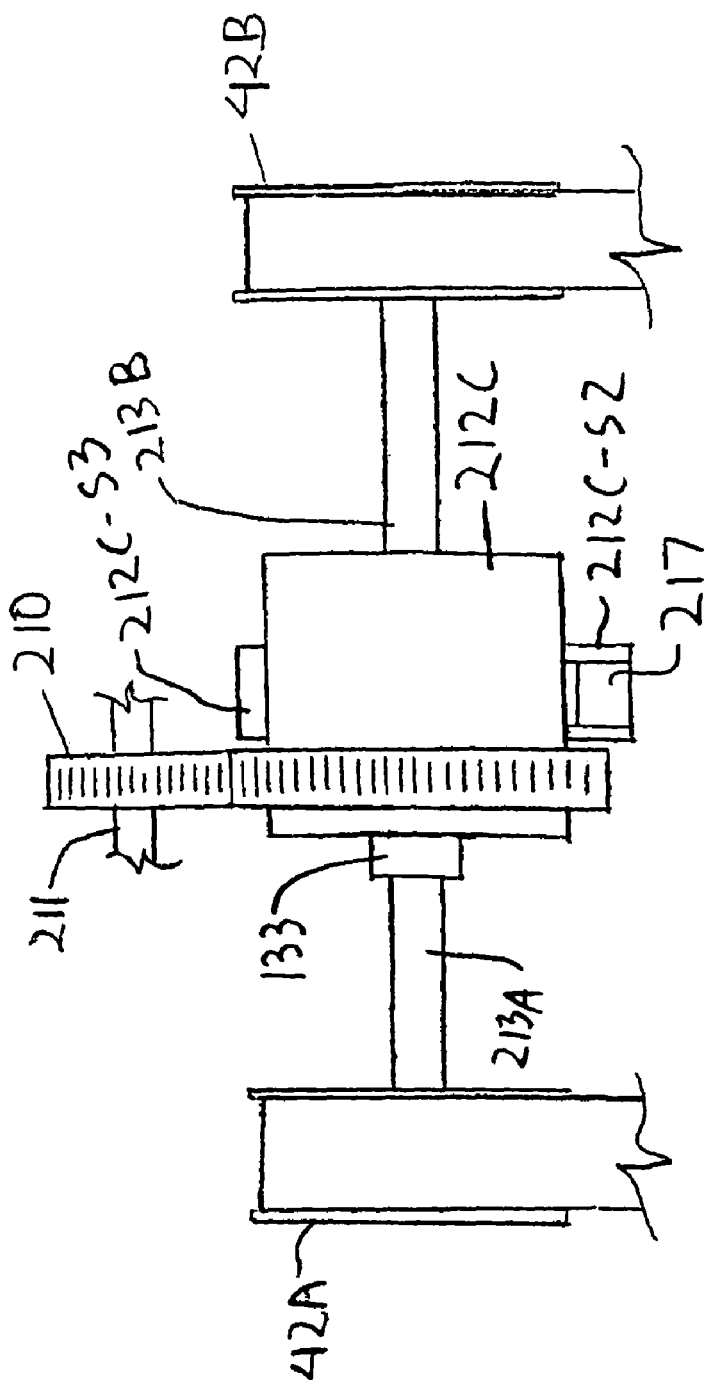

FIG. 40 show a top-view of differential adjuster shaft 4.

Figure 41:
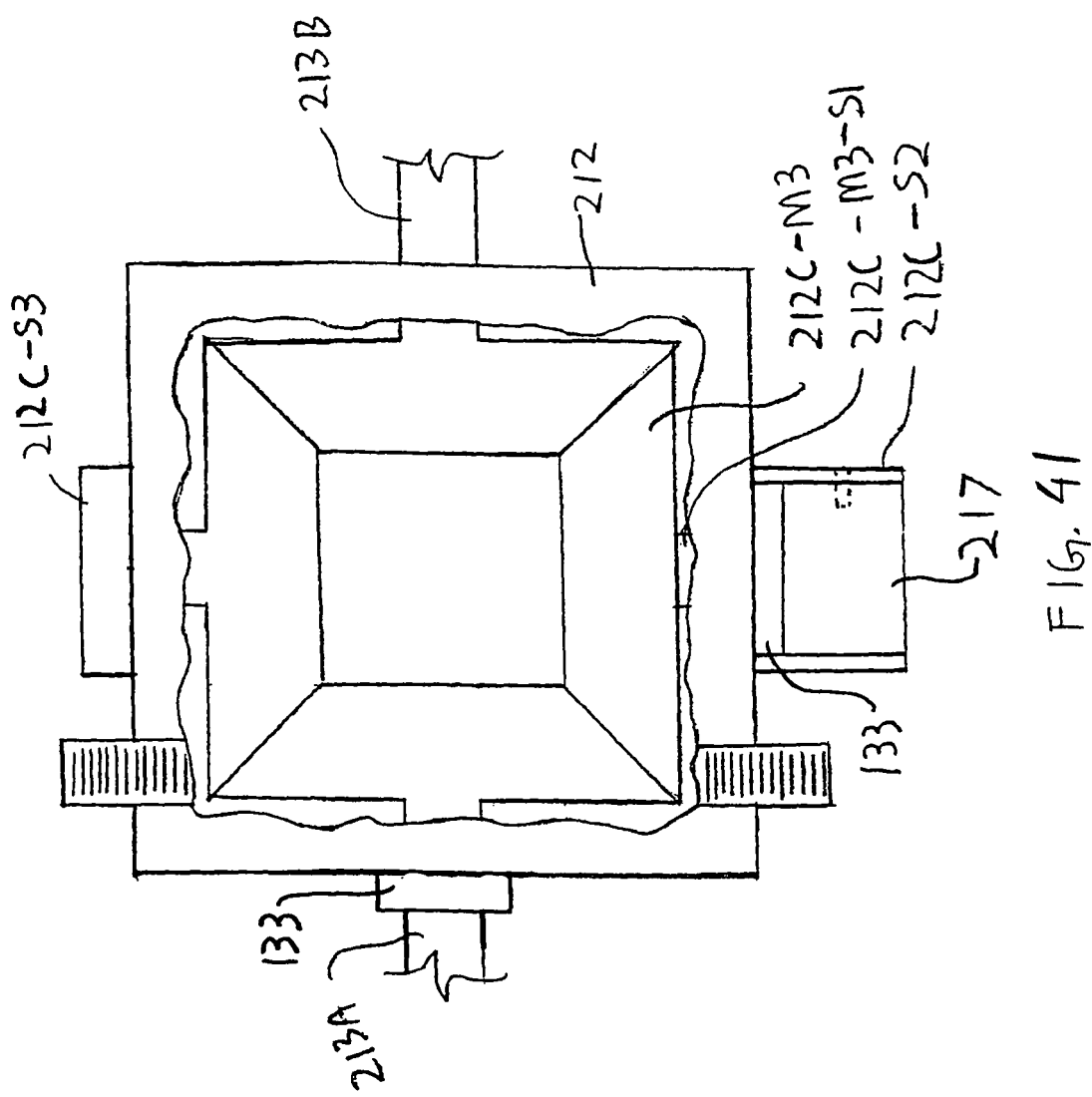

FIG. 41 show a partial phantom-view of the differential of differential adjuster shaft 4.

Figure 42:
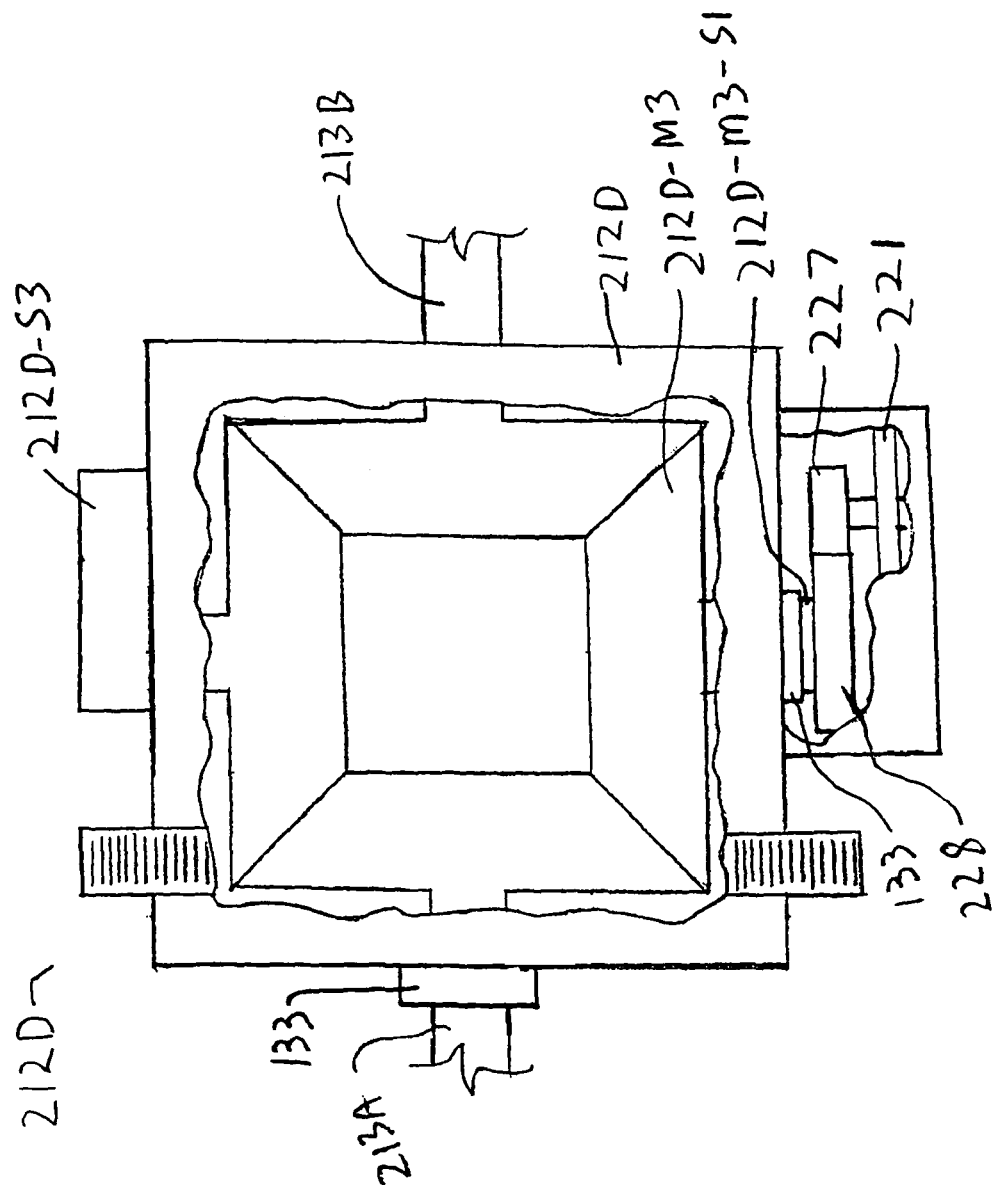

FIG. 42 shows a partial side-view of differential D 212D, which utilizes the index wheel mechanism.

Figure 43A:
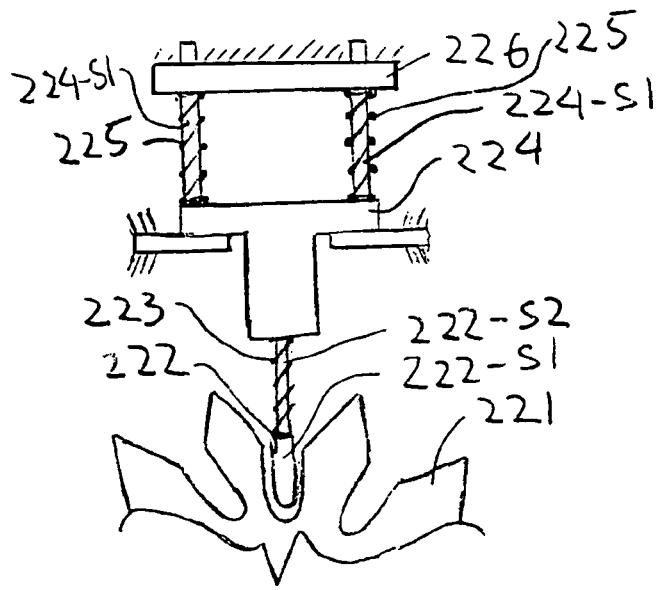

FIG. 43A shows partial top-view of the index wheel mechanism in its locking position.

Figure 43B:
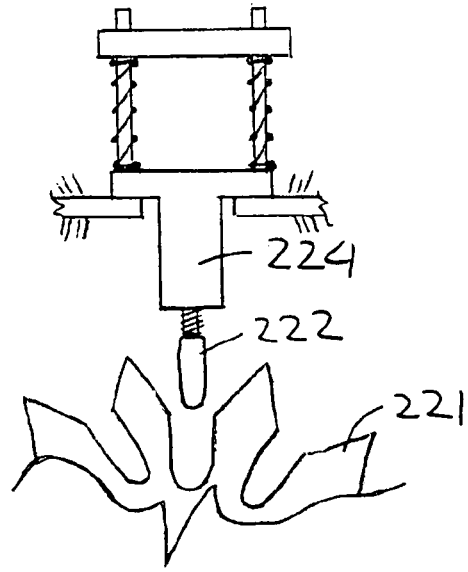

FIG. 43B shows partial top-view of the index wheel mechanism in its stepwise releasing mode.

Figure 43C:
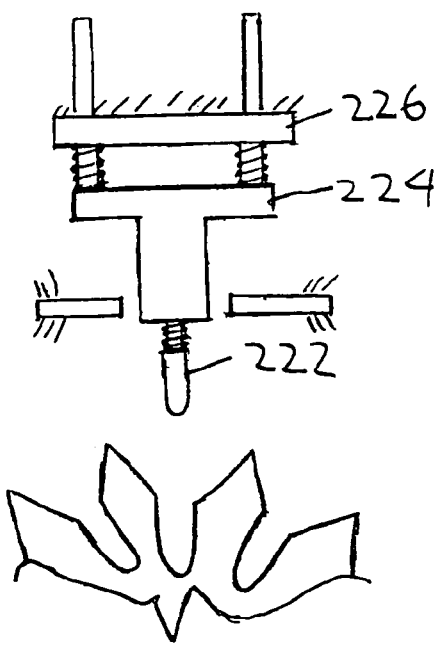

FIG. 43C shows partial top-view of the index wheel mechanism in its completely releasing mode.

Figure 43D:
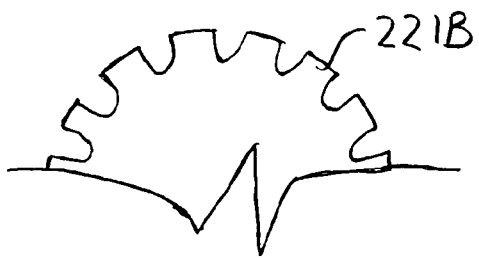

FIG. 43D shows partial top-view of an alternate index wheel 221B.

Figure 44:
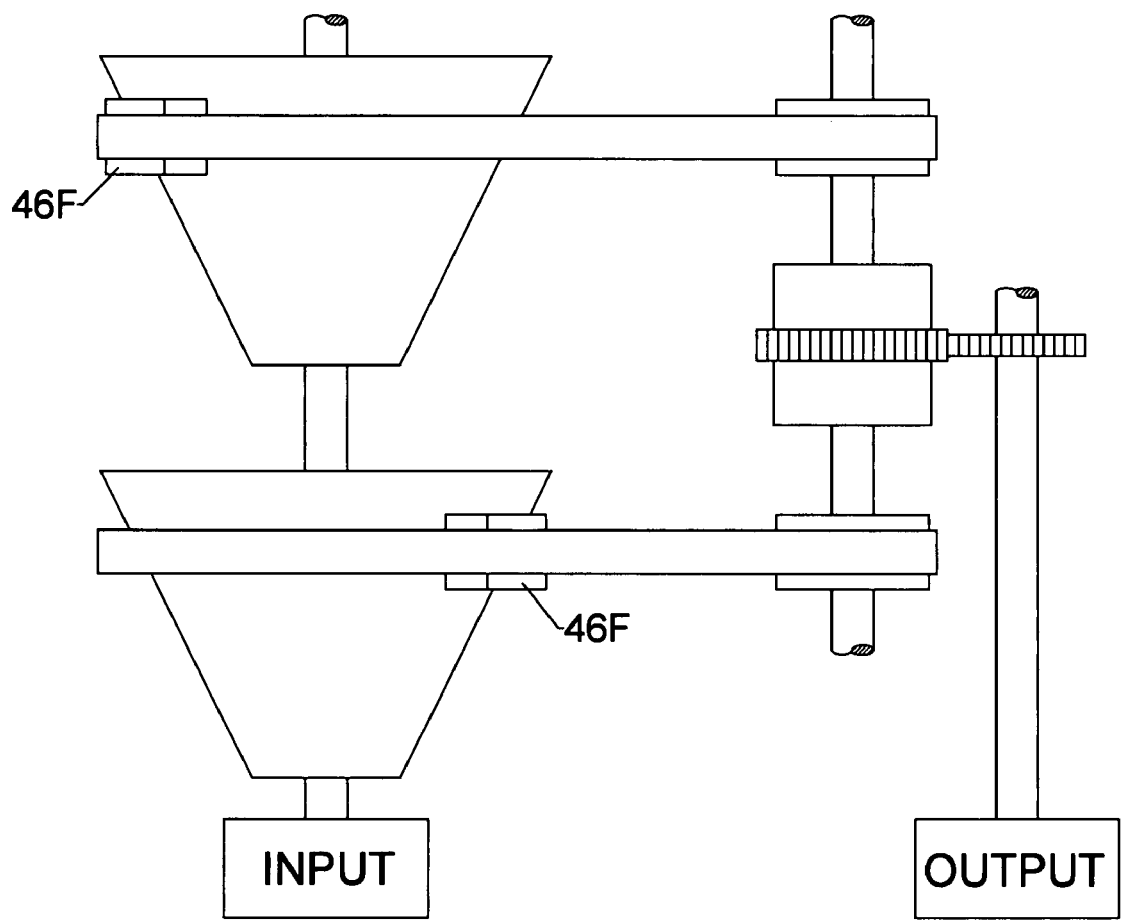

FIG. 44 shows a top-view of a configuration for a CVT that uses a differential adjuster shaft 5.

Figure 46:
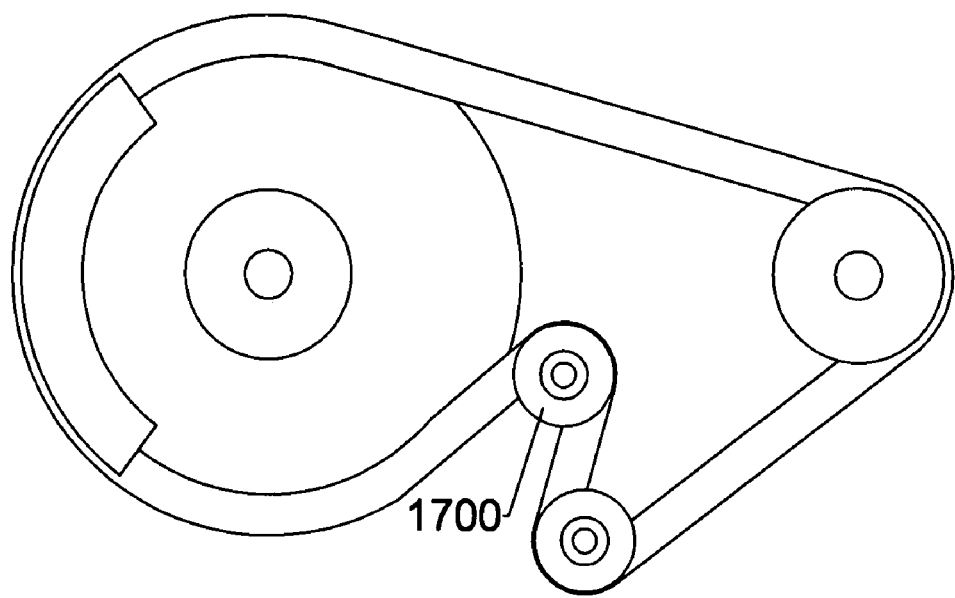
Figure 45:
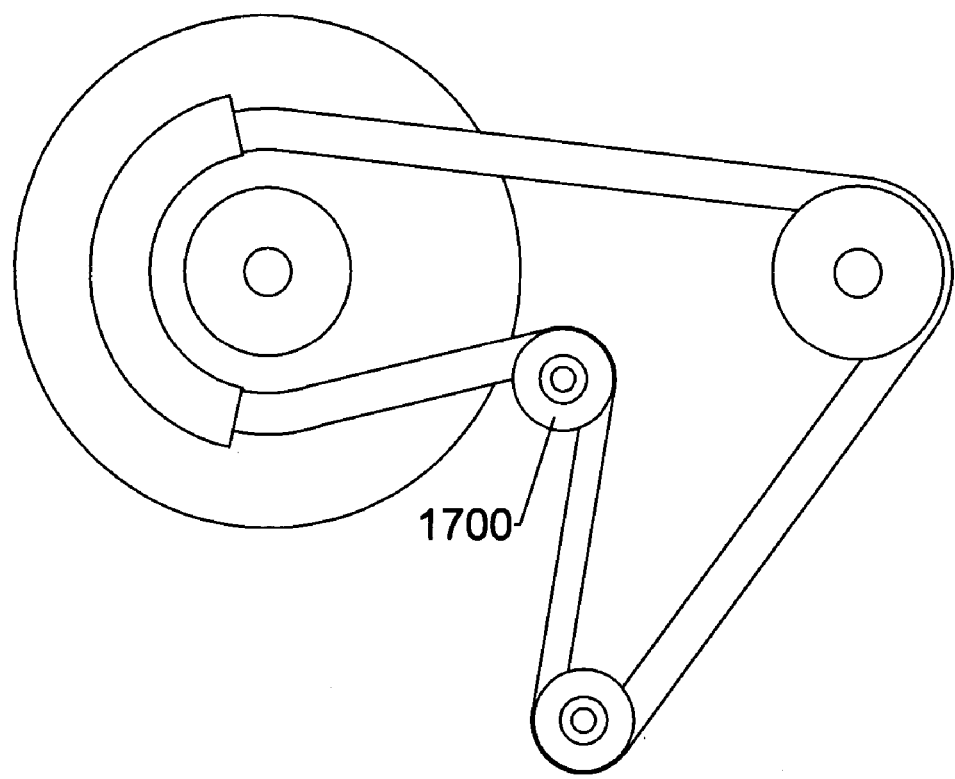

FIGS. 45 and 46 show partial front views of a CVT utilizing differential adjuster shaft 5

FIG. 47 shows a top-view of a configuration where a differential adjuster shaft is connected to a mover frame.

FIG. 48 shows a top-view of a configuration of a differential adjuster shaft where its differential shafts are replaced by splines. On those splines, spline sleeves on which the transmission pulleys are keyed-on are slideably mounted.

Figure 49B:
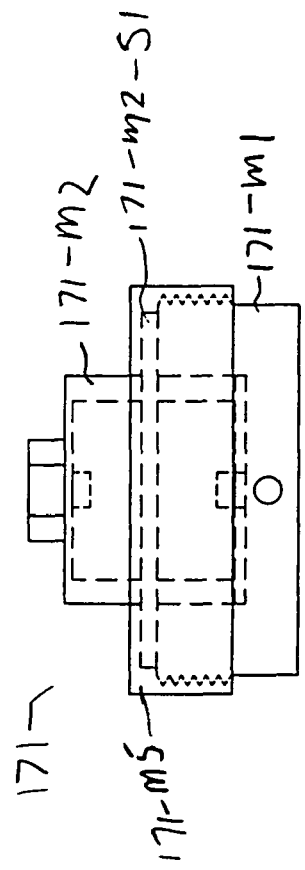
Figure 49C:
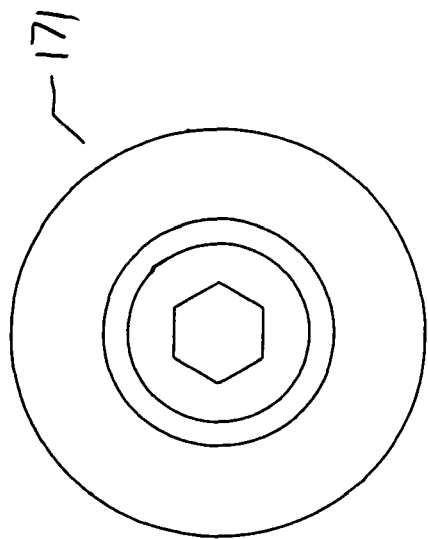
Figure 49A:
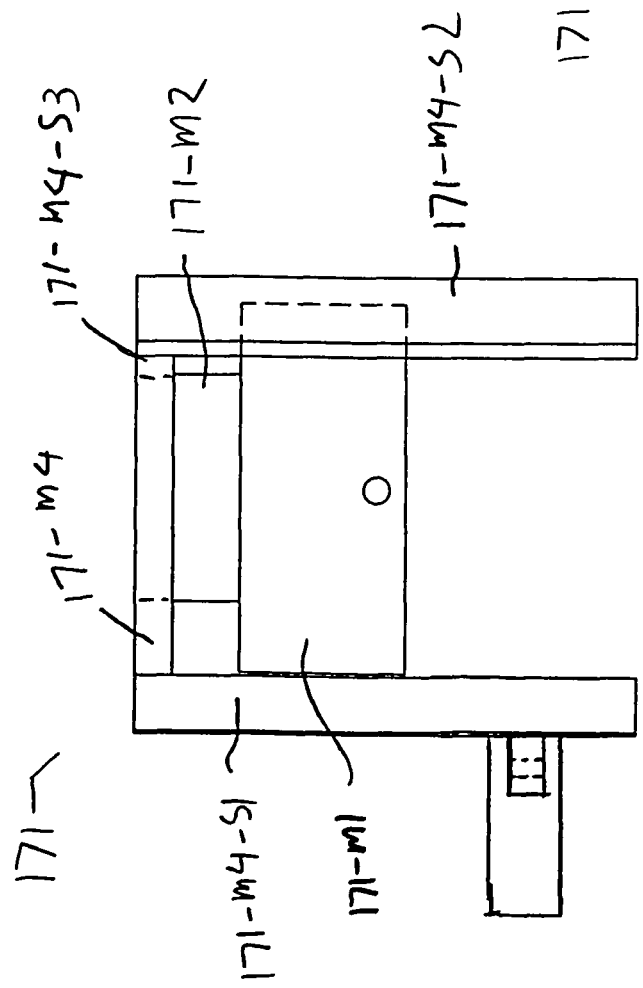

FIG. 49A shows a top-view of spring-loaded adjuster AS1 171.

FIG. 49B shows a partial front-view of spring-loaded adjuster AS1 171.

FIG. 49C shows a partial side-view of spring-loaded adjuster AS1 171, showing the hidden inner profile of the adjuster.

FIG. 49D shows a sectional top-view of spring-loaded adjuster AS1 171.

FIG. 50A shows a front-view of spring-loaded adjuster AS2 172.

FIG. 50B shows a top-view of spring-loaded adjuster AS2 172.

Figure 51A:
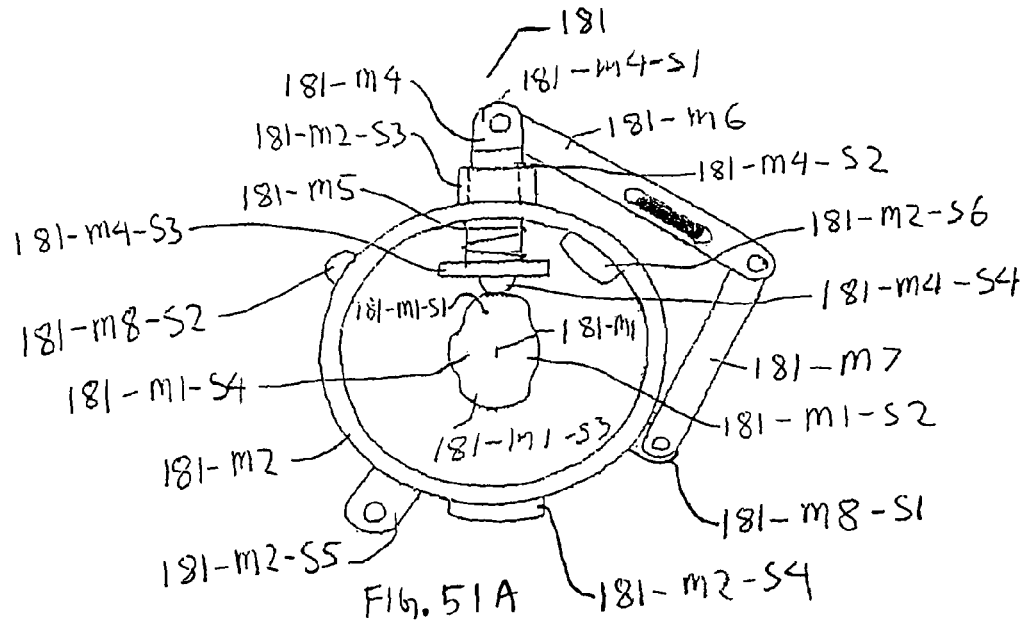

FIG. 51A shows a front-view of mechanical adjuster AM1 181.

Figure 51B:
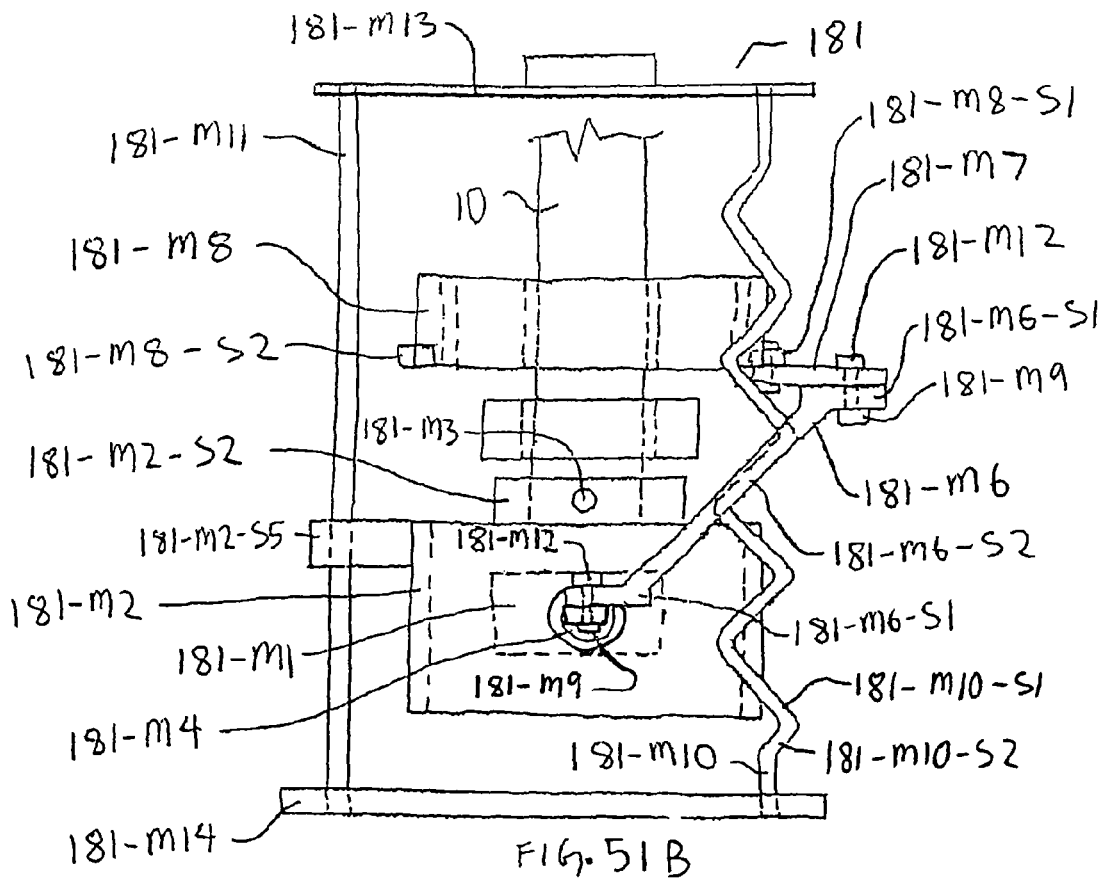

FIG. 51B shows a top-view of mechanical adjuster AM1 181.

Figure 52:
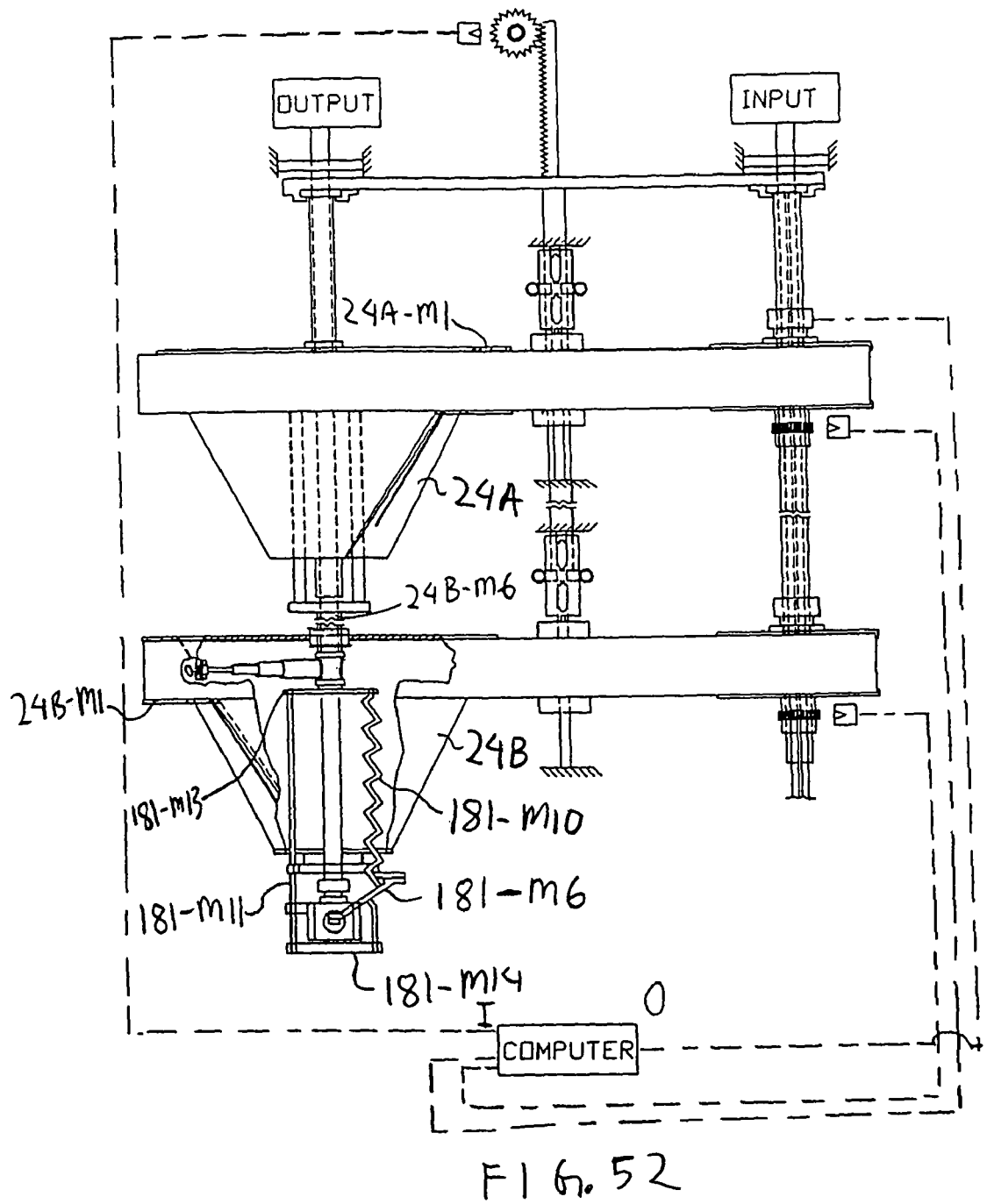

FIG. 52 shows a top-view of CVT 2.6.

Figure 53:
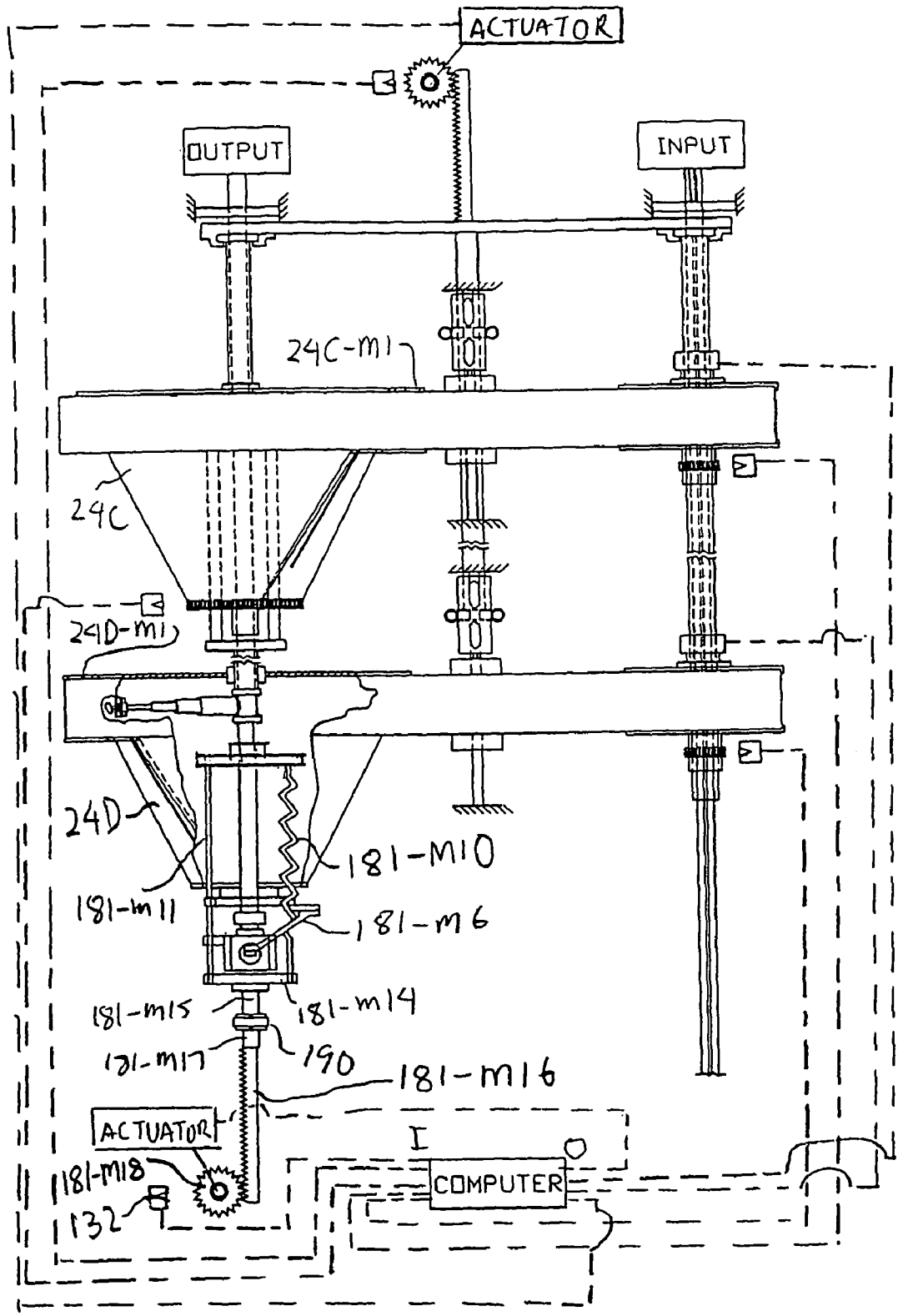

FIG. 53 shows a top-view of CVT 2.7.

Figure 54:
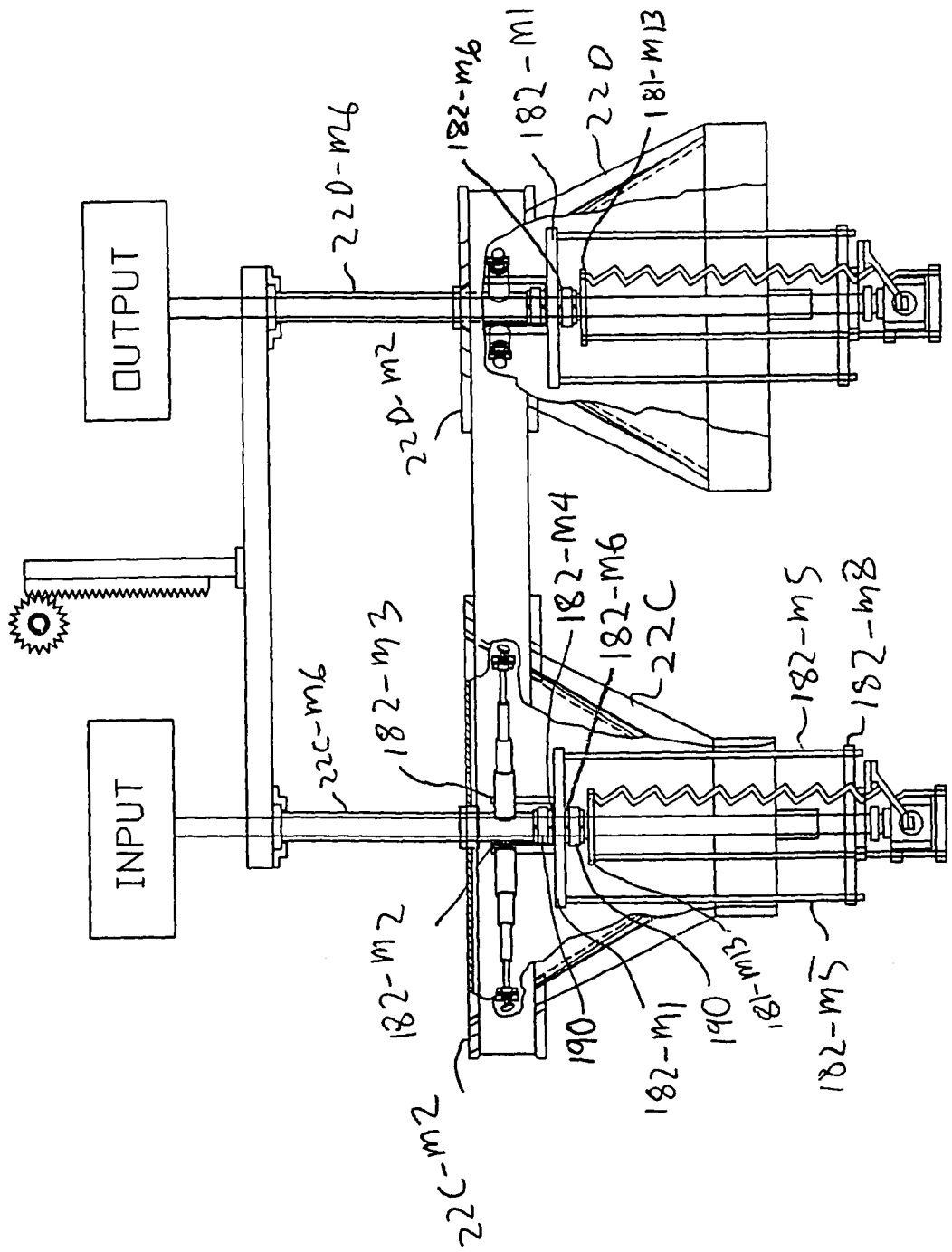

FIG. 54 shows a top-view of CVT 1.3.

Figure 55A:
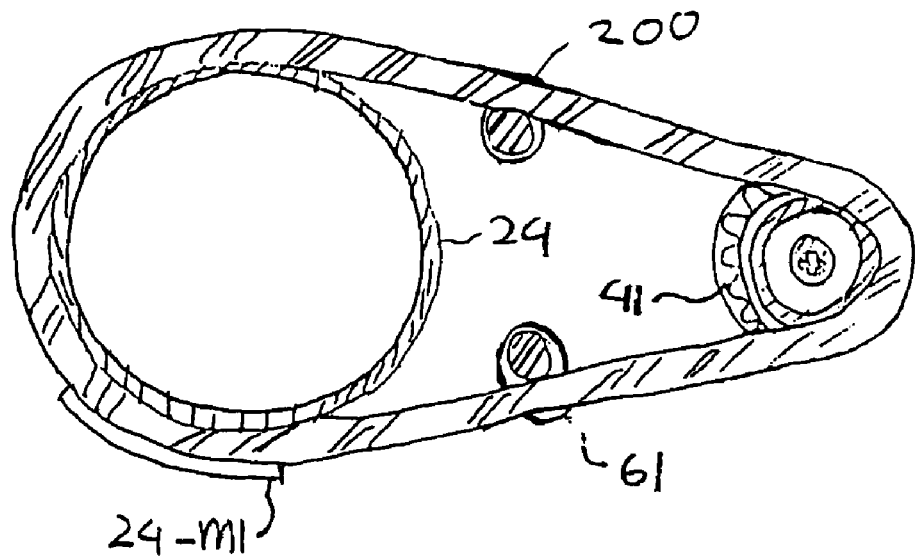
Figure 55B:
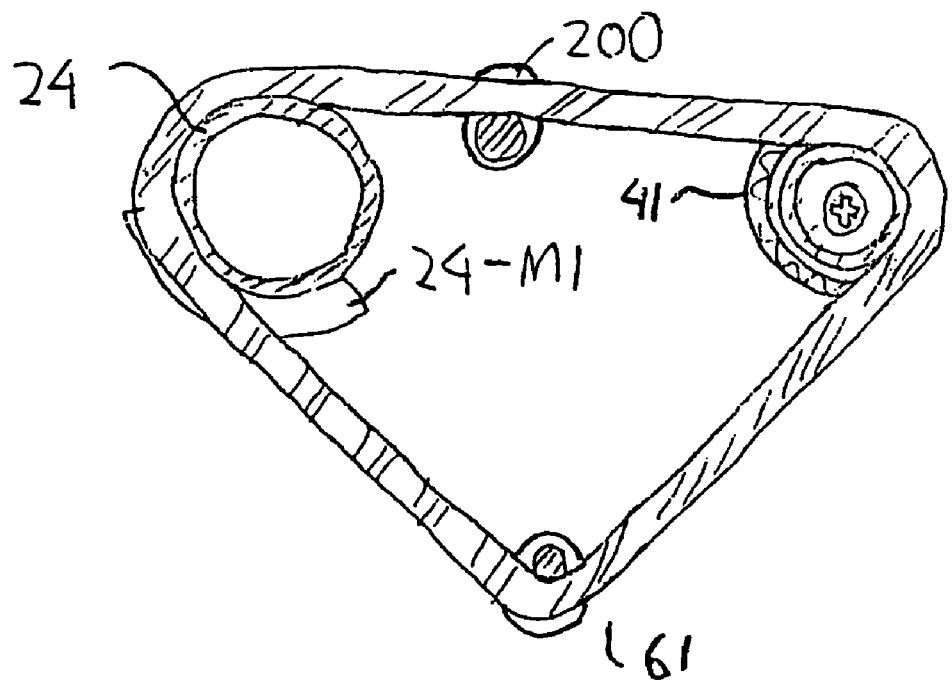

FIGS. 55A and 55B show sectional front-views of a CVT 2 showing the guiding wheels 200.

Figure 56:
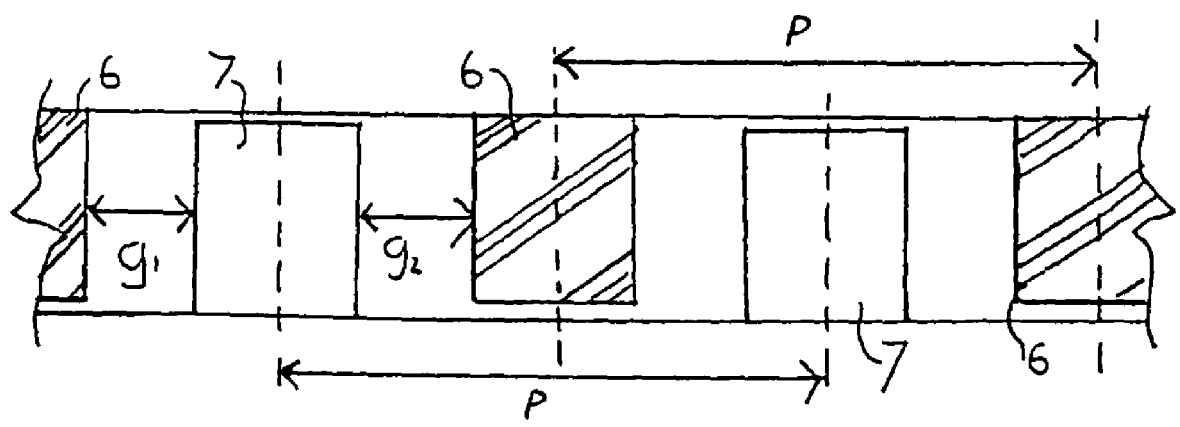

FIG. 56 shows a partial sectional view of a torque transmitting member mated with a transmission belt, where between their teeth, gaps exist.

Figure 57:
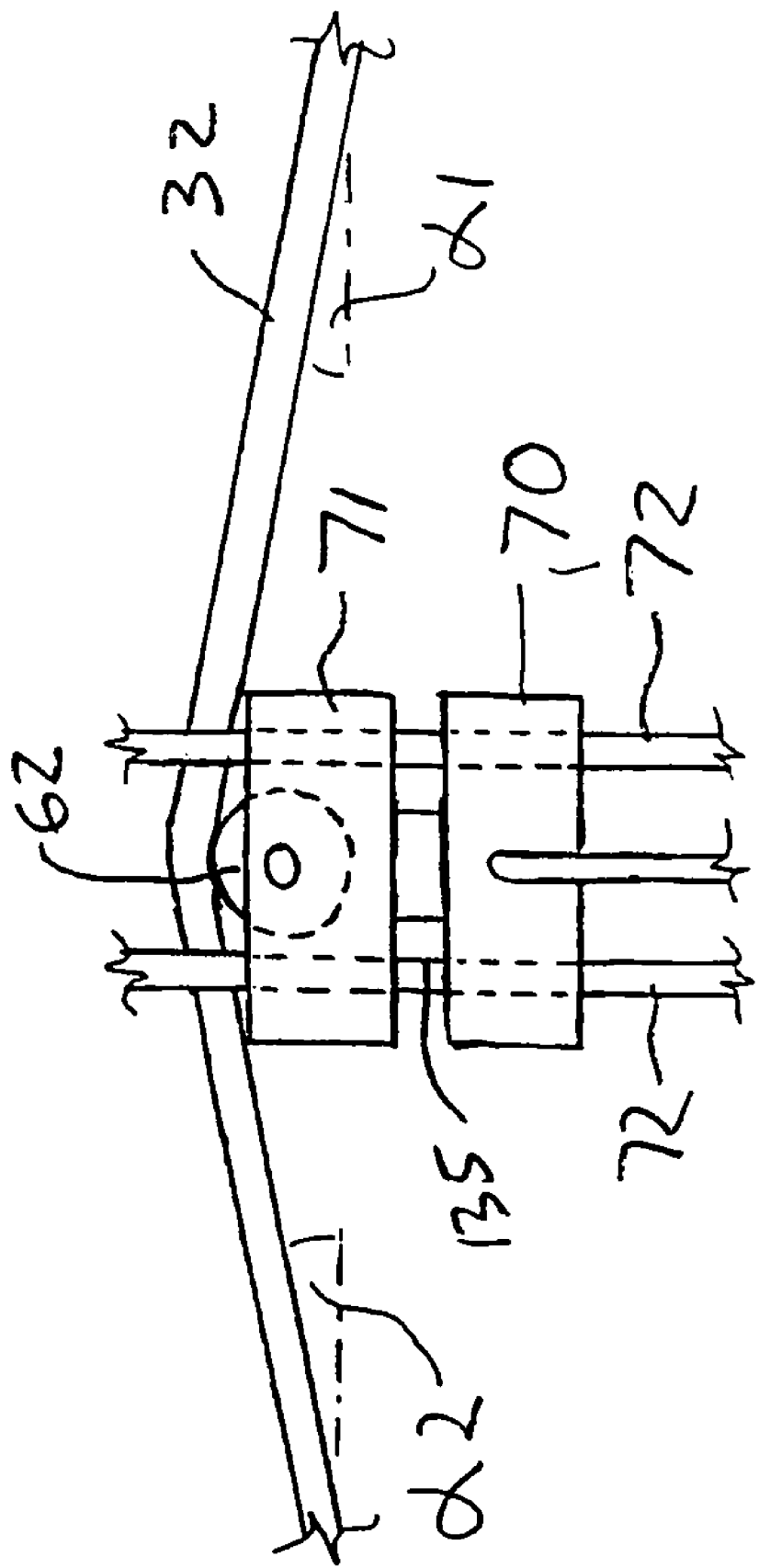

FIG. 57 shows a load cell wheel that is used to measure the tension of a transmission belt via a load cell.

Figure 58:
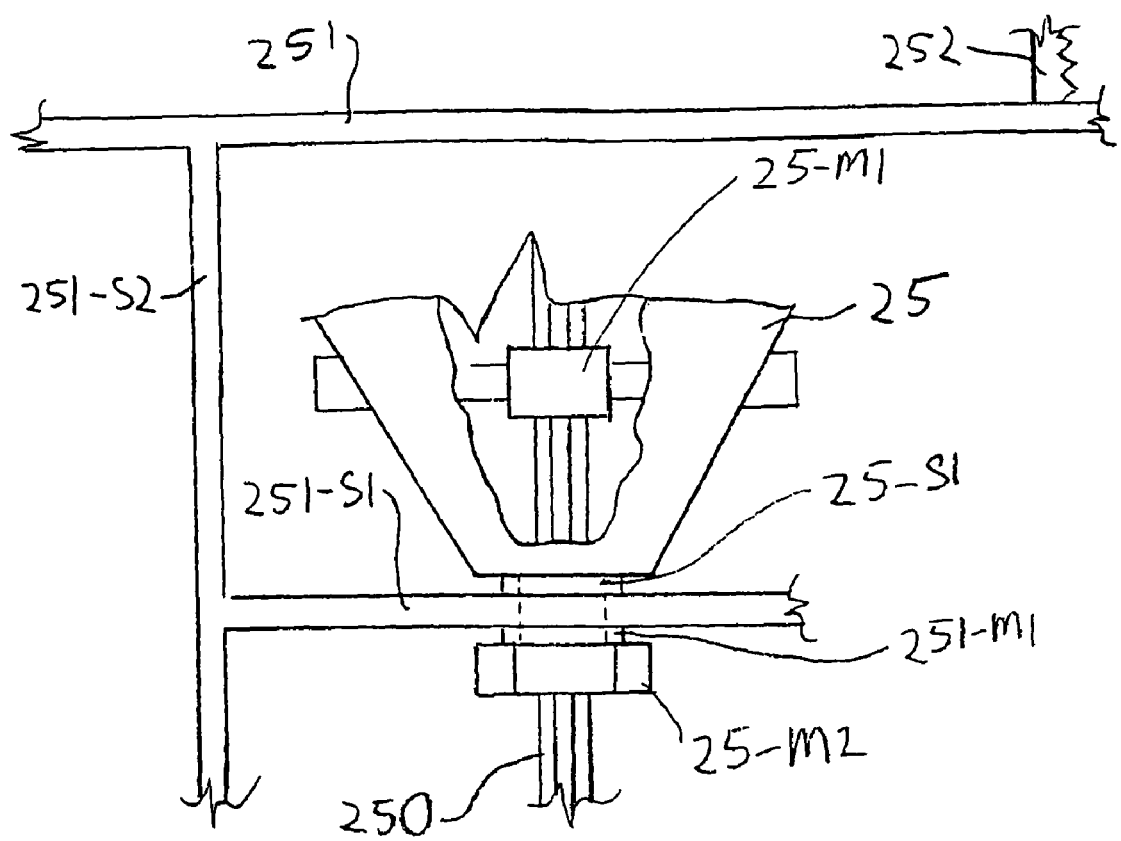

FIG. 58 shows a the mounting of a cone assembly in the sliding cone mounting configuration.

Figure 59:
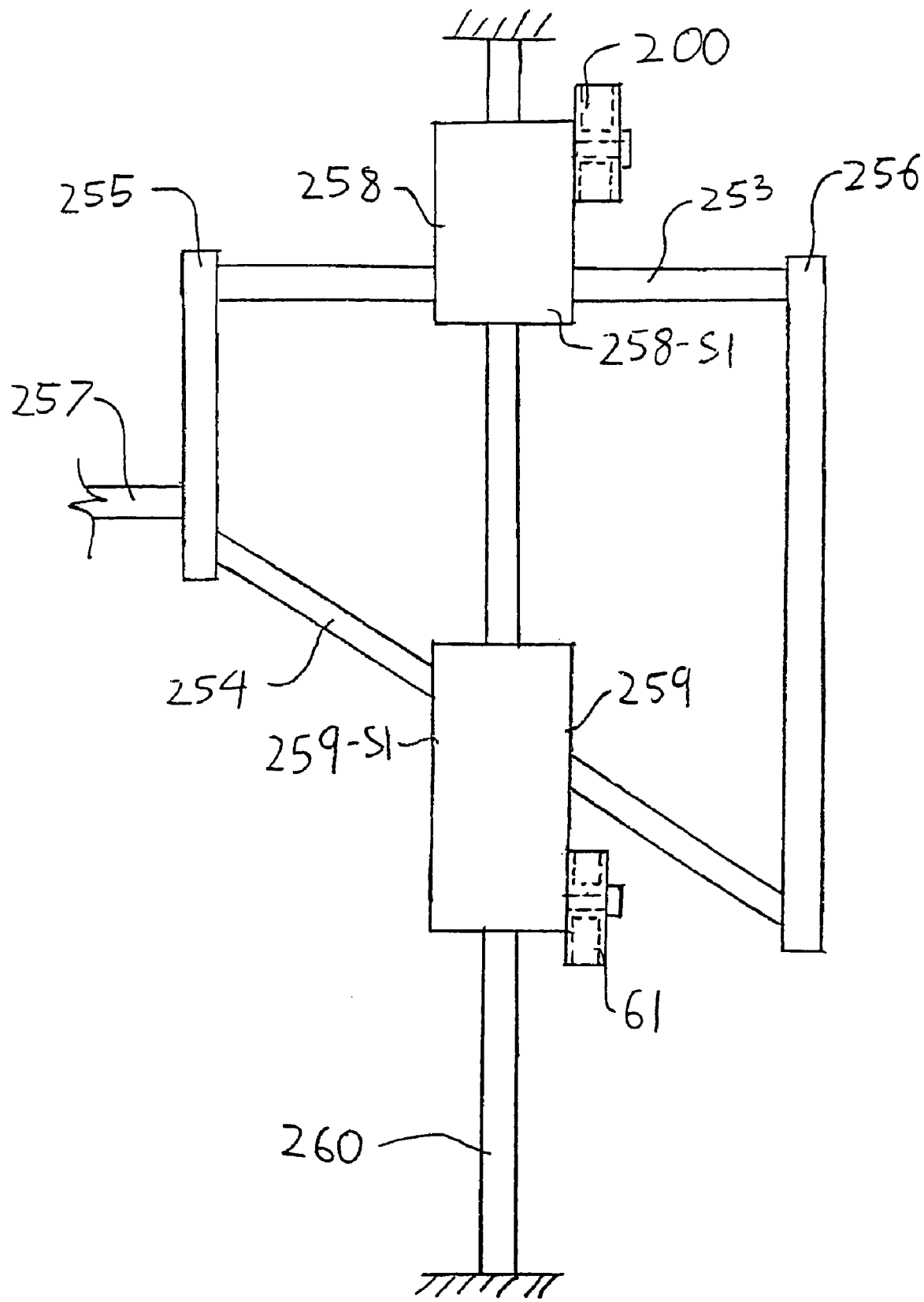

FIG. 59 shows a side-view of the transmission belt tensioning mechanism used in the sliding cone mounting configuration.

Figure 60:
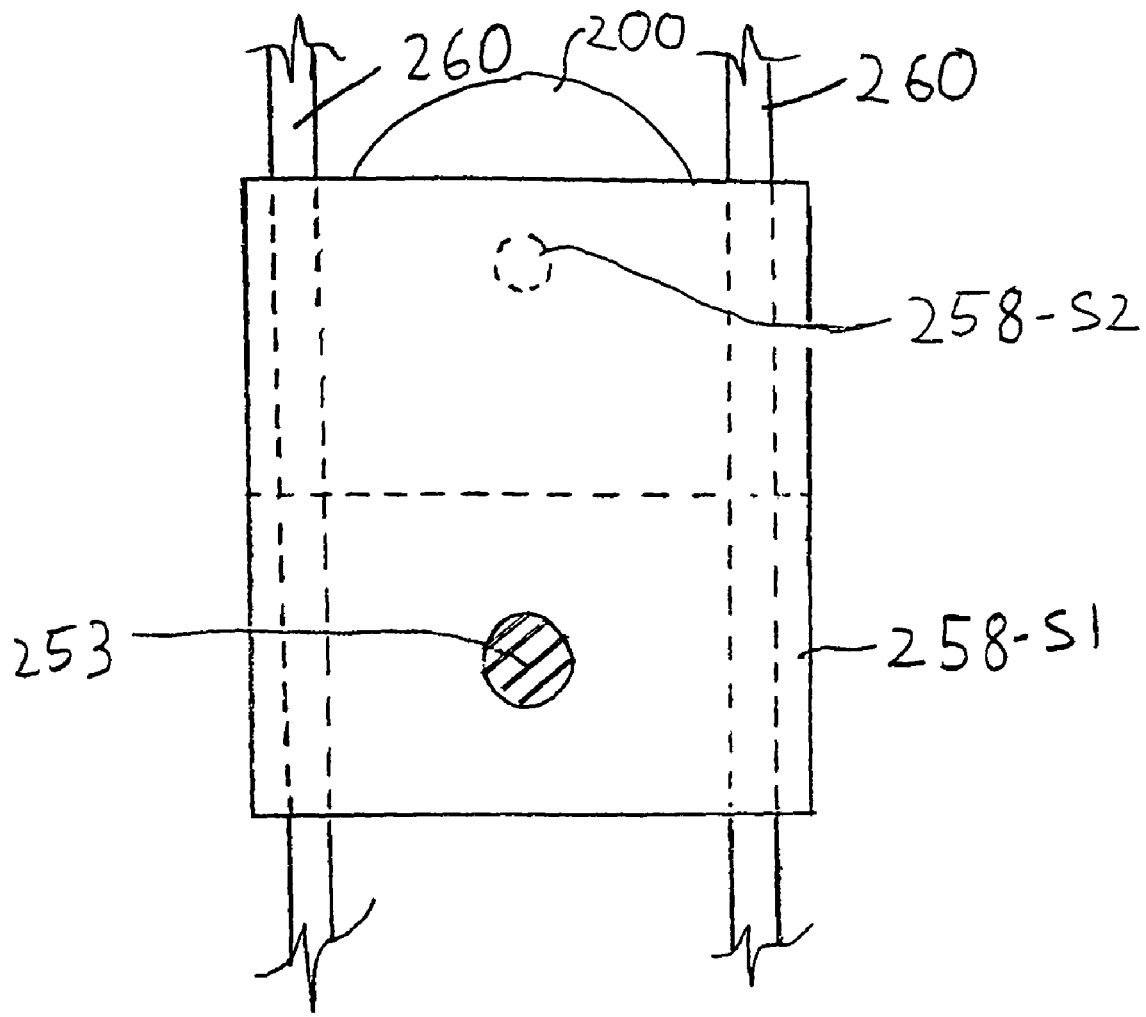

FIG. 60 shows a front-view of a tensioning slider A used in the transmission belt tensioning mechanism shown in FIG. 59.

FIG. 61A shows as a front-view of a chain link for a chain, which can be used in a CVT, for which the depth of its left side plate is deeper than that of its right side plate.

FIG. 61B shows as a front-view of a chain link for a chain, which can be used for a CVT, for which rubber legs are attached to the chain link plates.

FIG. 62A shows a side-view of a link A as seen from the right side of the link which is used to form a torque transmitting member chain, which is a torque transmitting member formed by chain links.

FIG. 62B shows a front-view of a link A, which is used to form a torque transmitting member chain.

FIG. 63A shows a side-view of a torque transmitting member chain, as seen from the right side of the chain, formed by alternating links A 270 and links B 272.

FIG. 63B shows a front-view of a torque transmitting member chain formed by alternating links A 270 and links B 272.

Figures 64A, 64B:
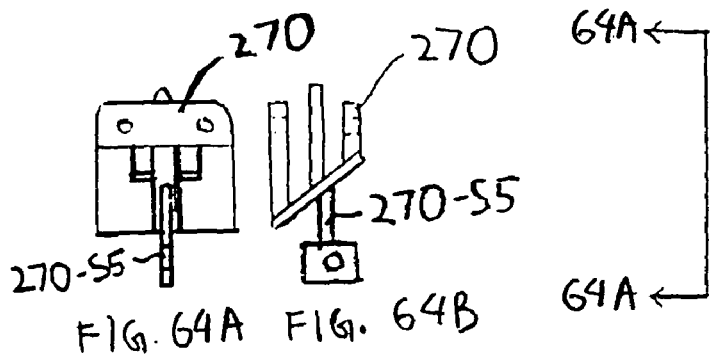

FIG. 64A shows a side-view of an end link configuration for a link A as seen from the right side of the link.

FIG. 64B shows a front-view of an end link configuration for a link A.

Figures 65A, 65B, 66:
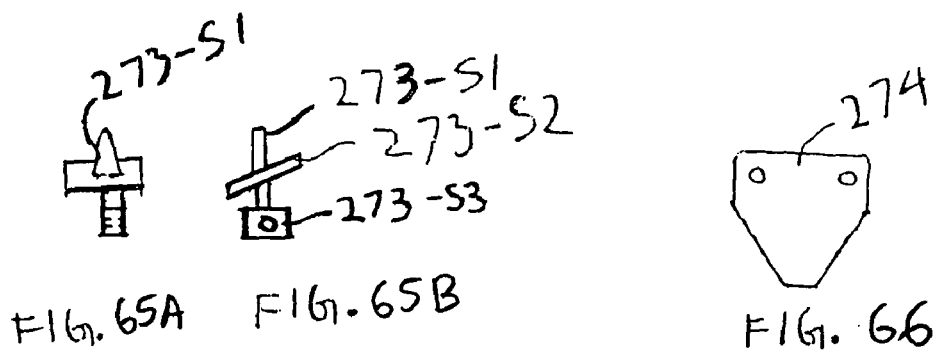

FIG. 65A shows a side-view of a single tooth link.

FIG. 65B shows a front-view of a single tooth link.

FIG. 66 shows a reshaped left link plate of a link that can be used to form a torque transmitting member chain.

Figures 67A, 67B:
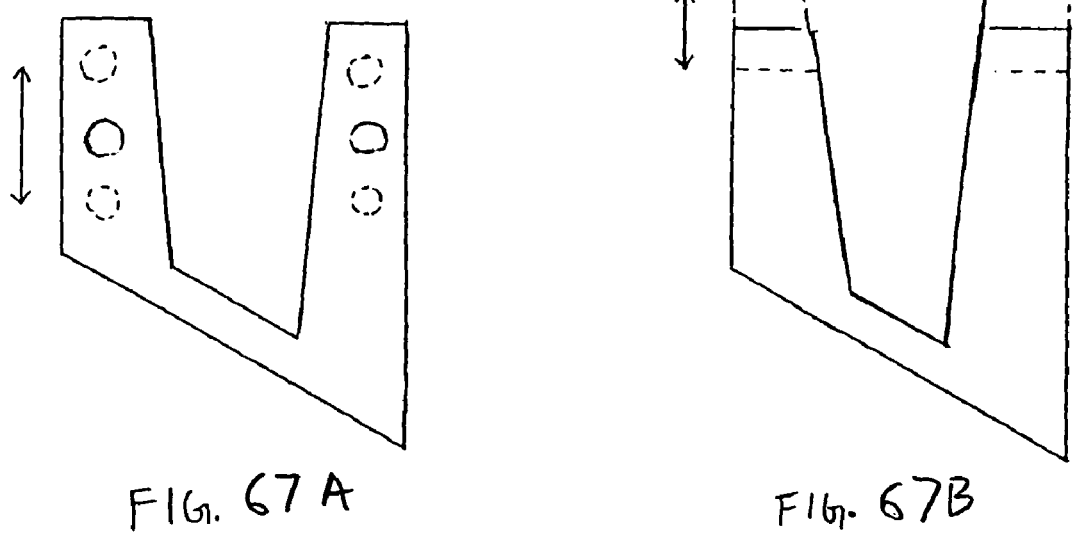

FIG. 67A shows how to adjust the location of the reinforcements in a torque transmitting member in order to increases or decrease the height of its neutral-axis.

FIG. 67B shows how to adjust the dimensions of a torque transmitting member in order to increases or decrease the height of its neutral-axis.

Figure 68:
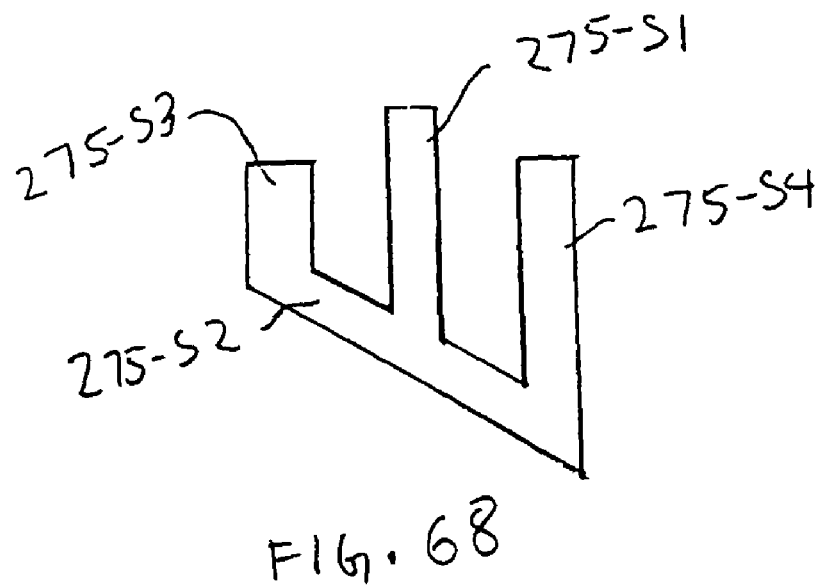

FIG. 68 shows a front-view of the chain torque transmitting member.

Figure 69:
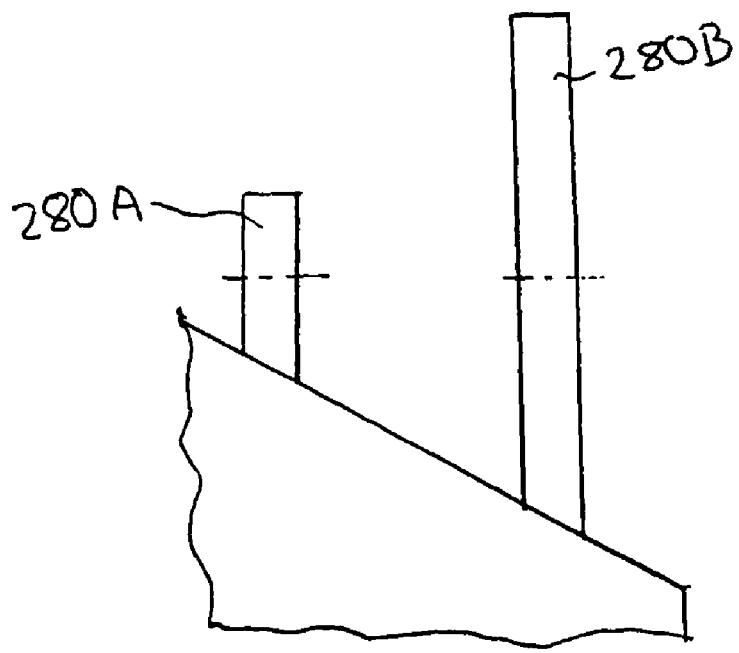

FIG. 69 shows a torque transmitting member that is formed by a left torque transmitting side member and by a right torque transmitting side member.

Figure 70A:
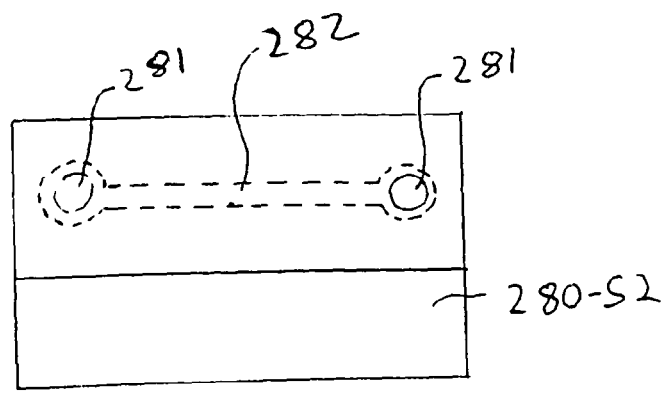

FIG. 70A shows a partial top-view of a torque transmitting side member.

Figure 70B:
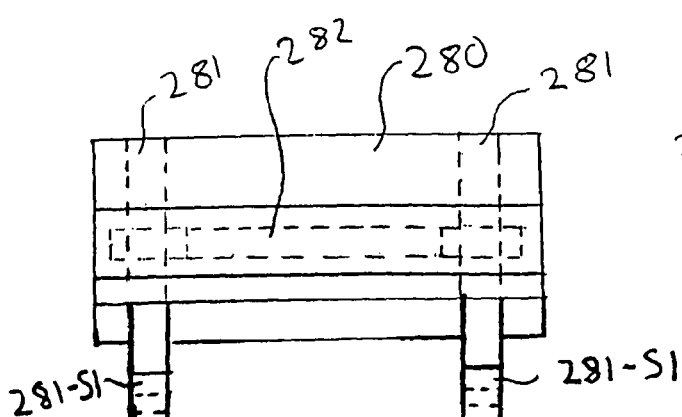

FIG. 70B shows a partial side-view of a torque transmitting side member.

Figure 70C:
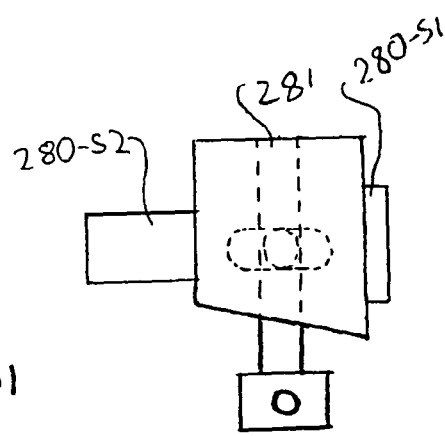

FIG. 70C shows an end-view of a torque transmitting side member.

Figure 71:
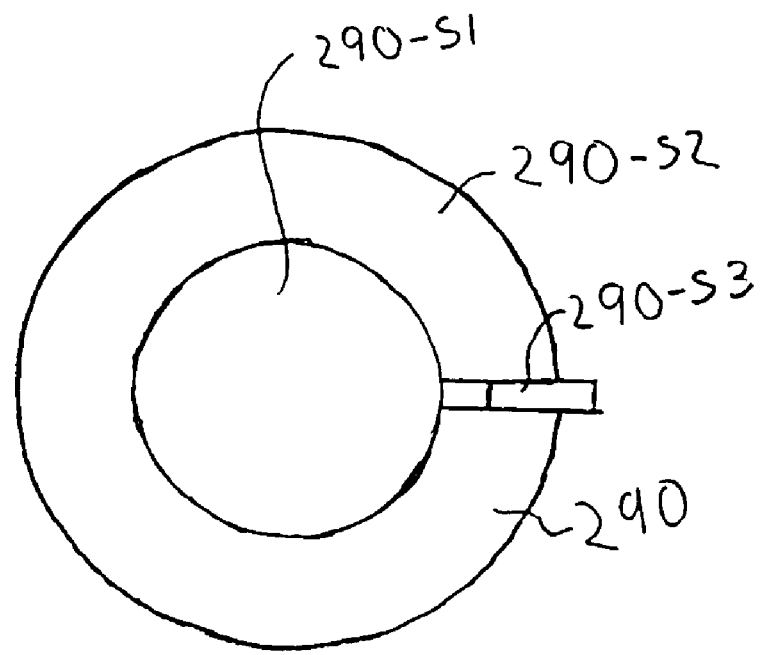

FIG. 71 show as a top-view of a single tooth cone.

Figure 72:
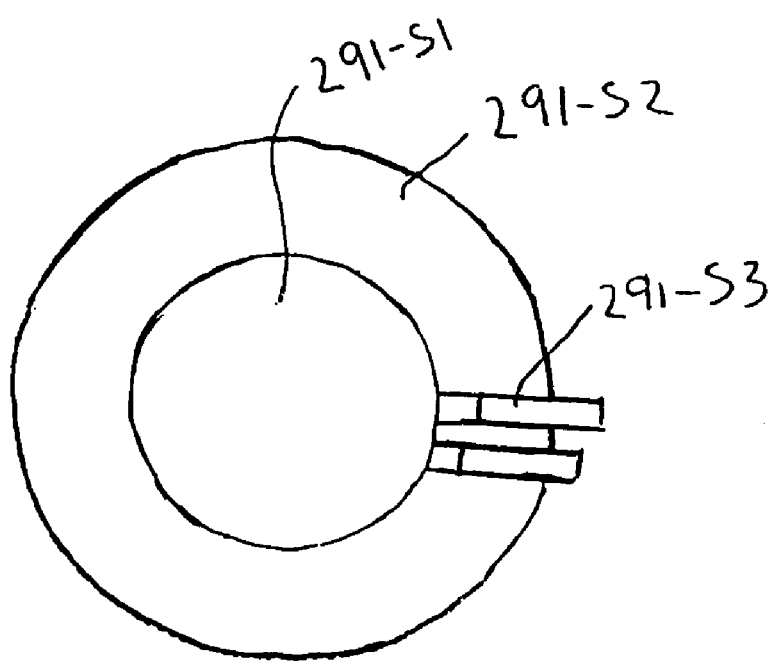

FIG. 72 show as a top-view of a single tooth cone that has a supporting surface.

FIG. 73A shows a side-view of an inverted belt that can be used with a single tooth cone.

FIG. 73B shows as sectional-view of an inverted belt that can be used with a single tooth cone.

FIG. 74A shows a top-view of an specialized inverted belt that can be used with a single tooth cone that has a supporting surface.

FIG. 74B shows a side-view of an specialized inverted belt that can be used with a single tooth cone that has a supporting surface.

FIG. 75, shows a side-view of a chain link of an inverted chain that can be used with a single tooth cone.

Figure 76:
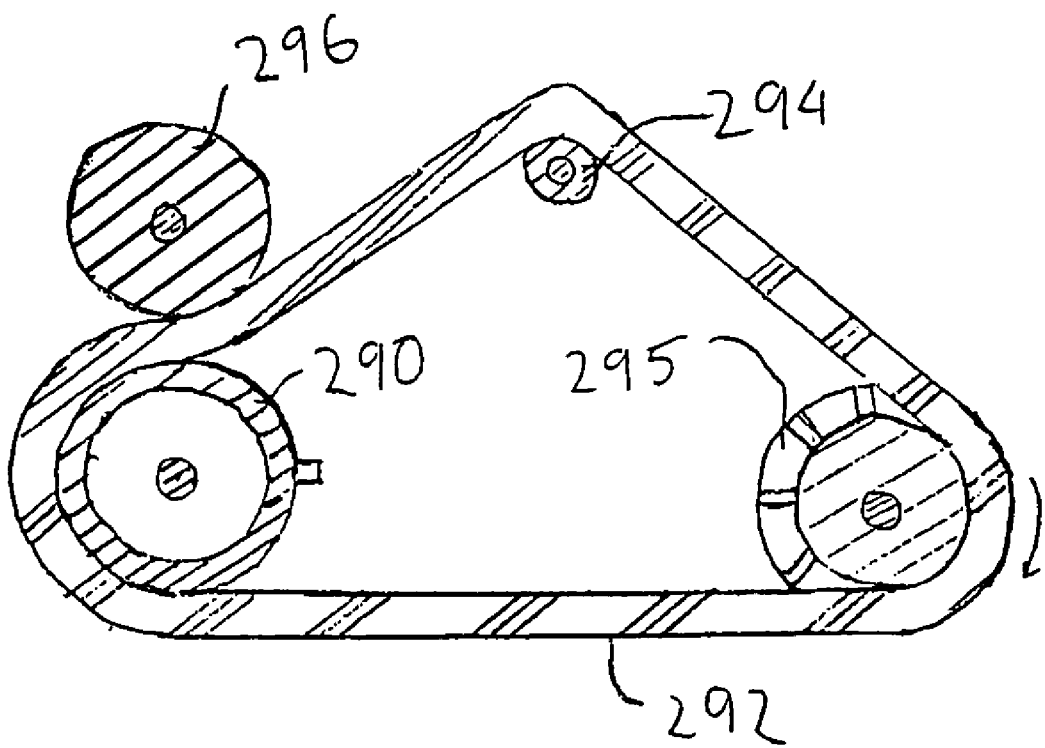

FIG. 76, shows a sectional-view of a single tooth cone CVT 2 cut near the smaller end of one of its cones which utilizes a supporting wheel.

Figure 77:
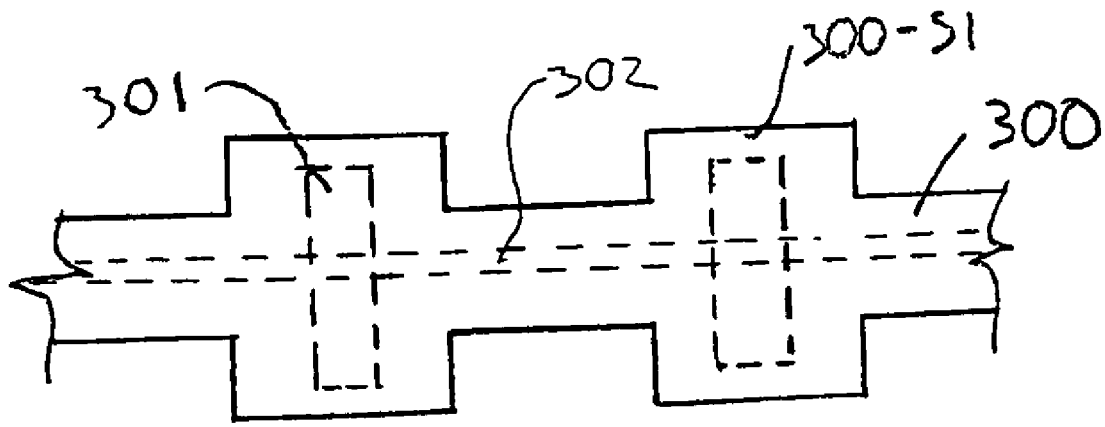

FIG. 77 shows a top-view reinforced transmission belt 300.

FIG. 78A shows a side-view of a pin belt

FIG. 78B shows an end-view of a pin belt end-view

Figure 79:
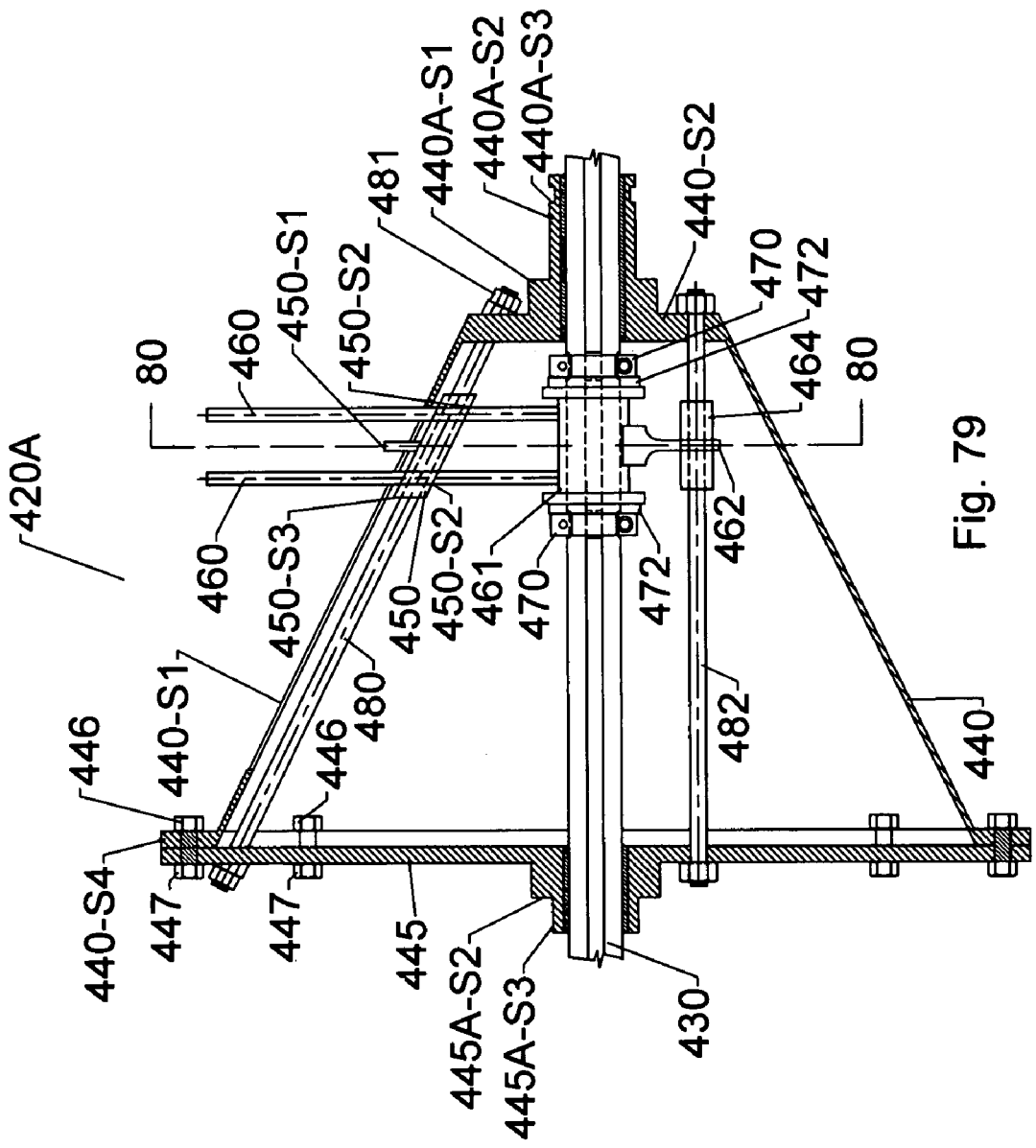

FIG. 79 shows a front-view of a cone 440 and its larger end cover 45 for which the front half surfaces have been removed.

Figure 80:
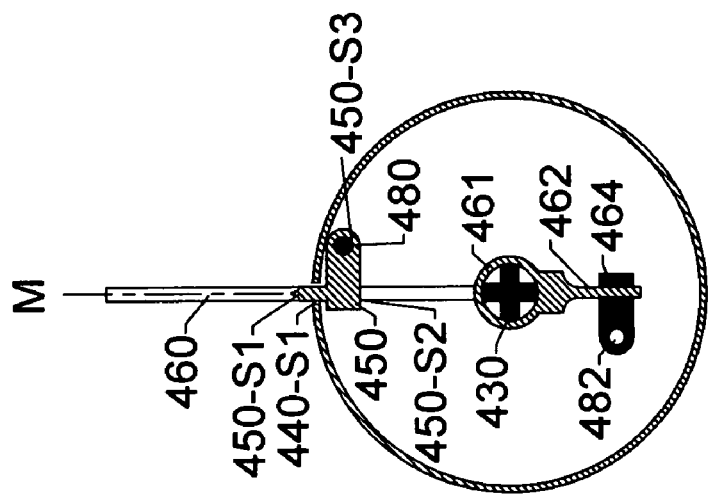

FIG. 80 shows a partial sectional right-end-view of a cone 440.

Figure 81:
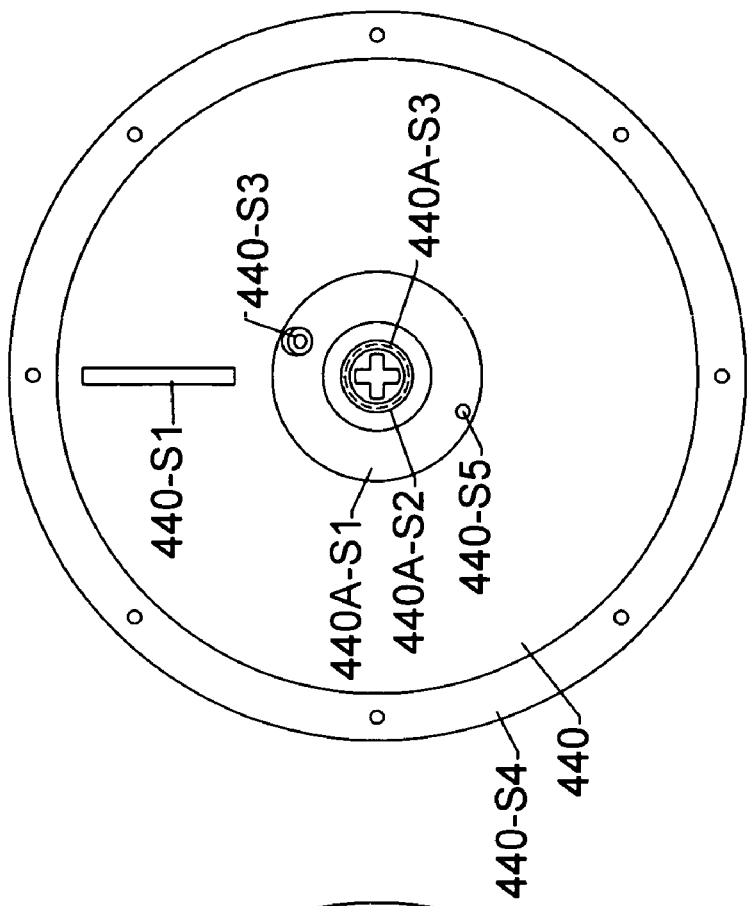

FIG. 81 shows an right-end-view of a cone 440.

Figure 82:
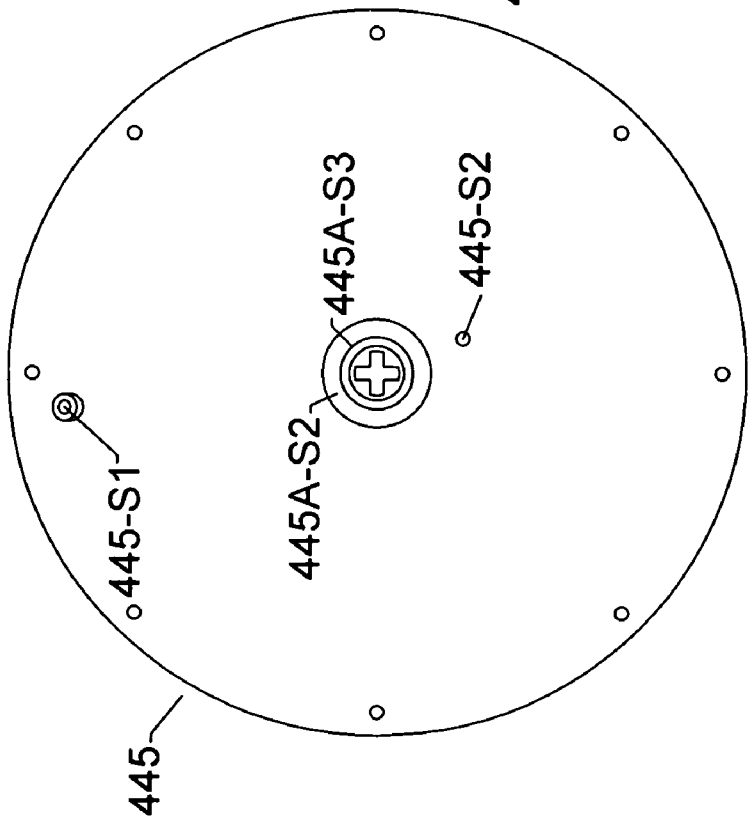

FIG. 82 shows a left-end-view of cover 445.

Figure 83:

FIG. 83 shows an end-view of a spline collar 470 mounted on a machined down portion of spline 430.

Figure 84:
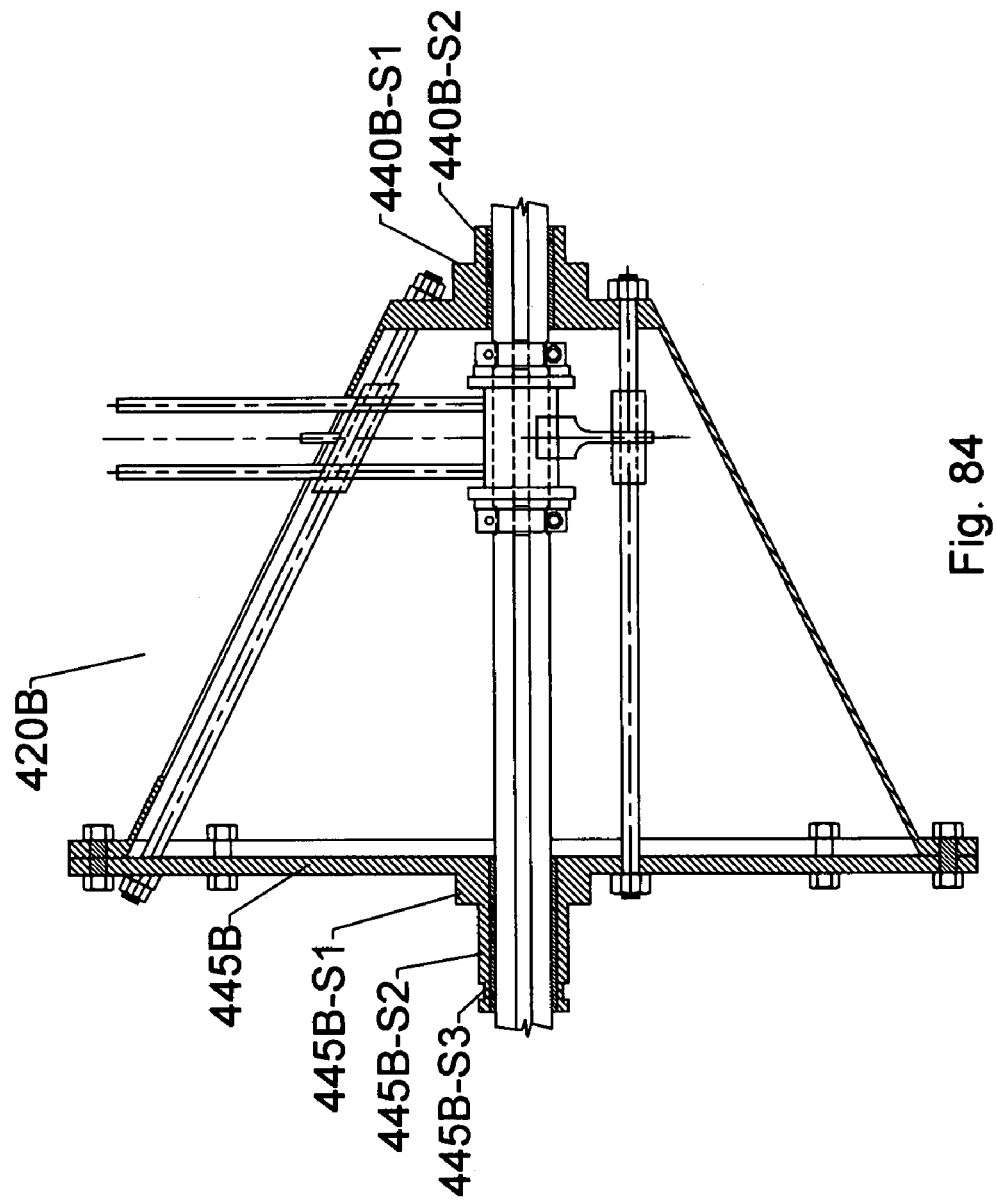

FIG. 84 shows a front-view of a back sliding tooth cone assembly 420B.

Figure 85B:
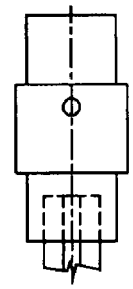
Figure 85A:
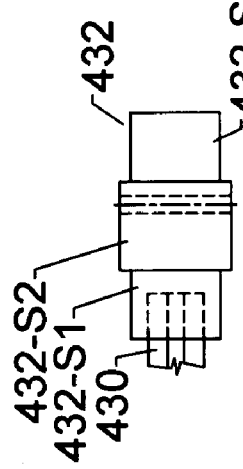

FIG. 85A shows a front-view of a spline shaft extension 432.

FIG. 85B shows a top-view of a spline shaft extension 432.

Figure 86:
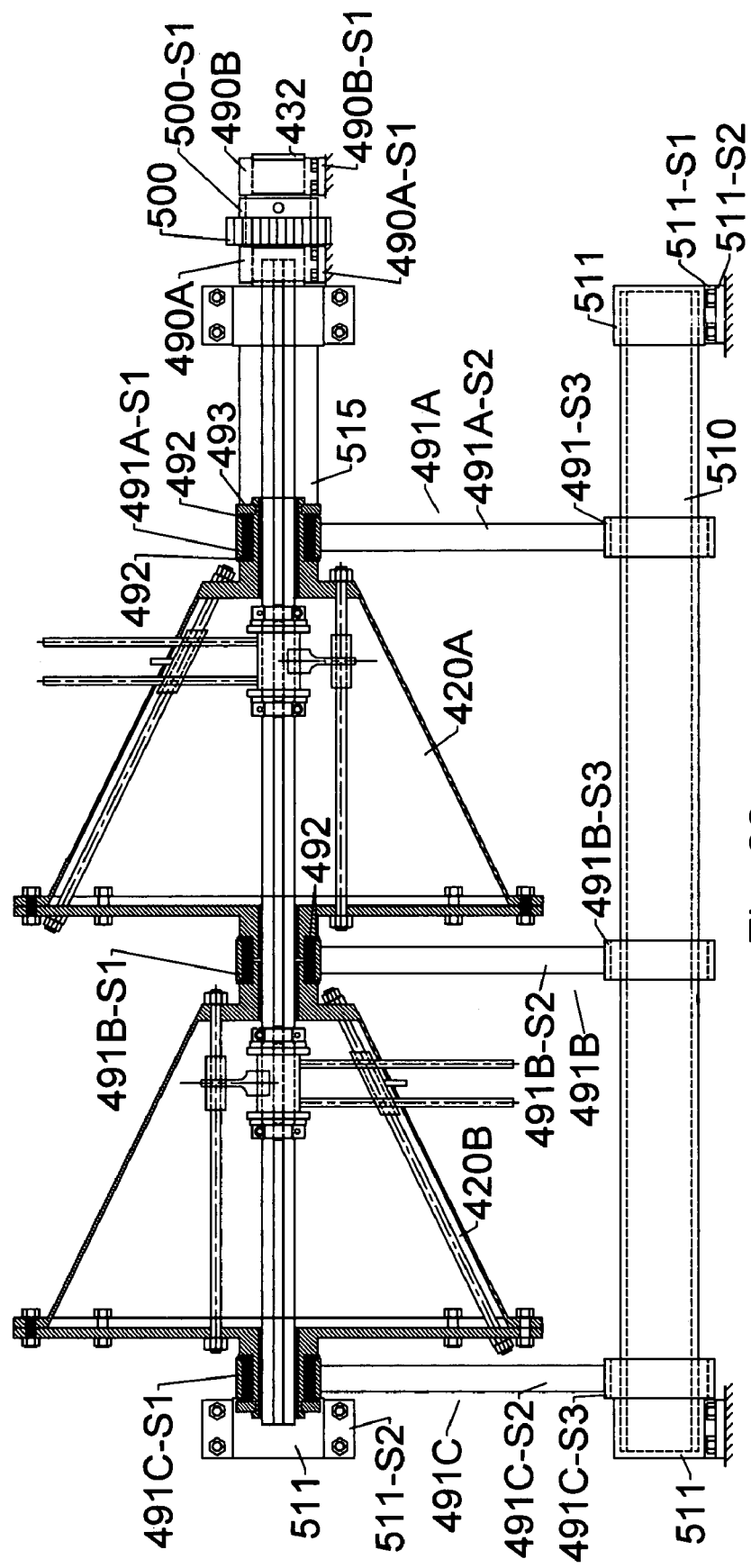

FIG. 86 shows a side-view of an assembled CVT 2 input/output shaft utilizing a front sliding tooth cone assembly 420A and a back sliding tooth cone assembly 420B.

Figure 87:
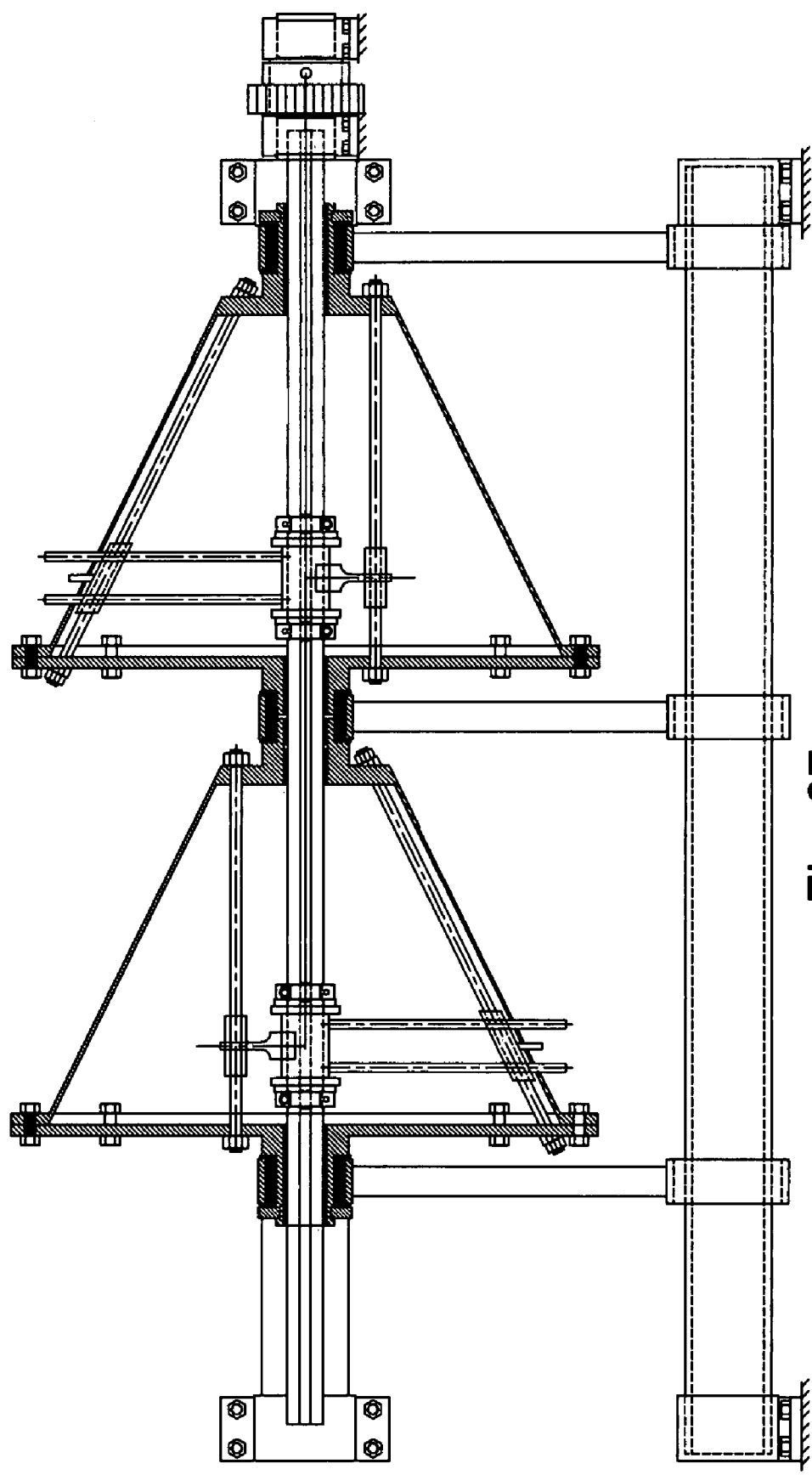

FIG. 87 shows another side-view of an assembled CVT 2 input/output shaft utilizing a front sliding tooth cone assembly 420A and a back sliding tooth cone assembly 420B.

Figure 88:
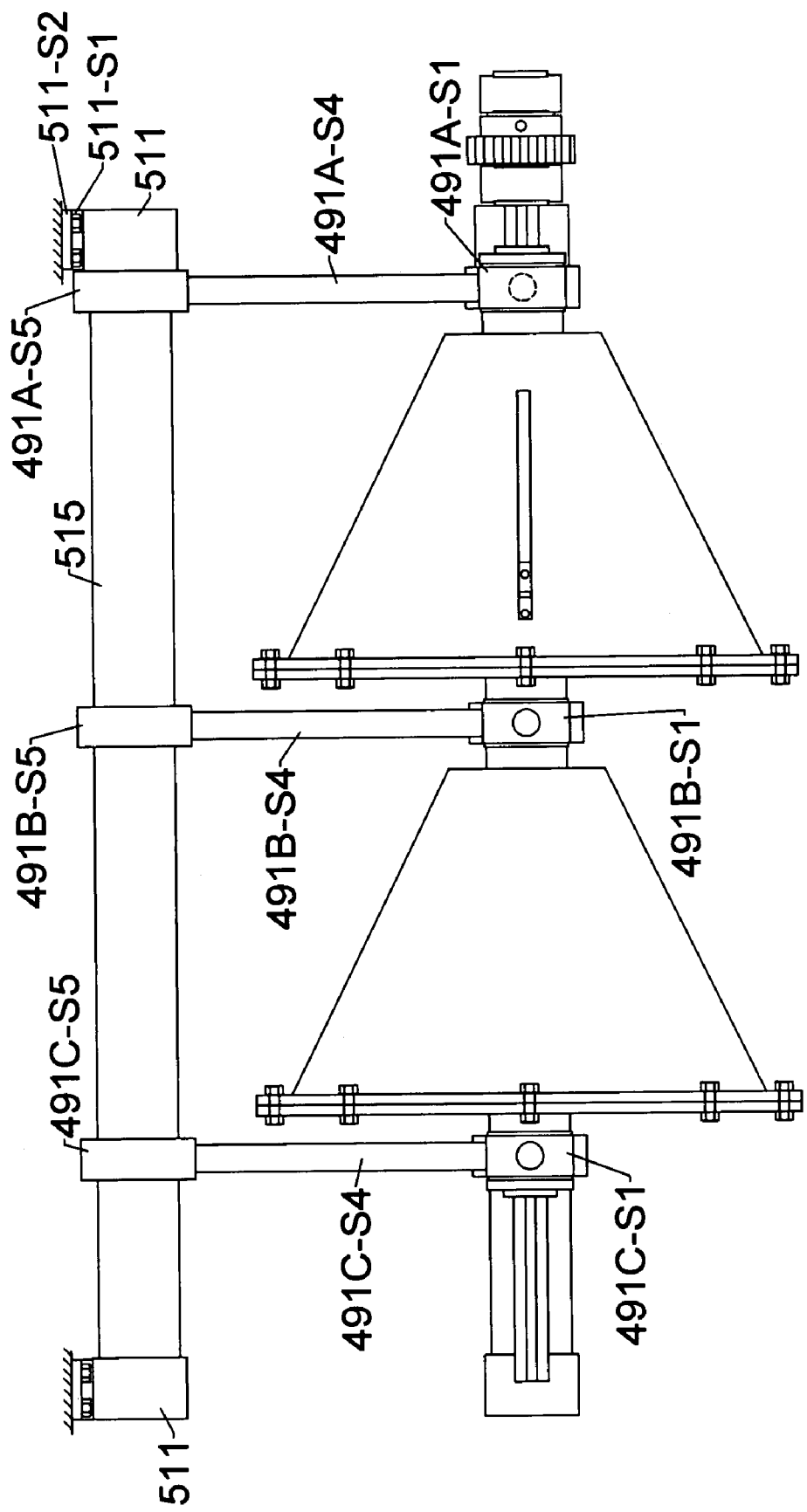

FIG. 88 shows top-view of an assembled CVT 2 input/output shaft utilizing a front sliding tooth cone assembly 420A and a back sliding tooth cone assembly 420B.

Figure 89:
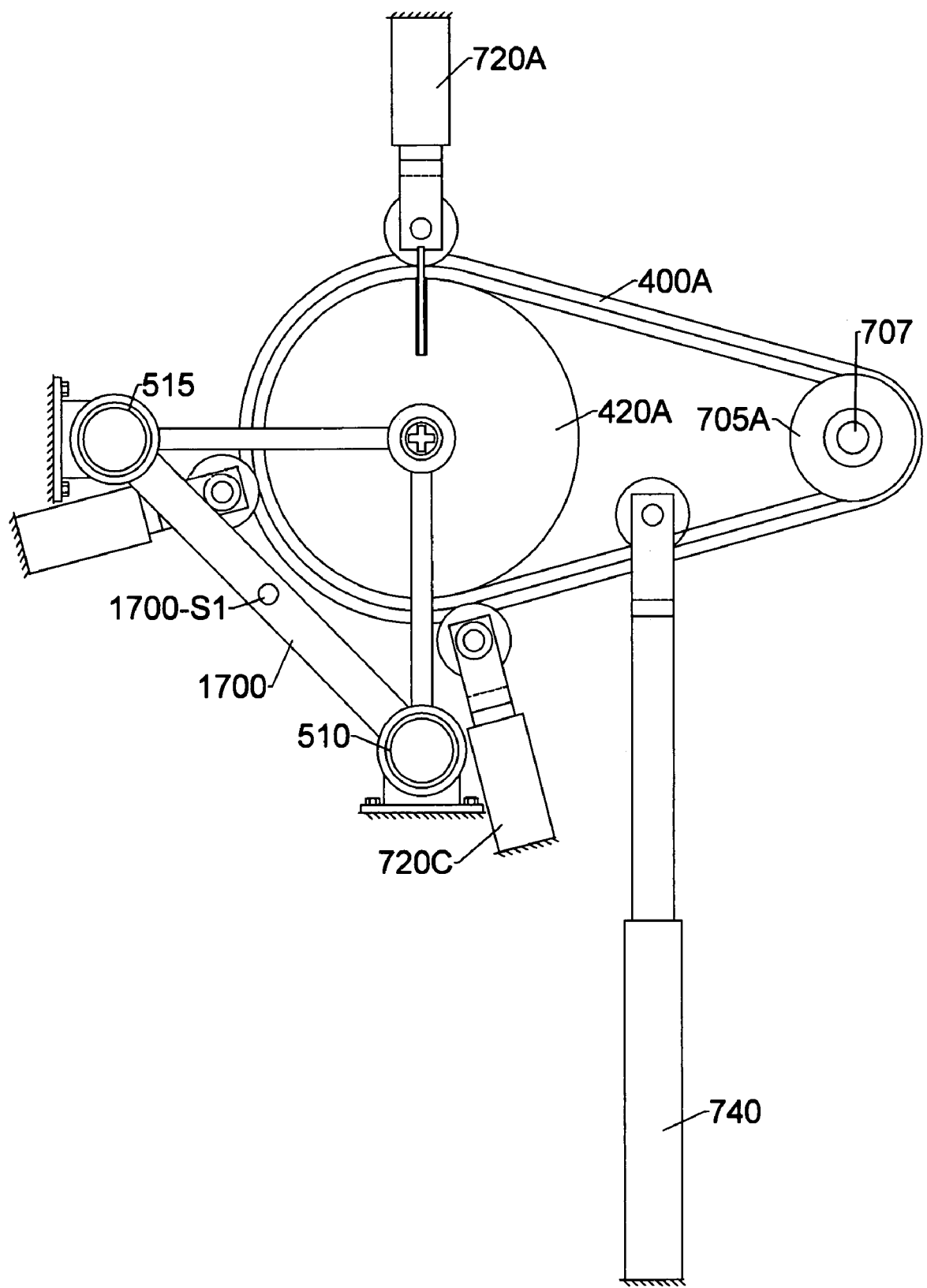

FIG. 89 shows a front-view of a CVT utilizing a CVT 2 input/output shaft.

Figure 90:
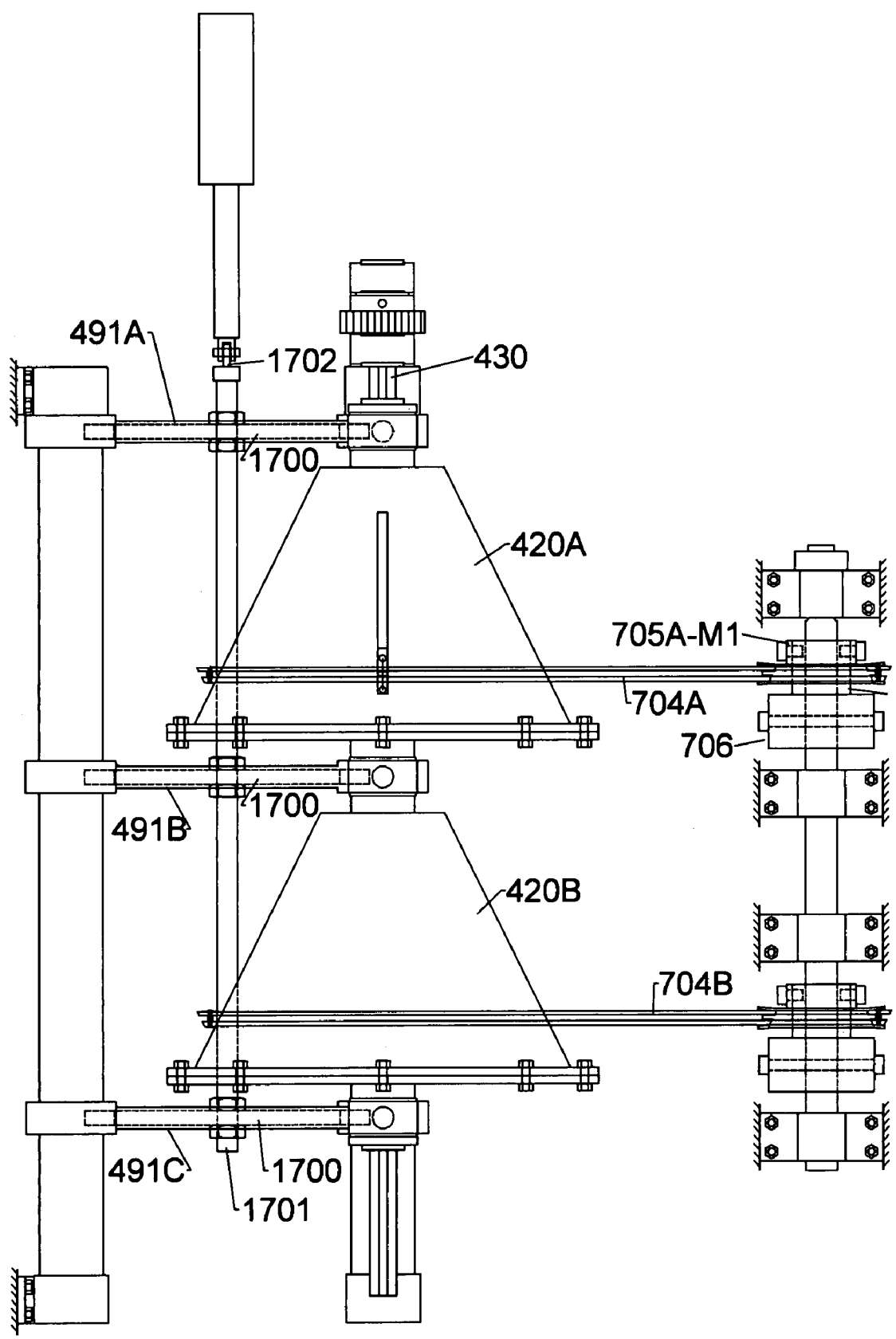

FIG. 90 shows a partial top-view of a CVT utilizing a CVT 2 input/output shaft.

FIG. 91A shows a front-view of a front pin belt cone assembly 520A where portions of its front surface has been cut and removed.

FIG. 91B shows an end-view of a front pin belt cone assembly 520A where the pin belt torque transmitting member 590 and pin belt non-torque transmitting member 690 are positioned near the smaller end of the cone.

FIG. 92A shows a front-view of a front pin belt cone assembly 520A where its entire front surface has been cut and removed.

FIG. 92B shows an end-view of a front pin belt cone assembly 520A where the pin belt torque transmitting member 590 and pin belt non-torque transmitting member 690 are positioned near the larger end of the cone.

Figure 93:
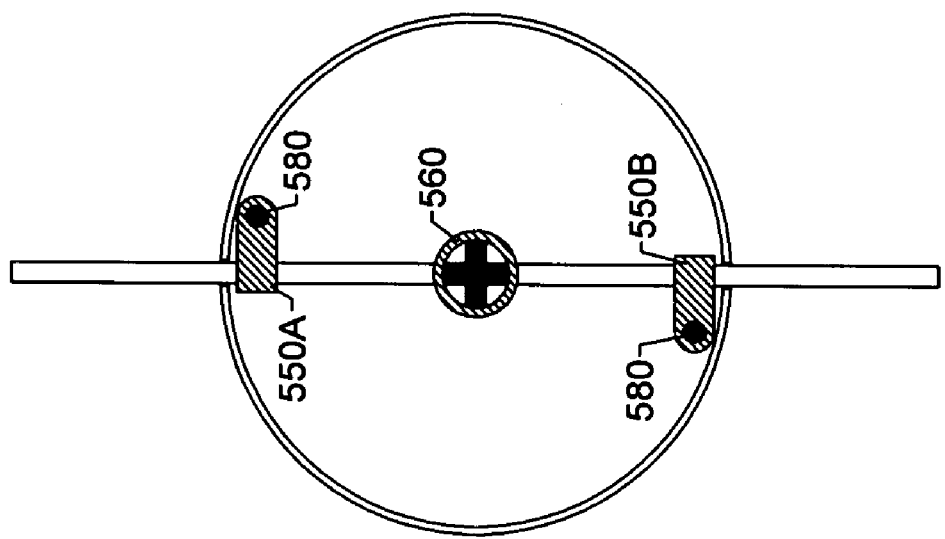

FIG. 93 shows a partial sectional-view of front pin belt cone assembly 520A where some items are not shown.

Figure 94:
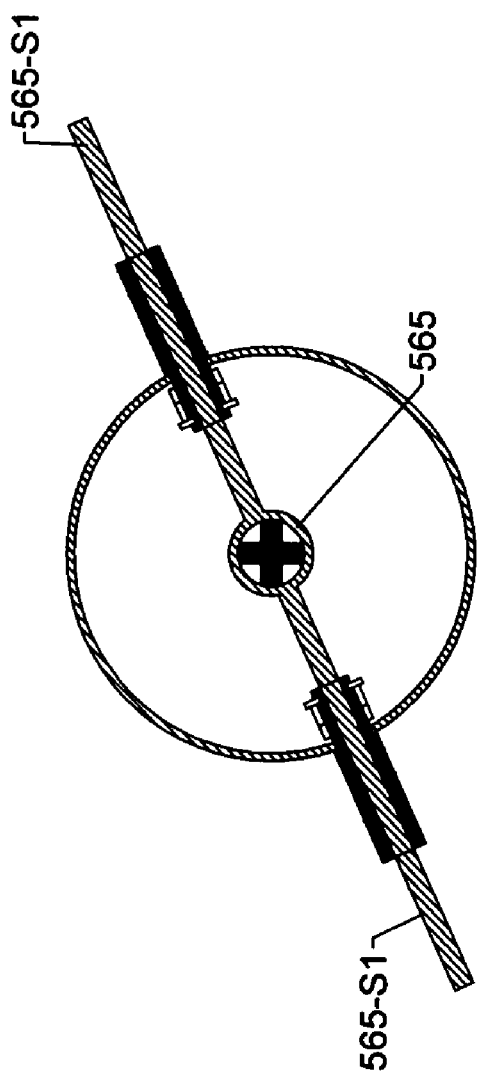

FIG. 94 shows another partial sectional-view of front pin belt cone assembly 520A.

FIG. 95 shows a top-view of pin belt torque transmitting member 590.

Figure 96:
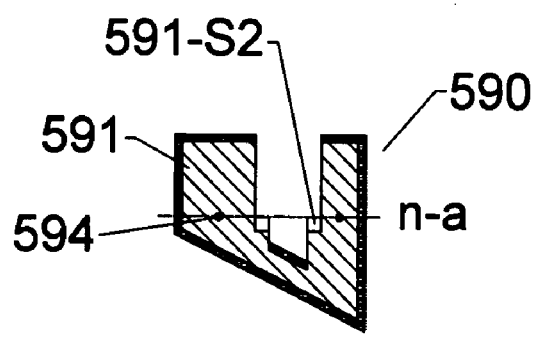

FIG. 96 shows a sectional-view of pin belt torque transmitting member 590.

Figure 97:
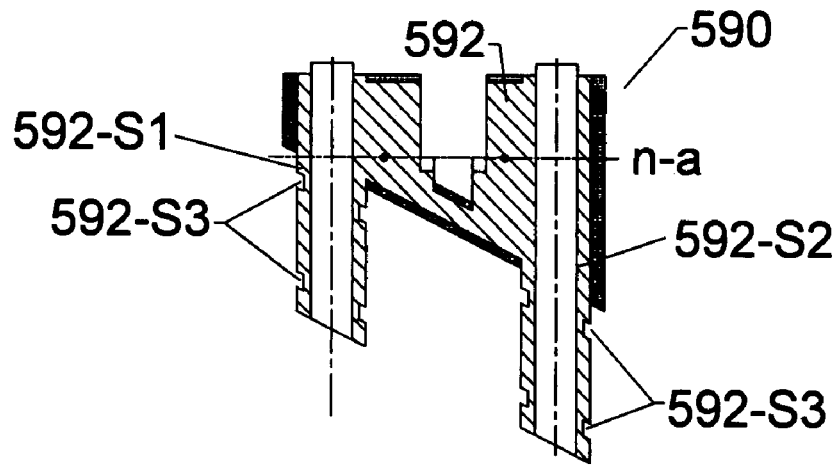

FIG. 97 shows another sectional-view of pin belt torque transmitting member 590.

FIG. 98 shows another sectional-view of pin belt torque transmitting member 590.

Figure 99:
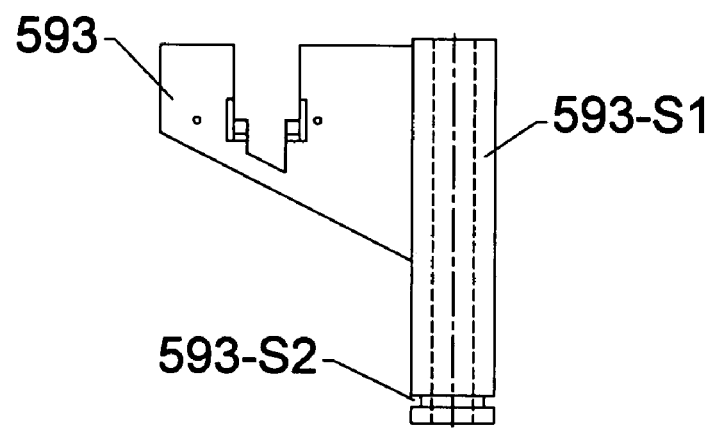

FIG. 99 shows an end-view of a trailing plate 593.

Figure 100:
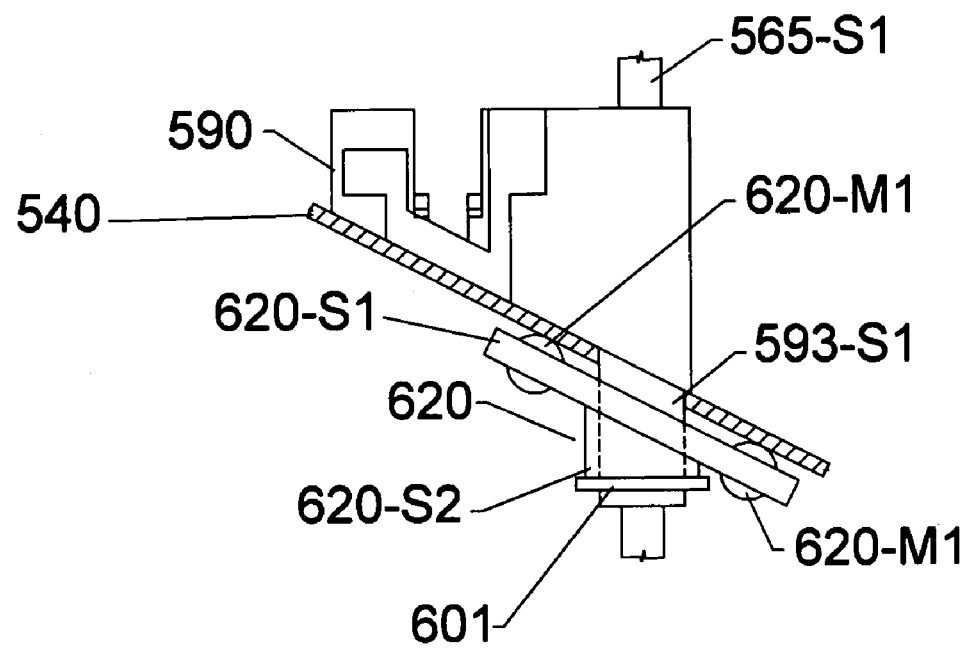

FIG. 100 shows an end-view of a trailing plate 593 that is secured to pin belt cone 540 using a ball clamp 620.

Figure 101:
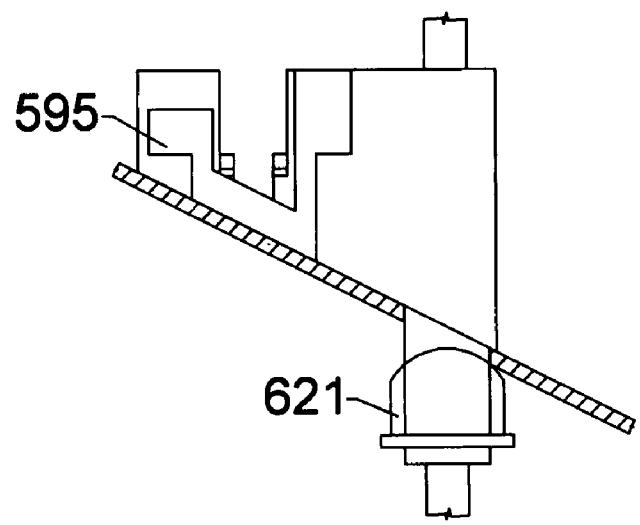

FIG. 101 shows an end-view of a trailing plate 593 that is secured to pin belt cone 540 using a dome shaped nut 621.

Figure 102B:
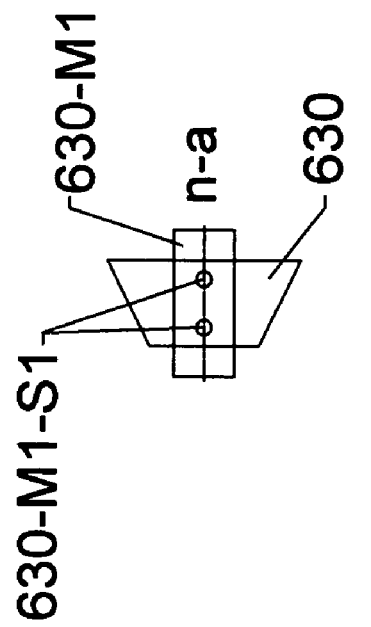
Figure 102A:
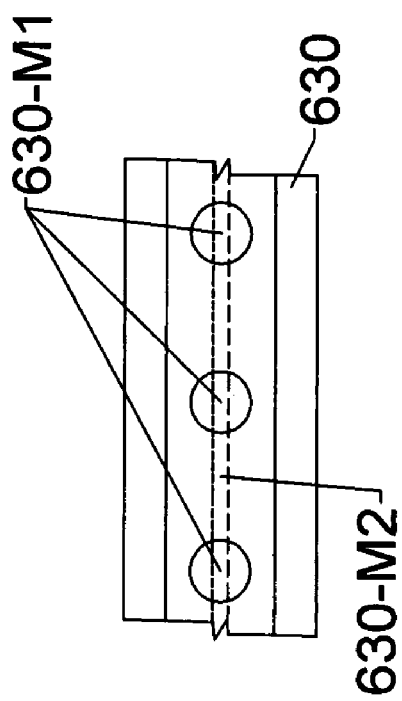

FIG. 102A shows a side-view of a pin transmission belt 630.

FIG. 102B shows an end-view of a pin transmission belt 630.

Figure 103:
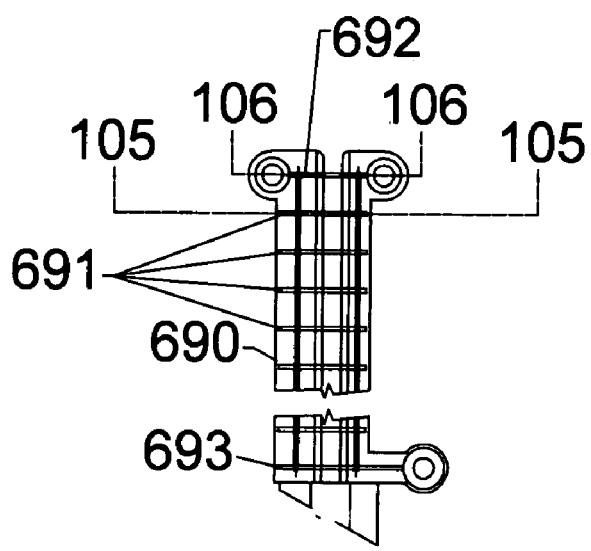

FIG. 103 shows a top-view of pin belt non-torque transmitting member 690.

Figure 104:

FIG. 104 shows a sectional-view of pin belt non-torque transmitting member 690.

Figure 105:
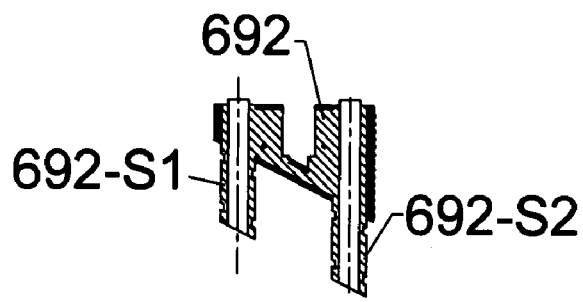

FIG. 105 shows another sectional-view of pin belt non-torque transmitting member 690.

Figure 106:
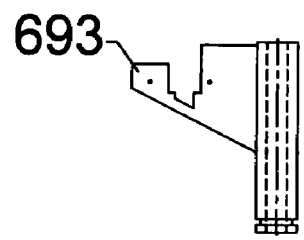

FIG. 106 shows an end view of non-torque trailing plate 693.

Figure 107:
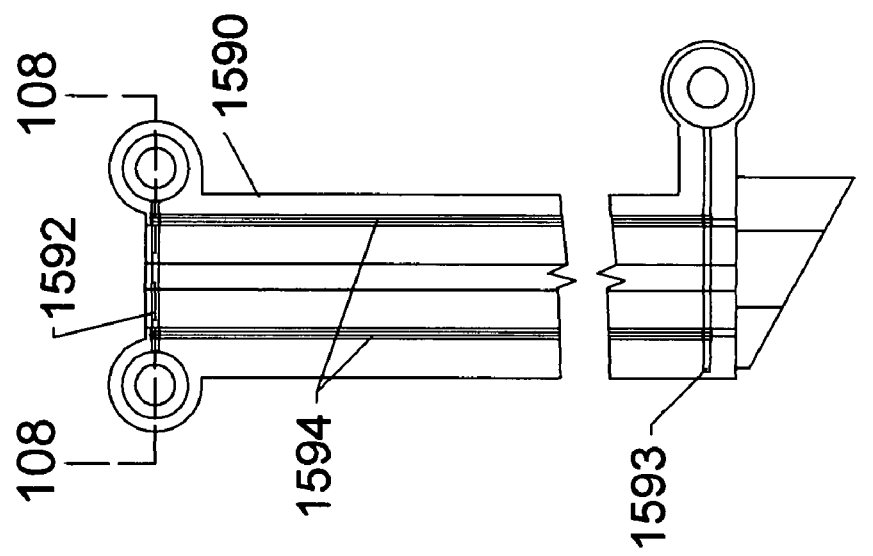

FIG. 107 shows as a top-view of alternate friction torque transmitting member 1590.

Figure 108:
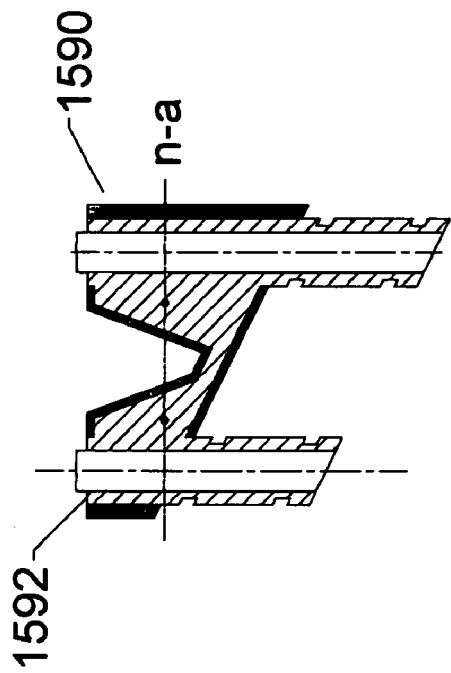

FIG. 108 shows a sectional-view of alternate friction torque transmitting member 1590

Figure 109:
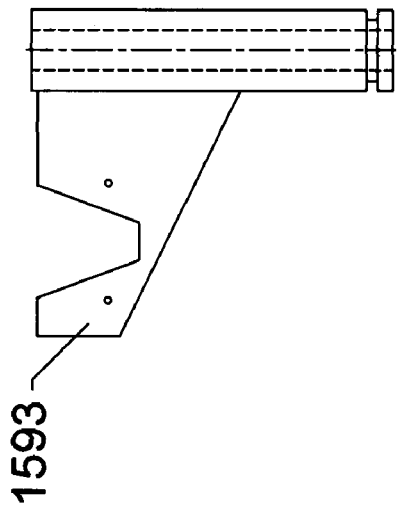

FIG. 109 shows a front-view of friction trailing plate 1593.

Figure 110:
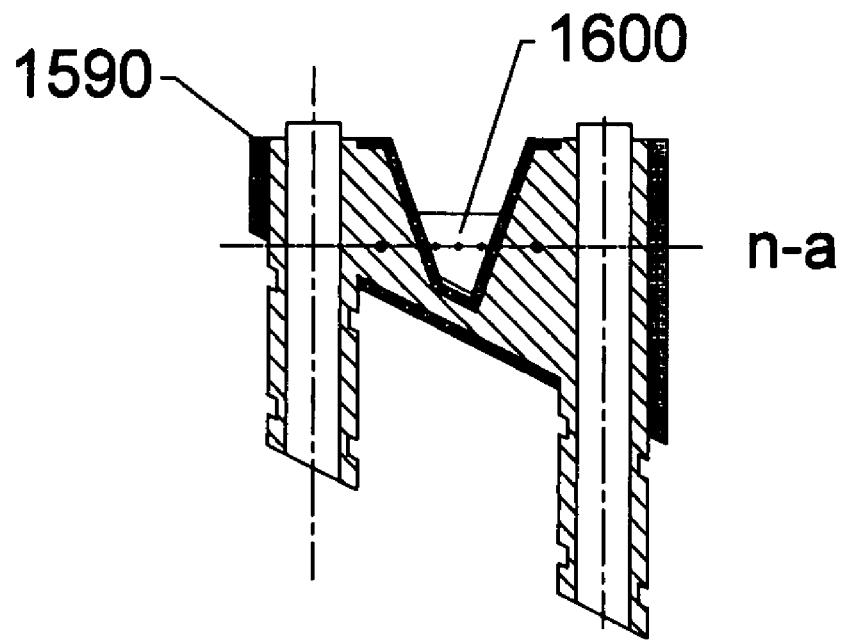

FIG. 110 shows a cross-sectional-view of alternate friction torque transmitting member 1590 that is engaged with its V-belt, which is labeled as V-belt 1600.

Figure 111:
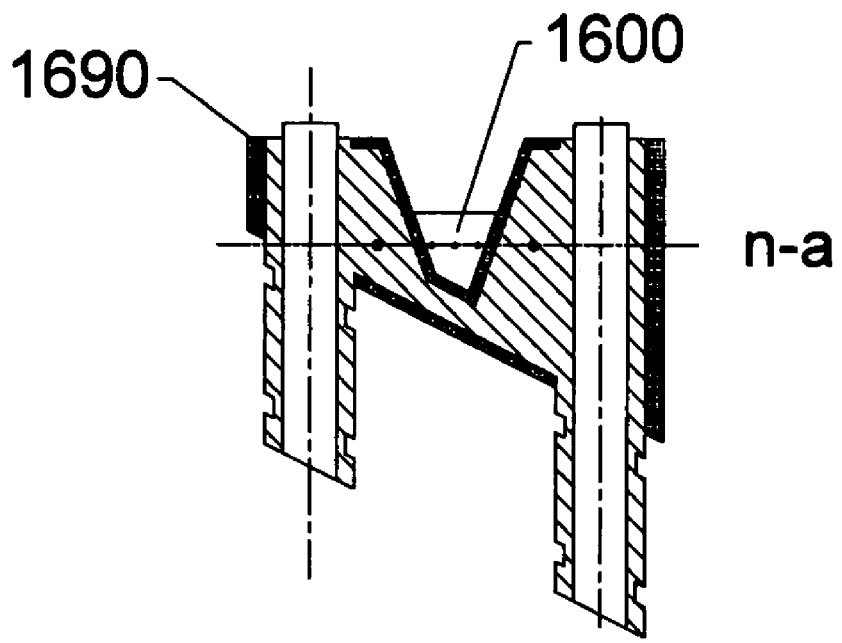

FIG. 111 shows a cross-sectional-view of alternate friction non-torque transmitting member 1690 that is engaged with its V-belt, which is labeled as V-belt 1600

Figures 112A, 112B:
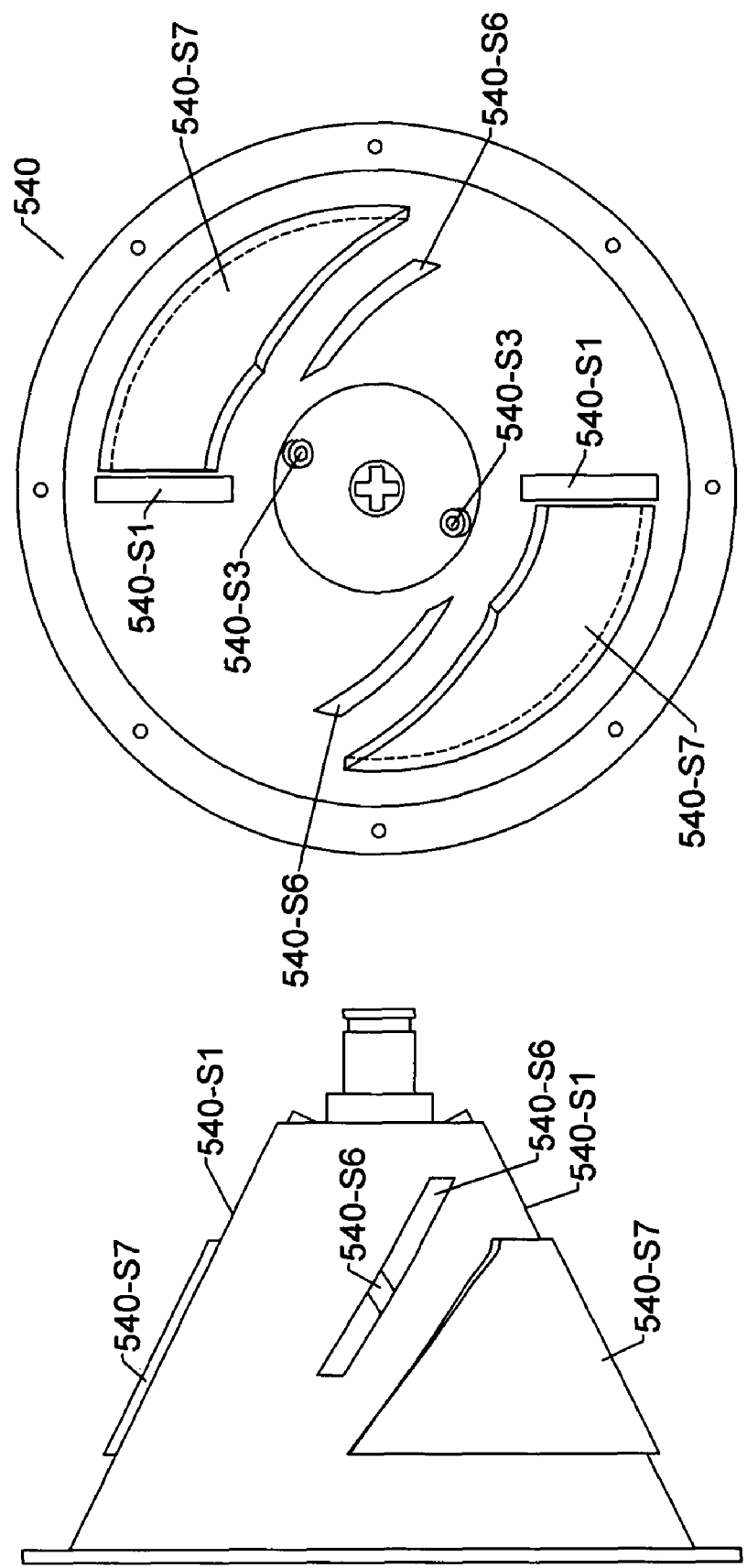

FIG. 112A shows a front-view of pin belt cone 540.

FIG. 112B shows an end-view of pin belt cone 540.

Figure 113:
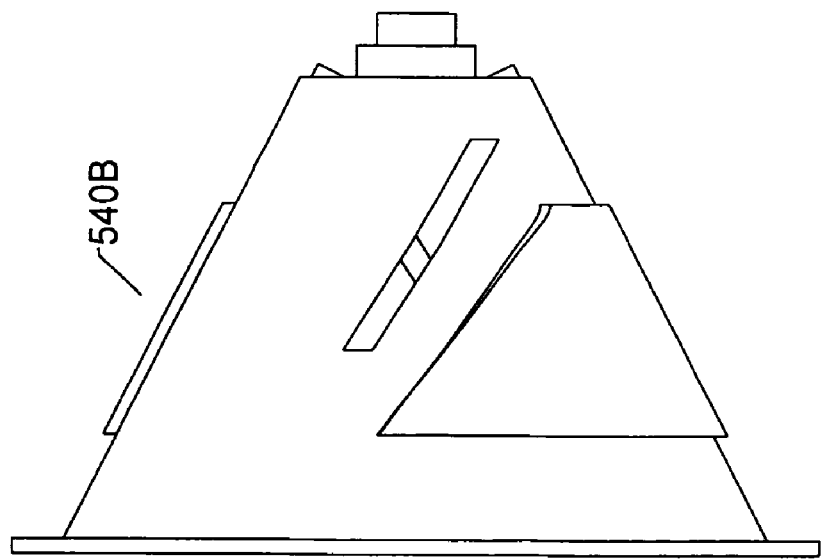

FIG. 113 shows a front-view of back pin belt cone 540B.

Figure 114:
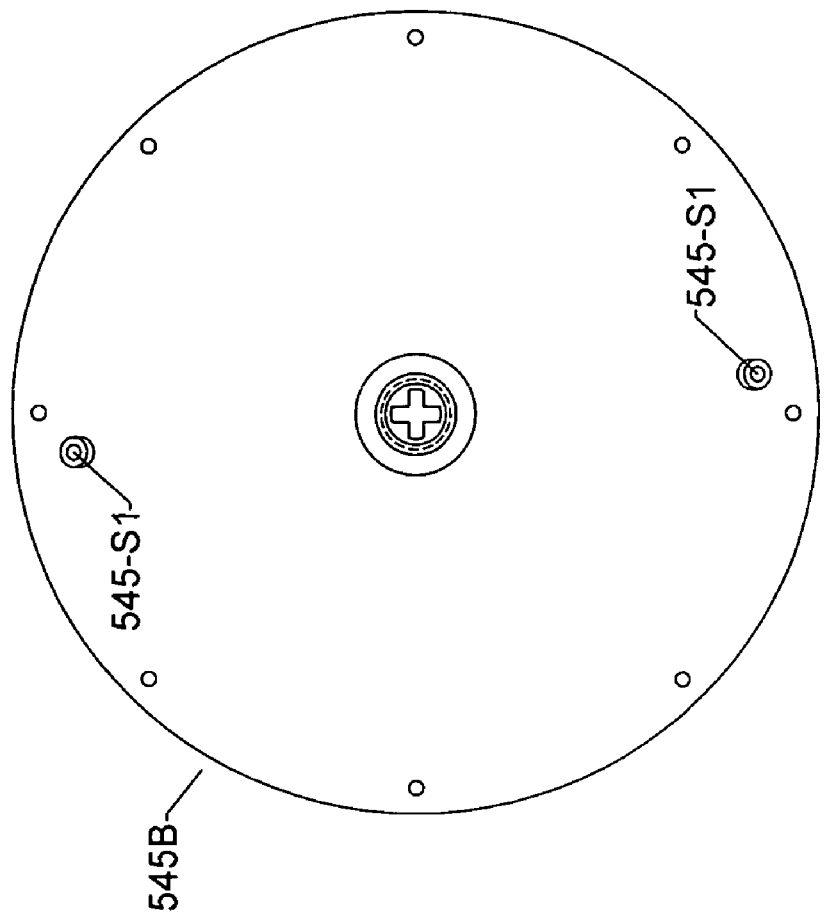

FIG. 114 shows a left-end-view of back pin belt cone larger end cover 545B

Figure 115:
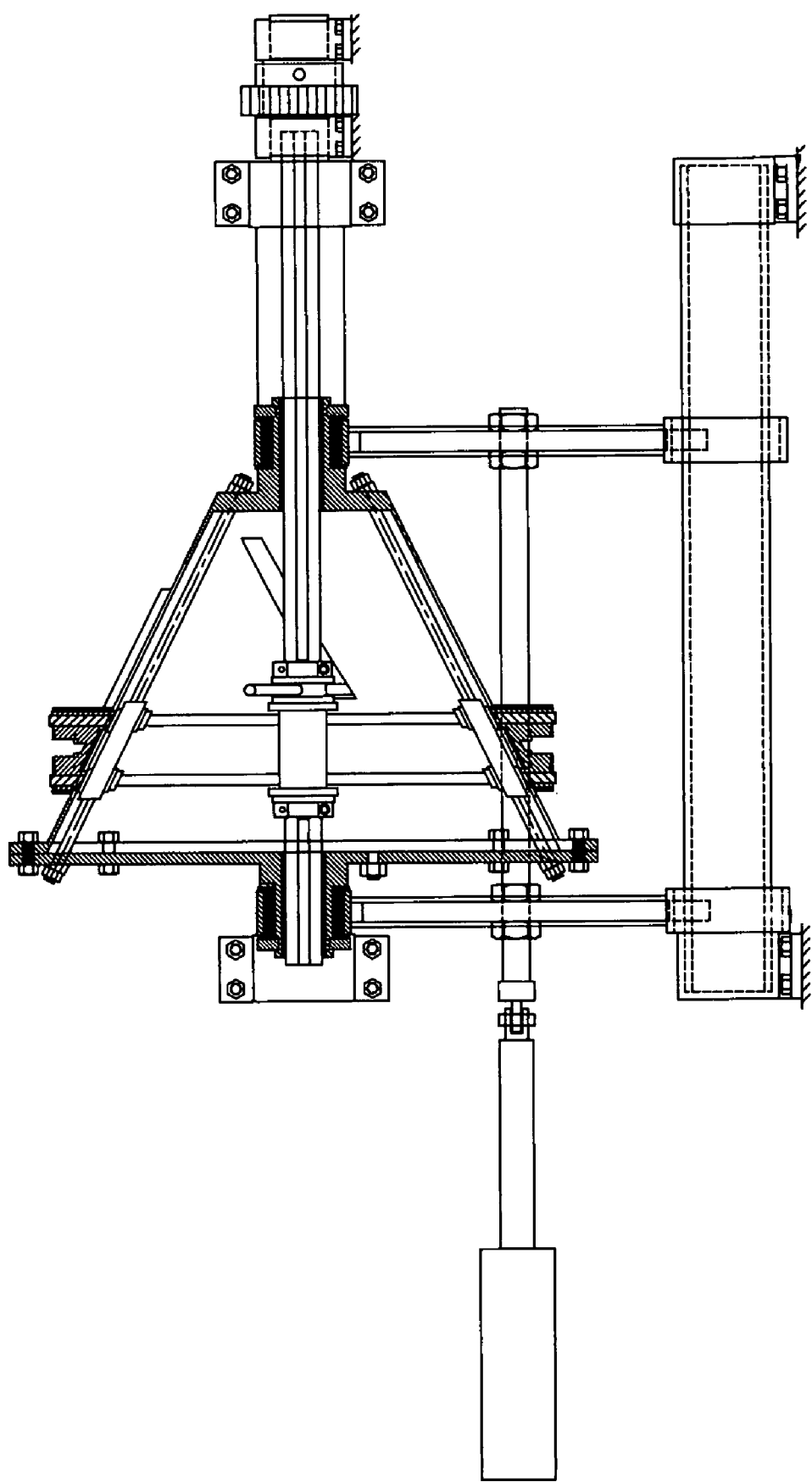

FIG. 115 shows a top-view for the mounting of a single cone assembly on a shaft/spline.

FIG. 116A shows a front-view of twin sprocket pulley 700.

FIG. 116B shows a sectional-view of twin sprocket pulley 700.

FIG. 117A shows a front-view of two sprockets 702 mounted in parallel.

FIG. 117B shows a sectional-view of two sprockets 702 mounted in parallel.

Figure 118:
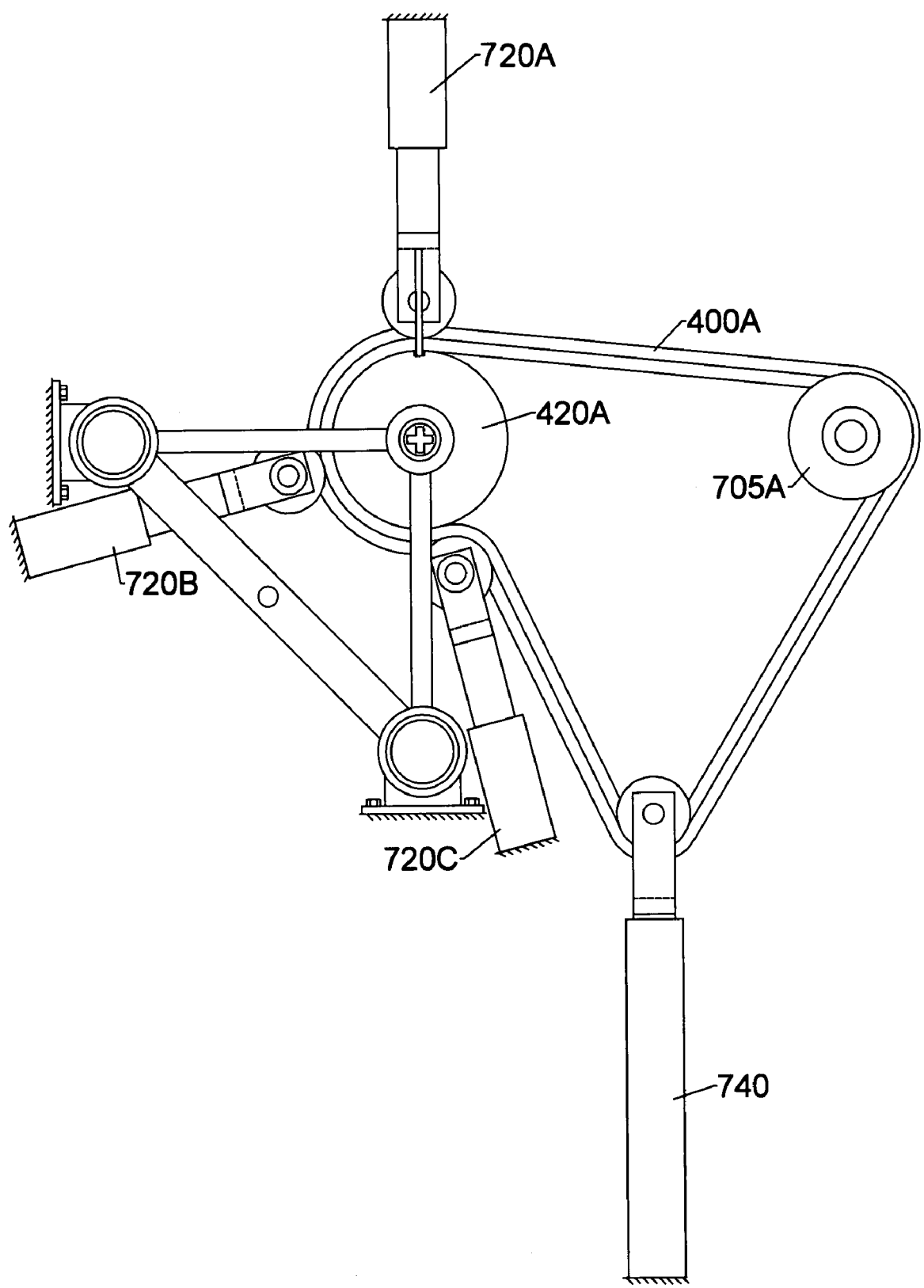

FIG. 118 shows partial back-view of CVT constructed from a front sliding tooth cone assembly 420A and a back sliding tooth cone assembly 420B where the tooth carriages 450 are positioned near the smaller end of the cone.

Figure 119A:
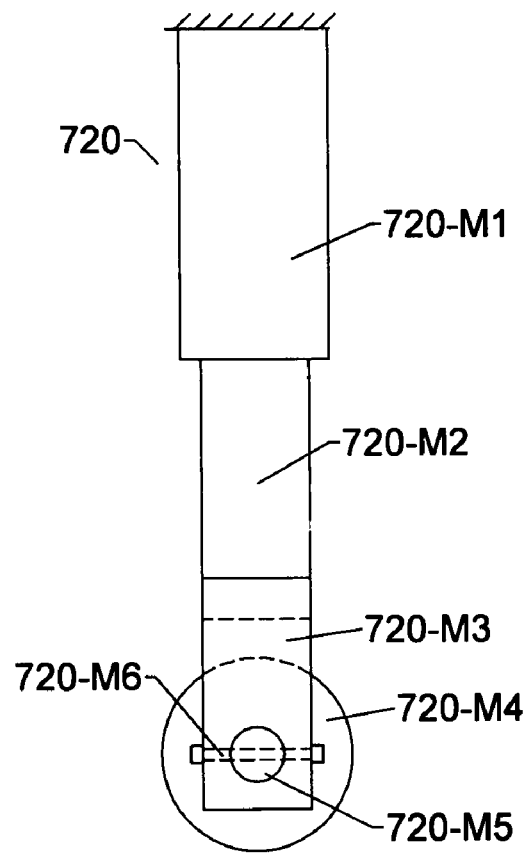

FIG. 119A shows a front-view of a spring-loaded slider pulley assembly 720.

Figure 119B:
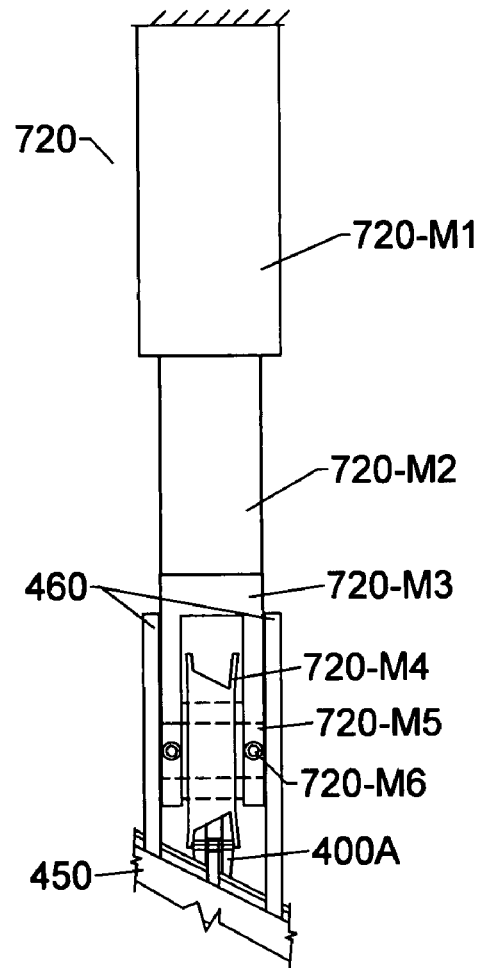

FIG. 119B shows an end-view of a spring-loaded slider pulley assembly 720.

Figure 120:
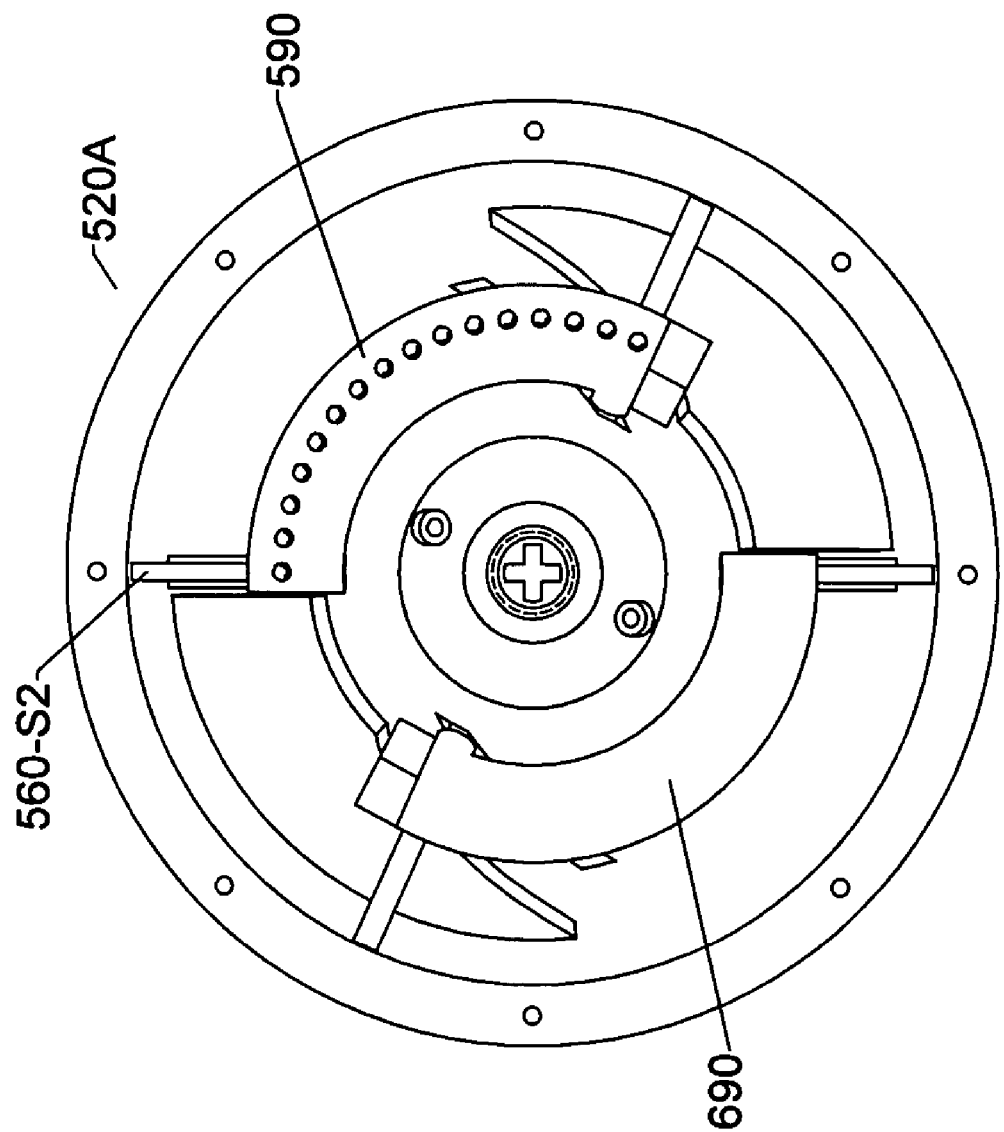

FIG. 120 shows an end-view of a front pin belt cone assembly 520A where the torque transmitting orientation is counter-clockwise.

Figure 121:
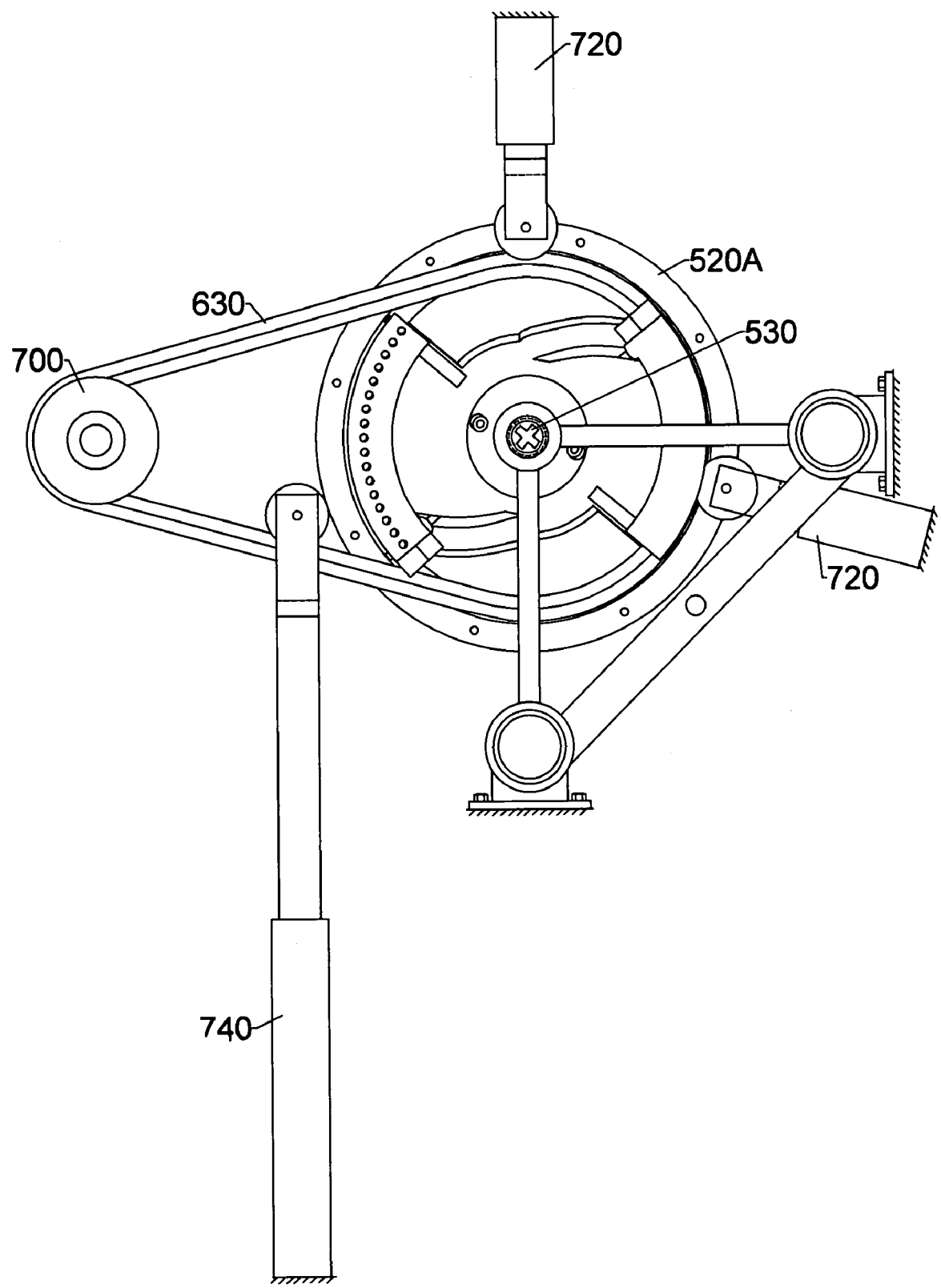

FIG. 121 shows a partial back-view of CVT constructed from a pin belt cone assembly 520A and a back pin belt cone assembly 520B where pin belt torque transmitting member 590 and pin belt non-torque transmitting member 690 are positioned near the larger end of the cone.

Figure 122:
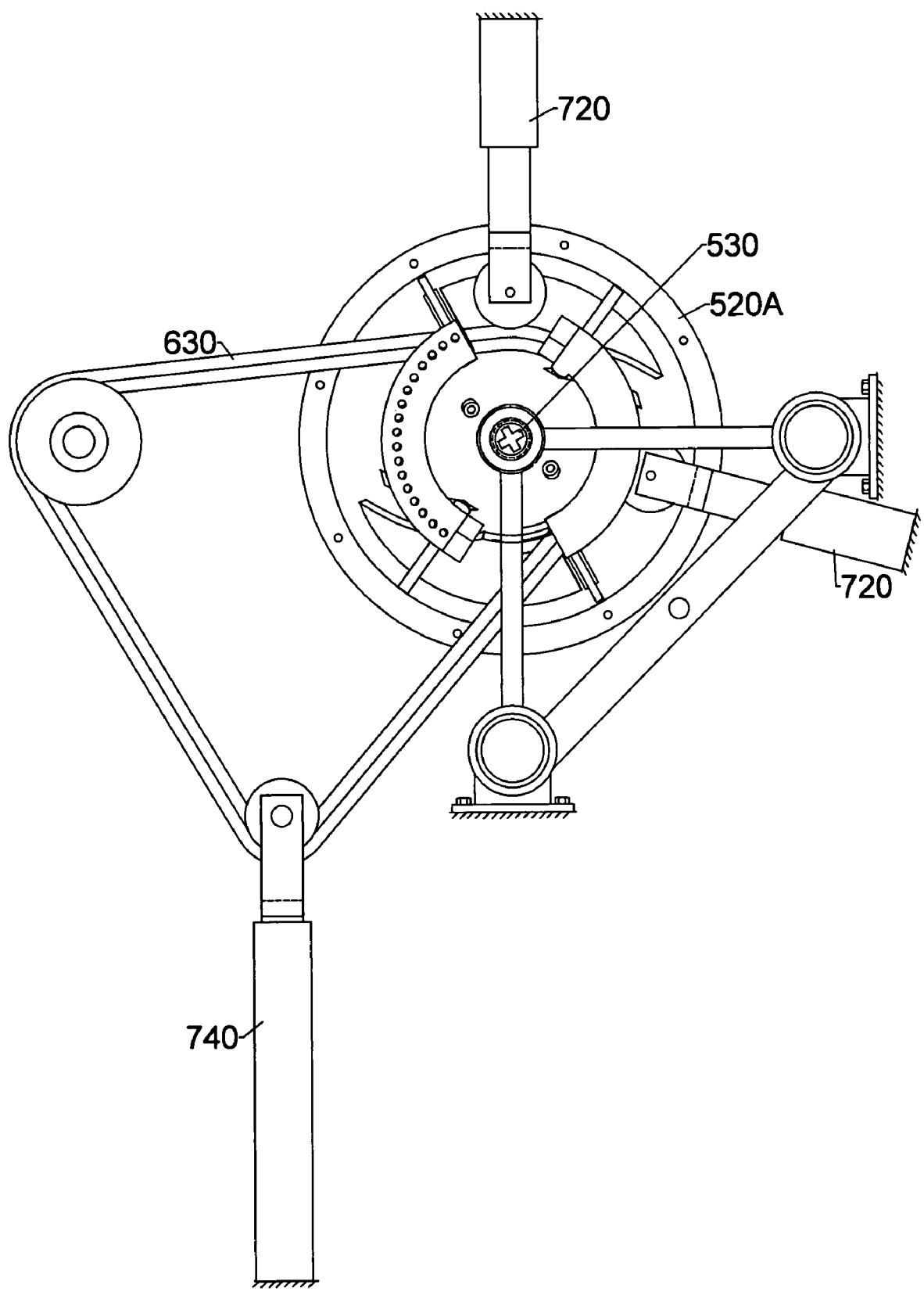

FIG. 122 shows partial back-view of CVT constructed from a pin belt cone assembly 520A and a back pin belt cone assembly 520B where the pin belt torque transmitting member 590 and pin belt non-torque transmitting member 690 are positioned near the smaller end of the cone.

Figure 123:
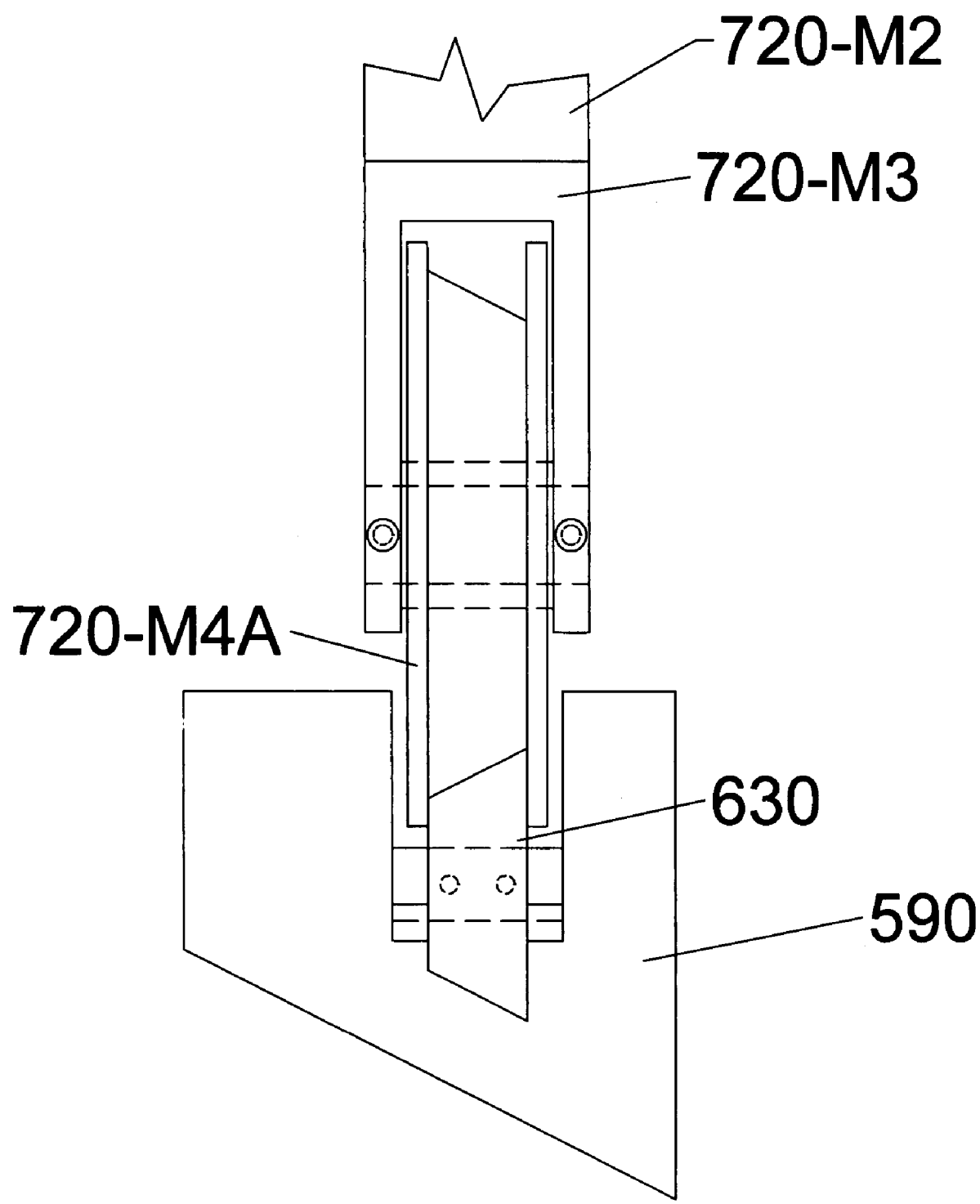

FIG. 123 shows a partial end-view of a pin belt spring-loaded slider pulley 720-M4A.

FIGS. 124, 125, and 126 show sectional-views of alternate pin transmission belts.

Figure 127:
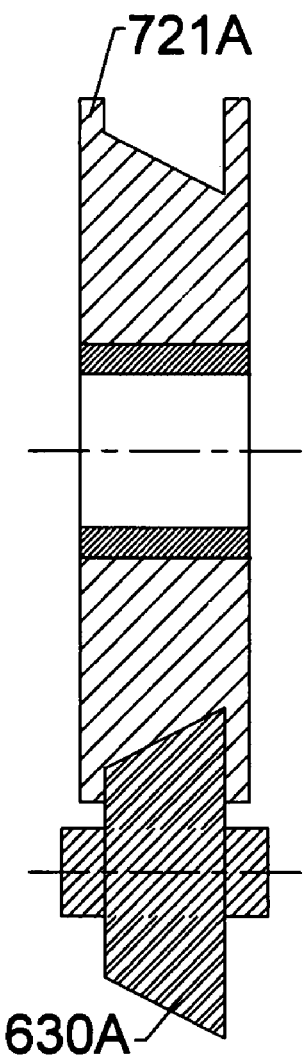
Figure 128:
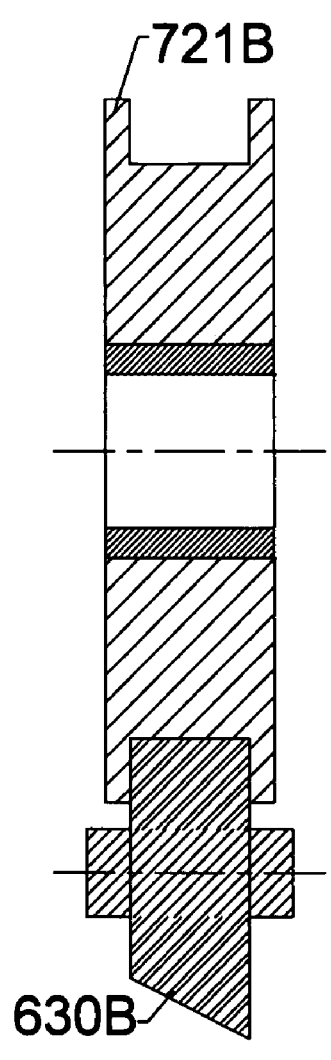
Figure 129:
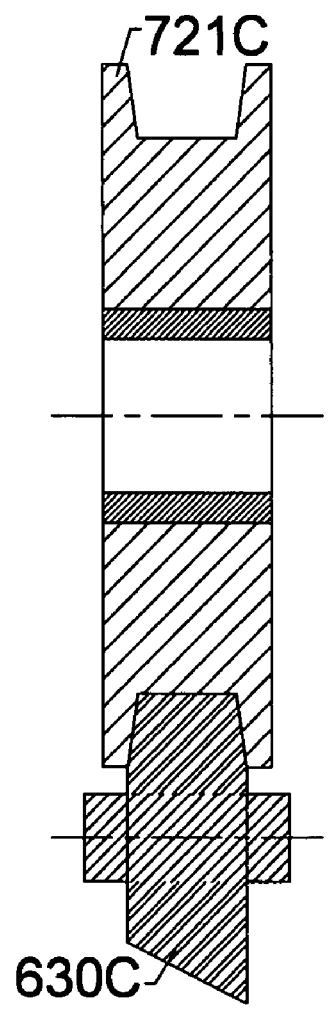

FIGS. 127, 128, and 129 show sectional-views of alternate pin transmission belts with their spring-loaded slider pulleys.

FIG. 130A shows a side-view of a alignment wheels pulley assembly 730.

FIG. 130B shows an end-view of a alignment wheels pulley assembly 730.

Figure 131B:
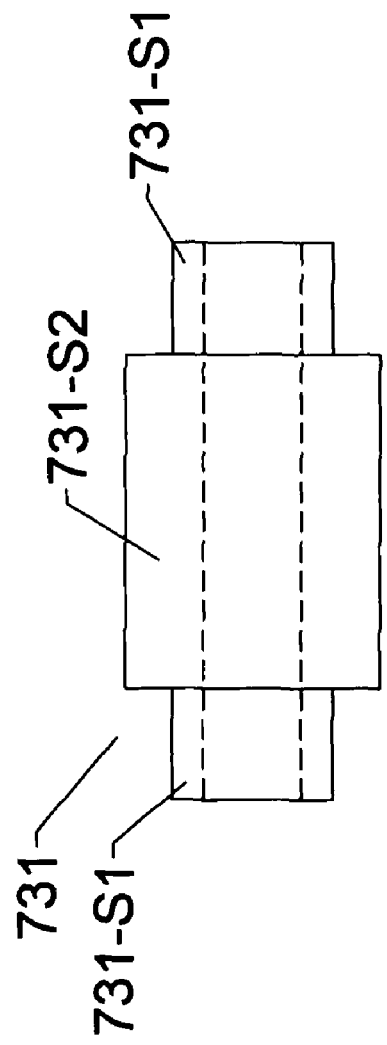
Figure 131A:
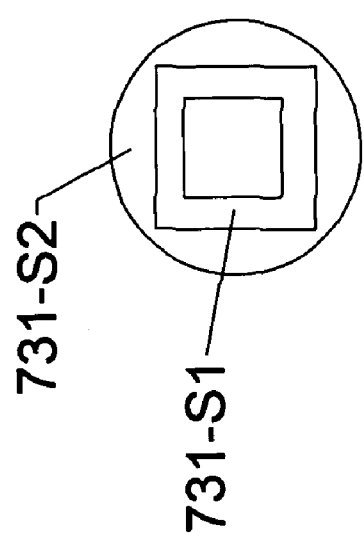

FIG. 131A shows a side-view of an alignment wheels pulley shaft 731.

FIG. 131B shows an end-view of an alignment wheels pulley shaft 731.

Figure 132:
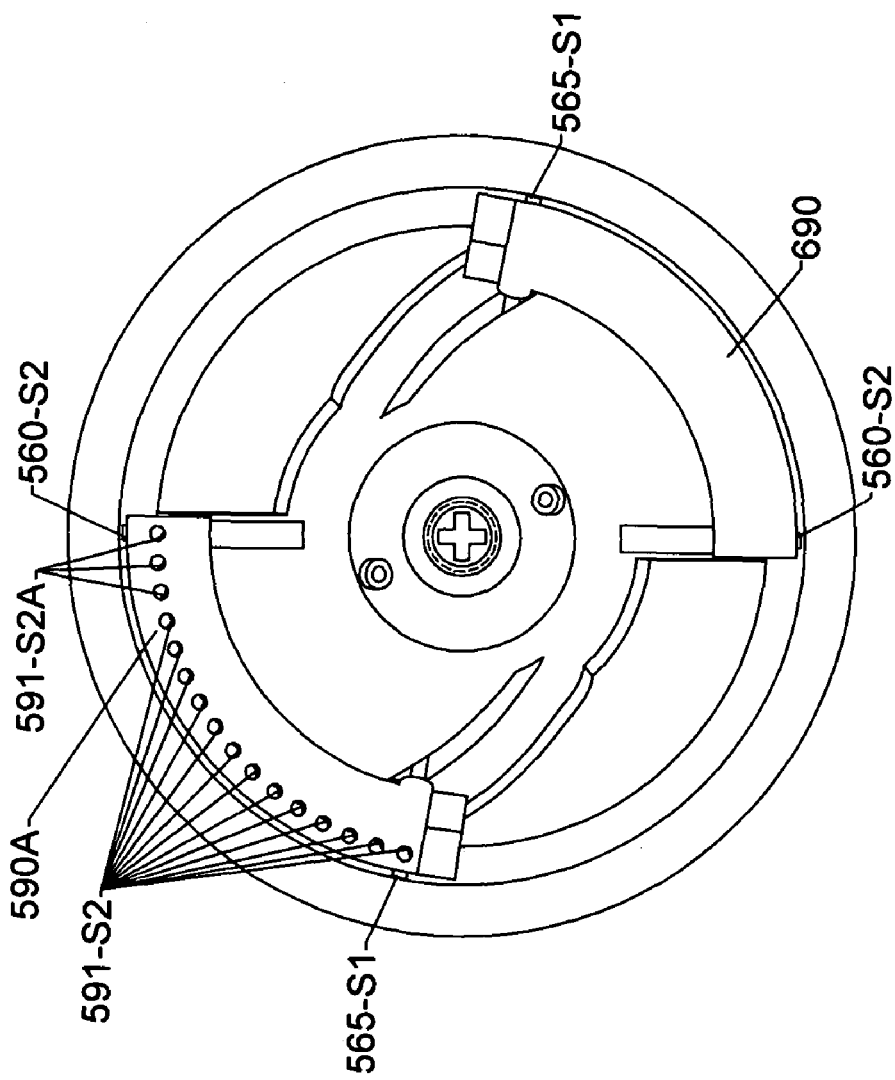

FIG. 132 shows a front-view of front pin belt cone assembly 520A utilizing a gaps method pin belt torque transmitting member 590A.

Figure 133:
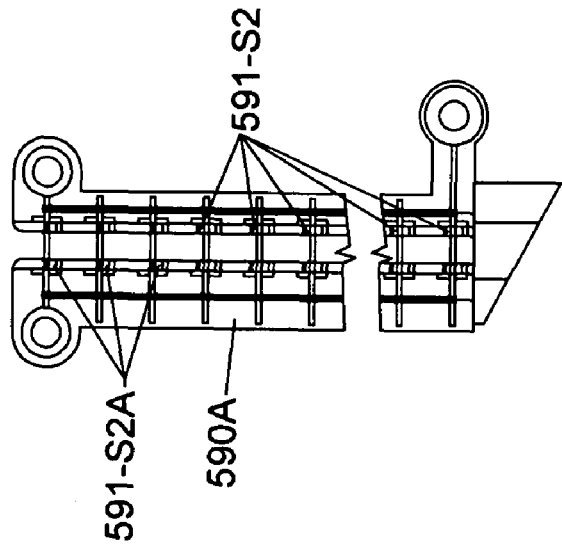

FIG. 133 shows a top-view of a gaps method pin belt torque transmitting member 590A.

Figure 134:
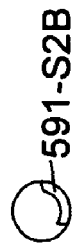

FIG. 134 shows a front-view of a pin belt tooth B 591-S2B.

Figure 135:
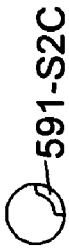

FIG. 135 shows a front-view of a pin belt tooth C 591-S2C.

Figure 136C:
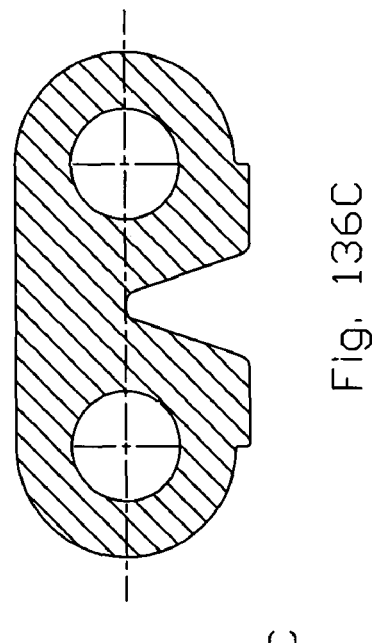
Figure 136B:
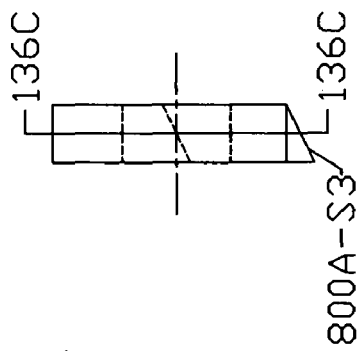
Figure 136D:
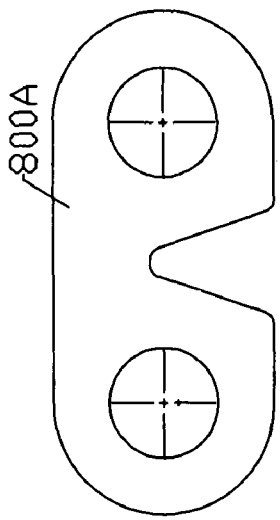
Figure 136A:
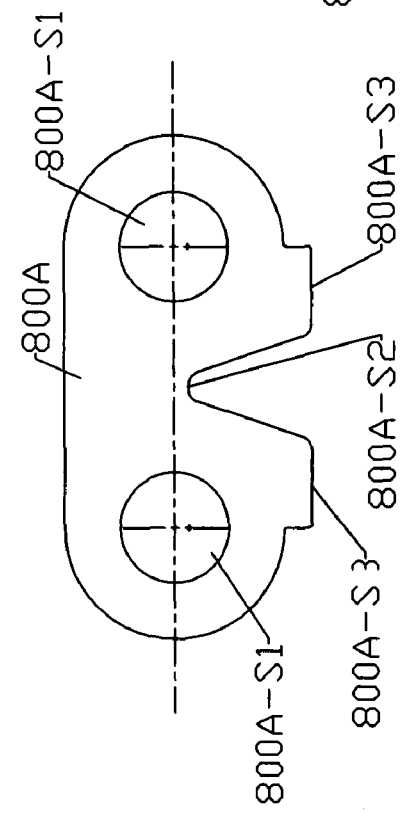

FIG. 136A shows a front-view of single tooth cone link A 800A.

FIG. 136B shows a side-view of single tooth cone link A 800A.

FIG. 136C shows a sectional-view of single tooth cone link A 800A.

FIG. 136D shows a partial back-view of single tooth cone link A 800A.

Figure 137B:
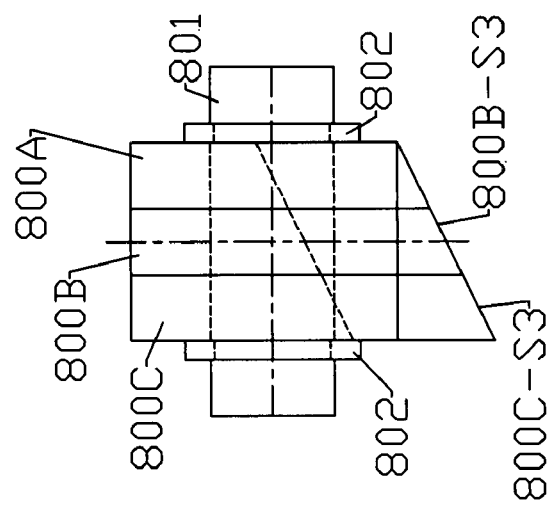
Figure 137C:
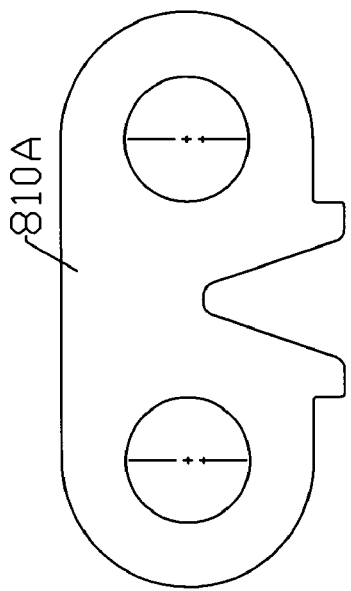
Figure 137A:
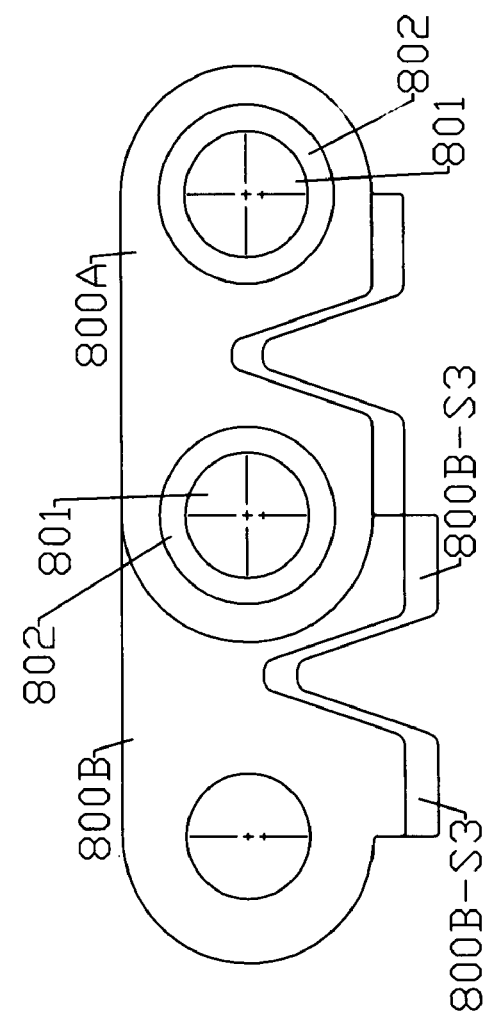

FIG. 137A shows a front-view of a partial chain section that is constructed from a single tooth cone link B 800B which right end is sandwiched by single tooth cone link C 800C and a single tooth cone link A 800A.

FIG. 137B shows an end-view of a partial chain section that is constructed from a single tooth cone link B 800B which right end is sandwiched by single tooth cone link C 800C and a single tooth cone link A 800A.

FIG. 137C shows a front-view of alternate single tooth cone link A 810A.

Figure 138B:
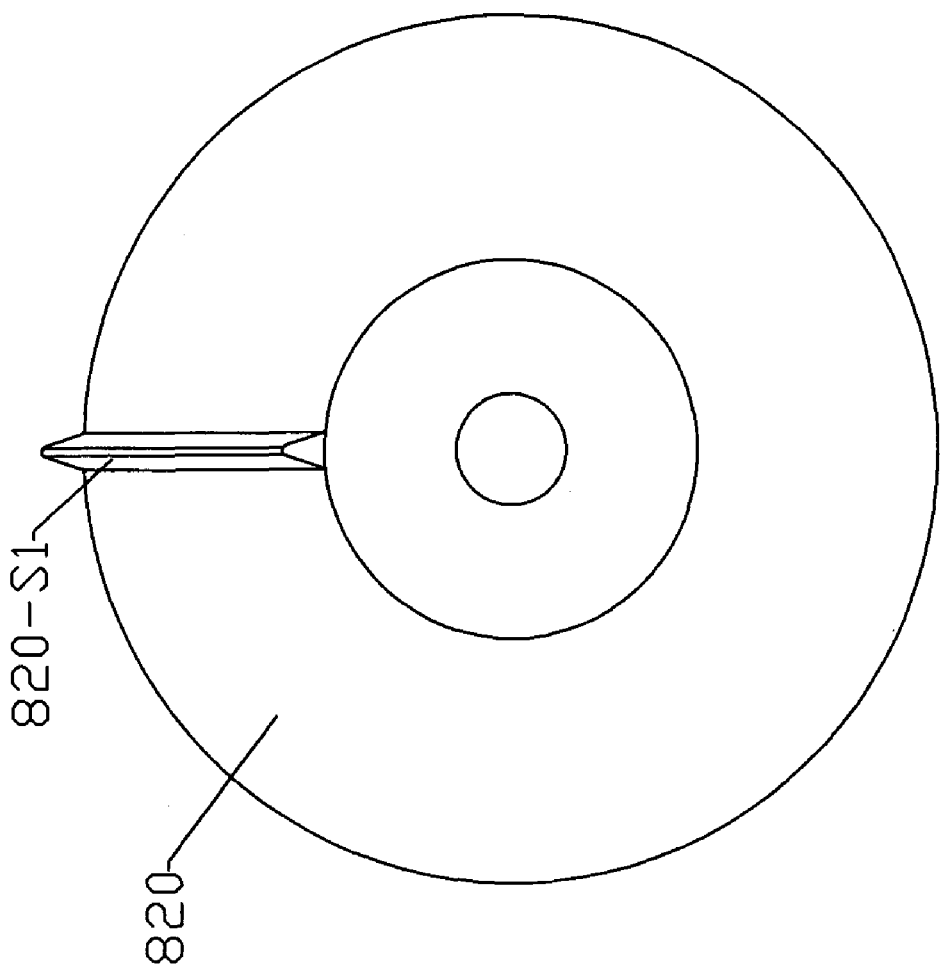
Figure 138A:
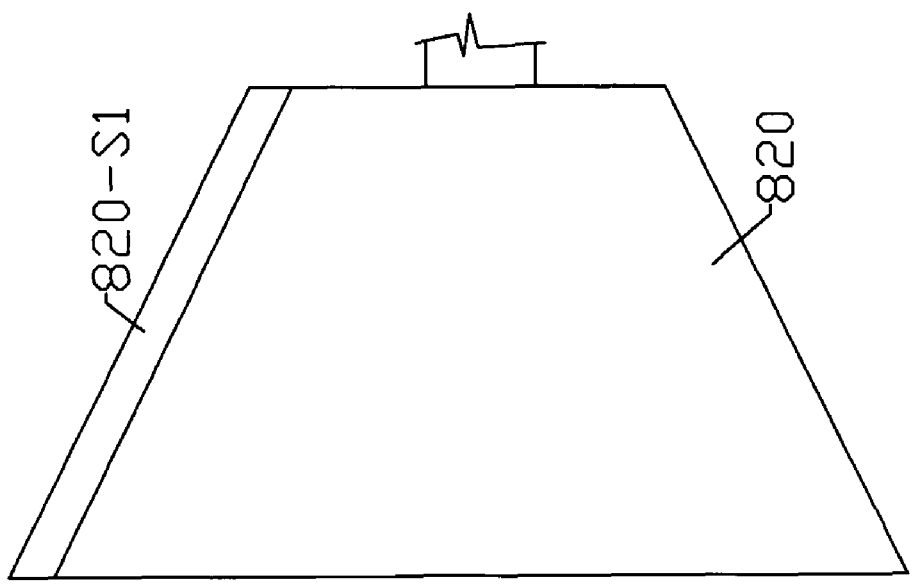

FIG. 138A shows a front-view of chain single tooth cone 820.

FIG. 138B shows an end-view of chain single tooth cone 820.

FIG. 139A shows a front-view of chain transmission pulley 850.

FIG. 139B shows an end-view of chain transmission pulley 850.

Figures 140A, 140B:
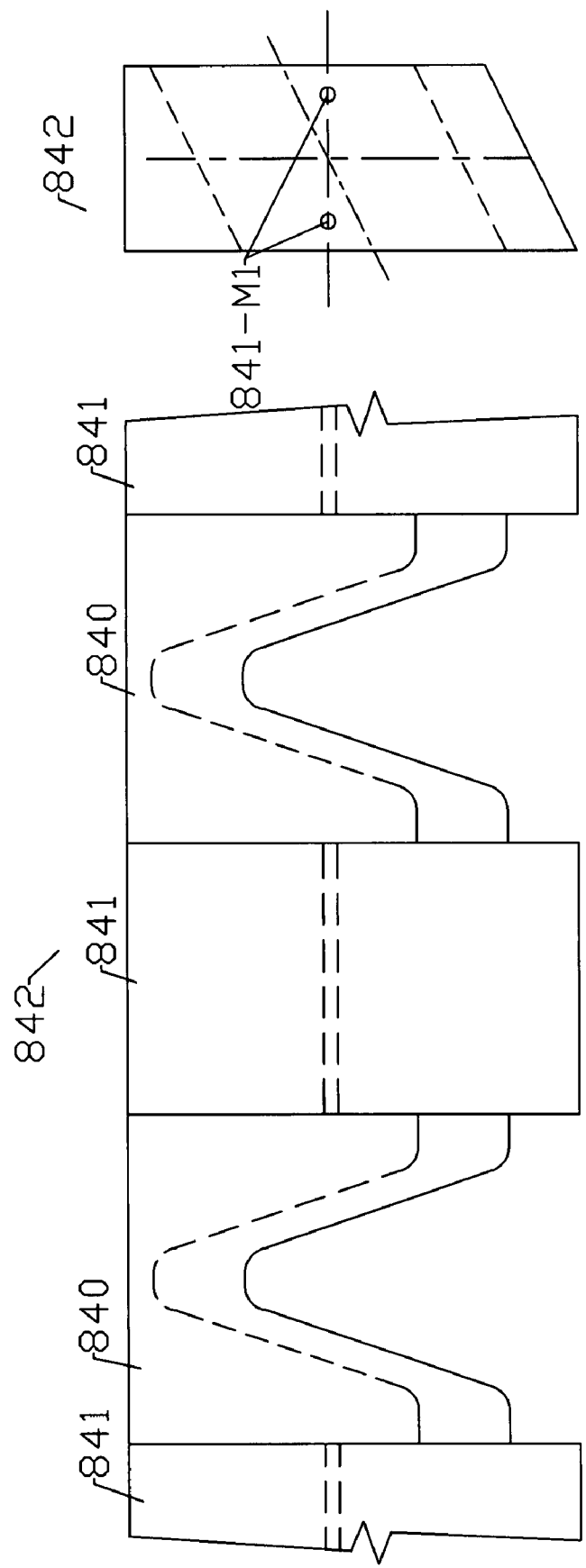

FIG. 140A shows a front-view of a blocks transmission belt 842.

FIG. 140B shows an end-view of a blocks transmission belt 842.

Figure 141B:
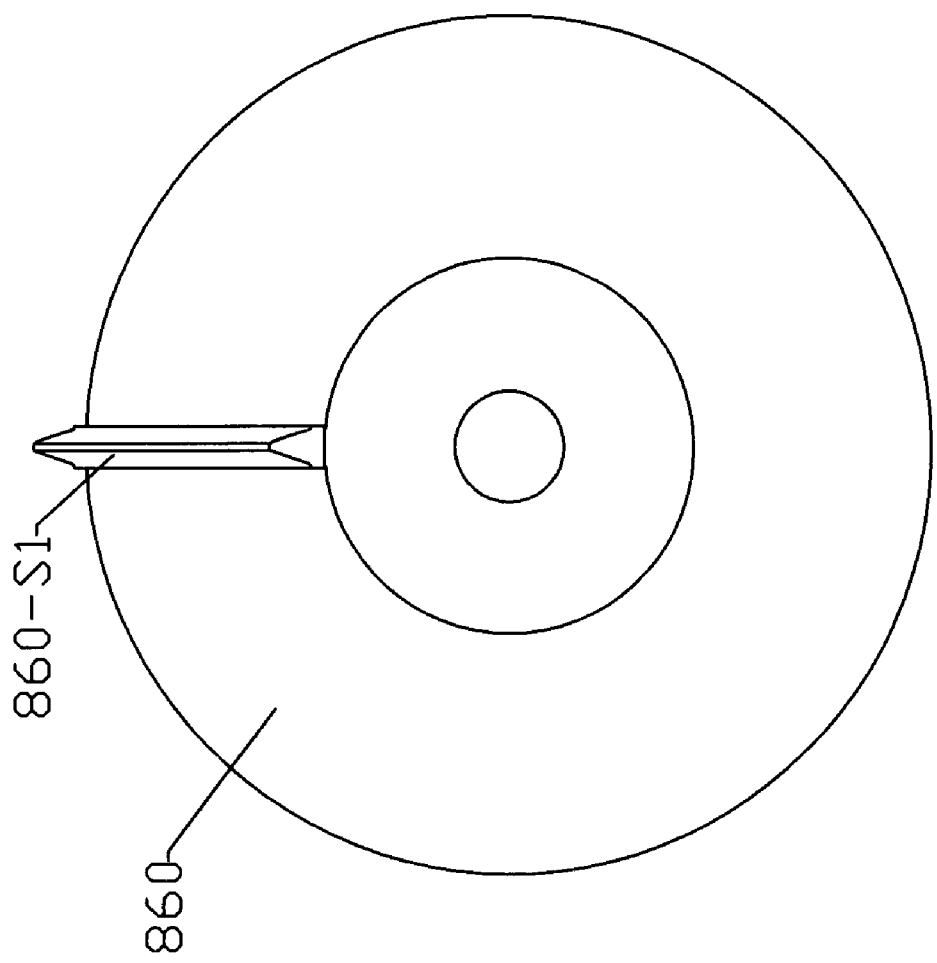
Figure 141A:
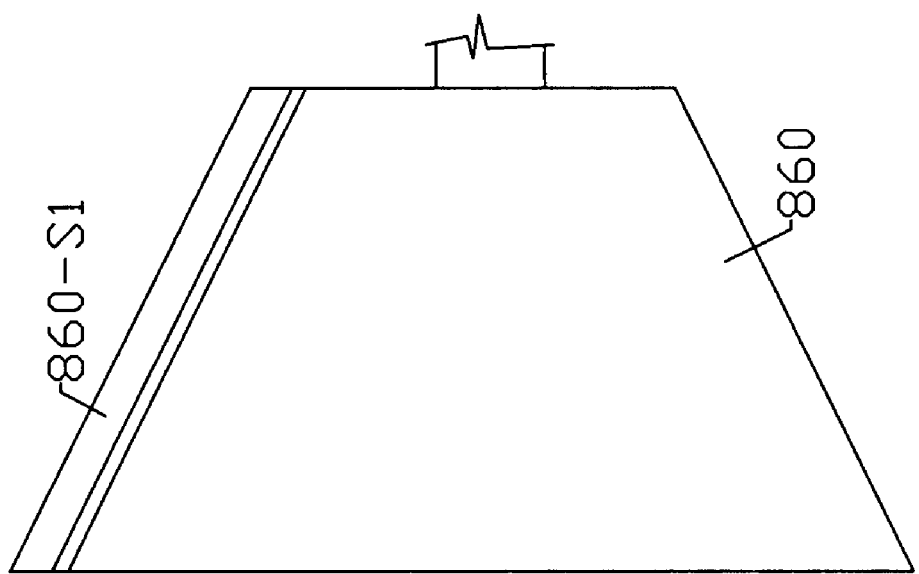

FIG. 141A shows a front-view of a blocks belt single tooth cone 860.

FIG. 141B shows an end-view of a blocks belt single tooth cone 860.

Figure 142B:
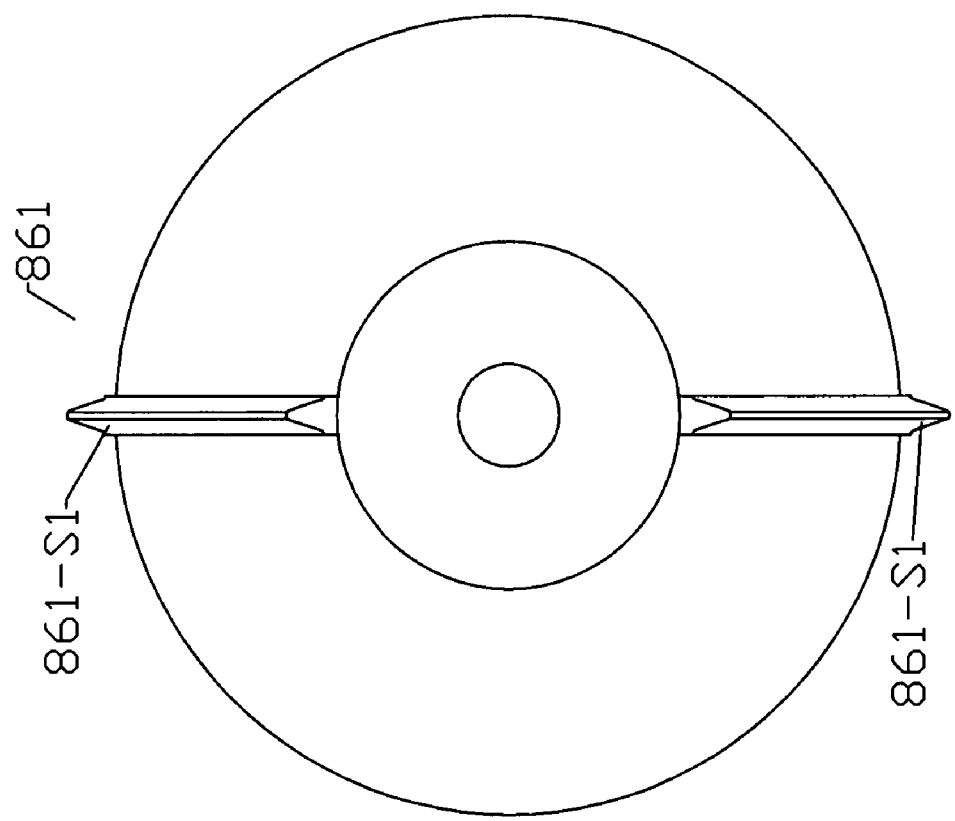
Figure 142A:
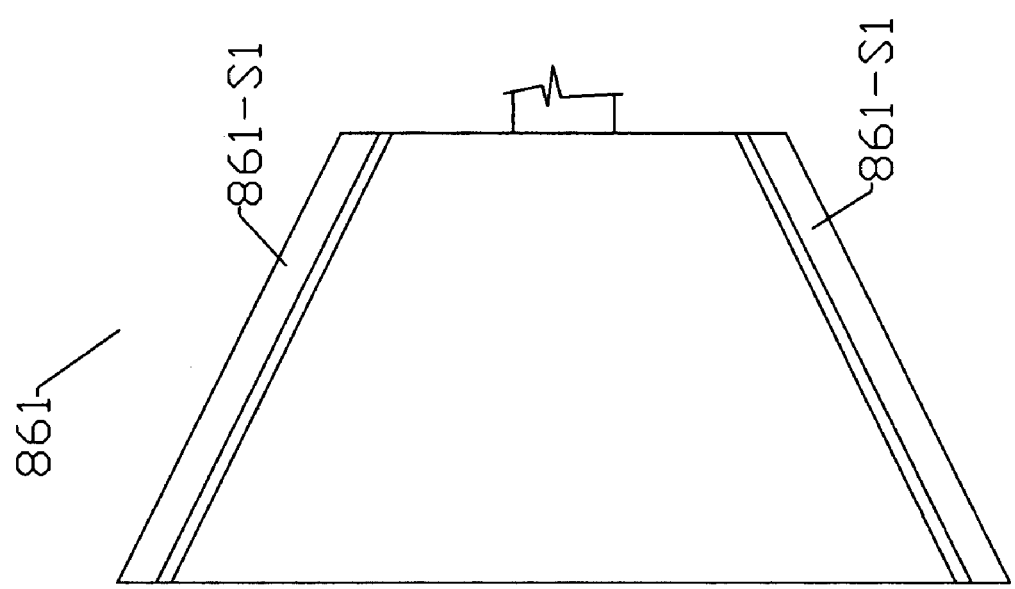

FIG. 142A shows a front-view of an opposite teeth cone 861.

FIG. 142B shows an end-view of an opposite teeth cone 861.

Figure 143B:
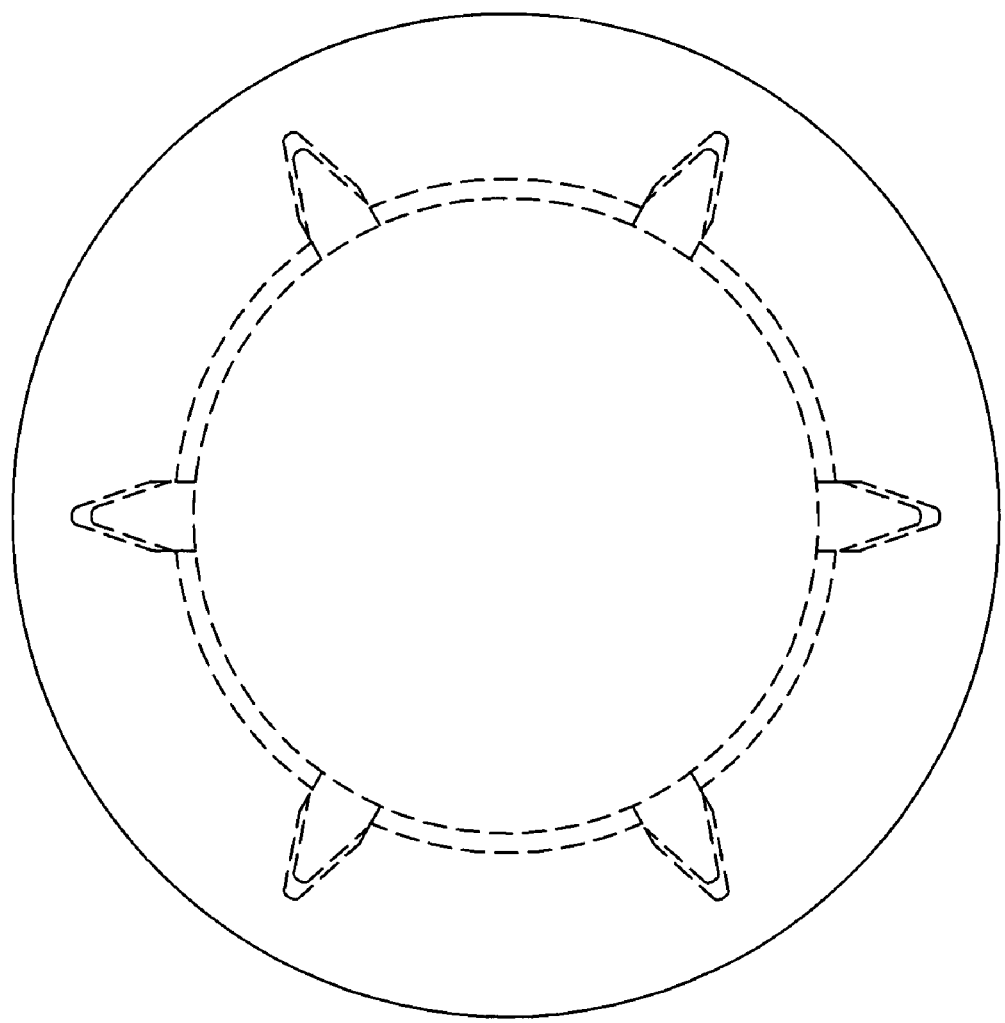
Figure 143A:
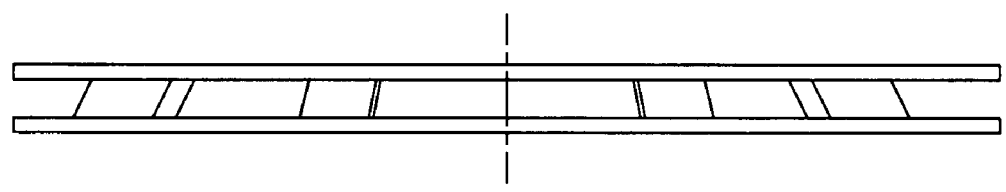

FIG. 143A shows a front-view of a transmission pulley that can be used with blocks transmission belt 842.

FIG. 143B shows an end-view of a transmission pulley that can be used with blocks transmission belt 842.

Figure 144:
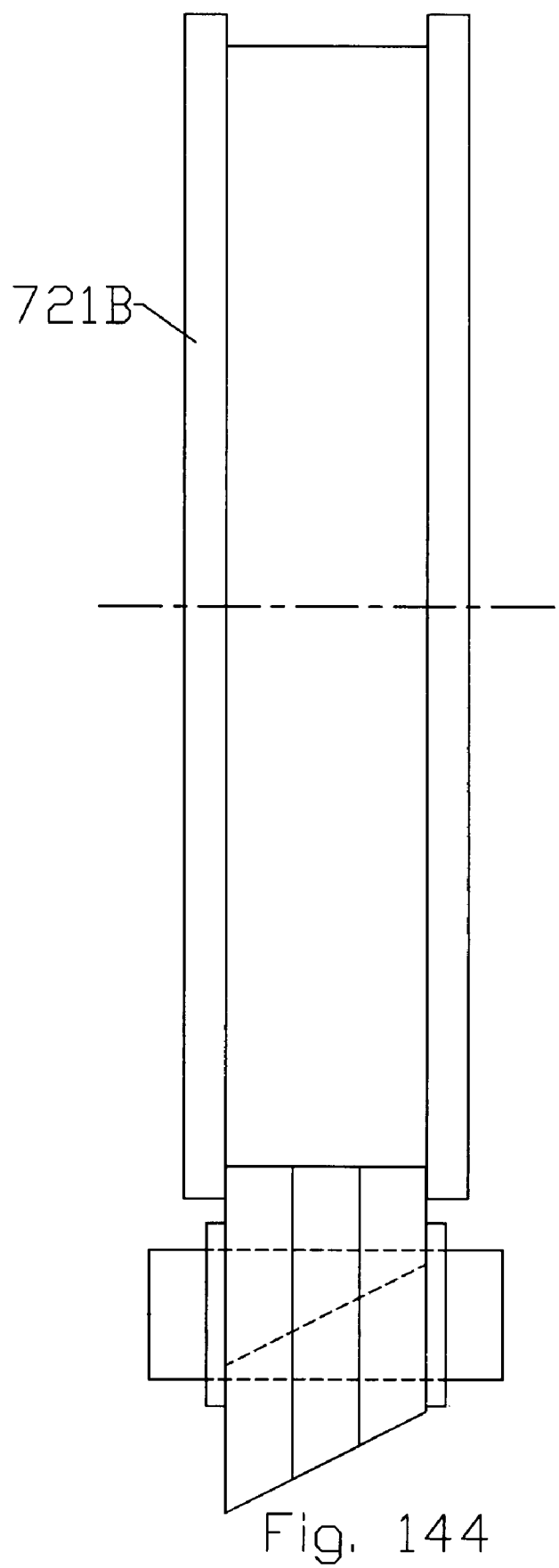

FIG. 144 shows a partial end-view of a pin belt spring-loaded slider pulleys 721B used with a chain that is partially shown in FIGS. 137A and 137B.

Figures 145A, 145B:
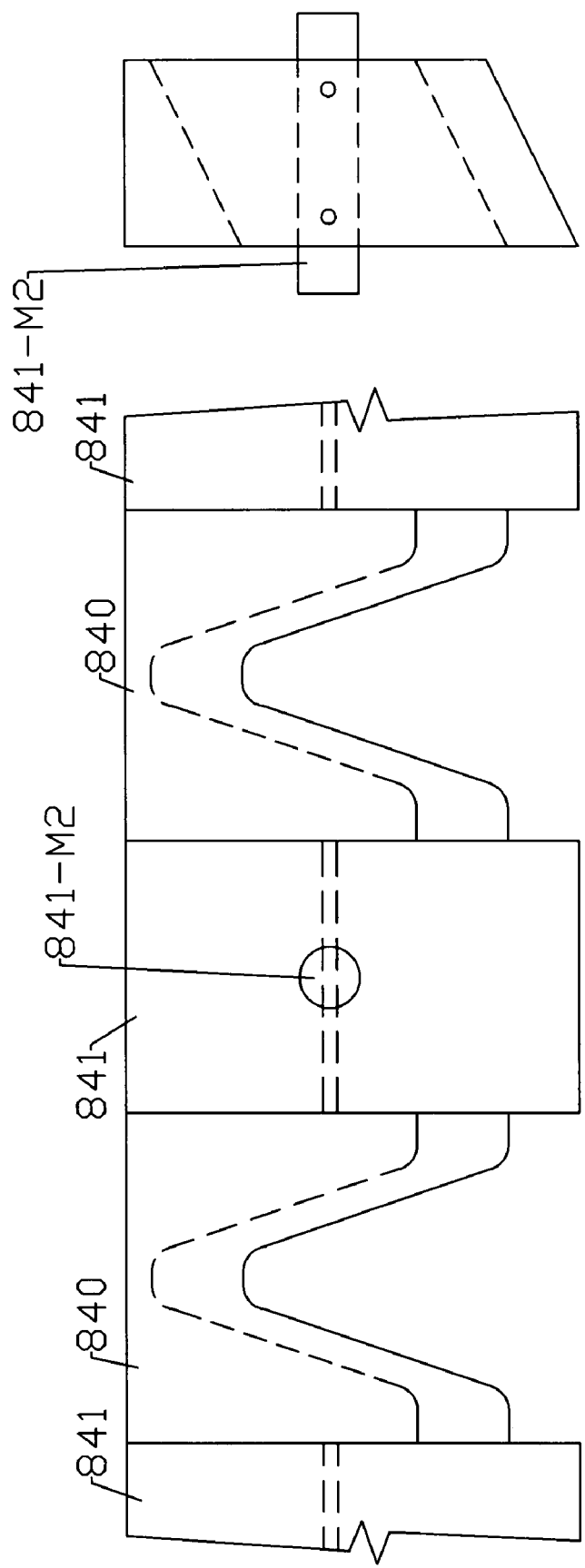

FIG. 145A shows a front-view of a modified blocks transmission belt.

FIG. 145B shows an end-view of a modified blocks transmission belt.

Figure 146A:
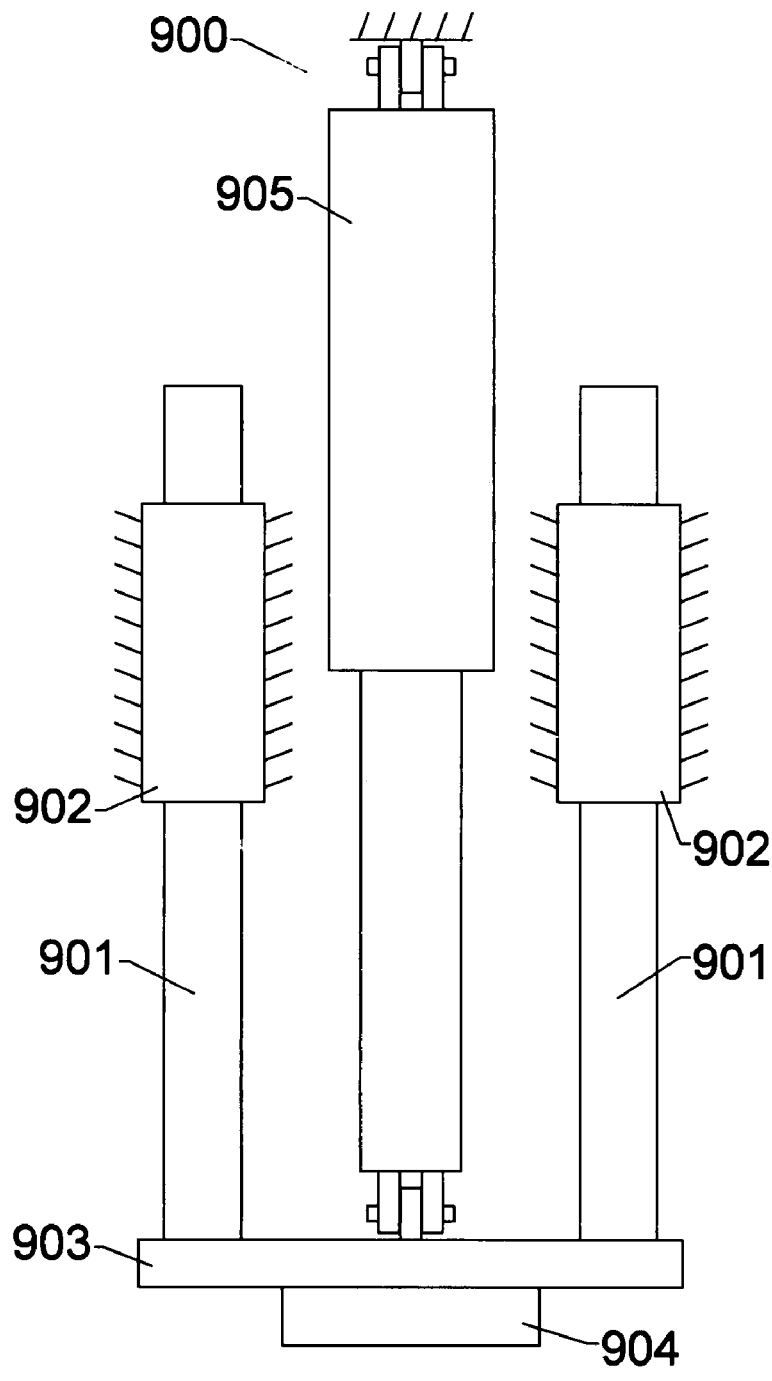

FIG. 146A shows a front-view of a guides for moving cones 900.

Figure 146B:
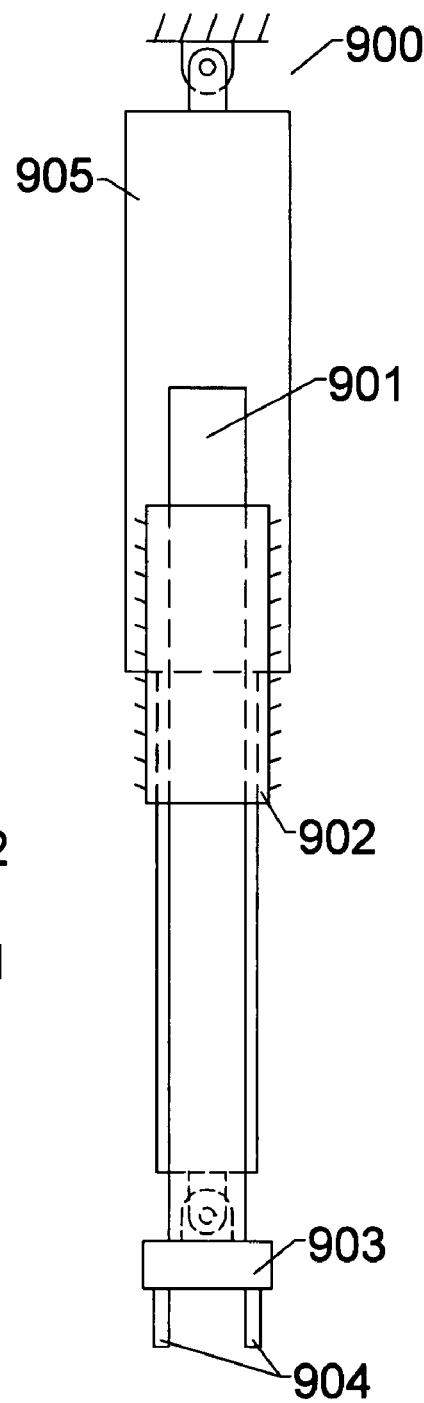

FIG. 146B shows an end-view of a guides for moving cones 900.

Figure 147:
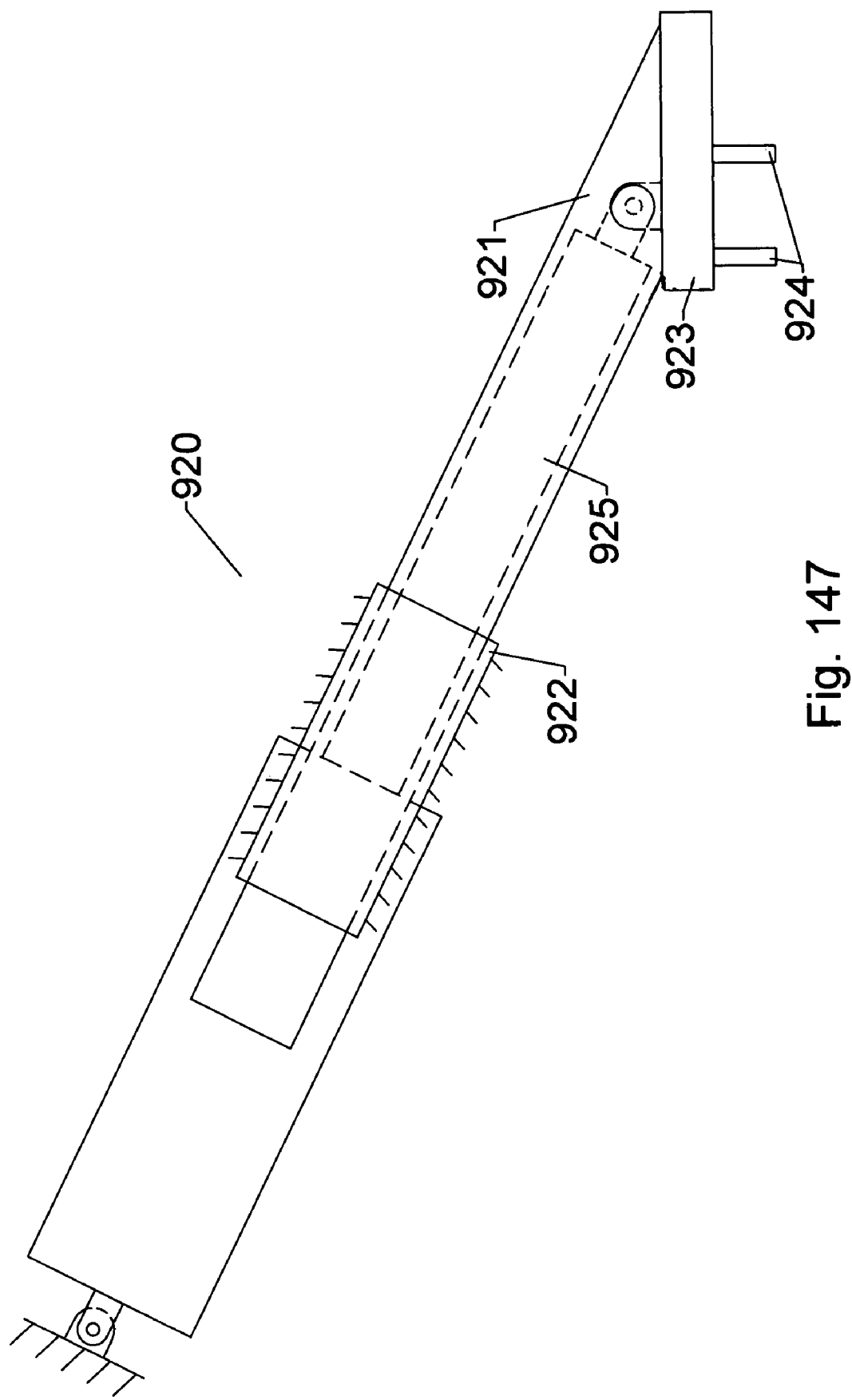

FIG. 147 shows an end-view of a guides for stationary cones 920.

FIG. 148 shows a partial front-view were 3 moving cones guiding plates 904 are used to maintain the axial position of a guides transmission belt 930.

REFERENCE NUMERALS IN DRAWINGS

For the reference numerals in this patent, the label M(number) after a reference numeral, where (number) is a number, such as M2 for example, is used to label different members of a part that is given one reference numeral but consist of more than one member. And the label S(number) after a reference numeral, where (number) is a number, such as S2 for example, is used to label the different shapes of a part that is given one reference numeral. Furthermore, same parts that are used in different location might have a different labeling letter after their reference numeral, or a different reference numeral altogether if this is helpful in describing the invention. If two parts have the same reference numeral then they are identical unless otherwise described.

DESCRIPTION OF INVENTION

First the basic idea of the invention will be presented in the General Cone Assembly section. Then some alternate configuration of the invention, labeled as cone assembly A 1026A, cone assembly B 1026B, and cone assembly C 1026C will be presented. Next, a mover mechanism will be described. Finally, several preferred configurations for a Continuous Variable Transmission (CVT) utilizing the invention will be described.

Also in case no specific method of fixing one part to another is described, then the method of gluing one part to another can be used. Although more sophisticated methods might be preferable, having to explain these methods would complicate the description of the invention without helping in describing the essence of the invention. Also in case no specific method for keying a part is provided than set-screws that screw completely or partially through the part to be keyed and the shaft on which it is keyed on can be used.

General Cone Assembly (Cone Assembly 1026)—FIGS. 1A, 1B, 1C, 1D, 2A, & 2B)

The corner stone of the invention is shown in FIGS. 1A, 1B, 1C, and 1D. It consists of a cone 1024 that is keyed to a shaft 1016 using an attachment sleeve 1036, located at the smaller end of the cone. At the larger end of the cone, an end cover 1037 that has a support sleeve 1038 through which shaft 1016 is slid through is mounted. On cone 1024 one torque transmitting member 1046 is attached so that a torque transmitting arc, which partially wraps around the surface of cone 1024 at an axial section of cone 1024, is formed. Having the torque transmitting arc formed by a group of torque transmitting members would also work. The torque transmitting arc formed by the torque transmitting member 1046 only covers a circumferential portion of cone 1024, so that the circumferential portion adjacent to the torque transmitting arc is not covered by the torque transmitting arc. A circumferential portion adjacent to a torque transmitting arc, which is not covered by a torque transmitting arc, is referred to as a non-torque transmitting arc and labeled as non-torque transmitting arc 1028. The torque transmitting arc is formed by the torque transmitting surfaces of torque transmitting member 1046, and will be used for torque transmission between cone 1024 and a rotational energy conveying device, such as belt, chain, gear, pulley, or wheel for example.

A torque transmitting member 1046 is channel shaped, with two sides and a base. Here the bottom surface of the base of the torque transmitting member 1046 rests on the surface of cone 1024, and a leveling loop 1066 rests on the top surface of the base of torque transmitting member 1046. The leveling loop 1066 is used to provide a level-resting place for a rotational energy conveying device. The inner side surfaces of torque transmitting member 1046 have at least one tooth, which will be used for torque transmission between a rotational energy conveying device and cone 1024. In this application, the torque transmitting members 1046 have a plurality of teeth, which are labeled as teeth 1047. For smooth operation teeth 1047 should have an involute tooth shape. It is also possible to have torque transmitting members 1046 which side surfaces are not toothed, since friction between the side surfaces of torque transmitting member 1046 and the torque transmitting surface(s) of a rotational energy conveying device can also be used to transmit torque, FIGS. 2A and 2B show a cone 1024 on which a friction torque transmitting member 1046F, which uses friction to transmit torque, is attached. Torque transmitting member 1046 is preferably made out of steel reinforced rubber. In order prolong the live of torque transmitting member 1046, and reduce the required force to move torque transmitting member 1046 to a different axial position relative to the surface of cone 1024, the bottom surface of the base of torque transmitting member 1046 is PTFE coated. Furthermore, an attachment plate 1048 is attached to both ends of torque transmitting member 1046. The heads of the attachment plates 1048 are preferably molded into the base of torque transmitting member 1046. The length of torque transmitting member 1046 can be varied according to the need of the CVT where it is utilized.

In order to attach the torque transmitting member 1046 to cone 1024, cone 1024 has two slots 1027. Here each attachment plate 1048 of torque transmitting member 1046 is placed in a slot 1027, and secured to cone 1024 using an attachment wheel 1049. The attachment wheels 1049 are aligned so that they roll with minimum amount of drag when torque transmitting member 1046 is moved from one axial position of cone 1024 to another. It is recommended that an attachment wheel 1049 has some flexibility as to allow some slight play as to account for the change in curvature of the inner surface of cone 1024 where an attachment wheel 1049 is positioned, as the torque transmitting member 1046 is moved from one axial position of cone 1024 to another. It is also recommended that an attachment wheel 1049 has a low friction outer surface so as to minimize frictional losses in instances where an attachment wheel 1049 has to be dragged relative to the inner surface of cone 1024. Furthermore, the attachment plates 1048 can also be used to attach a mover mechanism, which is used to move the torque transmitting member 1046 to a new axial position.

The torque transmitting member 1046 is attached on cone 1024 so that it can only slide in the axial direction of cone 1024, which is the direction along the length of shaft 1016. Sliding the torque transmitting member 1046 in the axial direction changes the pitch diameter of the torque transmitting arc, which depends on the diameter of the surface of cone 1024 where torque transmitting member 1046 is positioned. The arc length, and hence the pitch, of the torque transmitting arc remains constant regardless of its pitch diameter. The arc length of the non-torque transmitting arc increases as torque transmitting member 1046 is being slid from the smaller end of cone 1024 to the larger end of cone 1024.

Furthermore, in order to prevent a rotational energy conveying device, such as a transmission belt, to deform as it comes in and out of contact with torque transmitting member 1046, the surface of cone 1024 that will not be covered by torque transmitting member 1046, should be made flush with the top surface of the base of torque transmitting member 1046. Another method would be to eliminate the base of torque transmitting member 1046. This can be achieved by constructing torque transmitting member 1046 out of two side members that sit directly on the surface of cone 1024, which will be joined beneath the surface of cone 1024. Also, in order to reduce vibrations due to the centrifugal force of torque transmitting member 1046, cone assembly 1026 should be properly balanced The cones can be made out of die-cast stainless steel. And in order to obtain better dimensional tolerances and a smoother surface finish, it is recommended that the cones obtained from the die-cast process be machined.

The surface of cone 1024 should be PTFE coated. This will reduce the friction between torque transmitting member 1046 and the surface of cone 1024, which will extend the live of torque transmitting member 1046 and reduce the force required to move torque transmitting member 1046 to a new axial position. PTFE coating the surface of cone 1024 also reduces friction between the surface of cone 1024 and the rotational energy conveying device, so that wear due to sliding between the surface of cone 1024 and the rotational energy conveying device due to change in pitch diameter is minimized.

Hence a cone assembly 1026, which mainly consists of a cone 1024 and its torque transmitting member(s) 46, has been introduced.

Cone Assembly A 1026A—FIGS. 3A, 3B, 3C, & 3D

Cone assembly A 1026A is a cone assembly 1026 with the restriction described in this section. Cone assembly A 1026A has two torque transmitting arcs, each consisting of the torque transmitting surfaces formed by a torque transmitting member 1046 or a group of torque transmitting members 1046. The torque transmitting arcs are positioned opposite from each other on the surface of a cone A 1024A. Furthermore, at the smallest end of cone A 1024A, each torque transmitting arc provides coverage to less than half of the circumference of cone A 1024A. As described before, the circumferential portions adjacent to the torque transmitting arcs, which are not covered by the torque transmitting arcs, will be referred to as non-torque transmitting arcs.

Cone Assembly B 1026B—FIGS. 4A, 4B, 4C, & 4D

The only difference between cone assembly A 1026A and cone assembly B 1026B is that for cone assembly B 1026B, one torque transmitting arc is replaced with a maintaining arc, formed by one or a group of maintaining member(s) 46N, hence it also uses a cone A 1024A. A maintaining member 1046N is identical to a torque transmitting member 1046 except that it is not used for torque transmission between a rotational energy conveying device and a cone. The primary function of the maintaining member(s) 46N is to maintain the axial position of a rotational energy conveying device, such as a transmission belt, when it is not in contact with a torque transmitting member 1046. Hence the inner side surfaces of maintaining member(s) 46N should not be toothed, and friction between the rotational energy conveying device and maintaining member(s) 46N should be minimized by selecting a proper surface finish and shape for maintaining member(s) 46N.

Furthermore, the arc length of the torque transmitting arc is limited such that the torque transmitting surface(s) of the rotational energy conveying device(s) of the CVT where cone assemblies B 1026B are used, will never cover the entire non-torque transmitting arc of a cone assembly B 1026B. However, the arc length of the torque transmitting arc is long enough so that for the CVT where cone assemblies B 1026B are used, at least a torque transmitting arc of at least one cone assembly B 1026B is always engaged with its rotational energy conveying device.

Cone Assembly C 1026C—FIGS. 5A, 5B, 5C, & 5D

Cone assembly C 1026C, is a cone assembly 1026 with the restriction described in this section. As in cone assembly B 1026B, the arc length of the torque transmitting arc, formed by the torque transmitting surfaces of torque transmitting member(s) 1046, is limited such that the torque transmitting surface(s) of the rotational energy conveying device(s) of the CVT where cone assemblies C 1026C are used, will never cover the entire non-torque transmitting arc of a cone assembly C 1026C. However, the arc length of the torque transmitting arc is long enough so that for the CVT where cone assemblies C 1026C are used, at least a torque transmitting arc of at least one cone assembly C 1026C is always engaged with its rotational energy conveying device. Like before, in order to reduce vibration due to the centrifugal force of the torque transmitting member(s) 1046, cone assembly C 1026C should be properly balanced.

In the description for cone assembly A 1026A, cone assembly B 1026B, and cone assembly C 1026C, the drawings for these cone assemblies show torque transmitting members 1046 that are toothed. Instead of torque transmitting members 1046 that are toothed, friction torque transmitting members 1046F, which use friction to transmit torque, can also be used for these cone assemblies or any other cone assembly 1026.

For example, shown in FIGS. 6A to 6D is cone assembly AF 1026AF, which is identical to cone assembly A 1026A except that it uses friction torque transmitting members 1046F instead of torque transmitting members 1046.

Mover Mechanism—FIGS. 4A, 4B, 4C, 4D, 7A, & 7B

The torque transmitting members 1046 and the maintaining members 1046N will be moved relative to the surface of the cone on which they are attached using a mover mechanism. The maintaining members 1046N are attached to the mover mechanism in the same manner as the torque transmitting members 1046, and hence moved in the same manner. For clarity purposes, the maintaining members 1046N will not be referred to in this section.

The mover mechanism consists of a slider bushing 1055, which is attached to a shaft in a manner such that it tightly fits onto the shaft but is free to slide along the length of the shaft and in and out of the cone on which it is used through the support sleeve 1038 of the end cover 1037 of that cone. A rotor 1056 is fitted onto slider bushing 1055. Locking collars will be used to fix the axial position of rotor 1056 relative to slider bushing 1055, however rotor 1056 is free to rotate on slider bushing 1055. In order to attach telescopes 1057 to rotor 1056, pin-holed plates are attached to the outer surface of rotor 1056. The telescopes 1057 will be used to connect the torque transmitting member(s) 46 to rotor 1056, so that the axial position of the torque transmitting member(s) 46 depend on the axial position of rotor 1056. The length of telescopes 1057 can vary so that they can connect the torque transmitting member(s) 46 to rotor 1056 when the torque transmitting member(s) 46 are positioned at the smallest end and at the largest end of the cone on which they are attached. In instances were only one torque transmitting member 1046 is attached to rotor 1056, it is recommended that rotor 1056 is shaped as to reduce the centrifugal force due to that torque transmitting member 1046. The bottom end of each telescope 1057 has two parallel pin-holed plates, which will be used to join the bottom end of a telescope 1057 to a pin-holed plate on rotor 1056 using a locking pin, on which the pin-holed plates of the attached telescope 1057 are able to rotate. The top end of each telescope 1057 has an attachment plate, which is joined to an attachment plate 1048 of a torque transmitting member 1046 using a telescope connector. Here, in order to allow the attachment plates of a telescope 1057 to rotate relative to attachment plates 1048, locking pins are used.

Below is a detailed description of attachment plate 1048, which is shown in its assembled state as a front-view in FIG. 7A and as a top-view in FIG. 7B. The top end of attachment plate 1048 consists of a disk shape, which will be molded into a torque transmitting member or non-torque transmitting member. For assembly purposes it is recommended that the disk shape is molded into its torque transmitting member or its non-torque transmitting member such that it can rotate relative to its torque transmitting member or its non-torque transmitting member, otherwise, its torque transmitting member or its non-torque transmitting member has to be twisted during assembly. The slots of the cone into which the attachment plate 1048 will be inserted should have sufficient play to allow proper assembly. Below the disk shape, a pin shape exists. In the assembled state, this pin shape is positioned between the side surfaces of a slot of its cone. Below the pin shape, a plate with a hole exist. The hole of this plate is aligned as to allow an attachment wheel 1049 mounted on it to roll when its torque transmitting member is moved from one axial position on its cone to another. Since there might be instances where attachment wheel 1049 will not roll smoothly, it should have a low friction surface so that it can be dragged. Also in the assembled state, sufficient play between attachment wheel 1049 and the surface of its cone should exist to account for the change of curvature of its cone.

The top attachment plate of a telescope 1057, which is labeled as telescope attachment plate 1058, will be connected to attachment plate 1048 using a telescope connector 1059. Telescope attachment plate 1058 is shaped on the top end of a telescope 1057 and is shaped like a plate with a hole, which has a rounded top side. Telescope connector 1059 has a L-shape, where the horizontal and vertical members are formed by plates. At the bottom surface of the horizontal member of telescope connector 1059 a clevis exist. This clevis will be used to join telescope attachment plate 1058 to telescope connector 1059 using a pin and locking rings. At the vertical member of telescope connector 1059, a hole that has the same alignment as the hole of the plate with a hole of attachment plate 1048 exists. In the assembled state, the hole of the plate with a hole of attachment plate 1048 is aligned with the hole of the vertical member of telescope connector 1059, and a bolt, on which attachment wheel 1049 is mounted and which is secured with a nut, goes through those holes. Also, in the assembled state the bottom surface of the plate with a hole of attachment plate 1048 is engaged with top surface of the horizontal member of telescope connector 1059 so as to prevent the plate with a hole of attachment plate 1048 to pivot about the axis of its hole.

All parts discussed above are preferably made out of stainless steel, except the slider bushing 1055, which is preferably made out of oil-impregnated bronze. The mover mechanism described above can be used to change the axial position of the torque transmitting member(s) 46 and the maintaining member(s) 46N, if any, relative to the surface of cone 1024, or cone A 1024A to which they are attached, by changing the axial position of slider bushing 1055 relative to their cone 1024, or cone A1024A.

Continuous Variable Transmission Variation 1 (CVT 1)—FIGS. 8A & 8B

CVT 1 consists of a pair of cone assemblies A 1026A, each equipped with a mover mechanism described previously. Here one cone assembly A 1026A will be keyed to a driver shaft 1012 and the other cone assembly A 1026A will be keyed to a driven shaft 1014. Torque between the cone assemblies A 1026A is transmitted by a toothed transmission belt 1067, which couples the torque transmitting members 1046 of cone assembly A 1026A on the driver shaft 1012 with the torque transmitting members 1046 of cone assembly A 1026A on the driven shaft 1014. The configuration of CVT 1 and the arc length of the torque transmitting arcs of cone assemblies A 1026A should be designed such that for each cone assembly A 1026A, at least one torque transmitting arc is always engaged with transmission belt 1067. As described earlier, the arc lengths of the non-torque transmitting arcs increase as the torque transmitting members 1046 are slid from the smaller end of their cone A 1024A to the larger end of their cone A 1024A and vice-versa. Since there are instances were the arc lengths of the non-torque transmitting arcs do not correspond to a multiple of the width of teeth 1047 some stretching of transmission belt 1067 to account for this is to be expected. The transmission ratio depends on the axial position of the torque transmitting members 1046 on the surfaces of cones 1024A. The torque transmitting members 1046 of the cone assemblies A 1026A should always be properly aligned. In order to achieve this, the slider bushing 1055 on the driver shaft 1012 and the slider bushing 1055 on the driven shaft 1014 are connected by a connector 1075, in a manner such that they can rotate relative to connector 1075. In order to change the transmission ratio the pitch diameters of the torque transmitting arcs, formed by the torque transmitting surfaces of torque transmitting members 1046, of the cone assemblies A 1026A have to be changed. This is achieved by changing the axial position of transmission belt 1067 and the torque transmitting members 1046 relative to the surfaces of cones 1024A using an actuator, which is attached to connector 1075.

When for both cone assemblies A 1026A, transmission belt 1067 is not in contact with a complete non-torque transmitting arc then the transmission ratio can be changed without causing significant circumferential sliding between the torque transmitting surfaces of the torque transmitting members 1046 and the transmission belt 1067. This is because only the arc length of the non-torque transmitting arc changes as the transmission ratio is changed. The configuration where the transmission ratio can be changed without any significant circumferential sliding between the torque transmitting surfaces of the torque transmitting members 1046 and transmission belt 1067 is referred to as a moveable configuration. And the configuration where changing the transmission ratio will tend to cause significant circumferential sliding between the torque transmitting surfaces of the torque transmitting members 1046 and transmission belt 1067 is referred to as an unmovable configuration. Here changing the transmission ratio when transmission belt 1067 is in an unmovable configuration should simply cause the actuator to stall.

One method to eliminate or reduce stalling of the actuator is to equip the actuator with a spring-loaded piston. Here when the transmission belt 1067 is in a moveable configuration, than the torque transmitting members 1046 will move with the actuator. However, when the transmission belt 1067 is not in a moveable configuration then moving the actuator will not move the torque transmitting members 1046 but will stretch or compress the spring of the spring-loaded piston of the actuator. And once both cone assemblies A 1026A have rotated so that transmission belt 1067 is in a moveable configuration, the tension or compression in the spring-loaded piston will move transmission belt 1067 and the torque transmitting members 1046 in the direction the actuator was moved until the tension or compression of the spring-loaded piston is relieved.

When transmission belt 1067 is in the axial position where the transmission ratio is unity, where the cone assembly A 1026A on the driver shaft 1012 rotates at the same speed as the cone assembly A 1026A on the driven shaft 1014, then transmission belt 1067 can get stuck in an unmovable configuration. One method to avoid this problem is to make the smaller end of one cone assembly A 1026A slightly larger than the larger end of the other cone assembly A 1026A. Under this configuration the cone assemblies A 1026A will never rotate at the same speed, so that the rotational position of one cone assembly A 1026A relative to the other cone assembly A 1026A continuously changes as the cone assemblies A 1026A are rotating. Hence eventually the cone assemblies A 1026A will rotate to a movable configuration.

Another method to avoid having transmission belt 1067 stuck in an unmovable configuration is to have a mover control system control the movement of the actuator. Here, every time the actuator is about to move transmission belt 1067 to the position where the transmission ratio between the cone assemblies A 1026A is unity, the mover control system will stop the actuator. Then the mover control system will wait until the cone assemblies A 1026A have rotated to a rotational position such that once the actuator moves transmission belt 1067 to the axial position where the transmission ratio between the cone assemblies A 1026A is unity, during the rotation of the cone assemblies A 1026A an instance were transmission belt 1067 is in a movable configuration exists. In order for the mover control system to work, it needs to know the rotational position of each cone assembly A 1026A, the rotational speed of each cone assembly A 1026A, the axial position of transmission belt 1067, and the speed of the actuator.

In order for the mover control system to determine the rotational position and rotational speed of the cone assemblies A 1026A, a marked wheel 1085 is keyed to the driver shaft 1012 and to the driven shaft 1014, and each marked wheel 1085 has a marked wheel decoder 1086, which is attached to the frame of the CVT. In order to accurately determine the axial position of transmission belt 1067, a gear rack 1076 is attached to the actuator, and a gear 1077, which engages the gear rack 1076, is attached to the frame of the CVT. A marked wheel 1085 is attached to the gear, and a marked wheel decoder 1086 decodes the information from this marked wheel 1085 to determine the axial position of transmission belt 1067.

The information from the wheel decoders 86 mentioned previously, will be transmitted to a computer. The computer will then process the information to properly move the actuator, such that when the transmission belt 1067 is moved to the axial position where the transmission ratio is unity, an instance where the CVT is in a moveable configuration exists.

The mover control system can also be designed so that it only moves transmission belt 1067 when it is in a moveable configuration, as to prevent the actuator from stalling when it tries to move transmission belt 1067 when it is in an unmovable configuration. However, despite the use of a mover control system, stalling of the actuator is still possible. Furthermore, when gear 1077 is coupled to a rotary actuator it can be used as the actuator, which controls the axial position of the transmission belt 1067, see FIG. 8A.

Continuous Variable Transmission Variation 2 (CVT 2)—FIGS. 9A, 9B, 9C, 9D, & 9E CVT 2 consists of either two cone assemblies B 1026B, which are keyed to a driver shaft 1012 such that the torque transmitting arc of one cone assembly B 1026B is positioned opposite from the torque transmitting arc of the other cone assembly B 1026B, or two cones assemblies 1026C, which are attached in the same manner. Each cone assembly 1026 (B/C) is coupled to a transmission pulley 1098, attached on driven shaft 1014, by a transmission belt 1067.

The surfaces of the transmission pulleys 1098 are tapered as to match the taper of the outer surfaces of cone assemblies 1026(B/C). This allows the transmission belts 1067 for this CVT to be shaped such that they can rest on the surface of their respective cone assembly 26(B/C) and on the surface of their respective transmission pulley 1098 without being twisted. Hence, there is no need for leveling loop 1066 for CVT 2. Also, as described earlier, the arc lengths of the non-torque transmitting arcs increase as the torque transmitting members 1046 are slid from the smaller end of their cone to the larger end of their cone and vice-versa. Since there are instances were the arc lengths of the non-torque transmitting arcs do not correspond to a multiple of the width of the teeth 1047 some stretching of the transmission belts 1067 to account for this is to be expected.

Like in CVT 1, the transmission ratio is controlled by controlling the axial position of the torque transmitting members 1046 relative to the surface of their respective cone using the mover mechanism described earlier. In order to ensure that the axial position of the torque transmitting members 1046 relative to their respective cones is identical as to ensure that they rotate at the same speed, the slider bushings 1055 of the cones assemblies 1026(B/C) are rigidly connected by a slider joiner base 1096 and slider joiner rods 1097 (FIG. 9E). The smaller end of the cone 1024A which smaller end is facing the larger end of the other cone 1024A has holes through which the slider joiner rods 1097 can slide through. The change in axial position of the torque transmitting members 1046 has to be accompanied by the change in axial position of the transmission pulleys 1098. In order to achieve this, the transmission pulleys 1098 are keyed to a spline sleeve 1099 (FIGS. 9A & 9B), which is free to slide along the length of the driven shaft 14, which here is shaped like a spline, but is not free to rotate relative to driven shaft 1014.

Furthermore, the slider bushing 1055 of the cone assembly 1026(B/C) located closes to the actuator, which is used to change the transmission ratio, and the spline sleeve 1099 of the transmission pulleys 1098 are connected by a connector B 1075B, in a manner such that they can rotate relative to connector B 1075B, in a configuration such that the torque transmitting members 1046 are always properly aligned with their transmission pulleys 1098. Also, as described for CVT 1, here in instance when the transmission ratio is changed when the transmission belts 1067 are in an unmovable configuration, the actuator, used to change the transmission ratio, should simply stall. Here an unmovable configuration is a configuration were both torque transmitting members 1046 are in contact with their transmission belts 1067.

Furthermore, in order to maintain proper tension in the transmission belts 1067 for every transmission ratio of CVT 2, each transmission belt 1067 is equipped with a tensioning mechanism. The tensioning mechanism consists of two tensioning wheels 1105, two tensioning sliders 1106, two tensioning constrainers 1107, two tensioning movers 1108, and a tensioning actuator 1109. The tensioning wheels 1105 will be attached so that they touch the base of the transmission belts 1067. Each tensioning wheel 1105 is attached to a tensioning slider 1106. Each tensioning slider 1106 slides on a tensioning constrainer 1107. The tensioning constrainers 1107 are angled so that the tensioning wheels 1105 will maintain the proper tension in the transmission belts 1067 for every axial position of the transmission belts 1067. In order to change the axial position of the tensioning sliders 1106, each tensioning slider 1106 has two vertical sleeves, which will slide on two vertical guides of a tensioning mover 1108 so that the tensioning sliders 1106 can freely slide vertically as the axial positions of tensioning movers 1108 are changed. The tensioning actuator 1109 connects the tensioning mover 1108 closest to connector B 1075B to connector B 1075B, and the tensioning mover 1108 closest to connector B 1075B to the other tensioning mover 1108 in a manner such that each tensioning wheel 1105 is properly aligned with its torque transmitting member 1046 and its transmission pulley 1098 for every transmission ratio. Furthermore, tensioning wheels 1105 have smooth non-toothed side surfaces so that they can be used to maintain the alignment of the transmission belts 1067.

The configuration for CVT 1 and CVT 2, and other CVT's using the cones assemblies or cones of this patent, can also be used for cone assemblies that use friction torque transmitting members 1046F instead of torque transmitting members 1046. In this case, torque is transmitted through friction; however, in this case there is no stretching of the transmission belts that occur in CVT's where toothed torque transmitting members 1046 are used due to instances were the arc lengths of the non-torque transmitting arcs do not correspond to a multiple of the width of the teeth of their torque transmitting members.

In addition to the CVT's described earlier another recommended configuration for a CVT is a CVT that is identical to CVT 1 except that one cone assembly is replaced with a transmission pulley. This CVT will be referred to as CVT 3. Here as in CVT 2, it needs to be ensured that the transmission pulley is always properly aligned with the torque transmitting members of its cone assembly for all transmission ratios. The basic method to maintain alignment and to maintain tension in the transmission belts used in CVT 2 can also be used here. Under this configuration only one cone assembly A 1026A or one cone assembly AF 1026AF is needed, and here the transmission belt used will never get stuck in an unmovable configuration, hence the mover control system of CVT 1 is not needed in this design. A configuration for this CVT, where a cone assembly AF 1026AF, which uses two friction torque transmitting members 1046F, is coupled by a friction belt 1067F to a friction pulley 1098F is shown as a top-view in FIG. 10. For optimum performance, when a friction torque transmitting member 1046F is engaged with its friction belt 1067F, the neutral-axis of the friction torque transmitting members 1046F and the friction belt 1067F should coincide.

Performance Improving Adjuster Systems

Furthermore for CVT 1 and CVT 2, in order to reduce or eliminate stretching of the transmission belts in instances were the arc lengths of the non-torque transmitting arcs do not correspond to a multiple of the width of the teeth of their torque transmitting members, which will be referred to as transition flexing, and in order to increase the duration at which the transmission ratio can be changed by reducing or eliminating stalling of the actuator that is used to change the transmission ratio in instance when the transmission ratio is changed when the transmission belts are in an unmovable configuration, adjuster systems for CVT 1 and CVT 2, and the CVT's utilizing them will be described below. If friction torque transmitting members 1046F instead of torque transmitting members 1046 are used, then the adjuster systems are only needed to increase the duration at which the transmission ratio can be changed.

The adjuster systems described in this patent can also be used increase the performance of other CVT's, besides CVT 1 and CVT 2, that suffer from either or both transition flexing and a limited duration at which the transmission ratio can be changed by eliminating or reducing transition flexing and/or by increasing the duration at which the transmission ratio can be changed. Most likely, the adjuster systems of this patent, can benefit any machine that utilizes torque transmitting devices that alternately come in and out of contact with a common torque transmitting device, for which instances exist or can exist where rotational adjustment to an alternating torque transmitting device or a common torque transmitting device can improve the engagement of an alternating torque transmitting device with its common torque transmitting device; or for which instances exist where rotational adjustment(s) to alternating torque transmitting device(s) or common torque transmitting device(s) can compensate for the rotation of the torque transmitting device(s) that occur during transmission ratio change which may prevent transmission ratio change; or for which instances exist where rotational adjustment to a torque transmitting device which alternates between being in a moveable configuration, where the transmission ratio can be changed, and being in an un-moveable configuration, where the transmission ratio cannot be changed, can maintain that torque transmitting device in a moveable configuration.

Adjuster System for CVT 1 (FIGS. 11A, 11B, 12A, 12B, 13 to 19, 20A to 20D, 21A to 21C)

Here the CVT 1 to which an adjuster system is added is labeled as CVT 1.1. CVT 1.1 is almost identical to CVT 1, shown again in FIGS. 11A & 11B, described earlier. CVT 1 mainly consist of a cone assembly CS1A 21A and a cone assembly CS1B 21B, which are identical and each have two opposite positioned torque transmitting members which are rotatably constrained but are allowed to slide axially relative to the surface of their cone assembly. The torque transmitting members of cone assembly CS1A 21A are labeled as torque transmitting member CS1A-M1 21A-M1 and torque transmitting member CS1A-M2 21A-M2, while the cone of cone assembly 21A is labeled as cone CS1A-M3 21A-M3. And the torque transmitting members of cone assembly CS1B 21B are labeled as torque transmitting member CS1B-M1 21B-M1 and torque transmitting member CS1B-M2 21B-M2, while the cone of cone assembly 21B is labeled as cone CS1B-M3 21B-M3. The cone assembly CS21A 21A is keyed to the input shaft SH1 11, and the cone assembly CS1B 21B is keyed to the output shaft SH2 12. In order to transmit torque from the input shaft SH1 11 to the output shaft SH2 12, the torque transmitting members of cone assembly CS1A 21A are coupled with the torque transmitting members of cone assembly CS1B 21B by transmission belt BL1A 31A. The transmission ratio is changed, by changing the axial position of the torque transmitting members. And in order to change the axial position of the torque transmitting members, each cone assembly has a mover sleeve, which can slide axially relative to its shaft. And each torque transmitting member is connected to a mover sleeve by two telescopes, so that the axial position of the torque transmitting members depend on the axial position of the mover sleeves.

The transmission ratio can only be changed when for both cone assemblies only one torque transmitting member is in contact with transmission belt BL1A 31A. Otherwise stalling of the transmission ratio changing actuator occurs. The configuration where the transmission ratio can be changed is referred to as a moveable configuration. Also as described earlier, here transition flexing is not eliminated.

CVT 1.1, which is shown in FIG. 12A and FIG. 12B, is slightly different than CVT 1. For CVT 1.1, like for CVT 1, a cone assembly with two transmitting members is coupled by a transmission belt, which here is labeled as transmission belt BL1B 31B to another cone assembly with two torque transmitting members. However, for CVT 1.1, in order to eliminate or significantly reduce transition flexing, a transition flexing adjuster AD1A 101A is added to a slightly modified version of cone assembly CS1A 21A, which is labeled as cone assembly CS2A 22A, and a transition flexing adjuster AD1B 101B is added to a slightly modified version of cone assembly CS1B, which is labeled as cone assembly CS2B 22B. Also here the input shaft is labeled as input shaft SH3 13 and the output shaft is labeled as output shaft SH4 14. As can be seen from the labeling, here cone assembly CS2A 22A is identical to cone assembly CS2B 22B. Transition flexing adjuster AD1A 101A, which is shown in detail in FIGS. 13, 15, and 16, has an adjuster body AD1A-M1 101A-M1 and an adjuster output member AD1A-M2 101A-M2. Transition flexing adjuster AD1B 101B is identical to transition flexing adjuster AD1A 101A. The adjuster body AD1A-M1 101A-M1 of transition flexing adjuster AD1A 101A is fixed to the end of a mover sleeve CS2A-M6 22A-M6, where the two telescopes CS2A-M4 22A-M4 of torque transmitting member CS2A-M1 22A-M1 are attached. And the adjuster output member AD1A-M2 of transition flexing adjuster AD1A is used to mount the two telescopes CS2A-M5 22A-M5 of torque transmitting member CS2A-M2 22A-M2. A constraining mechanism CN1A 111A, which will be described in detail later, is used such that the adjuster output member AD1A-M2 101A-M2 of transition flexing adjuster AD1A 101A can be used to adjust the rotational position of torque transmitting member CS2A-M2 22A-M2. And the adjuster body AD1B-M1 101B-M1 of transition flexing adjuster AD1B 101B is fixed to the end of the mover sleeve CS2B-M6 22B-M6, where the telescopes CS2B-M4 22B-M4 of torque transmitting member CS2B-M1 22B-M1 are attached. And the adjuster output member AD1B-M2 101B-M2 of transition flexing adjuster AD1B 101B is used to mount the telescopes CS22B-M5 22B-M5 of torque transmitting member CS2B-M2 22B-M2. And a constraining mechanism CN1B 111B, is used such that the adjuster output member AD1B-M2 101B-M2 of transition flexing adjuster AD1B 101B can be used to adjust the rotational position of torque transmitting member CS2B-M2 22B-M2. Since cone assembly CS2B 22B is identical to cone assembly CS2A 22A, except that is mounted on the output shaft SH4 14 instead on the input shaft SH3 13, the only difference between constraining mechanism CN1B 111B and constraining mechanism CN1A 111A is that is mounted on cone assembly CS2B 22B instead of cone assembly CS2A 22A.

And in order to substantially increase the duration at which the transmission ratio can be changed, a mover adjuster AD2A 102A and a mover adjuster AD2B 102B, which are basically identical to the transition flexing adjuster 101A are used. Mover adjuster AD2A 102A, which is shown in FIG. 14, has an adjuster body AD2A-M1 102A-M1 and an adjuster output member AD2A-M2 102A-M2. And mover adjuster AD2B 102B, which is identical to mover adjuster AD2A 102A, has an adjuster body AD2B-M1 102B-M1 and an adjuster output member AD2B-M2 102B-M2.

The adjuster body AD2A-M1 102A-M1 of mover adjuster AD2A 102A is keyed to the input shaft SH3 13, and cone assembly CS2A 22A is fixed to the adjuster output member AD2A-M2 102A-M2 of mover adjuster AD2A 102A, see FIG. 12. And the body of mover adjuster AD2B 102B is keyed to the output shaft SH4 14, and cone assembly CS2B 22B is fixed to the output member AD2B-M2 of mover adjuster AD2B 102B.

In order to properly control the transition flexing adjusters AD1A and AD1B and the mover adjusters AD2A and AD2B, a computer CP1 121, which controls these adjusters based on the input of a transmission ratio sensor SN1A 131A, a rotational position sensors SN2A 132A, a rotational position sensor SN2B 132B, a relative rotational position sensor SN3A 133A, which shown in detail in FIG. 16, and a relative rotational position sensor SN3B 133B, is used. If more practical, the relative rotational position sensors can be replaced with rotational position sensors that monitor the rotational positions of the adjuster output members of the transition flexing adjusters. The transmission ratio sensor SN1A 131A is mounted on a frame so that it can be used to monitor the rotation of the transmission ratio gear rack gear via a sensor strip that is wrapped around the transmission ratio gear rack gear, so that computer CP1 121 can determine the transmission ratio, and hence the axial position of the torque transmitting members relative to the cones on which they are attached. And from that information computer CP1 121 can determine the pitch diameters, which depend on the diameter of the surfaces of the cones where the torque transmitting members are positioned. The rotational position sensor SN2A 132A, is mounted on a frame so that it can monitor the rotational position of cone assembly CS2A 22A via a sensor strip wrapped around cone assembly CS2A 22A. The rotational position sensor SN2B 132B, is mounted on a frame so that it can monitor the rotational position of cone assembly CS2B 22B via a sensor strip wrapped around cone assembly CS2B 22B. The relative rotational position sensor SN3A 133A, consist of a sensor inner sleeve SN3A-M1 133A-M1 and a sensor outer sleeve SN3A-M2 133A-M2, were the sensor inner sleeve SN3A-M1 133A-M1 is located inside the sensor outer sleeve SN3A-M2 133A-M2. The sensor inner sleeve SN3A-M1 133A-M1 and the sensor outer sleeve SN3A-M2 133A-M2 can rotate relative to each other. The amount of rotation between the sensor inner sleeve SN3A-M1 133A-M1 and the sensor outer sleeve SN3A-M2 133A-M2 can be monitored by computer CP1 121. The sensor inner sleeve SN3A-M1 133A-M1 is keyed to the adjuster output member AD1A-M2 101A-M2 of transition flexing adjuster AD1A 101A, and the sensor outer sleeve SN3A-M2 is mounted on the adjuster body AD1A-M2 of transition flexing adjuster AD1A 101A. Hence using the relative rotational position sensor SN3A, the computer CP1 121 can determine the rotational position of the adjuster output member AD1A-M2 relative to the rotational position of the adjuster body AD1A-M1. And hence the rotational position of torque transmitting member CS2A-M2 22A-M2 relative to torque transmitting member CS2A-M1 22A-M1. And in order to monitor the rotational position of torque transmitting member CS2B-M2 22B-M2 relative torque transmitting member CS2B-M1 22B-M1, a sensor SN3B 133B is mounted on the transition flexing adjuster AD1B 101B in the same manner as sensor SN3A 133A is mounted on transition flexing adjuster AD1A 101A. Hence by using the sensors above computer CP1 121, can determine the axial position of the torque transmitting members relative to the cones on which they are attached, and hence the pitch diameter; and the rotational positions of the torque transmitting members.

In order to connect the transmission ratio sensor SN1A 131A, the rotational position sensor SN2A 132A, and the rotational position sensor SN2B 132B to computer CP1 121, simple wire connections are used. Also since transition flexing adjusters AD1A 101A, transition flexing adjuster AD1B 101B, mover adjuster AD2A 102A, mover adjuster AD2B 102B, relative rotational position sensor SN3A 133A, and relative rotational position sensor SN3B 133B are rotating relative to computer CP1 121, in order to connect these transition flexing adjusters, mover adjusters and, relative rotational position sensors to the computer CP1 121, a ring and brush connection, is used. An example of a ring and brush connection is shown in FIG. 18. Here two output connections of computer CP1 121, one positive and one negative, are directed to two pair of brushes, labeled as brush BR1A 141A and brush BR1B 141B, by cables. Brush BR1A 141A is in contact with the positive electrical ring RN1A 151A. And brush BR1B 141B is in contact with the negative electrical ring RN1B 151B. The electrical rings are attached to the body of the adjuster by insulated fins RN1A-S1 151A-S1 and insulated fins RN1B-S1 151B-S1. And cables are used to direct the current or signal from the electrical rings to the electrical poles of the adjuster.

A configuration for the transition flexing adjuster AD1A 101A, which has an adjuster body AD1A-M1 101A-M1 and an adjuster output member AD1A-M2 101A-M2, is shown in FIG. 13. Here the adjuster output member AD1A-M2 101A-M2 can rotate relative to the adjuster body AD1A-M1 101A-M1, which is mounted at the end of the mover sleeve CS2A-M6 22A-M6, see FIG. 12. The mover sleeve CS2A-M6 22A-M6 is almost identical to the mover sleeve used in CVT 1, hence it can also slide axially relative to its cone and is used to change the axial position of its torque transmitting members. The only difference between mover sleeve CS2A-M6 22A-M6 and the mover sleeve used in CVT 1 is that for mover sleeve CS2A-M6 22A-M6 no rotor 1056 is used. The adjuster body AD1A-M1 101A-M1 is fixed to the mover sleeve CS2A-M6 22A-M6, but the adjuster output member AD1A-M1 101A-M1 can rotate relative to the mover sleeve CS2A-M6. Telescopes CS2A-M4 22A-M4 are basically identical to telescopes 1057 described previously. The top end of telescopes CS2A-M4 22A-M4 are connected to torque transmitting member CS2A-M1 22A-M1, and the bottom end of telescopes CS2A-M4 22A-M4 are attached to mover sleeve CS2A-M6; and the top end of telescopes CS2A-M5 22A-M5 are connected to torque transmitting member CS2A-M1 22A-M2, and the bottom end of telescopes CS2A-M5 22A-M5 are attached to the adjuster output member AD1A-M2 101A-M2. The telescopes CS2A-M4 22A-M4 and telescopes CS2A-M5 22A-M5 are attached in the same manner as the telescopes 1057 are attached to their torque transmitting members and to their rotor 1056. Hence mover sleeve CS2A-M6 and adjuster output member AD1A-M2 101A-M2 also have pin-holed plates, which are basically identical to the pin-holed plates attached on the outer surface of rotor 1056 as described in the Mover Mechanism section of this patent. Here the adjuster output member AD1A-M2 101A-M2, see FIG. 13, has the following shapes, it has an adjuster output shaft AD1A-M2-S1 101A-M2-S1, on which an adjuster extension arm AD1A-M2-S2 101A-M2-S2 is attached. The adjuster extension arm AD1A-M2-S2 101A-M2-S2 has an L-shape. The short leg of the L-shaped adjuster extension arm AD1A-M2-S2 101A-M2-S2 is extending radially outwards from the center of the front surface of the adjuster output shaft AD1A-M2-S1 101A-M2-S1. The long leg of the L-shaped adjuster extension arm AD1A-M2-S2 101A-M2-S2 is parallel to the adjuster output shaft AD1A-M2-S1 101A-M2-S1 and is extending axially backwards so that the telescopes CS2A-M5 22A-M5 of torque transmitting member CS2A-M2 22A-M2 can be attached at the same axial position as the telescopes CS2A-M4 22A-M4 of torque transmitting member CS2A-M1 22A-M1. This leg has two telescopes attachment plates AD1A-M2-S4 101A-M2-S4, which are used to attach the telescopes CS2A-M5 22A-M5 to this leg. The telescopes attachment plates AD1A-M2-S4 101A-M2-S4 are basically identical to the pin-holed plates attached on the outer surface of rotor 1056 as described in the Mover Mechanism section of this patent. In addition, a constrainer slide 111A-M1 is also attached to this leg. Furthermore, in order to balance the centrifugal forces of the adjuster extension arm AD1A-M2-S2 101A-M2-S2 and its attachments, an adjuster balancing arm AD1A-M2-S3 101A-M2-S3, which also has an L-shape, is positioned opposite from the adjuster extension arm AD1A-M2-S2 101A-M2-S2 on the front surface of the adjuster output shaft adjuster AD1A-M2-S1 101A-M2-S1.

Furthermore in order to ensure that the adjuster output member AD1A-M2 101A-M2 can be used to control the rotational position of torque transmitting member CS2A-M2, a constrainer mechanism CN1A 111A, shown in FIG. 19, is attached to the long leg of the L-shaped adjuster extension arm AD1A-M2-S2 101A-M2-S2. The constrainer mechanism consist of a constrainer slide 111A-M1, that is placed between the telescopes attachment plates of the long leg of the L-shaped adjuster extension arm AD1A-M2-S2 101A-M2-S2; a constrainer slider 111A-M2, that is slideably inserted into the constrainer slide 111A-M1; and two constrainer links 111A-M3, each connecting the bottom member of telescope CS2A-M5 22A-M5 to the constrainer slider 111A-M2. The constrainer slide 111A-M1 is shaped like slender round rod, on which the constrainer slider 111A-M2 is slideably inserted. The constrainer slider 111A-M2 is shaped like a sleeve, which has two identical slider clevises 111A-M2-S1 which are positioned opposite of each other. Each slider clevis of the constrainer slider consist of two parallel slider clevis plates, which are flat plates, which flat surfaces are perpendicular to the side surface of the constrainer slider. Each slider clevis plate has a hole and the outer edge of each slider clevis plate is rounded-off. Each constrainer link 111A-M3 is shaped like slender flat bar that has a constrainer link hole, which is a hole that is slightly larger than the holes of the slider clevis plates, at each end. The end of each constrainer link is rounded-off so that a half disk shape, which diameter is identical to the width of the constrainer link and which center is located at the center of the constrainer link hole, exist at each end of the constrainer link. Furthermore, the bottom member of each telescopes CS2A-M5 22A-M5 also has a telescope constrainer clevis CS2A-M5-S1 22A-M5-S1. The position of the telescope constrainer clevis on the bottom member of one telescope CS2A-M5 22A-M5 is identical to that of the other telescope CS2A-M5 22A-M5. Each telescope constrainer clevis consists of two parallel telescope constrainer clevis plates. The telescope constrainer clevis plates are flat plates, which flat surfaces are perpendicular to the side surfaces of their telescopes. Each telescope constrainer clevis plate has a hole, which is slightly smaller than the constrainer link holes, and the outer edge of each telescope constrainer clevis plate is rounded-off. In order to connect the bottom members of the telescopes CS2A-M5 22A-M5 to the constrainer slider 111A-M2, constrainer pins 111A-M4 are used. The constrainer pins 111A-M4 are shaped like slender round rods. Here one constrainer link hole of each constrainer link 111A-M3 is placed between the slider clevis plates of a slider clevis 111A-M2-S1, such that a constrainer pin CN1A-M4 111A-M4 can be inserted through the constrainer link holes and those slider clevis holes. The body of a constrainer pin 111A-M4 has a diameter small enough such that a constrainer link 111A-M3 can freely rotate on it, but large enough such that a constrainer pin CN1A-M4 111A-M4 can be securely held in place relative to its slider clevis 111A-M2-S1 by friction between the slider clevis hole surfaces and the body of the constrainer pin 111A-M4. Also, the constrainer pins 111A-M4 are long enough such that sufficient engagement between the constrainer pins 111A-M4 an a set of slider clevis plates of a slider clevis 111A-M2-S1 can exist.

And the other constrainer link hole of each constrainer link 111A-M2-S1 is placed between a set of telescope constrainer clevis plates of a telescope constrainer clevis CS2A-M5-S1 22A-M5-S1, such that a constrainer pin 111A-M4 can be inserted through the constrainer link holes and the telescope constrainer clevis plate holes. Here the diameters of the constrainer pins are small enough such that the constrainer links can freely rotate on them, but large enough such that they can be securely held in place relative to their telescope constrainer clevis plates by friction between their side surfaces and the telescope constrainer clevis hole surfaces. In addition, the constrainer pins are long enough such that sufficient engagement between the constrainer pins and a set of telescope constrainer clevis plates can exist.

In addition, while the slots of the cone of cone assembly CS2A where the attachment pins CS2A-M1-S1 22A-M1-S1, used to attach torque transmitting member CS2A-M1 22A-M1 to a cone assembly CS2A 22A, are inserted, should allow minimal rotational movements between torque transmitting member CS2A-M1 22A-M1 and its cone, the slots where the attachment pins CS2A-M2-S1 22A-M2-S1 of torque transmitting members CS2A-M2 22A-M2 are inserted should allow sufficient rotational movement between the torque transmitting member CS2A-M2 22A-M2 and its cone such that transition flexing can be eliminated. Hence here, the attachment pins of torque transmitting member CS2A-M2 22A-M2 are placed in a gap. In this application, a torque transmitting member which attachment pins are placed in a gap will be referred to as a gap mounted torque transmitting member.

From the description above it can be observed that the torque transmitting member CS2A-M1 22A-M1 is rotatably constrained relative to mover sleeve CS2A-M6 22A-M6, and torque transmitting member CS2A-M2 22A-M2 is rotatably constrained relative to the adjuster output member AD1A-M2 101A-M2, and since the adjuster output member AD1A-M2 101A-M2 can rotate relative to the mover sleeve CS2A-M6 22A-M6, the transition flexing adjuster AD1A 101A can be used by computer CP1 121 to adjust the rotational position of the torque transmitting member CS2A-M2 22A-M2 relative to torque transmitting member CS2A-M1 22A-M1. As described earlier, like CVT 1, CVT 1.1 has two identical cone assemblies, one on the input shaft SH3 13, which is labeled as cone assembly CS2A 22A, and another one on the output shaft SH4 14, which is labeled as cone assembly CS2B 22B. Hence here, the transition flexing adjuster AD1B is identical to transition flexing adjuster AD1A, and is mounted on cone assembly CS2B 22B in the same manner as transition flexing adjuster AD1A is mounted on cone assembly CS2A 22A.

Next the mover adjusters AD2A and AD2B, which will be used to substantially increase the duration at which the transmission ratio can be changed, are described. In order to substantially increase the duration at which the transmission ratio can be changed, the mover adjusters will be used to try maintain CVT 1.1 in a moveable configuration, as shown in FIG. 11 and described in detail in the Continuous Variable Transmission Variation 1 (CVT 1) section of this patent, regardless of the rotational position of the input shaft SH3 13 and the output shaft SH4 14. This is achieved by allowing the cone assemblies to slip relative to their shaft so that they are maintained in a moveable configuration. Here movable adjuster AD2A is used to allow cone assembly CS2A 22A, positioned on the input shaft SH3 13, to slip relative to the input shaft SH3 13. And movable adjuster AD2B is used to allow cone assembly CS2B 22B, positioned on the output shaft SH4 14, to slip relative to the output shaft SH4 14. In order to achieve this, the adjuster body AD2A-M1 102A-M1 of movable adjuster AD2A is keyed to the input shaft SH3 13 so that it is constrained from rotating and moving axially relative to input shaft SH3 13. And the cone assembly CS2A 22A is fixed to the adjuster output member AD2A-M2 102A-M2 of movable adjuster AD2A 102A so that it is constrained from rotating and moving axially relative the adjuster output member AD2A-M2 102A-M2. In order to mount mover adjuster AD2A 102A to input shaft SH3 13, mover adjuster AD2A 102A has an sliding hole, which center is located at the center-axis of mover adjuster AD2A 102A and goes through the entire axial length of mover adjuster AD2A 102A, except through the adjuster attachment ring AD2A-M1-S1 102A-M1-S1, which has a mounting hole, which is of a smaller diameter. The diameter of the sliding hole of mover adjuster AD2A 102A is considerably larger than the diameter of output shaft SH13 13 so that adjuster output member AD2A-M2 102A-M2 can freely rotate relative to output shaft SH13 13. And in order to mount the adjuster body AD2A-M1 102A-M1 of mover adjuster AD2A 102A to the output shaft SH13 13, the adjuster body AD2A-M1 102A-M1 has an adjuster attachment ring AD2A-M1-S1 102A-M1-S1 that extends axially backwards from the adjuster body AD2A-M1. The diameter of the mounting hole of the adjuster attachment ring AD2A-M1-S1 is only slightly larger than the diameter of input shaft SH3 13, so that the adjuster body AD2A-M1 102A-M1 can be securely mounted on input shaft SH3 13. In addition, the adjuster attachment ring AD2A-M1-S1 has a set-screw that is used to prevent the adjuster body AD2A-M1 102A-M1 from moving axially and from rotating relative to input SH3 13. The mover adjuster AD2B 102B is used to mount cone assembly CS2B 22B on output shaft SH4 14 in the same manner as the mover adjuster AD2A 102A is used to mount cone assembly CS2A 22A on input shaft SH3 13. And as described earlier, the rotational position of cone assembly CS2A 22A, which is mounted on the input shaft SH3 13, is monitored by computer CP1 121 via rotational position sensor SN2A 132A. And the rotational position of cone assembly CS2B 22B, which is mounted on the output shaft SH4 14, is monitored by computer CP1 121 via rotational position sensor SN2A 132A.

Now that the physical configuration of CVT 1.1, including its adjuster system, has been described. The operation of transition flexing adjuster AD1A 101A, transition flexing adjuster AD1B 101B, mover adjuster AD2A 102A, and mover adjuster AD2B 102B will described.

Figure 20A:
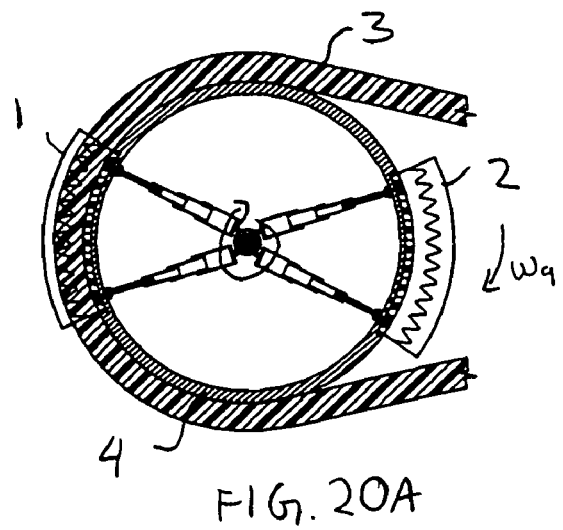
Figure 20B:
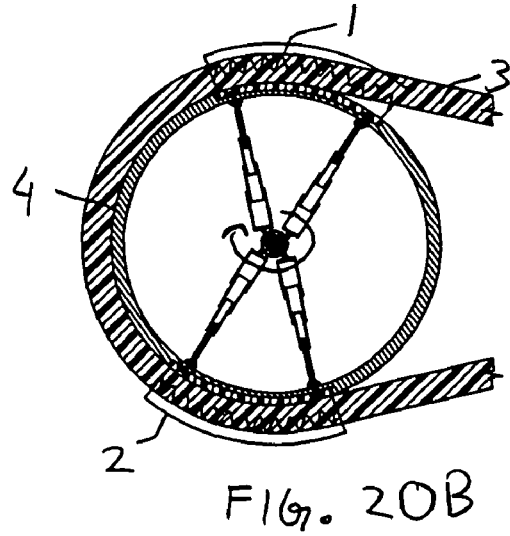
Figure 20C:
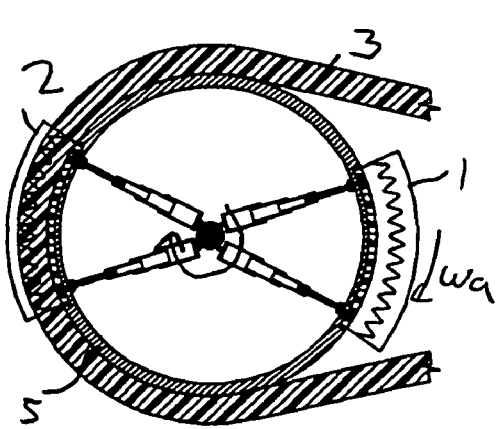
Figure 20D:
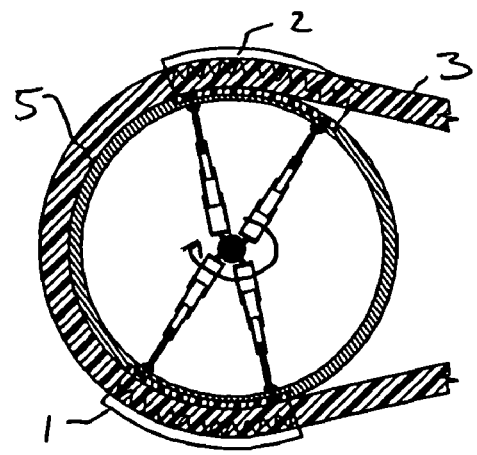

In order to explain the operation of the transition flexing adjusters, first the required relative rotational movements between the torque transmitting members of a cone assembly CS2 22, such as cone assembly CS2A 22A or cone assembly CS2B 22B, in order to eliminate transition flexing will be described. The relative rotational movements that can be used to eliminate transition flexing are shown in FIGS. 20A, 20B, 20C, and 20D, which show the different rotational positions of a cone assembly CS2 22 as it is rotated clockwise. For illustrative purposes, one torque transmitting member is referred to as torque transmitting member 11 and the other torque transmitting member is referred to as torque transmitting member 22. We start with FIG. 20A, here torque transmitting member 11 is in contact with the transmission belt 3 while torque transmitting member 22 is not. Here in order to eliminate transition flexing that will occur when torque transmitting member 22 comes in contact with the transmission belt 3, the lower positioned space between the torque transmitting members, which in this case is non-torque transmitting arc A4, needs to be a multiple of the width of the teeth of the torque transmitting members. If this is the case then no adjustment for the rotational position of torque transmitting member 22 relative to torque transmitting member 11 is needed. Otherwise a transition flexing adjuster needs to rotate one torque transmitting member clockwise or counter-clockwise relative to the other torque transmitting member such that the non-torque transmitting arc A4 is a multiple of the width of the teeth of the torque transmitting members. In FIG. 20A, the rotation provided by the transition flexing adjuster is shown as ωa, which is arbitrarily selected as clock-wise. After some rotation of the cone assembly, both torque transmitting member 11 and torque transmitting member 22, as shown in FIG. 20B, are in contact with the transmission belt 3. During this configuration, the transition flexing adjuster maintains the relative rotational position between the torque transmitting members, such that the non-torque transmitting arc A4, which in this instance is covered by the transmission belt 3, remains a multiple of the width of the teeth of the torque transmitting members. After some further rotations of the cone assembly, torque transmitting member 11 comes out of contact with the transmission belt 3, as shown in FIG. 20C. Here in order to eliminate transition flexing that will occur when the torque transmitting member 11 comes in contact with transmission belt 3 again, the lower positioned space between the torque transmitting members, which in this case is non-torque transmitting arc B5, needs to be a multiple of the width of the teeth of the torque transmitting members. If this is the case then no adjustment for the rotational position of torque transmitting member 11 relative to torque transmitting member 22 is needed. Otherwise a transition flexing adjuster needs to rotate one torque transmitting member clockwise or counter-clockwise relative to the other torque transmitting member such that the non-torque transmitting arc B5 is a multiple of the width of the teeth of the torque transmitting members. In FIG. 20C, the rotation provided by the transition flexing adjuster is also shown as ωa, which in this instance is again arbitrarily selected as clock-wise. After some rotation, both the torque transmitting member 11 and the torque transmitting member 22, as shown in FIG. 20D, are in contact with transmission belt 3. During this configuration, the transition flexing adjuster maintains the relative rotational position between the torque transmitting members, such that the non-torque transmitting arc B5, which is covered by the transmission belt 3 remains a multiple of the width of the teeth of the torque transmitting members. For clockwise rotation of a cone assembly, as shown in FIGS. 20A-20D, the lower positioned non-torque transmitting arc is the critical non-torque transmitting arc, since it is the non-torque transmitting arc that is about to be completely covered by the transmission belt so that it has to be adjusted immediately. However, for counter-clockwise rotation of a cone assembly CS2 22, the upper positioned non-torque transmitting arc is the critical torque transmitting arc, since in this case it is the non-torque transmitting arc that is about to be completely covered by the transmission belt so that it has to be adjusted immediately.

Graphs showing the required relative rotation between the torque transmitting members ($l_\theta$) vs. the arc length of the critical non-torque transmitting arc ($l_c$) are shown in FIGS. 21A, 21B, 21C. For these graphs, the y-axis represents the required arc length, $l_\theta$, that the torque transmitting member that is about to engage with its belt has to be rotated relative to the torque transmitting member currently engaged. For cases where the cone assemblies are rotated counter-clockwise, a positive value for $l_\theta$ represents counter-clockwise rotation, and a negative value for theta represents clockwise rotation. And for cases where the cone assemblies are rotated clockwise, a positive value for $l_\theta$ represents clockwise rotation, and a negative value for theta represents counter-clockwise rotation. So basically, a positive value for $l_\theta$ means that the tooth/torque transmitting member has to be rotated in the direction of rotation of the cone assembly relative to its transmission belt, and a negative value for $l_\theta$ means that the tooth/torque transmitting member has to be rotated in the opposite direction of rotation of the cone assembly relative to its transmission belt. Furthermore, the x-axis represents the arc length of the critical non-torque transmitting arc, $l_c$. Here the width $w_t$ corresponds to the width of the teeth of the torque transmitting members. In order to determine the value for the arc length of the critical non-torque transmitting arc, $l_c$, computer CP1 121 uses the data for the pitch diameter and the data for the rotational positions of the torque transmitting members. Also, the vertical lines, excluding the y-axis, of the graphs shown in FIGS. 21A/B/C mean that no adjustment is required.

Now the operation of the mover adjusters in order to substantially increase the duration at which the transmission ratio can be changed will be described. When the transmission ratio is about to be changed, the computer CP1 121 monitors the rotational position of the cone assemblies CS2A 22A and CS2B 22B using the rotational position sensors SN2A 132A and SN2B 132B, and once the cone assemblies are in a moveable configuration, such as shown in FIG. 11, the moveable adjusters AD2A 102A and AD2B 102B allow the cone assemblies to slip relative to their shaft such that they are maintained in a movable configuration. Then the transmission ratio is changed. In cases where the adjusters cannot be continuously maintained in a moveable configuration, due to practical or economical reasons for example, then the moveable adjusters can be used to at least substantially increase the duration that the cone assemblies are in a moveable configuration.

Adjuster System for CVT 2 (FIGS. 22, 23, 24A to 24D, 25, 26A to 26C, 27A, 27B, 28A, 28B, 29A, & 29B)

Here a slightly modified version if CVT 2 to which an adjuster system is added is labeled as CVT 2.1. CVT 2.1 is almost identical to CVT 2 described earlier. CVT 2, which is shown in FIG. 22, consist mainly of two transmission pulleys, transmission pulley PU1A 41A and transmission pulley PU1B 41B, and two cone assemblies which each have a torque transmitting member and a non-torque transmitting member, labeled as cone assembly CS3A 23A and cone assembly CS3B 23B. The torque transmitting member of cone assembly CS3A 23A is labeled as torque transmitting member CS3A-M1 23A-M1; and the torque transmitting member of cone assembly CS3B 23B is labeled as torque transmitting member CS3B-M1 23B-M1. And the non-torque transmitting member of cone assembly CS3A 23A is labeled as non-torque transmitting member CS3A-M2 23A-M2; and the non-torque transmitting member of cone assembly CS3B 23B is labeled as non-torque transmitting member CS3B-M2 23B-M2. Also the cone of cone assembly CS3A is labeled as cone CS3A-M3 23A-M3 and the cone of cone assembly CS3B is labeled as cone CS3B-M3 23B-M3. Each torque transmitting member and each non-torque transmitting member is attached to its cone such that it can slide axially relative to its cone, but is restrained from rotating relative to the its cone. The torque transmitting members are used for torque transmission, and the non-torque transmitting members are mainly used to maintain the axial position of their transmission belt and guide their transmission belt during transmission ratio change. The transmission pulleys PU1A 41A and PU1B 41B are keyed to a spline sleeve SP1A 51A, which is slideably mounted on the input spline shaft SH5 15, and the cone assemblies CS3A 23A and CS3B 23B are keyed to the output shaft SH6 16 in a manner such that the torque transmitting member of one cone assembly is positioned opposite from the torque transmitting member of the other cone assembly. In order to transmit torque from the input spline shaft SH5 15 to the output shaft SH6 16, a transmission belt BL2A 32A is used to couple transmission pulley PU1A 41A with cone assembly CS3A 23A, in a manner such that torque transmitting member CS3A-M1 23A-M1 can properly engage with transmission belt BL2A 32A. And a transmission belt BL2B 32B is used to couple transmission pulley PU1B 41B with cone assembly CS3B 23B, in a manner such that torque transmitting member CS3B-M1 23B-M1 can properly engage with transmission belt BL2B 32B. The transmission ratio is changed by changing the axial position of the torque transmitting members and the transmission pulleys relative to of their cone, in a manner such that for all transmission ratios, the torque transmitting members can properly engage with their transmission pulley. The transmission ratio can only be changed when only one torque transmitting member is in contact with its transmission belt, otherwise stalling of the transmission changing actuator occurs. And in order to maintain the proper tension in the transmission belts and help maintain the axial position of the transmission belts, each transmission belt has two tensioning wheels. The tensioning wheels for transmission belt BL2A 32A are labeled as tensioning wheel TW1A 61A and tensioning wheel TW1B 61B. And the tensioning wheels for transmission belt BL2B 32B are labeled as tensioning wheel TW1C 61C and tensioning wheel TW1D 61D. Each tensioning wheel is always in contact with the inner surface of its transmission belt, and is positioned between its cone assembly and its transmission pulley. For each transmission belt, one tensioning wheel is in contact with the slack side of the transmission belt, and the other tensioning wheel is in contact with the tight side of the transmission belt. From the description above, it becomes obvious that CVT 2 allows its transmission belts to flex more in order to compensate for transition flexing than CVT 1, since here the lengths of the transmission belts that can flex always extend from the torque transmitting members to the transmission pulleys, while for CVT 1 in some instances the length that its transmission belt can flex only extend from one torque transmitting member to the other.

CVT 2.1, see FIGS. 23, 24A, 24B, 24C, and 24D, is slightly different than CVT 2. Like CVT 2, for CVT 2.1 the two transmission pulleys are mounted on the input spline shaft, which here is labeled as input spline shaft SH7 17, by the use of an spline sleeve SP1B 51B. And like CVT 2, each transmission pulley is coupled to a cone assembly with a torque transmitting member and a non-torque transmitting member that are directly mounted on an output shaft, which here is labeled as output shaft SH8 18, by a transmission belt. Here the cone assemblies are labeled as cone assembly CS3C 23C and cone assembly CS3D 23D, and the transmission belts are labeled as transmission belt BL2C 32C and transmission belt BL2D 32D. And the torque transmitting member of cone assembly CS3C 23C is labeled as torque transmitting member CS3C-M1 23C-M1, and the torque transmitting member of cone assembly CS3D 23D is labeled as torque transmitting member CS3D-M1 23D-M1. And the non-torque transmitting member of cone assembly CS3C 23C is labeled as non-torque transmitting member CS3C-M2 23C-M2, and the non-torque transmitting member of cone assembly CS3D 23D is labeled as non-torque transmitting member CS3D-M 123D-M2. While the cone of cone assembly CS3C is labeled as cone CS3C-M2 23C-M3, and the cone of cone assembly CS3D is labeled as cone CS3D-M3 23D-M3. However unlike CVT 2, for CVT 2.1 for each transmission belt, only one tensioning wheel is used. These tensioning wheels operate and are mounted in the same manner as the tensioning wheels mounted on the slack side of the transmission belts of CVT 2. Here the tensioning wheel for transmission belt BL2C 32C is labeled as tensioning wheel TW1E 61E and the tensioning wheel for transmission belt BL2D 32D is labeled as tensioning wheel TW1E 61F.

Like CVT 2, in order to change the transmission ratio, a transmission ratio changing actuator is used. The strength of the transmission ratio changing actuator should be limited such that under no condition should it be able to cause excessive high stresses in the transmission belts. So that it will stall or slip in instances when it is about to cause excessive high stresses in the transmission belts. But in order to avoid unnecessary stalling or slipping of the transmission ratio changing actuator, it should be strong enough to be able to stretch the transmission belts within an acceptable limit.

Furthermore, for CVT 2.1, in order to eliminate or significantly reduce transition flexing, and substantially increase the duration at which the transmission ratio can be changed, an adjuster AD3 103 is used. Like the adjusters described earlier, adjuster AD3 103 has an adjuster body AD3-M1 103-M1 and an adjuster output member AD3-M2 103-M2, that can rotate relative to the adjuster body AD3-M1 103-M1. The adjuster body AD3-M1 is mounted on spline sleeve 51B using a setscrew so that it is axially and rotatably constrained relative to spline sleeve 51B. And on the adjuster output member AD3-M2 103-M2, the transmission pulley PU1C 41C is fixed via a torque sensor SN4C 134C, so that adjuster output member AD3-M2 103-M2 is virtually axially and rotatably constrained relative to transmission pulley PU1C 41C. And since the adjuster output member AD3-M2 103-M2 can rotate relative to the adjuster body AD3-M1, transmission pulley PU1C 41C can rotate relative to spline sleeve 51B. However, no adjuster is used to mount transmission pulley PU1D 41D to spline sleeve 51B. Here transmission pulley PU1D 41D is mounted to spline sleeve 51B via a torque sensor SN4D 134D, so that transmission pulley PU1D 41D is virtually axially and rotatably constrained relative to spline sleeve 51B.

In order to control adjuster AD3 103, a computer CP2 122, which controls adjuster AD3 103 based on the input from a transmission ratio sensor SN1B 131B, a rotational position sensor SN2C 132C, a rotational position sensor SN2D 132D, a rotational position sensor SN2E 132E, a torque sensor SN4C 134C, and a torque sensor SN4D 134D is used.

The transmission ratio sensor SN1B 131B is mounted on a frame so that it can be used to monitor the rotation of the transmission ratio gear rack gear via a sensor strip wrapped around the transmission ratio gear rack gear, so that computer CP2 122 can determine the transmission ratio, and hence the axial position of the torque transmitting members relative to the cones on which they are attached. And from that information computer CP2 122 can determine the pitch diameter, which as described earlier is the diameter of the surfaces of the cones where the torque transmitting members are positioned.

The rotational position sensors SN2E 132E, is mounted on a frame so that it can be used to monitor the rotational position of output shaft SH8 18 via a sensor strip wrapped around output shaft SH8 18. And from that information computer CP2 122 can determine the rotational position of the torque transmitting members. The rotational position sensor SN2C 132C, is mounted on a frame so that it can be used to monitor the rotational position of transmission pulley PU1C 41C via a sensor strip wrapped around a portion of transmission pulley PU1C 41C, or the adjuster output member on which transmission pulley PU1C 41C is mounted. And the rotational position sensor SN2D 132D, is mounted on a frame so that it can be used to monitor the rotational position of transmission pulley PU1D 41D via a sensor strip wrapped around transmission pulley PU1D 41D, or the adjuster output member on which transmission pulley PU1C 41C is mounted. Using the rotational position sensor SN2C 132C and SN2D 132D, computer CP2 122 can determine the absolute rotational position of the transmission pulleys and the rotational position of one transmission pulley relative to the other. Also if more advantageous, here a rotational position sensors that monitor the rotational position of the transmission pulleys can be replaced with a relative rotational position sensor that monitors the rotation between the adjuster body and the adjuster output member of adjuster AD3 103, and hence the relative rotational position between the transmission pulleys.

The torque sensors SN4C 134C and SN4B 134D, which each have a body and an output shaft, can measure the torque applied between their body and their output shaft. However unlike an adjuster, no significant rotation between the body and the output shaft of a torque sensor is allowed. Torque sensor SN4A 134C is used to measure the pulling load on transmission pulley PU1C 41C due to the torque at input spline shaft SH7 17 and the rotational resistance provided by cone assembly CS3C 23C. And torque sensor SN4D 134D is used to measure the pulling load on transmission pulley PU1D 41D due to the torque at input spline shaft SH7 17 and the rotational resistance provided by cone assembly CS3D 23D. Here the body of torque sensor SN4C 134C, is fixed to the adjuster output member AD3-M2 103-M2 and the output shaft of torque sensor SN4C 134C is fixed to transmission pulley PU1C 41C; and the body of torque sensor SN4D 134D is keyed to the spline sleeve SP1B 51B, and transmission pulley PU1D 41D is keyed to the output shaft of torque sensor SN4D 134D.

In order to connect the transmission ratio sensor SN1B 131B and the rotational position sensor SN2C 102C to computer CP2 122, simple wire connections are used. And since adjuster AD3 103, torque sensor SN4C 134C, and torque sensor SN4D 134D are rotating relative to computer CP2 122, in order to connect them to computer CP2 122, the ring and brush connection, is used. An example of a ring and brush connection is shown in FIG. 18 and is described earlier.

The rotational position sensors SN2E 132E, which monitors the rotational position of the shaft on which the cone assemblies are mounted, can consist of sensor wheel, which has a circular surface that has an alternating reflective and un-reflective pattern, and a counter, which counts the occurrence each time a reflecting pattern is positioned in front of it, as the sensor wheel is rotating. The counter resets each time the respective shaft rotates one full rotation from a predetermined reference point. Based on the amount of reflective patterns counted, the controlling computer, computer CP2 122, to which the sensor is connected can determine the angular position of the respective shaft. In the controlling computer, the angles between the reference points of the torque transmitting members which angular positions relative to the predetermined reference point of the sensor wheel do not change as the transmission ratio is changed should be programmed. For the cone assemblies described in the description for CVT 1 and CVT 2, the reference points of the torque transmitting members are located at the midpoint of the torque transmitting members. Here if the predetermined reference point is placed to coincide with the reference point of one torque transmitting member, than the angle between the reference point of that torque transmitting member and the predetermined reference point is 0 degrees. And the angle between the reference point of the other torque transmitting member and the predetermined reference point is 180 degrees.

For the front pin belt cone assembly 520A and back pin belt cone assembly 520B described in the Alternate CVT's section of this application, the angular position of a reference point of a torque transmitting member is located on the line that starts at the center of one torque transmitting member slide 560-S2 and ends at the center of the other torque transmitting member slide 560-S2, see FIGS. 77A, 77B, 78A, and 78B. And for front sliding tooth cone assembly 420A and back sliding tooth cone assembly 420B and single tooth cone assemblies, which will be described later in this application and which all have only one tooth each, the reference point of a torque transmitting member is located at the same angular position as the angular position where the mirror line of their tooth is located. Like for the cone assemblies described in the description for CVT 1 and CVT 2, the predetermined reference point can be located at a reference point of a torque transmitting member. And like for the cone assemblies described in the description for CVT 1 and CVT 2 if the predetermined reference point located at a reference point of a torque transmitting member, than the angle between the reference point of that torque transmitting member and the predetermined reference point is 0 degrees. And the angle between the reference point of the other torque transmitting member and the predetermined reference point is 180 degrees.

Furthermore, from the transmission ratio sensor SN1B 131B, the controlling computer, computer CP2 122, can determine the axial position of the torque transmitting members on the surface of their respective cones and from there the engagement coverage of the torque transmitting members; since the engagement coverage as a function of the axial position of the torque transmitting members relative the surface of their respective cones can be easily obtained experimentally and/or mathematically and then be programmed into the controlling computer. By using this information and the information from the rotational position sensors SN2E 132E, the controlling computer can be programmed so that it can determine the engagement status of the cone assemblies, which here were labeled as a cone assembly CS3C 23C and cone assembly CS3D 23D, as they are rotating. The engagement status of the cone assemblies are: 1) only the torque transmitting member of cone assembly CS3C 23C is engaged, 2) the torque transmitting member of cone assembly CS3C 23C is engaged and the torque transmitting member of cone assembly CS3D 23D is about to come into engagement, 3) the torque transmitting member of cone assembly CS3C 23C and the torque transmitting member of cone assembly CS3D 23D are engaged, 4) the torque transmitting member of cone assembly CS3C 23C is about to come out of engagement and the torque transmitting member of cone assembly CS3D 23D is engaged, 5) only the torque transmitting member of cone assembly CS3D 23D is engaged, 6) the torque transmitting member of cone assembly CS3D 23D is engaged and the torque transmitting member of cone assembly CS3C 23C is about to come into engagement, 7) the torque transmitting member of cone assembly CS3D 23D and the torque transmitting member of cone assembly CS3C 23C are engaged, 8) the torque transmitting member of cone assembly CS3D 23D is about to come out of engagement and the torque transmitting member of cone assembly CS3C 23C is engaged.

Besides depending on the rotational position of the cone assemblies, the engagement statuses above also depend on the input setting of the designer or user. For example, for engagement status 2) the torque transmitting member of cone assembly CS3C 23C is engaged and the torque transmitting member of cone assembly CS3D 23D is about to come into engagement, the designer needs to set a value in degrees when status 2 starts and status 1 ends. For example, here the designer can program the controlling computer so that status 2 starts 5 degrees before actual engagement of the torque transmitting member of cone assembly CS3D 23D. Obviously, a different value than 5 degrees can also be used. The value selected should ensure that for the equipment selected the CVT operates properly. The value for proper operation depends mainly on the responsiveness of the actuators, such as the adjusters and the transmission ratio changing actuator, the responsiveness of the controlling computer, the inertia of the components of the CVT, and the operating speed and acceleration of the motor coupled to the CVT. The proper value for engagement status 2) can be obtained experimentally by first running the machine at a low value or zero and then increasing the value if improper operations occur until improper operation cease to occur. The same method can be used to program the values for engagement statuses 4, 6, and 8.

The engagement statuses described in the previous paragraph can be used to have the controlling computer, computer CP2 122, properly control adjuster AD3 103 to reduce transition flexing. For example, as in CVT 1, in order to reduce transition flexing, the adjuster should provide adjustments when only one torque transmitting member is engaged with its transmission belt. Hence preferably the controlling computer should only use the adjuster to reduce transition flexing when the engagement status is either 1) only the torque transmitting member of cone assembly CS3C 23C is engaged or 5) only the torque transmitting member of cone assembly CS3D 23D is engaged. Although the entire durations at which the adjuster can provide adjustments is the duration of engagement statuses 1) only the torque transmitting member of cone assembly CS3C 23C is engaged and 2) the torque transmitting member of cone assembly CS3C 23C is engaged and the torque transmitting member of cone assembly CS3D 23D is about to come into engagement, and the duration of engagement statuses 5) only the torque transmitting member of cone assembly CS3D 23D is engaged and 6) the torque transmitting member of cone assembly CS3D 23D is engaged and the torque transmitting member of cone assembly CS3C 23C is about to come into engagement.

For proper operation the adjuster need to be fast enough such that it can provide proper adjustments during the engagement status or engagement status duration described in the previous paragraph. The required speed for the adjuster can be estimated by first determining the sum of the maximum rpm of the shaft on which the cone assemblies are mounted and the maximum speed of transmission ratio change rotation, which will be discussed latter, and from there calculating the duration of one complete revolution based on that sum, and then multiplying the duration of one complete revolution by the minimum angle the shaft on which the cone assemblies are mounted can be rotated so that only one torque transmitting member is engaged minus the maximum amount of adjustments needed, and then dividing that value by 360 degrees. It is however recommended that the speed of the adjuster is considerably faster than the estimation above.

Also, from the transmission ratio sensor, the controlling computer, computer CP2 122, can determine the axial position of the torque transmitting members on the surface of their respective cones and from there the arc length of the critical non-torque transmitting arc, which is the surface of the cone assembly about to be engaged, which is not covered by the torque transmitting member and is about to be covered by its transmission belt. This of course assumes that the entire torque transmitting member is toothed. If the torque transmitting member has a portion or portions that are not toothed, such as an extension, than those portions are part of the critical non-torque transmitting arc. Also here it is obviously assumed that the end portions of the torque transmitting member consists of complete tooth shape. A complete tooth shape, which width is the width of a tooth, $w_t$, is a tooth shape that corresponds to a tooth shape that starts at the midpoint of the space between two teeth and ends at the midpoint of the space between two teeth. If the end portions of the torque transmitting member do not consists of a complete tooth, then appropriate adjustments have to be made to the critical non-torque transmitting arc. For example, if one end portion of the torque transmitting member which is forming one end of the critical non-torque transmitting arc consists of a ⅔ complete tooth shape, than the other ⅓ of that tooth shape should be considered as part of the torque transmitting member instead of part of the critical non-torque transmitting arc so that the arc length of that ⅓ of a complete tooth shape should be subtracted from the arc length of critical non-torque transmitting arc.

A cone assembly can be viewed as a partial gear, which pitch-line is located at the neutral-axis or bending-axis, if it is a chain, of the torque transmitting member which in most cases is also where the height center-line of the teeth of its torque transmitting member is located, for the transmission belt described in the Alternate CVT's section of this patent, its pitch-line is located at the at the center of the pins, which when engaged with its torque transmitting member coincides with the pitch-line of its torque transmitting member. For a series of gears with different diameters of the same pitch, the width of a tooth, $w_t$, remains constant at the pitch-line. Since for a cone assembly, the pitch of its torque transmitting member should also remain constant as it is positioned at different diameters, here the width of a tooth, $w_t$, should also remains constant at the pitch-line for different diameters of its torque transmitting member. Also, when a torque transmitting member is fully engaged with its transmission belt, the pitch-line of the torque transmitting member and the pitch-line of the transmission belt should coincide.

In order to have a width of a tooth, $w_t$, value that remains constant for different diameters of the torque transmitting members, the length of the critical non-torque transmitting arc should be measured at the pitch-line of the torque transmitting member of its cone assembly; so that the width of a tooth, $w_t$, as shown on the vertical-axis and horizontal-axis of the graphs in FIGS. 21A/B/C corresponds to the width of a tooth as measured at the pitch-line. As described earlier, a complete tooth shape, which width is the width of a tooth, $w_t$, is a tooth shape that correspond to a tooth shape that starts at the midpoint of the space between two teeth and ends at the midpoint of the space between two teeth; this is true regardless circumferential-line used to measure the arc length of the critical non-torque transmitting arc.

Obviously, the arc length of the critical non-torque transmitting arc can be measured at a different circumferential-line, but then the width of a tooth, $w_t$, as shown on the vertical-axis of the graphs in FIGS. 21A/B/C should also be measured at the circumferential-line at which the length of the critical non-torque transmitting arc is measured. And if the circumferential-line does not coincide with the pitch-line, the width of a tooth changes as the transmission ratio is changed. For optimum performance, the controlling computer, computer CP2 122, should be programmed so that it can determine or estimate the width of a tooth at each transmission ratio. A competent engineer should be able do determine the equation that determines or estimates the width of a tooth at a desired circumferential-line as a function of the diameter of its torque transmitting member, which can be derived by the fact that the width of a tooth at a desired circumferential-line is "the width of a tooth at the neutral-axis of the torque transmitting member" multiplied by "the radius of the desired circumferential-line" divided by "the radius of the neutral-axis of the torque transmitting member". Once the equation is obtained, it can be programmed into the controlling computer so that it can determine the width of a tooth, $w_t$, at each transmission ratio. However, unless otherwise stated for this application the length of the critical non-torque transmitting arc is always measured at the pitch-line of the torque transmitting member of its cone assembly.

The controlling computer, computer CP2 122, will then use this information and the data from FIGS. 21A/B/C to control adjuster AD3 103 to reduce transition flexing. The equation for the engagement coverage of the torque transmitting members as a function of the transmission ratio, and the equation for the arc length of the critical non-torque transmitting arc as a function of the transmission ratio can easily be obtained or estimated experimentally and/or mathematically based on the length of the torque transmitting members and then programmed into the controlling computer.

The engagement statuses can also be used when adjuster AD3 103 is used to increase the duration at which the transmission ratio can be changed. Here engagement statuses 2, 4, 6, and 8, act as transition engagement statuses where the adjuster(s) and the transmission ratio changing actuator, if required, perform no operation so that they can come to a halt so that they are ready to perform their next task.

As described earlier, in order to reduce transition flexing, the rotational position of transmission pulley PU1C 41C relative to transmission pulley PU1D 41D needs to be monitored by the controlling computer, computer CP2 122. In order to achieve this rotational position sensor SN2C 132C and rotational position sensor SN2D 132D, or a relative rotational position sensor that monitors the rotation between the adjuster body and the adjuster output member of adjuster AD3 103 can be used. The relative rotational position sensor can also utilize the sensor wheel and counter described previously. In addition, adjuster AD3 103 should be connected to the controlling computer so that the controlling computer knows the direction the adjuster is rotating one transmission pulley relative to the other, such as rotating transmission pulley PU1D 41D clockwise relative to transmission pulley PU1C 41C or rotating transmission pulley PU1D 41D counter-clockwise relative to transmission pulley PU1C 41C for example. Two values from the data from the rotational position sensors or the relative rotational position sensor should be determined and monitored by the controlling computer. The first value is the "phase for cone assembly CS3C 23C" value. This value represents the phase between cone assembly CS3C 23C and its transmission belt. The second value is the "phase for cone assembly CS3D 23D" value. This value represents the phase between cone assembly CS3D 23D and its transmission belt. In order to determine the "phase for cone assembly CS3C 23C" and the "phase for cone assembly CS3D 23D" values, first the value for the amount of adjustment needed in order to rotate one transmission pulley from a position where its teeth are aligned with the teeth of the other transmission pulley, to the next position where its teeth are aligned with the teeth of the other transmission pulley needs to be determined. Once this value is obtained, it should be used to program the controlling computer so that the values for the "phase for cone assembly CS3C 23C" and the "phase for cone assembly CS3D 23D" values are zero when the teeth of one transmission pulley are aligned with the teeth of the other transmission pulley, and reset to zero each time the adjuster has rotated one transmission pulley relative to the other transmission pulley such that the teeth of the transmission pulleys are aligned again. And for all other relative rotational positions between the transmission pulleys, the controlling computer via the data from the rotational position sensor should determine the angle a transmission pulley has been rotated relative to the other transmission pulley. For the value for the "phase for cone assembly CS3C 23C", if the rotational position of transmission pulley PU1C 41C is adjusted relative to the rotational position of transmission pulley PU1D 41D so that its transmission belt is moved away from its torque transmitting member, torque transmitting member CS3C-M1 23C-M1, which is about to be engaged, which for a configuration of CVT where the transmission pulleys are rotating clockwise corresponds to adjustments where transmission pulley PU1C 41C is rotated counter-clockwise relative to transmission pulley PU1D 41D, a positive value is assigned for the angle measurement that transmission pulley PU1C 41C has been rotated relative to transmission pulley PU1D 41D from an initial position where the teeth of the transmission pulleys are aligned. As described above, this angle measurement resets to zero each time the teeth of the transmission pulleys are aligned again. This angle measurement is the value for the "phase for cone assembly CS3C 23C". So basically, the "phase for cone assembly CS3C 23C" represents the angle between the teeth of transmission pulley PU1C 41C and the teeth of transmission pulley PU1D 41D where the teeth of transmission pulley PU1C 41C are positioned behind the teeth of transmission pulley PU1D 41D according to the direction the transmission pulleys are rotating. Also, for the "phase for cone assembly CS3C 23C", if the rotational position of transmission pulley PU1C 41C is adjusted relative to the rotational position of transmission pulley PU 41D so that its transmission belt is moved towards its torque transmitting member, torque transmitting member CS3C-M1 23C-M1, which is about to be engaged, which for a configuration of CVT where the transmission pulleys are rotating clockwise corresponds to adjustments where transmission pulley PU1C 41C is rotated clockwise relative to transmission pulley PU 41D, the "phase for cone assembly CS3C 23C" is obtained by subtracting "the angle measurement transmission pulley PU1C 41C has been rotated relative to transmission pulley PU1D 41D from an initial position where the teeth of the transmission pulleys are aligned" from "the value for the amount of adjustment needed in order to rotate one transmission pulley from a position where its teeth are aligned with the teeth of the other transmission pulley, to the next position where its teeth are aligned with the teeth of the other transmission pulley". Also in case the transmission pulleys are rotating counter-clockwise, then in order to move the transmission belt for cone assembly CS3C 23C away from its torque transmitting member which is about to be engaged, transmission pulley PU1C 41C has to be rotated clockwise relative to transmission pulley PU1D 41D; and in case the transmission pulleys are rotating counter-clockwise, then in order to move the transmission belt for cone assembly CS3C 23C towards its torque transmitting member which is about to be engaged, transmission pulley PU1C 41C has to be rotated counter-clockwise relative to transmission pulley PU1D 41D. Here and in the previous description using the terms moved away and moved towards, moved away means that the transmission belt about to be engaged is rotated in the opposite direction the cone assemblies are rotating; and moved towards means that the transmission belt about to be engaged is rotated in the direction the cone assemblies are rotating. The "phase for cone assembly CS3D 23D" represents the angle between the teeth of transmission pulley PU1D 41D and the teeth of transmission pulley PU1C 41C where the teeth of transmission pulley PU 41D are positioned behind the teeth of transmission pulley PU1C 41C according to the direction the transmission pulleys are rotating. The method to obtain the "phase for cone assembly CS3D 23D" is identical to the method to obtain the "phase for cone assembly CS3C 23C". So here if transmission pulley PU1D 41D is rotated in the opposite direction the cone assemblies are rotating relative to transmission pulley PU1C 41C, the "phase for cone assembly CS3D 23D" is the angle measurement transmission pulley PU1D 41D has been rotated relative to transmission pulley PU1C 41C from an initial position where the teeth of the transmission pulleys are aligned. Like the "phase for cone assembly CS3C 23C", the "phase for cone assembly CS3D 23D" resets to zero each time the adjuster has rotated one transmission pulley relative to the other transmission pulley such that the teeth of the transmission pulleys are aligned again. And if transmission pulley PU1D 41D is rotated in the direction the cone assemblies are rotating relative to transmission pulley PU1C 41C, the "phase for cone assembly CS3D 23D" is obtained by subtracting "the angle measurement transmission pulley PU1D 41D has been rotated relative to transmission pulley PU1C 41C from an initial position where the teeth of the transmission pulleys are aligned" from "the value for the amount of adjustment needed in order to rotate one transmission pulley from a position where its teeth are aligned with the teeth of the other transmission pulley, to the next position where its teeth are aligned with the teeth of the other transmission pulley".

From the angular values for the "phase for cone assembly CS3C 23C" and "phase for cone assembly CS3D 23D" and the pitch diameter of the transmission pulleys, the controlling computer should determine and monitor the correspond arc lengths, which should be measured at the pitch-lines of the portions of the transmission belts fully engaged with their transmission pulleys, of those angular values. The arc length for the "phase for cone assembly CS3C 23C" will be referred to as the "phase arc length for cone assembly CS3C 23C" and the arc length for the "phase for cone assembly CS3D 23D" will be referred to as the "phase arc length for cone assembly CS3D 23D".

In FIGS. 21A/B/C the vertical-axis shows the arc length of adjustment required in order to reduce transition flexing, and the horizontal-axis shows the arc length of the critical non-torque transmitting arc. As described earlier the same adjustment method used for a CVT 1, such as CVT 1.1, can also be for a CVT 2, such as CVT 2.1. Obviously since CVT 2.1 has two transmission belts, while CVT 1.1 only has one, for CVT 2.1 before any adjustment is made, the teeth of its transmission belts need to be aligned so that they resemble one transmission belt. Also for CVT 1.1, the arc length of the critical non-torque transmitting arc is the space between the torque transmitting members that is about to be covered by its transmission belt, if the same adjustment method used for CVT 1.1 is used for CVT 2.1, then the corresponding arc length of the critical non-torque transmitting arc needs to be used for CVT 2.1; so that for CVT 2.1 the arc length of the critical non-torque transmitting arc is also the space between the torque transmitting members, which should be measured at the pitch-line of the torque transmitting members, that is about to be covered by its transmission belt. Since for CVT 2.1 the rotational position of one torque transmitting member relative to the other torque transmitting member is fixed, the arc length of the critical non-torque transmitting arc is simply ("the circumference of the entire surface of either the cone for cone assembly CS3C 23C or the cone for cone assembly CS3D 23D as measured at the pitch-line of their torque transmitting members" minus "the arc length of the torque transmitting member of cone assembly CS3C 23C as measured at the pitch-line of the torque transmitting member" minus "the arc length of the torque transmitting member of cone assembly CS3D 23D as measured at the pitch-line of the other torque transmitting members") divided by two.

Since for CVT 2.1 the phase or rotational position of one transmission pulley relative to the other instead of the rotational position of one torque transmitting member relative to the other needs to be known, a slightly different approach referred to as the "adjustment phase" method might be more practical. For the "adjustment phase" method, if the graph show in FIG. 21A is used for cone assembly CS3C 23C then the vertical-axis value shows the required "phase arc length for cone assembly CS3C 23C", and the horizontal-axis value shows the arc length of the critical non-torque transmitting arc. And if the graph show in FIG. 21A is used for cone assembly CS3D 23D then the vertical-axis value shows the required "phase arc length for cone assembly CS3D 23D", and the horizontal-axis value shows the arc length of the critical non-torque transmitting arc. Hence by using the graph show in FIG. 21A, the arc length of the critical non-torque transmitting arc as determined by the controlling computer from the data from the transmission ratio sensor, the "phase arc length for cone assembly CS3C 23C", the "phase arc length for cone assembly CS3D 23D", and the engagement statuses, the controlling computer can control adjuster AD3 103 to reduce transition flexing; in order to reduce transition flexing, the arc length of the critical non-torque transmitting arc, the "phase arc length for cone assembly CS3C 23C", the "phase arc length for cone assembly CS3D 23D", and the engagement statuses should be monitored continuously by the controlling computer, computer CP2 122. Regarding the engagement statuses, for engagement status 1 (only the torque transmitting member of cone assembly CS3C 23C is engaged) and engagement status 2 (the torque transmitting member of cone assembly CS3C 23C is engaged and the torque transmitting member of cone assembly CS3D 23D is about to come into engagement), if used, the "phase arc length for cone assembly CS3D 23D" should match the vertical-axis value of the graph show in FIG. 21A, while the horizontal-axis value of that graph should correspond to the arc length of the critical non-torque transmitting arc. And for engagement status 5 (only the torque transmitting member of cone assembly CS3D 23D is engaged) and engagement status 6 (the torque transmitting member of cone assembly CS3D 23D is engaged and the torque transmitting member of cone assembly CS3C 23C is about to come into engagement), if used, the "phase arc length for cone assembly CS3C 23C" should match the vertical-axis value of the graph show in FIG. 21A, while the horizontal-axis value of that graph should correspond to the arc length of the critical non-torque transmitting arc. Also, the method to reduce transition flexing described in this paragraph applies to operations where the transmission ratio is not changed. A detailed control scheme to reduce transition flexing during transmission ratio change will be described latter.

It is recommended that CVT 2.1 is designed so that at the lowest (start-up) transmission ratio, no adjustment is required, so that the controlling computer does not need to know the "phase arc length for cone assembly CS3C 23C" and the "phase arc length for cone assembly CS3D 23D" during start-up. It is recommended that CVT 1.1 is designed in the same manner.

It does not matter in what direction the adjuster rotates one transmission pulley relative to the other as long as the proper phase is obtained. The controlling computer can be programmed so that it only rotates one transmission pulley relative to the other in one direction, preferably in the opposite direction the cone assemblies are rotating so that the adjuster only needs to slip; or the controlling computer can be programmed so that it rotates one transmission pulley relative to the other in the direction that requires the least amount of adjustment for example. For least amount of adjustment, if the "phase arc length for cone assembly CS3C 23C" and the "phase arc length for cone assembly CS3D 23D" is less or equal to "the value for the amount of adjustment needed in order to rotate one transmission pulley from a position where its teeth are aligned with the teeth of the other transmission pulley, to the next position where its teeth are aligned with the teeth of the other transmission pulley" divided by two, the controlling computer should be programmed so that the transmission belt about to be engaged is moved away from its torque transmitting member; and if the "phase arc length for cone assembly CS3C 23C" and the "phase arc length for cone assembly CS3D 23D" is greater than "the value for the amount of adjustment needed in order to rotate one transmission pulley from a position where its teeth are aligned with the teeth of the other transmission pulley, to the next position where its teeth are aligned with the teeth of the other transmission pulley" divided by two, the controlling computer should be programmed so that the transmission belt about to be engaged is moved towards its torque transmitting member.

And although the following adjustment is not critical and can be omitted, the performance of the CVT can be increased when in instances when both torque transmitting members are in contact with their transmission belt, adjuster AD3A 103A is used to adjust the rotational position between the transmission pulleys so as to properly adjust the torque applied to each transmission pulley so that the torque rating and/or the durability of the CVT is maximized. One method is to have adjuster AD3 103 try to evenly distribute the load on each tooth. In order to achieve this, the rotational position sensor is used to estimate the amount of teeth of each transmission pulley that is transmitting torque at that instance, and the torque sensors can be used to determine the load on each transmission pulley. And by dividing the measured load on a transmission pulley by its estimated amount of teeth, the load on each of its teeth can be estimated. Another method is to have adjuster AD3 103 try to maintain an even tension in the transmission belts.

Furthermore, although the following is also not critical and can be omitted, the torque sensors SN4C 134C and SN4D 134D can also be used as a diagnostic device that ensures the proper operation of adjuster AD3 103 in trying to eliminate transition flexing. For instance, when under non-transmission ratio changing operation the reading of torque sensor SN4C 134C when only transmission pulley PU1C 41C is transmitting torque is significantly different than the reading of torque sensor SN4D 134D when only transmission pulley PU1D 41D is transmitting torque, or when the reading of a torque sensor is excessively high, the controlling computer of the CVT can take corrective actions and safety steps that prevents or minimizes damages to the CVT, such as adjusting the adjustment provided in order to reduce transition flexing, or signaling warnings, or initiating shutdowns.

The reason why adjuster AD3 103 is needed in order to substantially increase the duration at which the transmission ratio can be changed is because of transmission ratio change rotation. Transmission ratio change rotation is rotation of a cone assembly that occurs when the axial position of its torque transmitting member is changed while it is in contact with its transmission belt. In order to help explain transition ratio change rotation, the points where the transmission belts first touch the upper surface of their cone assemblies will be referred to as points N. Here points N are neutral points, which are points where almost no sliding between the transmission belts and the surface of their cone assembly occur when the pitch diameter of the cone assemblies are changed, regardless of the rotational position of the torque transmitting members. This is because the lengths of the transmission belts from their point N to the points where the horizontal mirror lines of the transmission pulleys intersect the surfaces of the transmission pulleys remain almost constant as the transmission ratio is changed, since the center distance between the cone assemblies and the transmission pulleys do not change; however this is only true for reasonably small changes in pitch diameter of the cone assemblies. And point N is also the neutral point because changes in the pitch diameter of the cone assemblies do not affect the portions of the transmission belts that are not in contact with a cone assembly.

Note, for other configurations of a CVT, point N might be positioned elsewhere. For CVT's that utilizes transmission pulleys, a point N is most likely located at a point that corresponds to the end point of a portion of a transmission belt which length from the point where the horizontal mirror line of a transmission pulley intersect the surface of that transmission pulley to point N remains almost constant as the pitch diameter of its cone assembly is changed. For different configurations of CVT's, the location of point N can easily be determined experimentally, by simply determining the point where almost no sliding between the transmission belt and the surface of its cone assembly occur as the pitch diameter of the cone assembly is changed.

When the midpoint of the torque transmitting member is not positioned at point N, then significant transmission ratio change rotation occurs. The amount of transmission ratio change rotation depends on the angle θ, which is the angle between the midpoint of the torque transmitting member, referred to as point M, and point N. And the direction of transmission ratio change rotation depends on whether the midpoint of the torque transmitting member is positioned to the left or to the right of point N, and on whether the pitch diameter of the torque transmitting member is increased or decreased. The reason that transmission ratio change rotation has to occur is because if no slippage between the torque transmitting member and the transmission belt is allowed, then the arc length between point N and the midpoint of the torque transmitting member, point M, has to remain constant regardless of the pitch diameter. For a given initial angle $θ_1$, initial radius $R_1$, and final radius $R_2$, the transmission ratio change rotation, $Δθ$, can be determined from the equation shown in FIG. 25. From the equation shown in FIG. 25, it can be seen that the transmission ratio change rotation, $Δθ$, increases with an increase in initial angle $θ_1$. Also from FIGS. 24A-24D, where the initial angle $θ_1$ is simply labeled as θ, it can be observed that clockwise transmission ratio change rotation occurs when the pitch diameter is increased and the center of the torque transmitting member is positioned to the left of point N, see FIG. 24D, and when the pitch diameter is decreased and the center of the torque transmitting member is positioned to the right of point N, see FIG. 24A. And counter-clockwise transmission ratio change rotation occur when the pitch diameter is increased and the center of the torque transmitting member is positioned to the right of point N, see FIG. 24B, and when the pitch diameter is decreased and the center of the torque transmitting member is positioned to the left of point N, see FIG. 24C.

Furthermore, because of the configuration of CVT 2.1, in instances where both torque transmitting member CS3C-M1 23C-M1 and torque transmitting member CS3D-M1 23D-M1 are in contact with their transmission belt, the transmission ratio change rotation for cone assembly CS3C 23C is different from that of cone assembly CS3D 23D. Hence in order to allow the transmission ratio to be changeable when both torque transmitting members are in contact with their transmission belts, compensating relative rotation between either the cone assemblies or the transmission pulleys has to occur. As described earlier, the relative rotational position between the cone assemblies will not be changed, since it is desired to keep the rotational position of torque transmitting member CS3D-M1 23D-M1 opposite or close to opposite from the rotational position of torque transmitting member CS3C-M1 23C-M1. Therefore, in order to compensate for the transmission ratio change rotation, adjuster AD3 103 is used to adjust the rotational position of transmission pulley PU1C 41C relative to transmission pulley PU1D 41D. In order to compensate for the transmission ratio change rotation, adjuster AD3 103 is used to rotate transmission pulley PU1C 41C relative to transmission pulley PU1D 41D such that the pulling loads on the transmission pulleys, as measured by torque sensor SN4C 134C and torque sensor SN4D 134D, are about equal.

Besides eliminating transition flexing and compensating for transmission ratio change rotation, the adjuster system for CVT 2.1 can also be used to compensate for wear that causes unequal pulling loads in the alternating transmission pulleys.

Figure 26A:
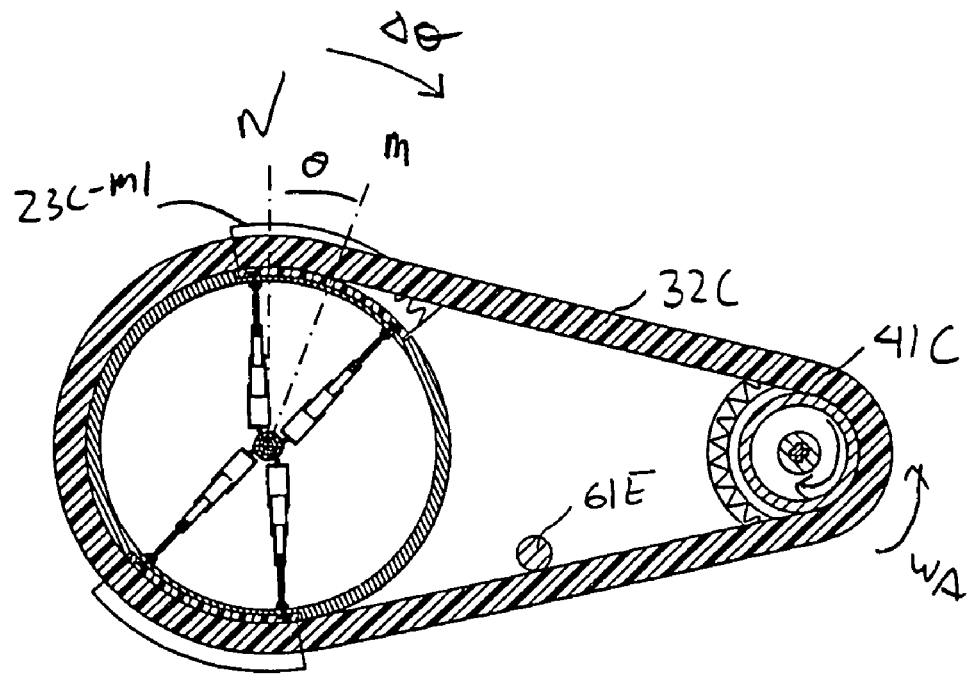
Figure 26B:
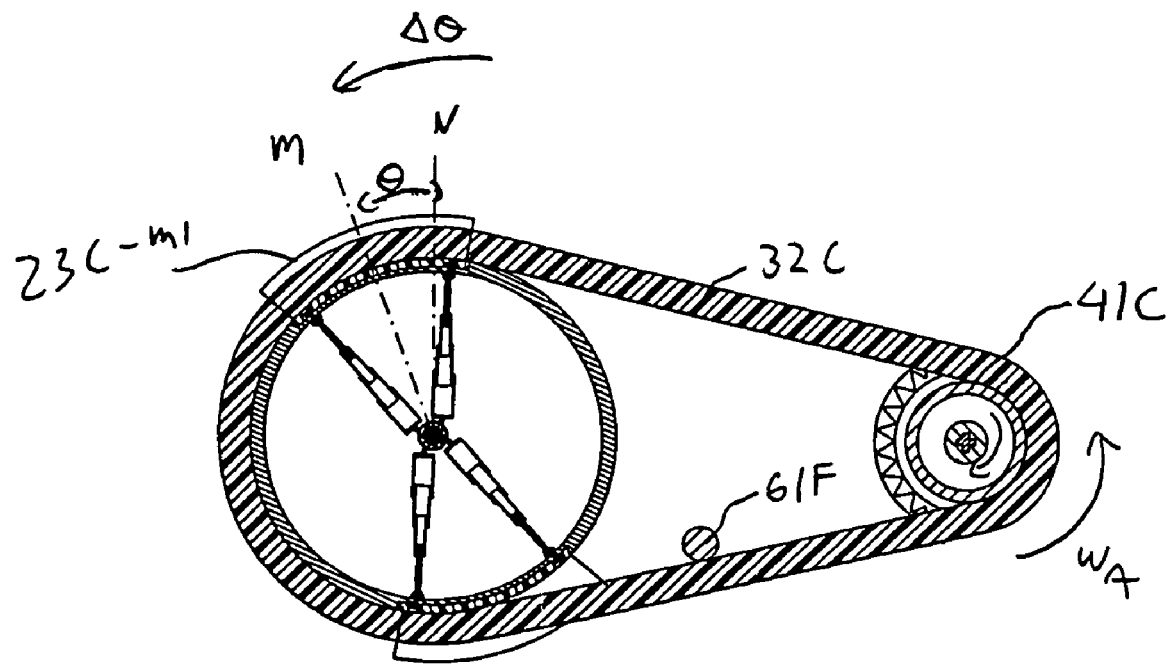
Figure 26C:
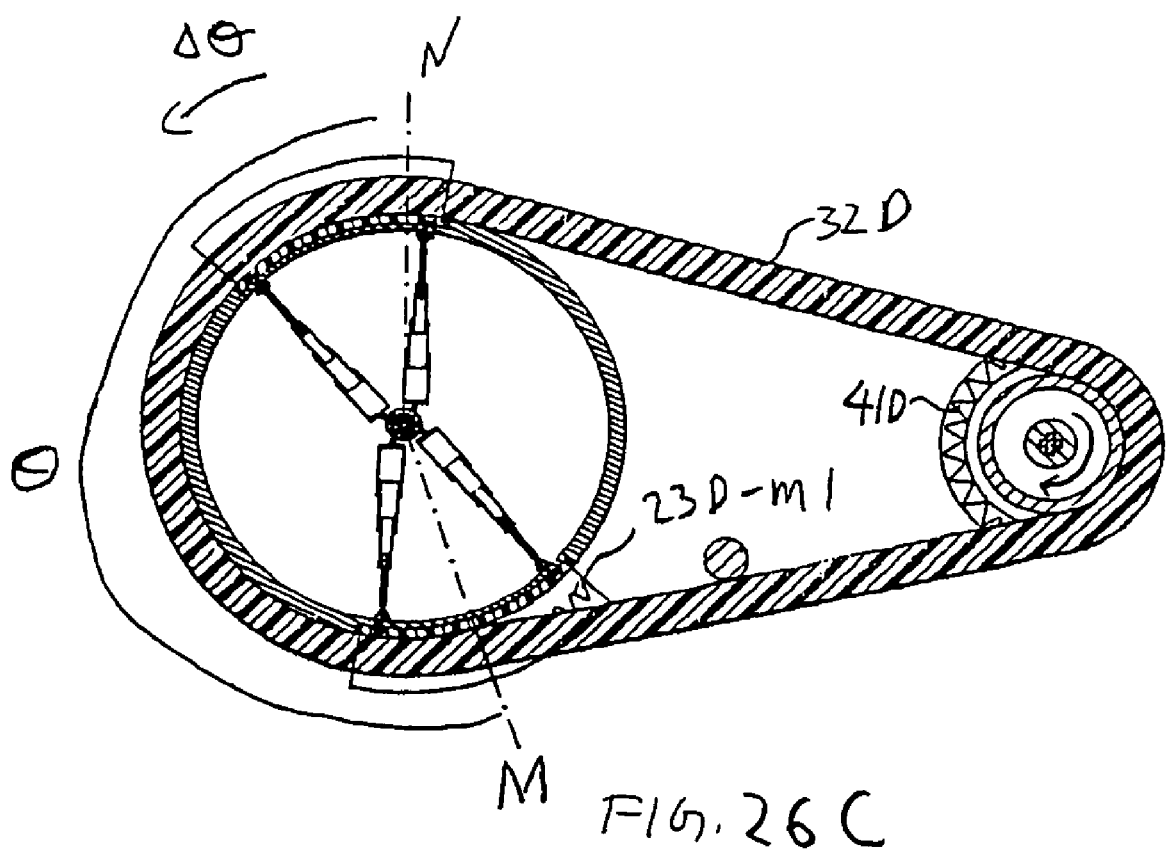

The rotational movements between transmission pulley PU1C 41C and transmission pulley PU1D 41D for different rotational positions and transmission ratio changes (increasing/decreasing) as to compensate for transmission ratio change rotation, and the rotational movements between transmission pulley PU1C 41C and transmission pulley PU1D 41D as to eliminate or reduce transition flexing, when the input shaft is rotated clock-wise are described below:

—Decreasing Pitch Diameter and Torque Transmitting Member CS3C-M1 23-M1 on Upper Half (FIGS. 26A-26C)

Here while Torque Transmitting Member Cs3C-M1 23C-M1 is Engaged and Torque transmitting member CS3D-M1 23D-M1 is not engaged with its transmission belt, adjuster AD3 103 is used to reduce transition flexing. This situation corresponds to engagement status 1 (only the torque transmitting member of cone assembly CS3C 23C is engaged) and engagement status 2 (the torque transmitting member of cone assembly CS3C 23C is engaged and the torque transmitting member of cone assembly CS3D 23D is about to come into engagement). In order to have a pause between the different operations of adjuster AD3A 103A, which are reducing transition flexing and compensating for transmission ratio change rotation, only engagement status 1 should be used to reduce transition flexing and to change the transmission ratio. Hence adjuster AD3A 103A and the transmission ratio changing actuator are not in operation during engagement status 2. If no pause is desired than engagement status 1 and engagement status 2 should be used to reduce transition flexing and to change the transmission ratio. In this instance adjuster AD3 103 is not used to compensate for transmission ratio change rotation, despite the fact that due to transition ratio change rotation the cone assemblies are rotated counter-clockwise. Since here only one torque transmitting member is in contact with its transmission belt, transmission ratio change rotation does not cause excessive stretching of the transmission belts. And some counter-clockwise rotation of the cone assemblies, which causes slippage at the output shaft, slightly reduces the performance of the CVT, but is not damaging the CVT. A detailed control scheme to reduce transition flexing during transmission ratio change is described after the rotational movements between the transmission pulleys for different rotational positions and transmission ratio changes description.

And once both torque transmitting member CS3C-M1 23C-M1, which is positioned on the upper half, and torque transmitting member CS3D-M1 23D-M1 are in contact with their transmission belts, see FIGS. 26A-26C, it can be observed that here when point M of torque transmitting member CS3C-M1 23C-M1 is positioned to the right of point N, see FIG. 26A, the transmission ratio change rotation of cone assembly CS3C-M1 23C-M1 is clockwise; and when torque transmitting member CS3C-M1 23C-M1 is positioned to the left of point N, see FIG. 26B, the transmission ratio change rotation of cone assembly CS3C 23C is counter-clockwise. And in this case, the transmission ratio change rotation of cone assembly CS3D 23D is always counter-clockwise, see FIG. 26D. From FIGS. 26B and 26C it can be seen that here if torque transmitting member CS3C-M1 23C-M1 is positioned to the left of point N, θ of cone assembly CS3D 23D is always greater than θ of cone assembly CS3C 23C. Hence, regardless of whether the transmission ratio change rotation of cone assembly CS3C 23C is clockwise or counter-clockwise, here changing the transmission ratio causes cone assembly CS3D 23D to rotate counter-clockwise relative to cone assembly CS3C 23C. In order to compensate for the transmission ratio change rotation, adjuster AD3 103 needs to rotate transmission pulley PU1C 41C counter-clockwise relative to transmission pulley PU1D 41D. As discussed previously, here the pulling load in the transmission pulleys PU1C 41C and PU1D 41D will be used to control the rotation of adjuster AD3 103. Here once the pulling load in transmission pulley PU1D 41D falls below a preset low limit value relative to the pulling load in transmission pulley PU1C 41C, the adjuster AD3 103 rotates transmission pulley PU1C 41C counter-clockwise relative to transmission pulley PU1D 41D. And once the difference in pulling load between transmission pulley PU1D 41D and transmission pulley PU1C 41C has reached an acceptable preset value, the adjuster AD3 103 stops rotating. In FIGS. 26A and 26B, the rotation provided by adjuster AD3 103 is labeled as $\omega_A$. Also, here the pulling load is the load that tends to rotate a transmission pulley counter-clock-wise. In instances where the adjuster AD3 103 is not providing sufficient adjustment, in order to prevent excessive flexing of the transmission belts, the transmission ratio changing actuator should stall. Also if desired, in instances where the pulling load in transmission pulley PU1D 41D falls below a lower preset low limit value relative to the pulling load in transmission pulley PU1C 41C, the transmission ratio changing actuator can be temporarily stopped until adjuster AD3 103 has reduced the difference in pulling load between transmission pulley PU1D 41D and transmission pulley PU1C 41C to a corresponding acceptable preset value. This situation corresponds to engagement status 3 (the torque transmitting member of cone assembly CS3C 23C and the torque transmitting member of cone assembly CS3D 23D are engaged), and engagement status 4 (the torque transmitting member of cone assembly CS3C 23C is about to come out of engagement and the torque transmitting member of cone assembly CS3D 23D is engaged). In order to have a pause between the different operations of adjuster AD3A 103A, which are reducing transition flexing and compensating for transmission ratio change rotation, only engagement status 3 should be used to compensate for transmission ratio change rotation and to change the transmission ratio. Hence adjuster AD3A 103A and the transmission ratio changing actuator are not in operation during engagement status 4. If no pause is desired than engagement status 3 and engagement status 4 should be used to reduce transition flexing and to change the transmission ratio.

And once torque transmitting member CS3C-M1 23C-M1 comes out of contact with its transmission belt, during transmission ratio change as during non-transmission ratio change operation, adjuster AD3 103 is used to reduce transition flexing. This situation corresponds to engagement status 5 (only the torque transmitting member of cone assembly CS3D 23D is engaged), and engagement status 6 (the torque transmitting member of cone assembly CS3D 23D is engaged and the torque transmitting member of cone assembly CS3C 23C is about to come into engagement). In order to have a pause between the different operations of adjuster AD3A 103A, which are reducing transition flexing and compensating for transmission ratio change rotation, only engagement status 5 should be used to compensate for transmission ratio change rotation and to change the transmission ratio. Hence adjuster AD3A 103A and the transmission ratio changing actuator are not in operation during engagement status 6. If no pause is desired than engagement status 5 and engagement status 6 should be used to reduce transition flexing and to change the transmission ratio. Since in this instance only one torque transmitting member is contact with its transmission belt, it is not necessary for adjuster AD3 103 to compensate for transmission ratio change rotation, despite the fact that due to transmission ratio change rotation, cone assembly CS3D 23D, and hence output shaft SH8 18 are rotated counter-clockwise. Since some counter-clockwise rotation applied to cone assembly CS3D 23D, which causes slippage at the output shaft SH8 18, slightly reduces the performance of the CVT but is not damaging the CVT. A detailed control scheme to reduce transition flexing during transmission ratio change is described after the rotational movements between the transmission pulleys for different rotational positions and transmission ratio changes description.

Figure 27A:
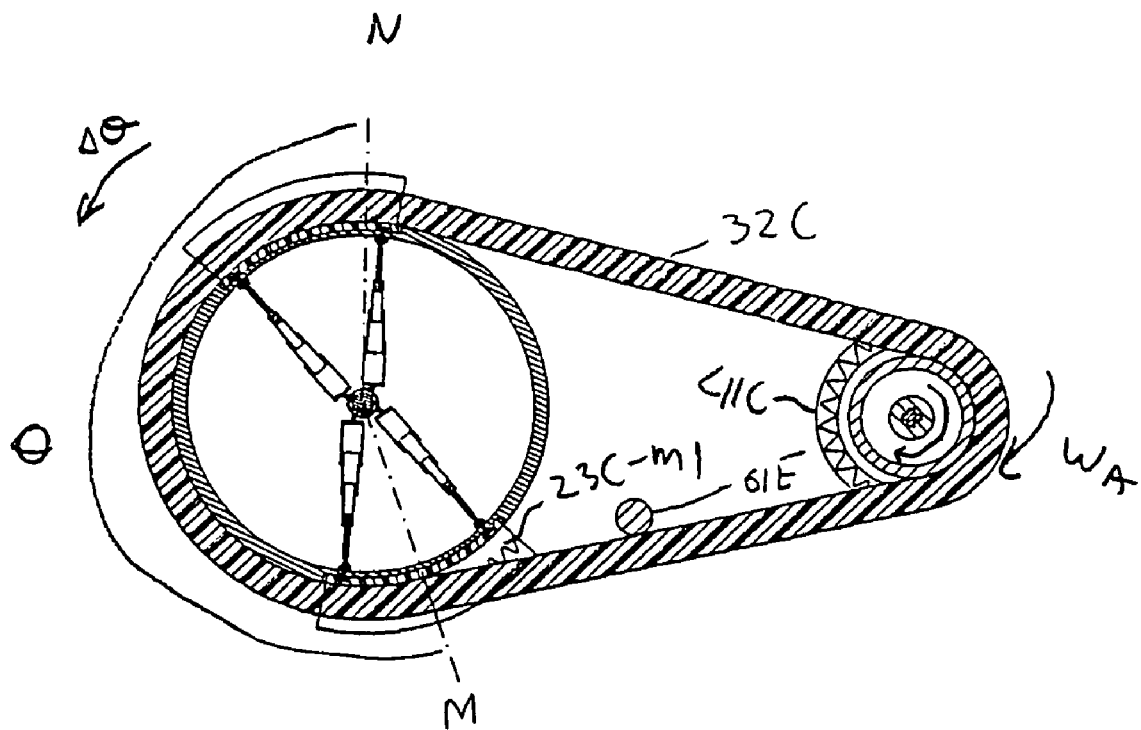
Figure 27B:
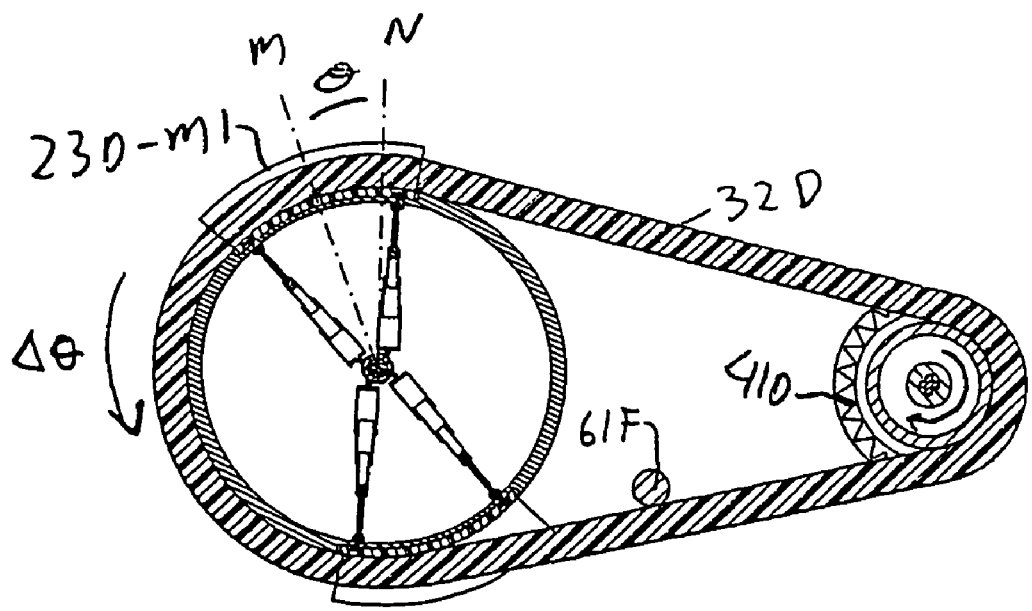

—Decreasing Pitch Diameter and Torque Transmitting Member CSC3C-M1 23C-M1 on Lower Half (FIGS. 27A & 27B)

Here while torque transmitting member CS3C-M1 23C-M1 is not engaged with its transmission belt, adjuster AD3 103 is used to reduce transition flexing. This situation corresponds to engagement status 5 (only the torque transmitting member of cone assembly CS3D 23D is engaged) and engagement status 6 (the torque transmitting member of cone assembly CS3D 23D is engaged and the torque transmitting member of cone assembly CS3C 23C is about to come into engagement). In order to have a pause between the different operations of adjuster AD3A 103A, which are reducing transition flexing and compensating for transmission ratio change rotation, only engagement status 5 should be used to reduce transition flexing and to change the transmission ratio. Hence adjuster AD3A 103A and the transmission ratio changing actuator are not in operation during engagement status 6. If no pause is desired than engagement status 5 and engagement status 6 should be used to reduce transition flexing and to change the transmission ratio. Since in this instance only one torque transmitting member is in contact with its transmission belt, it is not necessary for adjuster AD3 103 to compensate for transmission ratio change rotation, despite the fact that due to transition ratio change rotation the cone assemblies are rotated counter-clockwise. Since some counter-clockwise rotation of the cone assemblies, which causes slippage at the output shaft, slightly reduces the performance of the CVT but is not damaging the CVT. A detailed control scheme to reduce transition flexing during transmission ratio change is described after the rotational movements between the transmission pulleys for different rotational positions and transmission ratio changes description.

And once both torque transmitting member CS3C-M1 23C-M1, which is positioned on the lower half, and torque transmitting member CS3D-M1 23D-M1 are in contact with their transmission belt, see FIGS. 27A & 27B, adjuster AD3 103 is used to compensate for transmission ratio change rotation. By using the same method described in the previous section, where torque transmitting member CS3C-M1 23C-M1 is positioned on the upper half and both torque transmitting members are in contact with their transmission belt, it becomes clear that here in order to compensate for the transmission ratio change rotation, the adjuster AD3 103 needs to rotate transmission pulley PU 41C clockwise relative to transmission pulley PU1D 41D. As discussed previously, here the pulling load in the transmission pulleys PU 41C and PU1D 41D will be used to control the rotation of adjuster AD3 103. Here once the pulling load in transmission pulley PU1D 41D increases above a preset high limit value relative to the pulling load in transmission pulley PU1C 41C, the adjuster AD3 103 rotates transmission pulley PU1C 41C clockwise relative to transmission pulley PU1D 41C. And once the difference in pulling load between the transmission pulleys has reached an acceptable preset value, adjuster AD3 103 stops rotating. In instances where the adjuster AD3 103 is not providing sufficient adjustment, in order to prevent excessive flexing of the transmission belts, the transmission ratio changing actuator should stall. Also if desired, in instances where the pulling load in transmission pulley PU1D 41D increases above a higher preset high limit value relative to the pulling load in transmission pulley PU1C 41C, the transmission ratio changing actuator can be temporarily stopped until adjuster AD3 103 has reduced the difference in pulling load between transmission pulley PU1D 41D and transmission pulley PU 41C to a corresponding acceptable preset value. This situation corresponds to engagement status 7 (the torque transmitting member of cone assembly CS3D 23D and the torque transmitting member of cone assembly CS3C 23C are engaged), and engagement status 8 (the torque transmitting member of cone assembly CS3D 23D is about to come out of engagement and the torque transmitting member of cone assembly CS3C 23C is engaged). In order to have a pause between the different operations of adjuster AD3A 103A, which are reducing transition flexing and compensating for transmission ratio change rotation, only engagement status 7 should be used to compensate for transmission ratio change rotation and to change the transmission ratio. Hence adjuster AD3A 103A and the transmission ratio changing actuator are not in operation during engagement status 8. If no pause is desired than engagement status 7 and engagement status 8 should be used to reduce transition flexing and to change the transmission ratio.

And once torque transmitting member CS3D-M1 23D-M1 comes out of contact with its transmission belt, adjuster AD3 103 is used to reduce transition flexing. This situation corresponds to engagement status 1 (only the torque transmitting member of cone assembly CS3C 23C is engaged), and engagement status 2 (the torque transmitting member of cone assembly CS3C 23C is engaged and the torque transmitting member of cone assembly CS3D 23D is about to come into engagement). In order to have a pause between the different operations of adjuster AD3A 103A, which are reducing transition flexing and compensating for transmission ratio change rotation, only engagement status 1 should be used to compensate for transmission ratio change rotation and to change the transmission ratio. Hence adjuster AD3A 103A and the transmission ratio changing actuator are not in operation during engagement status 2. If no pause is desired than engagement status 1 and engagement status 2 should be used to reduce transition flexing and to change the transmission ratio. Since in this instance only one torque transmitting member is in contact with its transmission belt, adjuster AD3 103 is not used to compensate for transmission ratio change rotation, despite the fact that transmission ratio change rotation rotates cone assembly CS3C-M1 23C-M1, and hence output shaft SH8 18, counter-clockwise. Since some counter-clockwise rotation applied to cone assembly CS3C 23C, which causes slippage at the output shaft SH8 18, slightly reduces the performance of the CVT but is not damaging the CVT. A detailed control scheme to reduce transition flexing during transmission ratio change is described after the rotational movements between the transmission pulleys for different rotational positions and transmission ratio changes description.

Figure 28A:
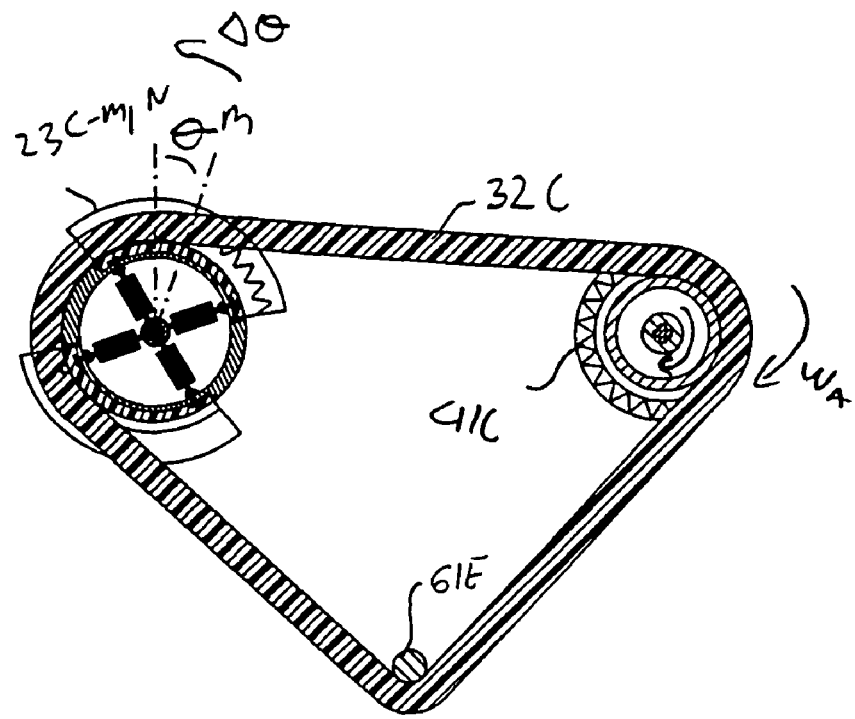
Figure 28B:
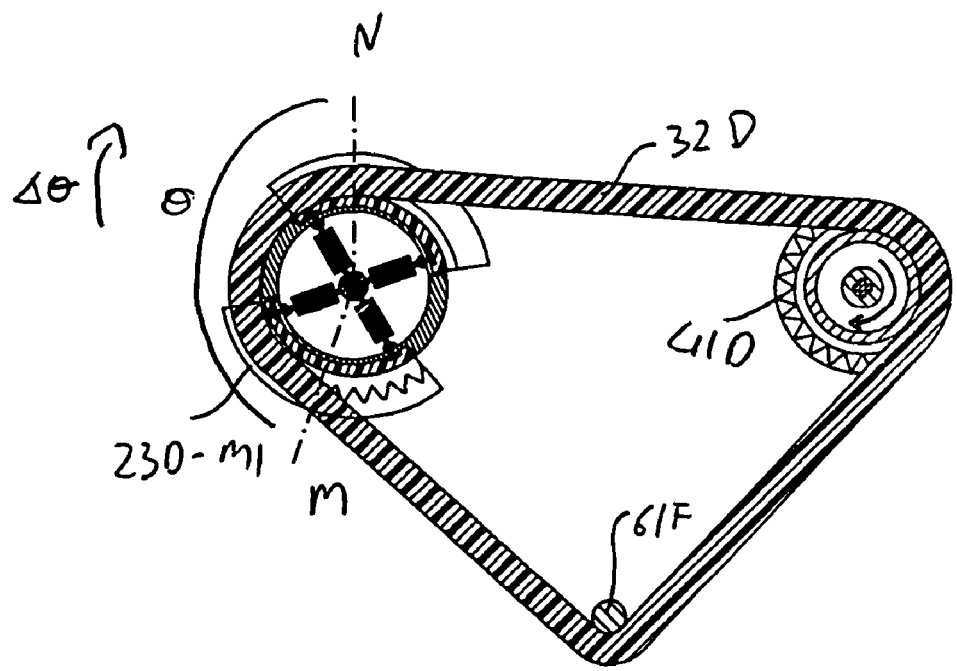

—Increasing Pitch Diameter and Torque Transmitting Member CS3C-M1 23C-M1 on Upper Half (FIGS. 28A & 28B)

Here while torque transmitting member CS3C-M1 23C-M1 is engaged and torque transmitting member CS3D-M1 23D-M1 is not engaged with its transmission belt, adjuster AD3 103 is used to reduce transition flexing. This situation corresponds to engagement status 1 (only the torque transmitting member of cone assembly CS3C 23C is engaged) and engagement status 2 (the torque transmitting member of cone assembly CS3C 23C is engaged and the torque transmitting member of cone assembly CS3D 23D is about to come into engagement). In order to have a pause between the different operations of adjuster AD3A 103A, which are reducing transition flexing and compensating for transmission ratio change rotation, only engagement status 1 should be used to reduce transition flexing and to change the transmission ratio. Hence adjuster AD3A 103A and the transmission ratio changing actuator are not in operation during engagement status 2. If no pause is desired than engagement status 1 and engagement status 2 should be used to reduce transition flexing and to change the transmission ratio. Since in this instance only one torque transmitting member is in contact with its transmission belt, the adjuster AD3 103 is not used to compensate for transmission ratio change rotation, despite the fact that due to transition ratio change rotation the cone assemblies are rotated clockwise, for the same reason discussed earlier. A detailed control scheme to reduce transition flexing during transmission ratio change is described after the rotational movements between the transmission pulleys for different rotational positions and transmission ratio changes description.

And once both, torque transmitting member CS3C-M1 23C-M1, which is positioned on the upper half, and torque transmitting member CS3D-M 123D-M1 are in contact with their transmission belts, see FIGS. 28A & 28B, adjuster AD3 103 is used to compensate for transmission ratio change rotation. As discussed earlier, here the direction of the transmission ratio change rotation is simply opposite from that were the transmission ratio is decreased. And as described before here a larger angle between the midpoint of a torque transmitting member and point N, results in a larger transmission ratio change rotation. Previously it was described that when the transmission ratio is decreased and torque transmitting member CS3C-M1 23C-M1 is positioned on the upper half and both torque transmitting members are in contact with their transmission belt, the adjuster AD3 103 needs to rotate transmission pulley PU1C 41C counter-clockwise relative to transmission pulley PU1D 41D. Hence in this case, the adjuster AD3 103 needs to rotate transmission pulley PU1C 41C clockwise relative to transmission pulley PU1D 41D. As discussed previously, here the pulling load in the transmission pulleys will be used to control the compensating rotation of the adjuster AD3 103. Here once the pulling load in transmission pulley PU1D 41D increases above a preset high limit value relative to the pulling load in transmission pulley PU1C 41C, the adjuster AD3 103 rotates transmission pulley PU1C 41C clockwise relative to transmission pulley PU1D 41D. And once the difference in the pulling load between transmission pulleys has reached an acceptable preset value, the adjuster AD3 103 stops rotating. In instances where the adjuster AD3 103 is not providing sufficient adjustment, in order to prevent excessive flexing of the transmission belts, the transmission ratio changing actuator should stall. Also if desired, in instances where the pulling load in transmission pulley PU1D 41D increases above a higher preset high limit value relative to the pulling load in transmission pulley PU1C 41C, the transmission ratio changing actuator can be temporarily stopped until adjuster AD3 103 has reduced the difference in pulling load between transmission pulley PU1D 41D and transmission pulley PU1C 41C to a corresponding acceptable preset value. This situation corresponds to engagement status 3 (the torque transmitting member of cone assembly CS3C 23C and the torque transmitting member of cone assembly CS3D 23D are engaged), and engagement status 4 (the torque transmitting member of cone assembly CS3C 23C is about to come out of engagement and the torque transmitting member of cone assembly CS3D 23D is engaged). In order to have a pause between the different operations of adjuster AD3A 103A, which are reducing transition flexing and compensating for transmission ratio change rotation, only engagement status 3 should be used to compensate for transmission ratio change rotation and to change the transmission ratio. Hence adjuster AD3A 103A and the transmission ratio changing actuator are not in operation during engagement status 4. If no pause is desired than engagement status 3 and engagement status 4 should be used to reduce transition flexing and to change the transmission ratio.

And once torque transmitting member CS3C-M1 23C-M1 comes out of contact with its transmission belt, during transmission ratio change as during non-transmission ratio change operation, adjuster AD3 103 is used to reduce transition flexing. This situation corresponds to engagement status 5 (only the torque transmitting member of cone assembly CS3D 23D is engaged), and engagement status 6 (the torque transmitting member of cone assembly CS3D 23D is engaged and the torque transmitting member of cone assembly CS3C 23C is about to come into engagement). In order to have a pause between the different operations of adjuster AD3A 103A, which are reducing transition flexing and compensating for transmission ratio change rotation, only engagement status 5 should be used to compensate for transmission ratio change rotation and to change the transmission ratio. Hence adjuster AD3A 103A and the transmission ratio changing actuator are not in operation during engagement status 6. If no pause is desired than engagement status 5 and engagement status 6 should be used to reduce transition flexing and to change the transmission ratio. Since in this instance only one torque transmitting member is in contact with its transmission belt, adjuster AD3 103 is not used to compensate for transmission ratio change rotation, despite the fact that transmission ratio change rotation rotates cone assembly CS3D-M123D-M1, and hence output shaft SH8 18, clockwise. Since some clockwise rotation applied to the output shaft SH8 18 is not damaging the CVT, and actually increases the total amount of rotation at the output shaft SH8 18 at the expense of the work provided by the transmission ratio changing actuator. A detailed control scheme to reduce transition flexing during transmission ratio change is described after the rotational movements between the transmission pulleys for different rotational positions and transmission ratio changes description.

Figure 29A:
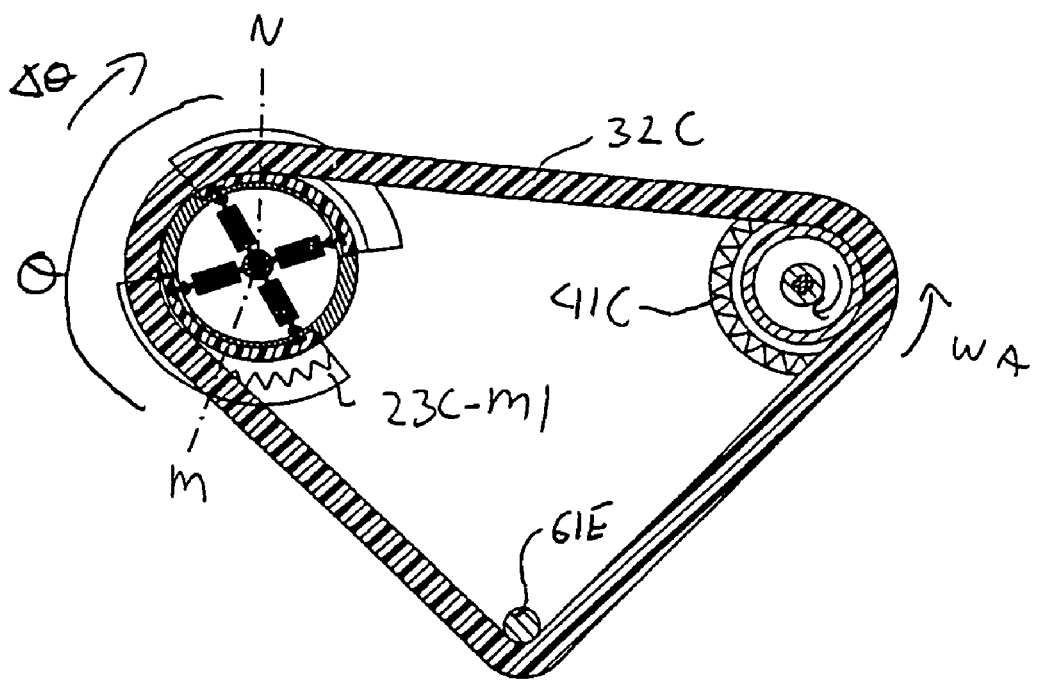
Figure 29B:
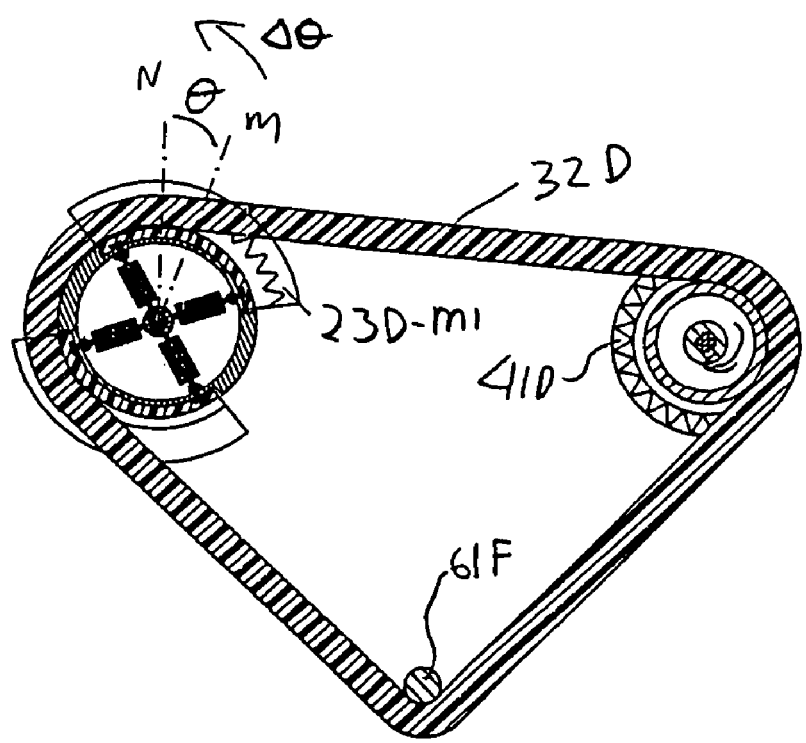

—Increasing Pitch Diameter and Torque Transmitting Member CS3C-M1 23C-M1 on Lower Half (FIGS. 29A & 29B)

Here while torque transmitting member CS3C-M1 23C-M1 is not engaged with its transmission belt, adjuster AD3 103 is used to reduce transition flexing. This situation corresponds to engagement status 5 (only the torque transmitting member of cone assembly CS3D 23D is engaged) and engagement status 6 (the torque transmitting member of cone assembly CS3D 23D is engaged and the torque transmitting member of cone assembly CS3C 23C is about to come into engagement). In order to have a pause between the different operations of adjuster AD3A 103A, which are reducing transition flexing and compensating for transmission ratio change rotation, only engagement status 5 should be used to reduce transition flexing and to change the transmission ratio. Hence adjuster AD3A 103A and the transmission ratio changing actuator are not in operation during engagement status 6. If no pause is desired than engagement status 5 and engagement status 6 should be used to reduce transition flexing and to change the transmission ratio. In this instance the adjuster AD3 103 is not used to compensate for transmission ratio change rotation, despite the fact that due to transition ratio change rotation the cone assemblies are rotated clockwise, for the same reasons discussed earlier. A detailed control scheme to reduce transition flexing during transmission ratio change is described after the rotational movements between the transmission pulleys for different rotational positions and transmission ratio changes description.

And once both torque transmitting member CS3C-M1 23C-M1, which is positioned on the lower half, and torque transmitting member CS3D-M1 23D-M1 are in contact with their transmission belts, see FIGS. 29A & 29B, the adjuster AD3 103 is used to compensate for transmission ratio change rotation. As discussed earlier, here the direction of the transmission ratio change rotation is simply opposite from that were the transmission ratio is decreased. And as described before here a larger angle between the midpoint of a torque transmitting member and point N, results in a larger transmission ratio change rotation. Previously it was described that when the transmission ratio is decreased and torque transmitting member CS3C-M1 23C-M1 is positioned on the lower half and both torque transmitting members are in contact with their transmission belt, the adjuster AD3 103 needs to rotate transmission pulley PU1C 41C clockwise relative to transmission pulley PU1D 41D. Hence here, the adjuster AD3 103 needs to rotate transmission pulley PU1C 41C counter-clockwise relative to transmission pulley PU1D 41D. As discussed previously, here the pulling load in the transmission pulleys will be used to control the rotation of adjuster AD3 103. Once the pulling load in transmission pulley PU1D 41D decreases below a preset low limit value relative to the pulling load in transmission pulley PU1C 41C, the adjuster AD3 103 rotates transmission pulley PU1C 41C counter-clockwise relative to transmission pulley PU1D 41D. And once the difference in pulling load between transmission pulleys has reached an acceptable preset value, the adjuster AD3 103 stops rotating. In instances where the adjuster AD3 103 is not providing sufficient adjustment, in order to prevent excessive flexing of the transmission belts, the transmission ratio changing actuator should stall. Also if desired, in instances where the pulling load in transmission pulley PU1D 41D falls below a lower preset low limit value relative to the pulling load in transmission pulley PU1C 41C, the transmission ratio changing actuator can be temporarily stopped until adjuster AD3 103 has reduced the difference in pulling load between transmission pulley PU1D 41D and transmission pulley PU1C 41C to a corresponding acceptable preset value. This situation corresponds to engagement status 7 (the torque transmitting member of cone assembly CS3D 23D and the torque transmitting member of cone assembly CS3C 23C are engaged), and engagement status 8 (the torque transmitting member of cone assembly CS3D 23D is about to come out of engagement and the torque transmitting member of cone assembly CS3C 23C is engaged). In order to have a pause between the different operations of adjuster AD3A 103A, which are reducing transition flexing and compensating for transmission ratio change rotation, only engagement status 7 should be used to compensate for transmission ratio change rotation and to change the transmission ratio. Hence adjuster AD3A 103A and the transmission ratio changing actuator are not in operation during engagement status 8. If no pause is desired than engagement status 7 and engagement status 8 should be used to reduce transition flexing and to change the transmission ratio.

And once torque transmitting member CS3D-M1 23D-M1 comes out of contact with its transmission belt, adjuster AD3 103 is used to reduce transition flexing. This situation corresponds to engagement status 1 (only the torque transmitting member of cone assembly CS3C 23C is engaged), and engagement status 2 (the torque transmitting member of cone assembly CS3C 23C is engaged and the torque transmitting member of cone assembly CS3D 23D is about to come into engagement). In order to have a pause between the different operations of adjuster AD3A 103A, which are reducing transition flexing and compensating for transmission ratio change rotation, only engagement status 1 should be used to compensate for transmission ratio change rotation and to change the transmission ratio. Hence adjuster AD3A 103A and the transmission ratio changing actuator are not in operation during engagement status 2. If no pause is desired than engagement status 1 and engagement status 2 should be used to reduce transition flexing and to change the transmission ratio. However in this instance the adjuster AD3 103 is not used to compensate for transmission ratio change rotation, despite the fact that transmission ratio change rotation rotates cone assembly CS3C-M123C-M1, and hence output shaft SH8 18, clockwise. Since some clockwise rotation applied to the output shaft SH8 18 is not damaging the CVT, and actually increases the total amount of rotation at the output shaft SH8 18 at the expense of the work provided by the transmission ratio changing actuator.

A detailed control scheme to reduce transition flexing during transmission ratio change is as follows, when both torque transmitting members are engaged, then adjuster AD3 103 simply performs as described in the rotational movements between the transmission pulleys for different rotational positions and transmission ratio changes description above. When one torque transmitting member has just disengaged with its transmission belt, adjuster AD3 103 rotates the just disengaged transmission belt relative to its torque transmitting member such that that torque transmitting member is positioned so that it can properly engage with its transmission belt. If required transmission ratio change can be temporarily stopped or slowed down during this period. When there is still time left, then as the transmission ratio is changed, the rotational position of the transmission belt about to be engaged is proportionally adjusted relative to the rotational position of its torque transmitting member. For example, as the pitch diameter is increased, the transmission belt is proportionally moved away from its torque transmitting member about to be engaged such that the proper phase is obtained; and when the pitch diameter is decreased, the transmission belt is proportionally moved towards its torque transmitting member about to be engaged such that the proper phase is obtained. In instances where the adjuster is not able to provide sufficient adjustments (leaves a predetermined tolerance range) the transmission ratio actuator should stop.

Also it is recommended that when only one torque transmitting member is engaged with its transmission belt and the direction of rotation of transmission ratio change rotation is opposite from the direction of rotation of the shaft on which the cone are assemblies are mounted, then the speed of the transmission ratio changing actuator should be limited, based on the feedback of the rotational position sensors SN2E 132E, so that the just disengaged torque transmitting member will not reengage with its transmission belt due to transmission ratio change rotation.

It is recommended that a pause between the different operations of adjuster AD3A 103A, which are reducing transition flexing and compensating for transmission ratio change rotation, is used, in order to have CVT that is reliable and consistent. The pauses should be long enough to account for the inaccuracy of the CVT in determining the proper engagement status. For example, the CVT might assume that it is engagement status 2 while it is still engagement status 1. Also in instances where the direction of rotation of adjuster AD3A 103A from the current operation to the next operation changes, the pauses should be long enough so that adjuster AD3A 103A can come to a complete halt before the next operation starts. If a pause is not used than some improper engagement between a torque transmitting member and its transmission belt might occur due to the reduced duration for reducing transition flexing; and some or an increased amount of stalling of the transmission ratio changing actuator might occur.

The strength of the adjuster AD3A 103A and the transmission ratio changing actuator should be limited such that they cannot cause excessive flexing in the transmission belts. They should stall or slip before they cause excessive flexing in the transmission belts. If slippage limiting torque devices such as friction clutches are used, they should be mounted such that they will not affect the accuracy of the transmission ratio sensor SN1B 131B and if used, the accuracy of the relative rotational position sensor that monitors the rotation between the adjuster body and the adjuster output member of adjuster AD3 103. Also, the preset low limit values, the preset high limit values, the acceptable preset values, and if used, the lower preset low limit values and the higher preset high limit values, should be selected so that they occur before stalling of the transmission ratio changing actuator occurs.

Despite the utilization of adjuster AD3 103, occasional stalling of the transmission ratio changing actuator can still be allowed, as long as the stalling is sufficiently reduced as to justify the cost of the adjuster. Since although it might be theoretically possible to completely eliminate stalling of the transmission ratio changing actuator, by also taking into account the flexibility of the transmission belts, this might not be economically practical. The cost to implement this might not compensate for the additional duration at which the transmission ratio can be changed.

Furthermore, in the instances where adjuster AD3 103 needs to rotate transmission pulley PU1C 41C in the direction the cone assemblies are rotating, adjuster AD3 103 needs to provide a pulling torque, which might be quite large, since it has to overcome the rotational resistance of cone assembly CS3C 23C. This situation is similar to a situation where a load is pulled up a cliff. And in the instances where adjuster AD3 103 needs to rotate transmission pulley PU1C 41C in the opposite direction the cone assemblies are rotating, adjuster AD3 103 needs to provide a releasing torque, which allows transmission pulley PU1C 41C to slip relative to the input shaft. Unlike the pulling torque, the releasing torque does not have to provide torque that overcomes the rotational resistance of cone assembly CS3C 23C. Here when a holding mechanism, which prevents transmission pulley PU1C 41C from freely rotating in the opposite direction the cone assemblies are rotating is used, the only load adjuster AD3 103 needs to exert is due to friction. This situation is similar to a situation where a load is lowered down a cliff using a winch that has a locking mechanism that prevents the load from going down the cliff without any input at the winch. By providing both transmission pulleys with an adjuster, the need of the adjusters to provide a pulling torque can be eliminated. Since here, in order to compensate for transmission ratio change rotation, one adjuster needs to provide a pulling torque, and the other adjuster needs to provide a releasing torque. Hence here the adjusters can be operated such that only the adjuster that needs to provide a releasing torque is active. Also, by providing both transmission pulleys with an adjuster, the adjusters can also be operated as to eliminate any rotation at the output shaft due the changing of the transmission ratio.

Electrical Adjuster (FIGS. 30A AND 30B)

In this section a design for an electrical adjuster 160 that can be used as a transition flexing adjuster, mover adjuster, or adjuster AD3 103 is described.

All the adjusters described in this invention consist of an adjuster body and an adjuster output member, that can rotate relative to the adjuster body. In order for the adjuster to transmit torque from a transmission pulley or a cone assembly that is fixed to the adjuster output member to the shaft to which the adjuster body is fixed, the adjuster output member has to be able to hold the adjuster output member fixed relative to the adjuster body despite the fact that torque is applied at the adjuster output member. This can be can be achieved by using an electrical brake or a holding mechanism.

For the electrical adjuster 160, shown as top-view in FIG. 30A and as a front-view in FIG. 30B, a holding mechanism is used. Here the adjuster motor 160-M1 drives a worm gear 160-M2, which engages with an adjuster gear 160-M3. The helix angle of the worm gear 160-M2, $\alpha$, is designed such that the worm gear 160-M2 can drive the adjuster gear 160-M3 but the adjuster gear 160-M3 can't drive the worm gear 160-M2. Hence here, the worm gear 160-M2 and the adjuster gear 160-M3 form the holding mechanism that allows the torque applied at the adjuster output member to be transmitted to the adjuster body.

The body of the adjuster consists mainly of an attachment sleeve 160-M4, which has an attachment sleeve arm 1 160-M4-S1, an attachment sleeve arm 2 160-M4-S2, an adjuster motor holder 160-M7, and a counter-weight 160-M8. The attachment sleeve 160-M4 can be fixed to an input shaft, an output shaft, or a spline sleeve, so that it is rotatably and axially constrained relative to the shaft or sleeve on which it is attached using a electrical adjuster set screw 160-M5. Extending radially outwards from the side surfaces of the attachment sleeve 160-M4 are the two attachment sleeve arms 160-M4-S1 and 160-M4-S2. Attached to attachment sleeve arm 1 160-M4-S1 is the adjuster motor holder 160-M7, on which the adjuster motor 160-M1 is pressed in such that due to friction, the adjuster motor 160-M1 can not move axially or rotate relative to the adjuster motor holder 160-M7. And attached to the attachment sleeve arm 2 160-M4-S2 is counter-weight 160-M8, which is used to counter-balance the centrifugal force of the adjuster motor holder 160-M7, the adjuster motor 160-M1, and the worm gear 160-M2. Using another adjuster motor with a worm gear to counter-balance the centrifugal force of the existing adjuster motor 160-M1 and worm gear 160-M2 should also work. The additional adjuster motor can be used to increase the torque capacity of the electrical adjuster 160, or it can be used as a back-up in case the main adjuster motor 160-M1 fails.

And extending axially backwards from the attachment sleeve 160-M4 are four attachment sleeve fins 160-M4-S3, spaced at 90 deg. from each other, on which two electrical rings 160-M6 are securely pressed in, as to prevent them from rotating or from moving axially relative to the attachment sleeve fins 160-M4-S3. Each electrical ring 160-M6 is connected to a pole/connection of the adjuster motor 160-M1. The surfaces of the attachment sleeve fins 160-M4-S3 in contact with the electrical rings 160-M6 are insulated such that the electricity directed to the electrical rings 160-M6 by some electrical brushes are directed to the electrical poles of the adjuster motor 160-M1 by electrical cables 160-M9. If an electric motor that requires more than two input signals is used, than additional electrical rings 160-M6 and electrical cables 160-M9 are needed.

Positioned axially in front of the attachment sleeve 160-M4 is an attachment sleeve flange 160-M4-S4, which is larger in diameter than the main body of attachment sleeve 160-M4. And positioned axially in front of the attachment sleeve flange 160-M4-S4 is an attachment sleeve extension 160-M4-S5, which is shaped like a hollow cylinder which has a smooth side surface, except at its front end, were it is threaded.

The adjuster gear 160-M3, with which the worm gear 160-M2 engages, is shaped like a spur gear, that has a centrically positioned cylindrical extension at its front surface. The spur gear shaped portion of adjuster gear 160-M3 is labeled as spur gear 160-M3-S1. And shaped axially in front of the spur gear 160-M3-S1 is an adjuster gear extension 160-M3-S2, which is shaped like a hollow cylinder, which center is positioned at the center of the spur gear 160-M3-S1. And positioned axially in front of the adjuster gear extension 160-M3-S2 is an adjuster gear flange 160-M3-S3, which is shaped like a disk that has a thick rim. The rim portion of adjuster gear flange 160-M3-S3 extends forwards beyond the surface of its disk shape. On the rim portion of the adjuster gear flange 160-M3-S3, two bolt holes that can be used to attach the electrical adjuster 160 to a torque transmitting device such as a cone assembly, a transmission pulley, an attachment extension on which the telescopes of a torque transmitting member can be attached, etc. The adjuster gear 160-M3 also has a centrically positioned hole that goes through all shapes of the adjuster gear 160-M3, so that it can be slid onto the attachment sleeve extension 160-M4-S5. When adjuster gear 160-M3 is slid onto attachment sleeve extension 160-M4-S5 until the back surface of adjuster gear 160-M3 is in contact with the attachment sleeve flange 160-M4-S4, the threaded portion of attachment sleeve extension 160-M4-S5 is not covered by the disk shaped portion of adjuster gear flange 160-M3-S3 but is only covered by its flange shaped portion. The engagement between the back surface of adjuster gear 160-M3 and the attachment sleeve flange 160-M4-S4 prevents the adjuster gear 160-M3 from moving axially backwards relative to the attachment sleeve 160-M4, and in order to prevent the adjuster gear 160-M3 from moving axially forwards relative to the attachment sleeve 160-M4, an electrical adjuster nut 160-M10 is threaded onto the threaded portion of the attachment sleeve extension 160-M4-S5. The width of the electrical adjuster nut 160-M10 should be less than the thickness of the rim shape of adjuster gear flange 160-M3-S3. Since the adjuster gear 160-M3 has to rotate relative to the attachment sleeve 160-M4, friction between the engaging surfaces of the attachment sleeve 160-M4, the adjuster gear 160-M3, and the electrical adjuster nut 160-M10 should be minimized. This can be done by coating the engaging surfaces of the adjuster gear with bronze.

It might also be useful to have a limiting clutch attached between the shaft of the adjuster motor and the worm gear, as a safety measure in case the controlling computer fails to control the electrical actuator properly. It is also recommended that a housing that protects the components of the electrical adjuster from dirt is used.

CVT 1.2 (FIG. 31)

This CVT, which is shown in FIG. 31, is almost identical to CVT 1.1, which is shown in FIG. 12, except that here cone assembly 22B is replaced with a transmission pulley 41; and a transmission belt and transmission belt tensioning mechanism, used in CVT 2.1, is used here. In this case only one moveable adjuster, one transition flexing adjuster, one rotational position sensor, and one relative rotational position sensor is needed.

CVT 2.2 (FIG. 32)

CVT 2.2, shown in FIG. 32, is identical to CVT 2.1, which is shown in FIG. 23, except that here no torque sensors are used to control the relative rotational position of the transmission pulleys. Here only the rotational position sensors are used to control the rotational position of the adjuster mounted transmission pulley in order to reduce transition flexing and compensate for transmission ratio change rotation. Here in order to compensate for transmission ratio change rotation, the rotational position of the adjuster mounted transmission pulley is controlled based on the results obtained from the equation shown in FIG. 25, where $\Delta\theta$ from the adjuster mounted cone assembly is subtracted from $\Delta\theta$ of the non-adjuster mounted cone assembly. It is preferred that counter-clockwise rotations are considered positive and clockwise rotations are considered negative. Here the values for $\theta$ should be continuously recalculated at short enough intervals as to minimize stalling of the transmission ratio changing actuator, since the values for $\theta$ continuously change as the cone assemblies are rotating. Also here, only $\theta$ for one cone assembly needs to be monitored, since the controlling computer can determined $\theta$ for the other cone assembly mathematically. Also for configurations were the change in pitch diameter is large, the equation shown in FIG. 25 is not very accurate. This is because as described earlier, as the pitch diameter is changed, the lengths of the transmission belts from their point N to the points where the horizontal mirror line of the transmission pulleys intersect the surfaces of the transmission pulleys remain almost constant only for small changes in pitch diameter. However, this should not be a problem, since here the values for $\theta$ are calculated at short intervals so that the changes in pitch diameter between one calculated value and its subsequent calculated value should be small. And some discrepancy between the actual values and the calculated values for $\Delta\theta$ can be compensated by some flexing of the transmissions belts. However, if desired a more accurate equation for calculating $\Delta\theta$, which takes into account the changes in pitch diameter and which will be referred to as the adjusted equation, is presented in the following paragraphs.

The adjusted equation, takes into account the changes in $\theta$ due to the change in the radius of the cone assembly where its torque transmitting member is positioned as its pitch diameter is changed, labeled as $d\theta/dR$; and takes into account the rotation of the cone assembly also due to the change in the radius, labeled as $d\theta_{rot}/dR$. For the adjusted equation, first the equation shown in FIG. 25 is modified by replacing $\theta_1$ with $(\theta_1+d\theta/dR)$; and then $d\theta_{rot}/dR$ is added to the modified equation. Here in instances were $\theta$, $\theta_1$ in FIG. 25, increases with the change in radius, $d\theta/dR$ is positive, and in instances were $\theta$ decreases with the change in radius, $d\theta/dR$ is negative. Also, in instances were $d\theta_{rot}/dR$ increases the value for $\Delta\theta$ with the change in radius, $d\theta_{rot}/dR$ is positive, and in instances were $d\theta_{rot}/dR$ decreases the value for $\Delta\theta$ with the change in radius, $d\theta_{rot}/dR$ is negative. Note, here the positive and negative signs for $d\theta/dR$ and $d\theta_{rot}/dR$ do not have anything to do with the direction of rotation of the cone assembly, since at this stage the values for $\theta$ and $\Delta\theta$ are considered positive regardless of the direction of rotation of the cone assembly. However, once the magnitudes for $\Delta\theta$ has been calculated using the adjusted equation, then the signs for the $\Delta\theta$s based on the direction of their rotation are assigned. As before, it is preferred that counter-clockwise rotations are considered positive and clockwise rotations are considered negative A rough estimation for the values for $d\theta/dR$ and $d\theta_{rot}/dR$, which here are assumed to be identical, can be obtained experimentally. This can be done by using a configuration for a CVT 2 where only one cone assembly is coupled to its transmission pulley by a transmission belt. Also in order to monitor $d\theta/dR$ and $d\theta_{rot}/dR$ as the pitch diameter, and hence radius, of the coupled cone assembly is changed, a computer that can monitor the rotational position of the coupled cone assembly and the transmission ratio via appropriate sensors is needed. The experiment is conducted by first positioning the transmission belt at the smallest pitch diameter, and positioning the midpoint of the torque transmitting member at the location where the transmission belt first touches the upper surface of the cone assembly. Then, the transmission belt is moved towards the largest pitch diameter, while the transmission ratio and the rotation of the cone assembly is continuously monitored by the computer. The computer can then use this information to compute the values for $d\theta/dR$ and $d\theta_{rot}/dR$, which can then be used in the adjusted equation.

The method for determining $d\theta/dR$ and $d\theta_{rot}/dR$ described in the previous paragraph might not be accurate enough for some applications. If this is the case, then the values for $d\theta/dR$ can be determined by again using a configuration for a CVT 2 where only one cone assembly is coupled to its transmission pulley by a transmission belt. However here, it might be easier to use a cone assembly that does not have a torque transmitting member. The experiment is conducted by first positioning the transmission belt at the smallest pitch diameter and then moving it towards the largest pitch diameter while continuously monitoring the location of point N, which is the point where the transmission belt first touches the upper surface of the cone assembly. Here the movement of point N as the pitch diameter, and hence radius, is changed is $d\theta/dR$. And the values for $d\theta_{rot}/dR$ can be determined by the same method used in the previous paragraph. However here instead of moving the transmission belt in one step, the transmission belt should be moved in a stepwise manner. So that by making adjustments as necessary, it can be assured that the midpoint of the torque transmitting member is positioned at or close enough to point N each time the pitch diameter is changed.

Also in cases where acceptable flexing in the transmission belts can not compensate for the inaccuracy of the equation shown in FIG. 25 or its adjusted equation, stalling of the transmission ratio changing actuator occurs.

CVT 2.3 (FIG. 33)

CVT 2.3, shown in FIG. 33, is identical to CVT 2.1, except that here two adjusters are used, one for each transmission pulley. In order to reduce transition flexing any or both adjusters can be used. The simplest method is to designate an adjuster that will be used to reduce transition flexing so that only that adjuster is used to reduce transition flexing unless there is a problem with the designated adjuster so that the other adjuster, which functions as a back-up, is used to reduce transition flexing. Another method is to first arbitrarily designate an adjuster that will be used to reduce transition flexing until during transmission ratio change an instance occurs where the direction of rotation for compensating for transmission ratio change rotation is different from the direction of rotation for reducing transition flexing, at which the adjuster that was not used for compensating for transmission ratio change rotation is used to reduce transition flexing. That adjuster will then be used to reduce transition flexing, unless there is a problem, until the next occurrence at which the direction of rotation for compensating for transmission ratio change rotation is different from the direction of rotation for reducing transition flexing, at which again the adjuster that was not used for compensating for transmission ratio change rotation is used to reduce transition flexing, which might or might not be the same adjuster that is currently used to reduce transition flexing. If desired both adjusters can be used to reduce transition flexing simultaneously.

If both adjusters are used to reduce transition flexing simultaneously or in instances where both adjusters are rotating while only one torque transmitting member of a cone assembly is engaged, the "phase for cone assembly CS3C 23C" is obtained by adding the "phase for cone assembly CS3C 23C" based on the action of the first adjuster to the "phase for cone assembly CS3C 23C" based on the action of the second adjuster; the same method described earlier in the Adjuster System for CVT 2 section should be used to determine each. And in the same manner the "phase for cone assembly CS3D 23D" is obtained by adding the "phase for cone assembly CS3D 23D" based on the action of the first adjuster to the "phase for cone assembly CS3D 23D" based on the action of the second adjuster. If the "phase for cone assembly CS3C 23C" value obtained from the first adjuster and the second adjuster, is greater than "the value for the amount of adjustment needed in order to rotate one transmission pulley from a position where its teeth are aligned with the teeth of the other transmission pulley, to the next position where its teeth are aligned with the teeth of the other transmission pulley" than "the value for the amount of adjustment needed in order to rotate one transmission pulley from a position where its teeth are aligned with the teeth of the other transmission pulley, to the next position where its teeth are aligned with the teeth of the other transmission pulley" should be subtract from that "phase for cone assembly CS3C 23C" value. And if the "phase for cone assembly CS3D 23D" value obtained from the first adjuster and the second adjuster, is greater than "the value for the amount of adjustment needed in order to rotate one transmission pulley from a position where its teeth are aligned with the teeth of the other transmission pulley, to the next position where its teeth are aligned with the teeth of the other transmission pulley" than "the value for the amount of adjustment needed in order to rotate one transmission pulley from a position where its teeth are aligned with the teeth of the other transmission pulley, to the next position where its teeth are aligned with the teeth of the other transmission pulley" should be subtract from that "phase for cone assembly CS3D 23D" value. In addition, the "phase for cone assembly CS3C 23C" value obtained from the first adjuster and the second adjuster and the "phase for cone assembly CS3D 23D" value obtained from the first adjuster and the second adjuster, should reset each time the adjusters have rotated one transmission pulley relative to the other transmission pulley such that the teeth of the transmission pulleys are aligned again.

And in order to compensate for transmission ratio change rotation and in order to distribute the torque loading on the cone assemblies when both torque transmitting members are transmitting torque, if desired, only the adjuster that need to provide a releasing torque can be made active so as to reduce the required torque capacity of the adjusters, see last paragraph of the Adjuster System for CVT 2 section.

CVT 2.4 (FIG. 34)

CVT 2.4, shown in FIG. 34, is identical to CVT 2.3, except that here no torque sensors are used. Here only the rotational position sensors are used to control the adjusters in order to reduce transition flexing and compensate for transmission ratio change rotation. In order to reduce transition flexing any or both adjusters can be used. And in order the compensate for transmission ratio change rotation, the active adjuster, which is the adjuster that is providing a releasing torque, can be controlled by using the equation shown in FIG. 25 or its adjusted equation as described in the CVT 2.2 section; or by using the over adjustment method describe later in this section.

When the equation shown in FIG. 25 or its adjusted equation is used, in instances where the active adjuster, which is the adjuster that is providing a releasing torque, is providing too little adjustments then the transmission ratio changing actuator should stall before excessive flexing of the transmission belts occur. And in instances where the active adjuster is providing too much adjustment, then the active adjuster should stall or slip before excessive flexing of the transmission belts occur. Stalling of the active adjuster might be preferred over stalling of the transmission ratio changing actuator, since stalling of the active adjuster will not reduce the duration at which the transmission ratio can be changed. Therefore, a more conservative estimation for the equation shown in FIG. 25 or its adjusted equation, see the CVT 2.2 Section, might be preferred.

Furthermore, instead of using the equation shown in FIG. 25 or its adjusted equation to control the adjusters, a simpler and more effective method might be to use the over adjustment method. In this method, during transmission ratio change, when both torque transmitting members are in contact with their transmission belt, the active adjuster, which should be the adjuster that is providing a releasing torque, continuously rotates so as to provide more adjustment than required. Here when adjustment is required, the active adjuster will provide adjustments and when not, the adjuster will simply stall or slip and flex the transmission belts within an acceptable limit. In order to ensure this, the torque of the adjusters should be small enough so that the adjusters cannot excessively flex the transmission belts or a slipping clutch that ensures this can also be used. Also for the over adjustment method, in instances where the active adjuster is not providing sufficient adjustment the transmission ratio changing actuator should stall or stop.

CVT 2.5 (FIG. 35)

CVT 2.5, which is shown in FIG. 35, is almost identical to CVT 2.1; however here in order to reduce transition flexing, the relative rotational movements between torque transmitting member 11 and torque transmitting member 22, as described for CVT 1.1, is used for torque transmitting member CS3C-M1 23C-M1 and torque transmitting member CS3D-M1 23D-M1. In order to achieve this, cone assembly CS3C, has to be rotated relative to cone assembly CS3D 23D or vice-versa. Hence here an adjuster AD4 104, that can adjust the rotational position of cone assembly CS3D 23D relative to cone assembly CS3C 23C is used.

Differential Adjuster Shaft for CVT 2 (FIGS. 36, 37, 38, 39, 40, 41, 42, 43A, 43B, 43C, 44, 45, 46 47, 48)

In this section differential adjuster shafts which can be used to replace the shaft on which the transmission pulleys are mounted of a CVT 2 will be presented. Here first the advantages of using a differential adjuster shaft, which is a shaft or spline that uses a differential, in a CVT 2 will be described. Then, the preferred and alternate configurations for differential adjuster shafts will be described. Next, the mounting details of a differential adjuster shaft, so as to allow axial movements for it's transmission pulleys, will be described.

As described in the previous sections, in a configuration where each transmission pulley is mounted on an adjuster, in order to distribute the torque loading on the cone assemblies when both torque transmitting members are transmitting torque and in order to compensate for transmission ratio change rotation, only the adjuster that needs to provides a releasing torque can be made active. Hence under this configuration, unlike the configuration where only one adjuster is used, the adjusters do not have to provide a pulling torque. And not having to provide a pulling torque can significantly lower the torque requirements of the adjuster. However, the obvious disadvantage for this configuration is that here two adjusters are needed instead of one.

By the use of a differential adjuster shaft, such as differential adjuster shaft 1 shown in FIG. 36, the need for an adjuster to provide a pulling torque can be eliminated while only using one adjuster. In FIG. 36, the power from the driving source is directed to the differential 212 through the engagement of power gear 210, keyed on differential adjuster input shaft 211, and the differential outer teeth 212-S1. Differential 212 has a differential shaft 213A and a differential shaft 213B, which are mounted in the same manner as the rear axles of a car are mounted on their rear differential. Using this mounting, the rotational position of differential shaft A 213A and differential shaft B 213B can be adjusted relative to the rotational position of the differential, in manner such that any rotation of differential shaft A 213A relative to the housing of the differential results in the same amount but oppositely directed rotation of the differential shaft B 213B relative to the housing of the differential and vice-versa. Then a transmission pulley PU2A 42A is keyed to differential shaft A 213A and transmission pulley PU2B 42B is keyed to differential shaft B 213B. In order to reduce transition flexing and compensate for transmission ratio change rotation the rotational position of transmission pulley PU2A 42A relative to transmission pulley PU2B 42B needs to be controllably adjusted. In order to achieve this, an adjuster AD5 105, which has an adjuster body AD5 105-M1, fixed to an adjuster shaft A 214A, and an adjuster output member AD5 105-M2, fixed to an adjuster shaft B 214B, is used. Here adjuster AD5 105 is used to controllably adjust the rotational position of adjuster shaft A 214A relative to adjuster shaft B 214B. In order to reduce transition flexing, adjuster AD5 105 needs to provide proper clockwise or counter-clockwise rotation. Here the amount of adjustment provided is measured by a relative rotational position sensor 133, which is mounted on the shaft end of adjuster body AD5 105-M1 so that it can measure the amount that adjuster output member AD5 105-M2 rotates relative to adjuster body AD5 105-M1. And in order to compensate for transmission ratio change rotation, adjuster AD5 105 continuously rotates the transmission pulley that tends to rotate clockwise relative to the other transmission pulley, clockwise at full capacity so as to provide more adjustment than required. Here when adjustment is required the active adjuster will provide adjustment and when not, the adjuster will simply stall or slip and flex the transmission belts within an acceptable limit. In order to ensure this, the torque of the adjusters should be small enough or a slipping clutch that ensures this can also be used. Adjuster shaft A 214A is then coupled to differential shaft A 213A through the engagement of an adjuster shaft gear 215, keyed on adjuster shaft A 214A, and a differential shaft gear 216, keyed on differential shaft A 213A. And like adjuster shaft A 214A, adjuster shaft B 214B is then also coupled to differential shaft B 213B through the engagement of a adjuster shaft gear 215 and a differential shaft gear 216.

An alternate configuration for a differential adjuster shaft, which is referred to differential adjuster shaft 2, is shown in FIG. 37. This design is identical to differential adjuster shaft 1; except here, in order to control the rotational position between its differential shafts, which here are labeled as differential shaft C 213C and differential shaft D 213D, instead of using adjuster shafts coupled by gears, here the adjuster body AD5 105-M1 is fixed to the housing of its differential, which here is labeled as differential A 212A; and the adjuster output member AD5 105-M2 is keyed to differential shaft C 213C. And as in differential adjuster shaft 1, here a relative rotational position sensor 133 is mounted on the shaft end of adjuster body AD5 105-M1.

Another alternate configuration for a differential adjuster shaft, which is referred to differential adjuster shaft 3, is shown in FIG. 38. This design is identical to differential adjuster shaft 2; except here, in order to control the rotational position between the differential shafts, the rotational position of differential pinion, which here is labeled as differential B pinion 2 212B-M3 of its differential, which here is labeled as differential B 212B, is adjusted. The details of differential B 212B is shown in FIG. 39, it consists of differential B pinion 212B-M1 and differential B pinion 2 212B-M3, which are rotatable mounted on the housing of the differential and which engage with a differential B gear 1 212B-M2 and a differential B gear 2 212B-M4. Each differential gear is fixed to a differential shaft. Here differential B pinion 2 212B-M3 has a differential B pinion 2 shaft 212B-M3-S1, which extends through the housing of the differential. And to this shaft, the adjuster output member AD5 105-M2 is keyed, while the adjuster body AD5 105-M1 is fixed to the housing of the differential, via differential B attachment sleeve 212B-S2, which is shaped like a cylinder for which two opposite wall sections have been removed, see FIG. 38. And as in differential adjuster shaft 1, here a relative rotational position sensor 133 is mounted on the shaft end of adjuster body AD5 105-M1. In order to properly balance the differential, a differential B counter-weight 212B-S3 is fixed opposite of the adjuster AD5 105 on the housing of the differential. Furthermore, since the differential is rotating relative to the frame, the ring and brush connection described earlier can be used to transmit electrical signals from the computer to adjuster AD 105 via electrical rings mounted on the body of the differential and cables.

Another alternate configuration for a differential adjuster shaft, which is referred to differential adjuster shaft 4, is shown in FIG. 40. This design is identical to differential adjuster shaft 3, except here, no adjuster output member is attached to a pinion shaft of its differential and no adjuster body is attached to the differential, via an attachment sleeve. Instead, here a differential brake 217 is used to brake or release a pinion shaft of its differential, see FIG. 40, which shows the details of the differential used here, which is labeled as differential C 212C. In order to achieve this, differential brake 217 has a differential brake pad, not shown, which can be controlled to brake or release differential C pinion 2 shaft 212C-M3-S1 of differential C pinion 2 212C-M3. And in order to properly balance the differential, a differential C counter-weight 212C-S3 is fixed opposite of the differential brake 217 on the housing of the differential. And in order to control differential brake 217, the computer of the CVT is used. Since the differential is rotating relative to the frame, the ring and brush connection described earlier can be used to transmit electrical signals from the computer to the differential brake via electrical rings mounted on the differential. Braking the differential C pinion shaft 2 212C-M3-S1 locks the differential, so that no relative rotation between the differential shafts 213A and 213B, and the housing of the differential is allowed. And releasing the pinion shaft releases the differential, and this allows the differential shafts to rotate freely relative to the housing of the differential. The differential should be locked under all conditions, except in instances where the rotational position of the transmission pulleys relative to each other need to be adjusted in order to reduce transition flexing and during transmission ratio change. As described earlier, in order to reduce transition flexing, the rotational position between the transmission pulleys is adjusted while only one torque transmitting member is in contact with its transmission belt. In this instance, the pulling load on the transmission pulleys is different, one pulley is transmitting torque while the other is not. So by releasing the differential, the rotational position between the transmission pulleys can be adjusted. And in order to accurately adjust the rotational position between the transmission pulleys, a relative rotational position sensor 133 is mounted on the housing of differential C 212C so that it can measure the amount that differential shaft 213A rotates relative to the housing of differential C 212C. Furthermore, as described earlier, during transmission ratio change, it is desirable to maintain an equal pulling load on the transmission pulleys, and releasing the differential will achieve this, since here the pulley that is transmitting more torque is forced to rotate slower than the other pulley, and this increases the pulling load on the other pulley. In any case, since releasing the differential allows free relative rotation between the transmission pulleys, excessive stresses in the transmission belts due to transmission ratio change rotation can not occur.

In addition, for differential adjuster shaft 4, it is difficult to accurately control the relative rotational position between the differential shafts using the differential brake 217. Since when differential C pinion shaft 2 212-M3-S1 is rotating, it does not stop immediately after the brake is applied. In order to better control differential adjuster shaft 4 using the same locking and releasing method an index wheel mechanism shown partially in FIGS. 42, 43A, 43B, and 43C might be used. Like the differential brake, the index wheel mechanism is used to lock or release its differential, which here is labeled as differential D 212D, see FIG. 42. The Index wheel mechanism consist of an index wheel mechanism frame 220, an index wheel 21, a locking pin 222, a locking pin spring 223, a solenoid A 224, a solenoid A spring 225, and a solenoid B 226. The index wheel 221, which rotational movements is controlled by locking pin 222, solenoid A 224, and solenoid B 226, is used to control the rotational movements of differential D pinion 2 212D-M3. In order to achieve this, index wheel 221 can be keyed to differential D pinion 2 shaft 212-M3-S1. However, in order to increase the resolution of the index wheel mechanism, it is recommended that one or several set of gears, that reduces the amount of rotation of the index wheel that is transmitted to the pinion shaft are used. In FIG. 42, which shows a partial side-view of differential 212D, which utilizes the index wheel mechanism, the rotational output of index wheel 221 is reduced by using a small index wheel mechanism gear 227 that is coupled to a large index wheel mechanism gear 228. The large index wheel mechanism gear 228 is then keyed to differential D pinion 2 shaft 212-M3-S1. More gears can be used for further refinements. And in order to properly balance the differential, a differential D counter-weight 212D-S3 is fixed opposite of the index wheel mechanism on the housing of the differential.

The physical description of the index wheel mechanism is described below. A partial top-view of the index wheel mechanism is shown in FIG. 43A. In order to lock index wheel 221, locking pin 222 is inserted into a groove of index wheel 221, see FIG. 43A. Locking pin 222 consist of two shapes, a locking pin lock 222-S1 and a locking pin rod 222-S2. The locking pin rod 222-S2 is slideably inserted into a matching hole of solenoid A 224, so that it can only slide axially relative to solenoid A 224. However, before locking pin rod 222-S2 is inserted, a locking pin spring 223 is slid into locking pin rod 222-S2. The locking pin spring 223 forces locking pin lock 222-S1 away from solenoid A 224. Furthermore, locking pin lock 222-S1 is magnetized, so that by energizing solenoid A 224, locking pin lock 222-S1 can be pulled towards solenoid A 224. In addition, on the surface of solenoid A 224, which is facing away from index wheel 221, two solenoid A rods 224-S1 exist. The solenoid A rods 224-S1, are slideably inserted into a matching holes of solenoid B 226 so that they can only slide axially relative to solenoid B 226. However, before the solenoid A rods 224-S1 are inserted, a solenoid A spring 225 is slid into each solenoid A rod 224-S1. The solenoid A springs 225 force solenoid A 224 away from solenoid B 226.

The operation of the index wheel mechanism, which is used to either lock or release index wheel 221, is described below. The locking position of the index wheel mechanism is shown in FIG. 43A. Here locking pin lock 222-S1 is positioned inside a groove of index wheel 221, and this prevents index wheel 221 from rotating. In order to stepwise control the rotational position of index wheel 221, solenoid A 224 is energized. This lifts locking pin lock 222-S1 out of the groove of index wheel 221, but not out of the triangular portion of that groove, see FIG. 43B. Here by using a pulse signal for solenoid A, the index wheel 221 is released one groove at a time. This method can be used to adjust the rotational position between the transmission pulleys to adjust for transition flexing. The amount of adjustment provided can be determined from the amount of pulse signals provided, or from a relative rotational position sensor 133 mounted on the housing of differential D 212D so that it can measure the amount that differential shaft 213A rotates relative to the housing of differential D 212D. And in order to completely release the index wheel, solenoid A 224 and solenoid B 226 should be energized. This lifts locking pin lock 222-S1 out of the triangular portion of its groove, see FIG. 43C. This method should be used during transmission ratio change. Although releasing the index wheel can also be accomplished by continuously energizing solenoid A 224, it is preferably to also use solenoid B 226. By only energizing solenoid A 224, the locking pin lock 222-S1 is not lifted out of the triangular portion of the index wheel, so that loss of energy due to the compression of the solenoid A spring 225 occurs as the index wheel is rotating.

Furthermore, since the index wheel mechanism is rotating relative to the frame where its controlling computer is attached, the ring and brush connection described earlier can be used to direct signals from the computer to the solenoids. An alternate index wheel 221B is shown in FIG. 43D. It is basically a wheel that has cavities for locking pin 222 evenly spaced along its circumference.

If friction torque transmitting members are used then an alternate configuration for a differential adjuster shaft, which is referred to as differential adjuster shaft 5, can be used. A configuration for a CVT that uses a differential adjuster shaft 5 is shown as a top-view in FIG. 44. This CVT is similar to a CVT 2 except that here the shaft on which the transmission pulleys are mounted is replaced with a differential adjuster shaft 5. On the housing of the differential of differential adjuster shaft 5 a gear that engages with a gear on the output shaft is keyed. For differential adjuster shaft 5, the differential does not have an adjuster so that the transmission pulleys are free to rotated relative to each other. For the CVT utilizing differential adjuster shaft 5, the shaft or spline on which the cone assemblies are mounted should be the input shaft/spline.

If the arc length of the torque transmitting arc of the friction torque transmitting members is limited such that each transmission belt will never cover the entire non-torque transmitting arc of the cone assembly to which they are coupled, then there might be instances were only one cone assembly is engaged with its transmission belt, and since the transmission pulleys are free to rotate relative to each other here occasional slippage, where torque at the input shaft/spline is not transmitted to the output shaft/spline, might occur. This can be eliminated by ensuring that both torque transmitting arcs are always engaged with their transmission belt, this can be achieved by selecting the proper arc length for the torque transmitting arcs and if necessary by sufficiently increasing the engagement coverage of the transmission belts by using supporting pulleys. A supporting pulley, which is labeled as supporting pulley 1700, is shown in FIGS. 45 and 46, which show partial front views of a CVT utilizing differential adjuster shaft 5. The position of the supporting pulleys at different transmission ratios can be controlled in the same manner as the tensioning wheels described in the description for CVT 2. Depending on the configuration of the CVT, the mounting method described in the Sliding Cone Mounting Configuration or the spring-loaded slider pulley assemblies C 720C described latter in this patent in the Alternate CVT's section can also be used for supporting pulleys 1700. Under this configuration, there might be instances where a transmission belt covers the entire non-torque transmitting arc of a cone assembly; hence during transmission ratio change occasional stalling of the actuator that is used to change the transmission ratio might occur. If it is undesirable to have occasional stalling of the actuator that is used to change the transmission ratio during transmission ratio change, then the arc lengths of the torque transmitting arcs should be limited such that the transmission belts will never cover an entire non-torque transmitting arc. Under this configuration, slippage can be limited by locking the differential of differential adjuster shaft 5 during all instances except during transmission ratio change. Here the locking devices used for differential adjuster shaft 4 can be used.

Furthermore, in order to change the transmission ratio unless the axial position of the cones can be changed, the axial position of the transmission pulleys need to be changed. In order to emphasize the function of the differential adjuster shaft in addressing the transition flexing and transmission ratio change issue, such detail have been previously omitted. In the following paragraphs, details on how to allow the axial position of the differential adjuster shaft mounted transmission pulleys to be changed will be described. The following details can be applied to any of the differential adjuster shafts described earlier.

A simple method to allow the axial position of the differential adjuster shaft mounted transmission pulleys to be changed can be achieved by simple connecting the differential adjuster shaft and its adjuster shaft, if applicable, to a mover frame 230, which is connected to the mover gear rack 231 which engages a transmission ratio gear that is used to control the transmission ratio, see FIG. 47. Here the differential adjuster shaft and the adjuster shaft should be connected to mover frame 230 so that they move axially with the mover frame but are allowed to rotate relative to the mover frame. This can be achieved by simple having a differential shaft flange 213A-S1 and an adjuster shaft flange 214A-S1 at the end of the shafts. The mover flanges, can than be inserted into a matching cavity in mover frame 230 and secured by mover frame flange plates 230-M1, which are partially glued to mover frame 230. Also since here it might be unpractical to have differential adjuster input shaft 211 move axially with the mover frame 230. The input gear 210 can be mounted on an input gear sleeve 232, which can slide axially on an input gear spline 233, which is used instead of differential adjuster input shaft 211. The input gear sleeve 232 can then be connected by the use of mover arm 230-S1, which has a mover arm bearing 230-M2, to mover frame 230 so that it moves axially with the mover frame. Here mover arm bearing 230-M2 is used to allow the input gear sleeve 232 to rotate relative to the mover arm 230-S1. A more detailed description of the input gear sleeve 232 can be found in the next paragraph, which describes in detail the configuration of a differential spline sleeve 241, which is nearly identical to the input gear sleeve 232.

Another configuration that allows the axial position of the differential adjuster shaft mounted transmission pulleys to be changed is shown in FIG. 48. Here differential shaft A 213A is replaced with differential spline A 240A and differential shaft B 213B is replaced with differential spline B 240B. In addition, here each transmission pulleys is keyed to a differential spline sleeve 241 using a differential spline set-screw 241-M1, so that they are rotatably and axially fixed relative to their differential spline sleeve. The differential spline sleeves 241 have a splined profile that matches the profile of a differential spline 240A and 240B; so that the differential spline sleeves can slide axially relative to their differential spline, but can not rotate relative to their differential spline. Each differential spline sleeve 241 consists of two main shapes, a differential spline sleeve pulley mount shape 241-S1 and a differential spline sleeve bearing mount shape 241-S2. Each differential spline sleeve pulley mount shape 241-S1 is shaped like a round cylinder that has a radial oriented threaded hole that does not extruded through the inner surface of the differential spline sleeve. This hole will be used for a differential spline sleeve set-screw 241-M1. The differential spline sleeve bearing mount shape 241-S2 is also shaped like a round cylinder; however, it is smaller in diameter than the differential spline sleeve pulley mount shape 241-S1 so that a shoulder is formed between the differential spline sleeve pulley mount shape 241-S1 and the differential spline sleeve bearing mount shape 241-S2. Furthermore, the free end of differential spline sleeve bearing mount shape 241-S2 is threaded. The transmission pulleys 42A and 42B are each mounted on their differential spline sleeve pulley mount shape 241-S1 and secured using a differential spline sleeve set-screw 241-M1. And a mover arm A bearing 242-M1, which is a thrust bearing that is tightly inserted into a matching hole of each mover arm A 242-S1 so as to prevent any relative movements between them, is slid into each differential shaft sleeve bearing mount shape 241-S2. Then a differential spline sleeve nut 241-M2 is threaded onto the threaded end of each differential shaft sleeve bearing mount shape, so that the mover arm A bearings 242-M1 are tightly sandwiched between the shoulder formed by their differential spline sleeve pulley mount shape 241-S1 and their differential spline sleeve bearing mount shape 241-S2, and their differential spline sleeve nut 241-M2. Under this set-up, the axial position of the differential spline sleeves 241 depend on the axial position of their mover arms A 242-S1. Also, here the mover arm A bearings 242-M1 allow their differential spline sleeves 241 to rotate without much frictional resistance relative to their mover arms A 242-S1. The mover arms A 242-S1 are then connected to a mover rod 242-S2, which is part of a mover frame A 242, which is used to change the axial position of the torque transmitting members and the transmission pulleys via a gear rack A 243. This mounting configuration can be used for differential adjuster shafts 2, 3, 4, and 5.

In order to support the differential adjuster shafts, support bearings positioned so that they do not interfere with its operation of can be used. As before, the method of supporting the shafts will not be explained in this application, since the technique to do this is well known and a details for this will unnecessarily complicated the description for the invention without adding to the essence of the invention.

Spring-Loaded Adjuster

Another simple method to reduce transition flexing is by using a spring-loaded adjuster that biases a spring-loaded adjuster mounted torque transmitting member towards a neutral position from which it can rotate clockwise and counter-clockwise relative to the shaft on which it is attached. Here first a spring-loaded adjuster AS1 171, which can be used to replace the adjusters AD1A 101A or AD1B 101B of CVT 1.1 will be described, then a spring-loaded adjuster AS2 172 that can be used as an adjuster AD4 104 for CVT 2.4 will be described. It is also recommended that the spring-loaded adjusters are mounted such that they will not affect the accuracy of the sensors of their CVT.

—Spring-Loaded Adjuster AS1 171 (FIGS. 49A-49D)

Another simple method to reduce transition flexing is by having a parallel gap in the slots where the attachment pins used to attach a torque transmitting member to its cone assembly are inserted; and using a spring-loaded adjuster to bias the attachment pins of the gap mounted torque transmitting member towards the center of the gap. This allows for some rotational movement of the gap mounted torque transmitting member in instances where the pitch diameter of the gap mounted torque transmitting member is increased and decreased. In order to achieve this, a spring-loaded adjuster AS1 171 is needed. The spring-loaded adjuster AS1 171 consists mainly of a spring-loaded adjuster shaft 171-M2 that can rotate relative to a spring-loaded adjuster body 171-M1, and is biased by an adjuster spring 171-M3 towards a neutral position, see FIG. 49D. Also in order to mount the telescopes of a gap mounted torque transmitting member to the spring-loaded adjuster shaft 171-M2, a shaft end attachment 171-M4 is attached to the end of the spring-loaded adjuster shaft, see FIG. 49A. The shaft end attachment consist mainly of three shapes that form an inverted U-shape. One leg of the inverted U-shape, which is labeled as shaft end attachment extension arm 171-M4-S1, is shaped like the long leg of the adjuster extension arm AD1A-M2-S2 101A-M2-S2 of adjuster AD1A 101A of CVT 1.1, see FIG. 13, and is used in the same manner, hence it also has a constrainer mechanism CN1A 111A. The other leg of the inverted U-shape, which is labeled as shaft end attachment balancing arm 171-M4-S2, is shaped like the long leg of the adjuster balancing arm AD1A-M2-S3 101A-M2-S3 and is used to balance the centrifugal forces of the shaft end attachment extension arm 171-M4-S1 and its attachments. And the top horizontal member of the inverted U-shape, which is labeled as shaft end attachment mounting plate 171-M4-S3, is shaped like elongated rectangular plate that has a hexagonal cavity at its center. The hexagonal cavity of the shaft end attachment mounting plate 171-M4-S3 is used to securely press in a matching hexagonal notch located at the top end of the spring-loaded adjuster shaft 171-M2, see FIG. 49B. The spring-loaded adjuster body 171-M1 is basically shaped like a hollow cylinder, which has an open top end and a closed bottom end. And the spring-loaded adjuster shaft 171-M2 is basically shaped like a hollow cylinder, which has an open bottom end and a closed top end, see FIGS. 49C and 49D. The inner top end of the spring-loaded adjuster shaft 171-M2 and the bottom end of the spring-loaded adjuster body 171-M1, each have a square shaped notch, which function will be explained later. And the outer top end of the spring-loaded adjuster shaft 171-M2 has a hexagonal notch, which is used to attach the shaft end attachment 171-M4. The outer diameter of the spring-loaded adjuster shaft 171-M2 is slightly smaller than the inner diameter of the spring-loaded adjuster body 171-M1, so that when the spring-loaded adjuster shaft 171-M2 is inserted into the spring-loaded adjuster body 171-M1, only significant rotational movements between them is allowed. Also, the outer surface of the top end portion of the spring-loaded adjuster body is threaded. And the outer surface of the spring-loaded adjuster shaft 171-M2 has a spring-loaded adjuster flange 171-M2-S1, which diameter is slightly smaller than the outside diameter of the spring-loaded adjuster body. The spring-loaded adjuster flange 171-M2-S1 is positioned somewhere between the top end and the bottom end of the spring-loaded adjuster shaft 171-M2. The spring-loaded adjuster flange 171-M2-S1 should be positioned so that a sufficient amount of the spring-loaded adjuster shaft 171-M2 can be inserted into the spring-loaded adjuster body 171-M1 so that sufficient amount of moment and deflection can be resisted by the assembled spring-loaded adjuster AS1 171. An adjuster spring 171-M3 is inserted into the cavity formed by the inner top end surface and inner side surface of the spring-loaded adjuster shaft, and the inner bottom end surface and the bottom portion of the inner side surface of the spring-loaded adjuster body. At both ends of the adjuster spring 171-M3, the wire of the adjuster spring is shaped such that a square shaped loop, on which the square notches of the spring-loaded adjuster shaft and the spring-loaded adjuster body can be tightly inserted, is formed. The length of the adjuster spring 171-M3 is designed such that when the spring-loaded adjuster flange 171-M2-S1 is engaged with the top end surface of the spring-loaded adjuster body, the top end and the bottom end of the adjuster spring is always in contact with the top surface of the spring-loaded adjuster shaft 171-M2 and the bottom surface of the spring-loaded adjuster body 171-M1.

In order to securely fix the axial position of the spring-loaded adjuster shaft 171-M2 relative to the spring-loaded adjuster body 171-M1, a spring-loaded adjuster cap 171-M5 is used. The spring-loaded adjuster cap 171-M5 is shaped like a short cylinder, which has a top surface but not a bottom surface. The top surface of the spring-loaded adjuster cap has a hole at its center, which diameter is slightly larger than the diameter of the spring-loaded adjuster shaft 171-M2, but smaller than the diameter of the spring-loaded adjuster flange 171-M2-S1. And the inner side surface of the spring-loaded adjuster cap 171-M5 has internal threads that can engage with the external threads of the spring-loaded adjuster body 171-M1.

The spring-loaded adjuster 171 is assembled by first inserting the adjuster spring 171-M3 into the spring-loaded adjuster body 171-M1 such that the bottom square shaped loop of the spring-loaded adjuster spring is fully inserted into the square shaped notch of the spring-loaded adjuster body. Then the spring-loaded adjuster shaft 171-M2 is slid into the spring-loaded adjuster body 171-M1, in a manner such that the open end of the spring-loaded adjuster shaft is facing the open end of the spring-loaded adjuster body, and the top square shaped loop of the spring-loaded adjuster spring 171-M3 is fully inserted into the square shaped notch of the spring-loaded adjuster shaft 171-M2. Then the spring-loaded adjuster cap 171-M5 is inserted through the top-end of the spring-loaded adjuster shaft 171-M2 and tighten unto the spring-loaded adjuster body 171-M1 through the engagement of the internal threads of the spring-loaded adjuster cap with the external threads of the spring-loaded adjuster body. The spring-loaded adjuster cap 171-M5 should be tighten unto the spring-loaded adjuster body 171-M1 until the inner top surface of the spring-loaded adjuster cap pushes the spring-loaded adjuster flange 171-M2-S1 of the spring-loaded adjuster shaft 171-M2 towards the top surface of the spring-loaded adjuster body 171-M1, so that axial movements between the spring-loaded adjuster shaft 171-M2 and the spring-loaded adjuster body 171-M1 is minimized. Since the spring-loaded adjuster shaft has to rotate relative to the spring-loaded adjuster body, friction between the engaging surfaces of the spring-loaded adjuster cap, the spring-loaded adjuster shaft, and the spring-loaded adjuster body should be minimized. This can be done by coating the engaging surfaces of the spring-loaded adjuster flange of the spring-loaded adjuster shaft with bronze. However in order to prevent the spring-loaded adjuster cap from loosening, no low friction coating should be applied to internal and external threads. Next in order to be able to properly mount the telescopes of a gap mounted torque transmitting member and a constrainer mechanism to the spring-loaded adjuster shaft 171-M2, the shaft end attachment 171-M4 is attached to the spring-loaded adjuster shaft. In order to achieve this, the hexagonal notch at the outer top surface of the spring-loaded adjuster shaft 171-M2 is pressed into the hexagonal cavity of the shaft end attachment mounting plate 171-M4-S3. Here the dimension of the hexagonal cavity should be slightly smaller than the dimension of the hexagonal notch, so that sufficient friction between them, as to prevent any axial movements between them, is developed when separating forces encountered during normal operation is applied to them.

—Spring-Loaded Adjuster AS2 172 (FIGS. 50A & 50B)

The spring-loaded adjuster AS2 172, shown in FIGS. 50A and 50B, can be used to replace the adjuster AD4 104 in CVT 2.5. The spring-loaded adjuster AS2 172 is identical to the spring-loaded adjuster AS1 171, except that here two radially opposite positioned threaded holes for two limiter rods 172-M1, are drilled into the spring-loaded adjuster shaft 171-M2. And two pairs of radially opposite positioned cylindrical limiter notches 172-M2 are welded on to the outer top surface of the spring-loaded adjuster cap 171-M5. The limiter rods 172-M1 and the limiter notches 172-M2 should be positioned, such that the adjuster spring 171-M3 biases each limiter rod towards the midpoint of the space created between a pair of limiter notches 172-M2. Also here the hexagonal notch of the spring-loaded adjuster shaft 171-M2 is not used to attach shaft end attachment 171-M4, but it is used to mount a cone assembly, which here should have a matching square opening, which should have a dimension such that sufficient friction between the notch and the opening exist as to prevent any significant relative movements between the cone assembly and its spring-loaded adjuster shaft. This adjuster can be further modified by drilling a hole through its entire length. Through this hole a shaft can be slid through. The hole can also have a notch for a key at its spring-loaded adjuster body, which can be used to key the spring-loaded adjuster body to its shaft.

Mechanical Adjuster

In this section a design for a mechanical adjuster AM1 181, that can be used as an adjuster AD4 104, and a mechanical adjuster AM2 182, that can be used as transition flexing adjuster AD1 101 is described. Since it is simpler, here the mechanical adjuster AM1 181, which is for CVT 2.5, will be described before the mechanical adjuster AM2 182, which is for CVT 1.1, is described.

—Mechanical Adjuster AM1 181 (FIGS. 51A, 51B, 52, and 53)

Like the electrical adjuster 160, the mechanical adjuster AM1 181, which is shown in FIGS. 51A and 51B, mainly consists of an adjuster body and an adjuster output member. However here, the rotational position between them is controlled by an adjustable ratio cam mechanism instead of an electrical motor. Here the adjuster body consist mainly of a cam 181-M1, cam sleeve 181-M2, a follower 181-M4, and a follower spring 181-M5. The cam 181-M1 is stationary relative to the shaft where the mechanical adjuster AM1 181 is used. The cam 181-M1 consist mainly of four shapes. The top shape of the cam, top cam shape 181-M1-S1, and the bottom shape of the cam, bottom cam shape 181-M1-S3, have a diameter $D_C$. The right shape of the cam, right cam shape 181-M1-S2 has a diameter $D_1$, and the left shape of the cam, left cam shape 181-M2-S4, also has a diameter $D_1$. Here the diameter $D_C$ is larger than the diameter $D_1$. Between the different shapes of the cam, transition shapes exist so that cam 181-M1 has a smooth continuous surface. The cam sleeve 181-M2 is shaped like a hollow cylinder, which has an open end and a closed end. The closed end of the cam sleeve 181-M2 is shaped like a disk that has an cam sleeve attachment sleeve 181-M2-S2, which is used to attach the shaft where the mechanical adjuster AM1 181 is used, which here is labeled as shaft SH0 10. In order to fix the cam sleeve 181-M2 axially and rotatably to shaft SH0 10, cam sleeve attachment sleeve 181-M2-S2 has a threaded hole for a cam sleeve set screw 181-M3. In addition, cam sleeve 181-M2 has a radial hole, through which follower 181-M4 is inserted. And on top of the radial hole of cam sleeve 181-M2, a cam sleeve constrainer sleeve 181-M2-S3, which has the same inside diameter as the radial hole exist. Also, in order to balance the centrifugal forces due to cam sleeve constrainer sleeve 181-M2-S3, cam follower 181-M4, and portions of the centrifugal forces due to a link AM1-M6 181-M6 and a link AM1-M7 181-M7, a cam sleeve counter-weight 181-M2-S4 is shaped opposite of the cam sleeve constrainer sleeve 181-M2-S3 on the surface of constrainer sleeve 181-M2. Also extending radially outwards from the surface of the cam sleeve 181-M2 is a controller rod counter-weight arm 181-M2-S5. The controller rod counter-weight arm 181-M2-S5 has a hole through which a controller rod counter-weight 181-M11 will be slid through, so as to constrain the rotational position of the controller rod counter-weight 181-M11 relative to cam sleeve 181-M2. The controller rod counter-weight arm 181-M2-S5 is positioned so that a controller rod 181-M10 can be properly slid through the controller slot of the link AM1-M6 181-M6. Also in order to balance the centrifugal forces of the controller rod counter-weight arm 181-M2-S5, a counter-weight arm counter-weight 181-M2-S6 is positioned opposite of the controller rod counter-weight arm 181-M2-S5. The counter-weight arm counter-weight 181-M2-S6 is positioned on the inside surface of cam sleeve 181-M2, so that it does not interfere with the movements of link AM1-M6 181-M6. The follower 181-M4 consist mainly of four shapes. The top shape of the follower, which is labeled as follower top 181-M4-S1, is shaped like a flat bar that has a hole. The shape below it, which is labeled as follower round 181-M4-S2, is shaped like a round rod. During normal operation of the mechanical adjuster AM1 181, this shape of the follower is in contact with the radial hole and the hole of the constrainer sleeve 181-M2-S3 of cam sleeve 181-M2. Follower round 181-M4-S2 should have a dimension such it can only move radially in and out relative to cam sleeve 181-M2. The shape below it, which is labeled as follower shoulder 181-M4-S3, is the shoulder of follower 181-M4. It is shaped like a round disk, which diameter is larger than the diameter of the shape above it. And the bottom shape, which is labeled as follower bottom 181-M4-S4, is shaped like a half sphere. In the mechanical adjuster AM1 181 assembled state, cam 181-M1, which is stationary relative to the shaft, is inserted into the open end of cam sleeve 181-M2 such that they are concentric. And in order to ensure that the follower 181-M4 is always in contact with cam 181-M1, a follower spring 181-M5 is placed between the inner surface of cam sleeve 181-M2 and follower shoulder 181-M4-S3.

The adjuster output member of the mechanical adjuster AM1 181 is shaped like disk, and it will be referred to as the output disk 181-M8. The output disk 181-M8 has two opposite positioned bolt holes, which will be used to attach a cone assembly or a transmission pulley to the output disk. In addition, output disk 181-M8 has an output disk arm 181-M8-S1, which is a radial extension that has a hole. And in order to balance the centrifugal force due the output disk arm 181-M8-S1, and portions of the centrifugal forces due to link AM1-M6 181-M6 and link AM1-M7 181-M7, an output disk counter-weight 181-M8-S2 is shaped opposite of the output disk arm 181-M8-S2 on the surface of output disk 181-M8. In order to control the relative rotation between cam sleeve 181-M2 and output disk 181-M8, a link AM1-M6 181-M6 and link AM1-M7 181-M7, which connect the cam sleeve to the output disk, are used. Link AM1-M6 181-M6 is shaped like a monkey wrench. It has a middle shape, and two end shapes. Each end shape, which is labeled as link shape AM1-M6-S1 181-M6-S1, is shaped like a square plate that has a hole. And the middle shape, which is labeled as link shape AM1-M6-S2 181-M6-S2, is shaped like a slender rectangular plate that has a controller slot. The end shapes are parallel relative to each other but the middle shape is positioned diagonally relative to the end shapes. The other link, link AM1-M7 181-M7 is shaped like flat and slender bar that has two link holes at each of its ends. In addition, the ends of link AM1-M7 181-M7 have a half disk shape, which center is positioned at the center of the holes of link AM1-M7 181-M7.

In order for link AM1-M6 181-M6 and link AM1-M7 181-M7 to connect the cam sleeve 181-M2 to the output disk 181-M8, one end of link AM1-M6 181-M6 is connected to follower 181-M4 by inserting a link bolt 181-M9 through the hole of follower 181-M4, and then securing that bolt using a link nut 181-M12. And the other end of link AM1-M6 181-M6 is connected to one end of link AM1-M7 181-M7 by inserting a link bolt 181-M9 through the other hole of link AM1-M6 181-M6 and a hole of link AM1-M7 181-M7, and then securing that link bolt using a link nut 181-M12. And the other end of link AM1-M7 181-M7 is connected to the output disk arm 181-M8-S1 by inserting a link bolt 181-M9 through the other hole of link AM1-M7 181-M7 and the hole of the output disk arm 181-M8-S1, and then securing that link bolt using a link nut 181-M12. The surfaces of the link bolts and the link nuts that are in contact with follower 181-M4, link AM1-M6 181-M6, link AM1-M7 181-M7, or output disk arm 181-M8-S1, are preferably coated with a low friction material such as oil-impregnated bronze, so that the link AM1-M6 181-M6 and link AM1-M7 181-M7 can rotate without much frictional resistance.

In order to control the relative rotation between cam sleeve 181-M2 and output disk 181-M8, a controller rod 181-M10 is used. The controller rod 181-M10 is a slender steel rod that is bent repeatedly such that a zigzag profile is formed. The zigzag profile consist of two alternating shapes, a pivot shape 181-M10-S1 and a parallel shape 181-M10-S2, that can be slid through the controller slot of link AM1-M6 181-M6. The angle between the pivot shape 181-M10-S1 and the parallel shape 181-M10-S2 should be 90°. The pivot shapes 181-M10-S1 are positioned perpendicular to the long surfaces of link AM1-M6 181-M6, so that they can act as pivots for link AM1-M6 181-M6. And the parallel shapes 181-M10-S2 are positioned parallel to the long surfaces of link AM1-M6 181-M6, so that they can act as constrainers for link AM1-M6 181-M6. The function of the controller rod 181-M10 is to properly adjust the rotation of the output disk 181-M8 relative to the cam sleeve 181-M2 due the profile of the cam 181-M1, by adjusting the pivot location of link AM1-M6 181-M6 or by constraining link AM1-M6 181-M6. By changing the axial position of the controller rod 181-M10 relative to link AM1-M6 181-M6, it can be selected whether a pivot shape 181-M10-S1 or a parallel shape 181-M10-S2 is positioned inside the controller slot of link AM1-M6 181-M6. In instances where a pivot shape 181-M10-S1 is located in the controller slot of link AM1-M6 181-M6, the position of the pivot for link AM1-M6 181-M6 can be changed by changing the axial position of the controller rod 181-M10 relative to link AM1-M6 181-M6. And changing the position of the pivot for link AM1-M6 181-M6, by changing the axial position of controller rod 181-M10 relative to link AM1-M6 181-M6, changes the amount of relative rotation between cam sleeve 181-M2 and output disk 181-M8 due to the profile of cam 181-M1. Furthermore, by inserting a parallel shape 181-M10-S2 into the controller slot of link AM1-M6 181-M6, link AM1-M6 181-M6 is constrained from pivoting, so that despite the profile of cam 181-M1, no relative rotation between cam sleeve 181-M2 and output disk 181-M8 exist. When follower 181-M4 is in contact with a diameter $D_1$ of cam 181-M1, a positive angle, which is referred to as the controller angle, is formed between the flat profile of the controller rod 181-M10 and the controller slot of link AM1-M6 181-M6. The controller angle increases as the pivot is moved towards the follower 181-M4. The amount of relative rotation between the cam sleeve 181-M2 and the output disk 181-M8 increases proportionally with an increase in the controller angle. The diameters $D_1$ should be selected as to eliminate transition flexing. When the follower 181-M4 is in contact with a diameter $D_C$ of cam 181-M2, link AM1-M6 181-M6 is aligned such that the flat profile of controller rod 181-M10 is parallel to the controller slot of link AM1-M6 181-M6. In this configuration the axial position of controller rod 181-M10 relative to link AM1-M6 181-M6 can always be changed.

Furthermore, the zigzag profile of the controller rod 181-M10 and its pattern of axial movements relative to link AM1-M6 181-M6 should be designed based on the information shown in FIGS. 21A and 21C. Here in instances were the circumference of the surface of the cone were the torque transmitting members are positioned is an even multiple of the width of their teeth, so that no relative rotation between cam sleeve 181-M2 and output disk 181-M8 is required, the parallel shape 181-M10-S2 of the controller rod 181-M10 should be positioned inside the controller slot of link AM1-M6 181-M6. And from FIG. 21A, it can be observed that the required amount of rotational adjustment linearly increases as the critical non-torque transmitting arc is increased from an integer space, were it is a multiple of the width of the teeth of the torque transmitting members, until the next integer space is reached. Furthermore, from FIG. 21A, it can be observed that the required amount of rotational adjustment linearly decreases as the critical non-torque transmitting arc is decreased from an integer space until the next integer space is reached. A slightly different set-up is shown in FIG. 21C, here the required amount of rotational adjustment linearly decreases as the critical non-torque transmitting arc is increased from an integer space until the next integer space is reached; and the required amount of rotational adjustment linearly increases as the critical non-torque transmitting arc is decreased from an integer space until the next integer space is reached. Here the pivot shape 181-M10-S1 of controller rod 181-M10 and its pattern of axial movement should be designed so that the position of the pivot can be properly adjusted with the change in pitch diameter so that transition flexing is eliminated or at least minimized. The axial distance between a parallel shape 181-M10-S2 to the next parallel shape 181-M10-S2 should correspond to the same axial distance that corresponds to an increase or decrease of a circumferential length of one tooth of the circumferential surface of the cone assembly where its torque transmitting member is positioned. The proper dimension and shape of the cam 181-M1, the follower 181-M4, the link AM1-M6 181-M6, the link AM1-M7 181-M7, the output disk arm181-M8-S1, the controller rod 181-M10, and the cones, can be determined experimentally. One method would be to first estimate the proper dimension for each part and then adjusting the dimension of the controller rod 181-M10 and its controller rod slot. If that does not work-out then the dimensions of the cam 181-M1 can be adjusted. If this still does not work-out then the dimension of a different part can adjusted and so forth.

Also the controller rod 181-M10 has to be slid through the controller slot of link AM1-M6 181-M6, which is rotating with the cam sleeve 181-M2, which in turn is rotating with shaft SH0 10. Hence, the controller rod 181-M10 has to be attached such that it rotates with shaft SH0 10 but can be moved axially relative to shaft SH0 10. In order to achieve this a controller rod mechanism, that consist of the controller rod 181-M10, a controller rod counter-weight 181-M11, a controller rod slider 181-M13, and a controller rod disk 181-M14, is used. Here in order to constrain the rotational position of the controller rod 181-M10 relative to the controller rod counter-weight 181-M11, the back end of the controller rod 181-M10 and the back end of an controller rod counter-weight 181-M11 are connected to the controller rod slider 181-M13, which slides freely on shaft SH0 10 and is positioned in the back of the controller rod disk 181-M14. And the front end of the controller rod 181-M10 and the front ends of the controller counter-weight 181-M11 are connected to the controller rod disk 181-M14, which is positioned in front of the cam sleeve 181-M2. As described earlier the controller rod counter-weight 181-M11 is slid through controller rod counter-weight arm 181-M2-S5 of cam sleeve 181-M2 so that the controller rod counter-weight 181-M11 rotates with cam sleeve 181-M2. And since controller rod 181-M10 and controller rod counter-weight 181-M11 are rotatably constrained relative to each other, controller rod 181-M10 is rotatably constrained relative to cam sleeve 181-M2. Therefore, controller rod 181-M10 rotates with cam sleeve 181-M2.

The controller rod 181-M10 and the controller rod counter-weight 181-M11, except their ends, are made from a round wire. And in order to avoid any vibrations due to unbalanced centrifugal forces, the weight of controller rod 181-M10 should be identical to the weight of controller rod counter-weight 181-M11. In order to attach controller rod 181-M10 and controller rod counter-weight 181-M11 to controller rod slider 181-M13 and controller rod disk 181-M14, the front-end and the back-end of the controller rod and the controller rod counter-weight are shaped like a straight square wire. The controller rod slider 181-M13 is shaped like a hollow cylinder with an plain end and a flanged end. The inner diameter of the controller rod slider 181-M13 is slightly larger than the diameter of shaft SH0 10, so that only significant relative axial movements between the controller rod slider 181-M12 and shaft SH0 10 is allowed. Furthermore, the plain end of the controller rod slider 181-M13 is facing away from cam sleeve 181-M2 and the flanged end of the controller rod slider is facing towards the cam sleeve. To the flanged end of the controller rod slider 181-M13, the back end of the controller rod 181-M10 and the back end of the controller rod counter-weight 181-M11 are attached. In order to achieve this, the flanged end of the controller rod slider has two opposite positioned square holes into which the back end of the controller rod and the back end of the controller counter-weight are securely pressed in. They are attached opposite of each other so that the centrifugal force of the controller rod is canceled out by the centrifugal force of the controller rod counter-weight. In addition, the controller rod and the controller rod counter-weight are also aligned so that their center-axis is parallel to the center-axis of shaft SH0 10. And the front end of the controller rod 181-M10 and the front end of the controller rod counter-weight 181-M11 are attached to the controller rod disk 181-M14, which also has two opposite positioned square holes into which the front end of the controller rod and the front end of the controller rod counter-weight are securely pressed in. And in order to control the axial position of the controller rod mechanism, a member of the controller rod mechanism can be connected to a member of the CVT where it is used, that moves axially with the torque transmitting members as the transmission ratio is changed, so that the axial position of the controller rod is automatically adjusted as the transmission ratio is changed. This method is shown in FIG. 52. Another method to control the axial position of the controller rod 181-M10 is to attach a controller rod mover mechanism, that is used to change the axial position of the controller rod relative to the link AM1-M6 181-M6, to the controller disk 181-M14. This method is shown in FIG. 53. For the configurations shown in FIGS. 52 and 53, the rotational adjustments provided by the mechanical adjuster should be based on the information shown in FIG. 21C.

A configuration of a CVT, where a mechanical adjuster AM1 181 can be utilized is shown in FIG. 52. For this CVT, which is referred to as CVT 2.6, the controller rod slider 181-M13 is directly connected to the mover sleeve CS4B-M6 24B-M6 of cone assembly CS4B 24B, which is identical to cone assembly CS3 23, except that it does not have a non-torque transmitting member. Here the mechanical adjuster AM1 181 is used to properly adjust the rotational position between cone assembly CS4A 24A and cone assembly CS4B 24B, and hence the rotational position between torque transmitting member CS4A-M1 24A-M1 and torque transmitting member CS4B-M1 24B-M1. Also as noted earlier the axial position of the controller rod 181-M10 can only be changed when its flat profile is parallel to the controller slot of link AM1-M6 181-M6, hence some stalling of the transmission ratio changing actuator is to be expected. The strength of transmission ratio changing actuator should be small enough such that it can not cause damaging internal stresses in the parts of mechanical adjuster AM1 181 or anywhere else in the CVT, when it tries to change the transmission ratio when the flat profile of the controller rod is not parallel to the controller slot of link AM1-M6 181-M6. A limiting clutch mounted on the output of the transmission ratio changing actuator that causes slippage between the output of the transmission ratio changing actuator and the rest of the mechanism used to change the transmission ratio when the torque at the transmission ratio changing actuator exceeds a limiting value can also be used. One problem with connecting a member of the controller rod mechanism directly or indirectly to the mover sleeve of a cone assembly is the fact that the controller rod 181-M10 and the link AM1-M6 181-M6 have a finite thickness so that when the axial positions of the controller rod and the torque transmitting members are changed, the parallel shape 181-M10-S2 of the controller rod and the controller slot of link AM1-M6 181-M6 are engaged for a finite axial distance. Since no rotational adjustment between the cam sleeve 181-M2 and the output disk 181-M8 is allowed when the parallel shape of the controller rod is engaged with controller slot of link AM1-M6 181-M6, no rotational adjustment is allowed for a finite axial distance. However since the critical non-torque transmitting arc(s), continuously change as the axial positions of the torque transmitting members and the controller rod is changed, the torque transmitting members are at an even space, where no rotational adjustment between the torque transmitting members is required, for an infinitesimal axial distance. Therefore, there are instances where no rotational adjustments is provided despite the fact that some adjustment in the rotational position of one torque transmitting member relative to the other is required. Hence here some transition flexing has to occur. Here, transition flexing can be reduced by reducing the thickness of link AM1-M6 181-M6 and the thickness of controller rod 181-M10 or by also using a spring-loaded adjuster AS2 172.

The following configuration of a CVT, as shown in FIG. 53, can be used to control the axial position of the controller rod 181-M10 so that transition flexing can be minimized without having to reduce the thickness of controller rod 181-M10 and the thickness of link AM1-M6 181-M6. For this CVT, which is referred to as CVT 2.7, the mechanical adjuster AM1 181 is used to adjust the rotational position of a cone assembly CS4C 24C relative to a cone assembly CS4D 24D, and hence the rotational position of torque transmitting member CS4C-M1 24C-M1 relative to torque transmitting member CS4D-M1 24D-M1. Here a cam adjuster gear rack 181-M16, which engages with a cam adjuster gear 181-M18, is attached to the front surface of the controller rod disk 181-M14 via a rotatable coupling 190. The rotatable coupling 190, which is shown in detail in FIG. 17, allows one end of the rotatable coupling to rotate relative to the other end of the rotatable coupling. It mainly consists of two coupling sleeves 190-M1, which each have an upper shape and a larger lower shape. The larger lower shapes are inserted into a joiner sleeve 190-M2. In order to prevent the coupling sleeves from moving axially relative to each other, joiner sleeve ends 190-M3, that engage with the shoulder created between the upper shapes and the lower shapes of the coupling sleeves, are glued on each end of joiner sleeve 190-M2. The upper shapes of the coupling sleeves 190-M1, each have two opposite positioned threaded holes, which are used to screw in coupling sleeve set-screws. Here for mounting purposes a controller rod disk shaft 181-M15 is centrically welded on to the front surface of the controller rod disk 181-M14; and a gear rack shaft 181-M17, is glued on to the back surface of the cam adjuster gear rack 181-M16. And in order to attach one end of a rotatable coupling 190 to the controller rod disk 181-M14, the controller rod disk shaft 181-M15 is inserted into one coupling sleeve, and a coupling sleeve set-screw is threaded through the controller rod disk shaft 181-M15; and in order to attach the other end of that rotatable coupling to the cam adjuster gear rack 181-M16, the gear rack shaft 181-M17 is inserted into the other coupling sleeve of the rotatable coupling 190, and a coupling sleeve set-screw is threaded through the gear rack shaft 181-M17. The cam adjuster gear 181-M18, which is keyed to a controller rod motor and engages with the cam adjuster gear rack 181-M16, will be used to control the axial position of the controller rod. In addition, the cam adjuster gear 181-M18 has a marked wheel attached to it, which will also be used to monitor the axial position of the controller rod via a rotational position sensor SN2 132. In order to properly control the axial movement of the controller rod, the controller rod motor is connected to the computer that controls CVT 2.7. The computer will then properly control the transmission ratio changing actuator and the controller rod motor as the eliminate or minimize the stretching of the transmission belts in instances where the circumferences of the cone assemblies where the torque transmitting members are positioned is not a an even multiple of the width of the teeth of the torque transmitting members. Changing the axial position of the controller rod when the follower is not in contact with the diameter $D_C$ of the cam can damage the mechanical adjuster. In order to prevent this the strength of the controller rod motor should be small enough such that it can not cause damaging internal stresses in the mechanical adjuster AM1 181 or anywhere else in the CVT. In order to ensure this a limiting clutch can also be mounted on the output of the controller rod motor.

The following control scheme can be used to properly control the controller rod motor and the transmission ratio changing actuator. First of all as described earlier, the axial position of the controller rod 181-M10 should only be changed when follower 181-M4 is in contact with the diameter $D_C$ of cam 181-M1, otherwise stalling of the controller rod actuator or slipping of its limiting clutch has to occur. Although not absolutely necessary, it is nice to prevent this by attaching a rotational position sensor on one of the cone assemblies of the CVT shown in FIG. 53, preferably cone assembly CS4C 24C, and connect this sensor to the computer of this CVT; and program the computer so that it only changes the axial position of the controller rod when the follower is in contact with the diameter $D_C$ of cam 181-M1. The same method can also be used for the CVT shown in FIG. 52. Furthermore, the axial position of the controller rod 181-M10 should be changed such that it corresponds with the axial position of the torque transmitting members. Here a certain limit value is set as to limit the discrepancy between the required axial position of the controller rod based on the axial position of the torque transmitting members and the actual axial position of the controller rod. For example, when the controller rod has moved too far ahead relative to its required axial position based on the position of the torque transmitting members, the movement of the controller rod will be put on hold until the torque transmitting members have moved to a corresponding axial position which is within the required limit range. And when the torque transmitting members have moved too far ahead relative to the controller rod, the movement of the torque transmitting members will be put on hold until the controller rod has moved to a corresponding axial position which is within the required limit range. When the pivot shape of the controller rod is in the controller slot of link AM1-M6 181-M6, a corresponding movement of the torque transmitting members should result in a corresponding movement of the controller rod. And when the parallel shape of the controller rod is engaged with the controller slot of link AM1-M6 181-M6, then despite the movement of the controller rod, no movement of the torque transmitting members should occur.

—Mechanical Adjuster AM2 182 (FIG. 54)

For the mechanical adjuster AM1 181, shown in FIGS. 51A and 51B, the adjuster output member, output disk AM1-M8 181-M8, is axially fixed relative to the shaft where it is used. Hence this mechanical adjuster can not be used as an adjuster AD1A 101A or AD1B 101B of CVT 1.1, since these adjusters move axially relative to their shaft when the axial position of the torque transmitting members is changed. In order to reduce transition flexing for a CVT similar to CVT 1.1, which is shown in FIG. 54 and is referred to as CVT 1.3, a slightly modified version of mechanical adjuster AM1 181, which is labeled as mechanical adjuster AM2 182, is used. Mechanical adjuster AM2 182, is shown in detail on the left cone assembly, cone assembly CS2C 22C, of FIG. 54. It is identical to mechanical adjuster AM1 181, except that here in order to have an adjuster output member that can move axially with the torque transmitting members, an adjuster slider plate 182-M1 is added. Most of the members used for mechanical adjuster AM1 181 are also used for mechanical adjuster AM2 182. Here only the members that are different, or are not used in mechanical adjuster AM1 181 are labeled differently than in mechanical adjuster AM1 181. The adjuster slider plate 182-M1 is shaped like an elongated plate. On one side of the adjuster slider plate 182-M1, a cam adjuster extension arm 182-M2 and a cam adjuster balancing arm 182-M3 are welded on. The cam adjuster extension arm 182-M2 is shaped like the long leg of the adjuster extension arm AD1A-M2-S2 101A-M2-S2 of transition flexing adjuster AD1A 101A, which is used in CVT 1.1, see FIG. 13. And the cam adjuster balancing arm 182-M3 is shaped like the long leg of the adjuster balancing arm AD1A-M2-S3 101A-M2-S3 of transition flexing adjuster AD1A 101A. The cam adjuster extension arm 182-M2 is used to mount a gap mounted torque transmitting member, which here is torque transmitting member CS2C-M2 22C-M2, in the same manner as a gap mounted torque transmitting member is mounted on adjuster extension arm AD1A-M2-S2 101A-M2-S2. And like in adjuster AD1A 101A, the cam adjuster balancing arm 182-M3 is used to balance the centrifugal forces of the cam adjuster extension arm 182-M2 and its attachments. Also as in transition flexing adjuster AD1A 101A, here a constrainer mechanism CN1A 111A, that constrains the movements of the telescopes of torque transmitting member CS2C-M2 22C-M2, is attached to the cam adjuster extension arm 182-M2. Also for mounting purposes, on the same side and near the center of the adjuster slider plate 182-M1, an adjuster slider plate back tube 182-M4, which inner diameter is slightly larger than the diameter of the input shaft, is welded on. And on the other side of the adjuster slider plate 182-M1, two cam adjuster sliders 182-M5 are welded on in manner such that in the mechanical adjuster's AM2 182 assembled state, there are no members that prevent the cam adjuster sliders 182-M5 from moving axially. Also in order to ensure that the adjuster slider plate 182-M1 rotates with the output disk AM2-M8 182-M8, the output disk AM2-M8 182-M8 has two slider holes, into which the cam adjuster sliders 182-M5 can be slideably inserted. Also, the cam adjuster sliders 182-M5 are long enough such that they are engaged with the output disk AM2-M8 182-M8 for every axial position of the torque transmitting members. Also for mounting purposes, on the same side and near the center of the adjuster slider plate 182-M1, an adjuster slider plate front tube 182-M6, which inner diameter is slightly larger than the diameter of the input shaft, is welded on.

A configuration where two mechanical adjusters AM2 182 are used to reduce transition flexing for a CVT 1.3 is shown in FIG. 54. For this CVT, a mechanical adjuster AM2 182 is used to properly adjust the rotational position of torque transmitting member CS2C-M2 22C-M2 of cone assembly CS2C 22C, and to properly adjust the rotational position of torque transmitting member CS2D-M2 22D-M2 of cone assembly CS2D 22D. Here a rotatable coupling 190, described in the previous section, is used to mount an adjuster slider plate 182-M1 to mover sleeve CS2C-M6 22C-M6 and to mount an adjuster slider plate 182-M1 to mover sleeve CS2D-M6 22D-M6. Here in order to attach one end of a rotatable coupling 190 to a mover sleeve, a portion of that mover sleeve is inserted into one coupling sleeve of coupling 190, and two coupling sleeve set-screws, positioned opposite from each other, are partially threaded through the walls of that mover sleeve; and in order to attach the other end of that rotatable coupling to an adjuster slider plate, the adjuster slider plate back tube 182-M4 is inserted into the other coupling sleeve, and two coupling sleeve set-screws, positioned opposite from each other, are partially threaded through the walls of that adjuster slider plate back tube. And another rotatable coupling 190 is used to rotatably connect an adjuster slider plate 182-M1 to its controller rod slider 181-M13, so that the axial position of the controller rod sliders 181-M13 are properly adjusted as the axial position of the torque transmitting members is changed. In order to attach one end of this rotatable coupling 190 to an adjuster slider plate, the adjuster slider plate front tube 182-M6 is inserted into one coupling sleeve of coupling 190, and two coupling sleeve set-screws, positioned opposite from each other, are partially threaded through the walls of that adjuster slider plate front tube; and in order to attach the other end of this rotatable coupling 190 to a controller rod slider 181-M13, a portion of the controller rod slider 181-M13 is inserted into the other coupling sleeve, and two coupling sleeve set-screws, positioned opposite from each other, are partially threaded through of the walls of the controller rod slider.

Also for a cone assembly CS4 24, such as cone assembly CS4A/B/C/D 24A/B/C/D, no non-torque transmitting member is used. Hence in order to maintain the longitudinal shape of the transmission belts as the transmission ratio is changed, guiding wheels 200 or a guides can be mounted on the tense side of the transmission belts such as shown FIGS. 55A and 55B. Like the tensioning wheels, which in FIGS. 55A and 55B are tensioning wheels TW1 61, the guiding wheels 200 move axially with the torque transmitting members, which in FIGS. 55A and 55B are torque transmitting members CS4-M1 24-M1, and the transmissions pulleys, which in FIGS. 55A and 55B are transmission pulleys PU1 41, as the transmission ratio is changed. However, while the tensioning wheels move vertically up or down as their axial position is changed, so that they can maintain proper tension in their transmission belts, the vertical positions of the guiding wheels do not need to change as their axial position is changed.

Gap in Teeth (FIG. 56)

In order to compensate for the inaccuracy or absence of any adjusters in order to reduce transition flexing another method besides relaying on the flexibility of the transmission belts or using spring-loaded adjusters is by having gaps between the teeth of the torque transmitting members and the torque transmitting devices coupled to them. This method will be referred to as the "gaps between teeth" method. Here, the pitch, p, of the teeth of the torque transmitting members and the pitch, p, of the teeth of their transmission belts are equal, but the width of the space between the teeth are slightly wider than the width of the teeth so that gaps between the teeth are formed. It is recommended that the gaps are wide enough so that despite the inaccuracy of the adjusters, transition flexing can be eliminated. A partial sectional view of a torque transmitting member about to be engaged with a transmission belt, where between their teeth gaps, g1 and g2, exist is shown in FIG. 56, which shows the teeth of a torque transmitting member, which are individually labeled as torque transmitting member tooth 7, and a cross-section of the teeth of a transmission belt, which are individually labeled as transmission belt tooth 6.

In order to reduce transition flexing, when only one torque transmitting member is engaged, the adjuster(s) ensure that when the torque transmitting member about to be engaged is mated with its transmission belt, the teeth of that torque transmitting member are positioned between the teeth of its transmission belt but not touching the teeth of its transmission belt. Here a "gap offset value" can be added to the value of adjustments needed as based on the graphs in FIGS. 21A/B/C. The "gap offset value" is based on the amount of rotational adjustments needed in order to position the torque transmitting member or tooth about to be engaged in the middle of the space between the teeth of its transmission belt instead of being engaged with the teeth of its transmission belt. If the torque transmitting member or tooth currently engaged is engaged with the teeth or tooth of its transmission belt, the adjustments based on the graphs in FIGS. 21A/B/C will position the torque transmitting member or tooth about to be engaged so that it is engaged with the teeth of its transmission belt. In order to position the torque transmitting member or tooth about to be engaged in the middle of the space between the teeth of its transmission belt, the transmission belt about to be engaged has to be moved relative its torque transmitting member which is about to be engaged by an amount that corresponds to ("the width of a tooth shape of a torque transmitting member that is positioned between a space between two teeth of its transmission belt" minus "the width of a space between two teeth of its transmission belt") divided by two, this rotational adjustment is designated as the "gap offset value", which should be programmed into the controlling computer so that to each adjustment value obtained from the graph in FIG. 21A, the "gap offset value" is either subtracted or added depending on whether the leading surfaces or the trailing surfaces of the teeth of the engaged torque transmitting members are engaged with the teeth of their transmission belt during normal operation. The arc length of the "gap offset value" should be measured at the pitch-lines of the torque transmitting members; hence, "the width of a tooth shape of a torque transmitting member that is positioned between a space between two teeth of its transmission belt" and "the width of the space between two teeth of its transmission belt" should be measured at the pitch-lines of the torque transmitting members.

If the leading surfaces of the teeth of the engaged torque transmitting members are engaged with the teeth of their transmission belt during normal operation, then to each "phase arc length for cone assembly CS3C 23C" and "phase arc length for cone assembly CS3D 23D" values obtained from the graph in FIG. 21A, the "gap offset value" is subtracted. If a negative value is obtained for the subtracted "phase arc length for cone assembly CS3C 23C" or the "phase arc length for cone assembly CS3D 23D" value, then "the arc length value for the amount of adjustment needed in order to rotate one transmission pulley from a position where its teeth are aligned with the teeth of the other transmission pulley, to the next position where its teeth are aligned with the teeth of the other transmission pulley, as measured at the pitch-lines of the torque transmitting members" is added to that negative value. The leading surfaces of the teeth of the engaged torque transmitting members are engaged with the teeth of their transmission belt during normal operation when the cone assemblies are mounted on the input shaft.

If the trailing surfaces of the teeth of the engaged torque transmitting members are engaged with the teeth of their transmission belt during normal operation, then to each "phase arc length for cone assembly CS3C 23C" and "phase arc length for cone assembly CS3D 23D" values obtained from the graph in FIG. 21A, the "gap offset value" is added. If the value for the added "phase arc length for cone assembly CS3C 23C" value is greater than "the arc length value for the amount of adjustment needed in order to rotate one transmission pulley from a position where its teeth are aligned with the teeth of the other transmission pulley, to the next position where its teeth are aligned with the teeth of the other transmission pulley, as measured at the pitch-lines of the torque transmitting members" than "the arc length value for the amount of adjustment needed in order to rotate one transmission pulley from a position where its teeth are aligned with the teeth of the other transmission pulley, to the next position where its teeth are aligned with the teeth of the other transmission pulley, as measured at the pitch-lines of the torque transmitting members" should be subtract from that added "phase arc length for cone assembly CS3C 23C" value. And if the value for the added "phase arc length for cone assembly CS3D 23D" value is greater than "the arc length value for the amount of adjustment needed in order to rotate one transmission pulley from a position where its teeth are aligned with the teeth of the other transmission pulley, to the next position where its teeth are aligned with the teeth of the other transmission pulley, as measured at the pitch-lines of the torque transmitting members" than "the arc length value for the amount of adjustment needed in order to rotate one transmission pulley from a position where its teeth are aligned with the teeth of the other transmission pulley, to the next position where its teeth are aligned with the teeth of the other transmission pulley, as measured at the pitch-lines of the torque transmitting members" should be subtract from that added "phase arc length for cone assembly CS3D 23D" value. The trailing surfaces of the teeth of the engaged torque transmitting members are engaged with the teeth of their transmission belt during normal operation when the cone assemblies are mounted on the output shaft.

If based on experimentation a different "gap offset value" works better than the one described previously, than that "gap offset value" can be programmed into the controlling computer. The "gap offset value" can be any value as long as the teeth of the transmitting members about to be engaged are positioned between the teeth of their transmission belt without any interference. And once one or several teeth of the torque transmitting member about to be engaged is positioned between the teeth of its transmission belt, the adjuster adjust the relative rotational position between the torque transmitting member about to be engaged and its transmission belt so that the teeth are touching the teeth of their transmission belt such that the engagement between the teeth can be used for desired torque transmission. This can be done by adjusting the rotational position of the transmission pulley of the transmission belt about to be engaged, adjusting the rotational position of the cone assembly about to be engaged by adjusting the rotational position of the other transmission pulley, or by a combination of the two previous adjustment methods for example. Once the teeth are engaged as desired, the adjuster can stop rotating. This type of adjustment will be referred to as "engagement adjustment".

Ideally "engagement adjustment" should start once one tooth of the torque transmitting member about to be engaged is positioned between the teeth of its transmission belt. And ideally engagement adjustment should stop once the teeth of that torque transmitting member are touching the teeth of their transmission belt. If this kind of adjustment is not practical because of accuracy limitations, then engagement adjustment can start during a window when say two to three teeth of the torque transmitting member about to be engaged are positioned between the teeth of its transmission belt, or during an even later and larger window. This can be done by adding a delay value in degrees as to when "engagement adjustment" should start after the beginning of engagement statuses 3 and 7. However, the delay value selected should be small enough so that engagement between the teeth about to be engaged occurs before the currently engaged torque transmitting member disengages. Also a second delay value that starts at the end of the delay value discussed previously can be used to program when "engagement adjustment" should stop. Engagement adjustment can be stopped at any time before that torque transmitting member disengages with its transmission belt. Engagement adjustment is not absolutely necessary, but it can eliminate shock loads if the "gaps between teeth" method is used. In order to control the adjuster(s) to perform "engagement adjustment", the controlling computer uses the delay value and second delay value described in this paragraph in conjunction with the engagement statuses described previously.

Also here because of the space between the teeth of the torque transmitting member and the transmission belt, in instances when the output shaft is pulling the input shaft, which might occur due to friction in the engine and inertia that wants to keep the output shaft rotating, the currently engaged teeth of the torque transmitting member will rotate relative to its transmission belt so that under this condition the engaged surfaces are different than the engaged surfaces during normal operation. For example for a certain configuration, under this condition the leading surfaces are engaged instead of the trailing surfaces, which are engaged during normal operation. This problem can be avoided by avoiding having the output shaft pulling the input shaft, which can be done by mounting a one way clutch between the output shaft and the output device being rotated, so that the output shaft can rotate the output device in the driving direction but the output device can not rotate the output shaft in the driving direction, and by ensuring that the friction in the output shaft is larger than in the engine. A one way clutch which can be locked or which direction can be reversed on command can be used in case reverse rotation is required. Another method to solve this problem is by using a tension measuring load-cells on the tense side and slack side of the transmission belt or transmission belts. Here a tension measurement on the side that is slack during normal operation that is larger than that of the side that is tense during normal operation indicates that the output shaft is pulling the input shaft, and this information can then be used by the controlling computer to appropriately control the adjuster(s).

Friction Clutch Mounting

In order to account for transition flexing and transmission ratio change rotation, the cone assemblies and transmission pulleys of a CVT, which rotational positions need to be adjusted can be mounted using friction clutches, which slip once their torque limit is exceeded. Slipping of the friction clutches allow the rotational position of the cone assemblies and transmission pulleys mounted on them to be adjusted. Although simple and cheap, this method of adjustment might cause significant energy loses due to frictional slippage and limit the amount of torque that can be transmitted. However, the friction clutch mounting method can be used as a safety measure in case the adjusters malfunction.

Tension Measuring Load Cell (FIG. 57)

For CVT 2.1, torque sensors are used to measure the pulling loads on the transmission pulleys. Another method to measure, or in this case estimate, the pulling load on a transmission pulley is by measuring the tension in the tense side of transmission belt BL2 32 via a load cell 135, see FIG. 57. Here the slider used to mount a tensioning wheel, which here is labeled as load cell wheel 62, is identical to the tensioning slider 1106 one described in Continuous Variable Transmission Variation 2 (CVT 2) section of this patent except that here it is horizontally cut into two halves. The lower half, which includes the hole for the slide, is labeled as load cell lower slider 70. And the upper half, which includes the shaft for mounting the tensioning wheel, is labeled as load cell upper slider 71. Between load cell lower slider 70 and load cell upper slider 71, load cell 135 is positioned. In order to maintain the position of load cell 135, load cell 135 is glued to the top surface of load cell lower slider 70. Also like for the tensioning sliders 1106, vertical guides 72, which here are inserted into vertical holes of the load cell lower slider 70 and load cell upper slider 71, are used to change the axial position of the load cell lower slider 70 and load cell upper slider 71 and maintain their proper orientation.

Furthermore, the angle between the horizontal plane and the tense side of transmission belt BL2 32 will be referred to as angle $\alpha 1$ and angle $\alpha 2$. Smaller values for angle $\alpha 1$ and angle $\alpha 2$ are preferred, so that a load cell 135 with a smaller load rating can be used. In order to determine the tension in transmission belt BL2 32, besides monitoring the measurement of load cell 135, the controlling computer of the CVT also needs to determine the angle $\alpha 1$ and angle $\alpha 2$. This can be done by programming the values for angle $\alpha 1$ and angle $\alpha 2$ for every transmission ratio, which is monitored, into the computer. Another method that can be used is by programming into the computer an equation for angle $\alpha 1$ and angle $\alpha 2$ based on the transmission ratio.

Additional Embodiments

In this section some additional embodiments for CVT 1 and CVT 2 or parts for CVT 1 and CVT 2 are described. The adjuster systems and the adjustment methods described earlier in this patent can be used for all of the additional embodiments described below.

Sliding Cone Mounting Configuration (FIGS. 58, 59, 60)

In the sliding cone mounting configuration, in order to change the transmission ratio, the axial positions of the cones relative to their frame are changed, while the axial positions of the torque transmitting members and the transmission pulleys are held fixed relative to their frame. Using the sliding cone mounting configuration, the design for some CVT's can be simplified. Especially the design where a differential adjuster shaft is used.

A portion of the sliding cone mounting configuration is shown as a partial top-view in FIG. 58, which shows a portion of one of its cone assembly, which is labeled as sliding cone cone assembly 25. Here the sliding cone rotors 25-M1, on which the telescopes of the torque transmitting members and the non-torque transmitting members are mounted, are keyed to a sliding cone spline 250 so as to constrain any rotational and axial movements between the sliding cone rotors and the sliding cone spline. And sliding cone assembly 25 is slideably mounted on a sliding cone spline 250. Here sliding cone assembly 25 has a sliding cone slider 25-S1 at the smaller end of its cone. The inner surfaces of sliding cone slider 25-S1 form a splined profile that match the splined profile of the sliding cone spline 250 so that torque can be transmitted between them while also allowing sliding cone slider 25-S1, and hence sliding cone cone assembly 25, to slide freely on sliding cone spline 250. And the outer surface of sliding cone slider 25-S1 is shaped like a round cylinder, which center axis is the rotational axis of its cone. Furthermore, the outer diameter of sliding cone slider 25-S1 is smaller in diameter than the smaller end of its cone so that a shoulder is formed between a sliding cone slider 25-S1 and the smaller end of its cone. In addition, the free end of sliding cone slider 25-S1 is threaded. A mover arm B bearing 251-M1, which is a thrust bearing that is tightly inserted into a matching hole of a mover arm B 251-S1 so as to prevent any relative movements between them, is slid into sliding cone slider 25-S1. Then a sliding cone slider nut 25-M2 is threaded onto the threaded end of sliding cone slider 25-S1, so that mover arm B bearing 251-M1 is tightly sandwiched between the shoulder formed by sliding cone slider 25-S1 and the smaller end of its cone. Under this set-up, the axial positions of sliding cone slider 25-S1, and hence the axial positions of sliding cone assembly 25, depend on the axial positions of mover arms B 251-S1. Also, here mover arm B bearing 251-M1 allow sliding cone assembly 25 to rotate without much frictional resistance relative to mover arm B 251-S1. Mover arm B 251-S1 is then connected to a mover rod B 251-S2, which is part of a mover frame B 251, which is used to change the axial position of the cone assemblies and the tensioning slides via a gear rack B 252.

In addition, in case the sliding cone configuration is used for a CVT 1.2 or CVT 2, in order to properly maintain the tension of the transmission belts the tensioning mechanism shown in FIG. 59 can be used. Here a tensioning slide A 253 and tensioning slide B 254 are connected by a tensioning slide end A 255 and a tensioning slide end B 256. Tensioning slide end A 255 is then connected to mover frame B 251, shown in FIG. 58, by a tensioning slide connector 257. Sliding on tensioning slide A 253 is a tensioning slider A 258 and sliding on tensioning slide B 254 is a tensioning slider B 259. Tensioning slider A 258 consists of two main shapes, a tensioning slider A block 258-S1 and a tensioning slider A clevis 258-S2. Tensioning slider A block 258-S1 has a horizontal slide hole through which the tensioning slide A 253 is inserted, see FIG. 60, which shows a partial front-view of a tensioning slider A 258. And to the left and to the right of the horizontal slide hole of tensioning slider A 258, two vertical holes through which the fixed vertical guides 260, which are fixed to the frame of the CVT, are inserted. Near the top of the tensioning slider A block 258-S1, the tensioning slider A clevis 258-S2 is shaped. The tensioning slider A clevis 258-S2 is used to mount a guiding wheel 200 or a tensioning wheel 61. Tensioning slider B 259 is identical to tensioning slider A 258, except that here the tensioning slider B block 259-S1 has a angled slide hole through which tensioning slide B 254 is inserted instead of the horizontal slide hole through which the tensioning slide A 253 is inserted.

Torque Transmitting Member for Chain (FIGS. 61A, 61B, 62A, 62B, 63A, 63B, 64A, 64B, 65A, 65B, 66, 67A, 67B, & 68)

In case a chain is preferred instead of a belt, then a torque transmitting member that can accommodate a chain can be designed. For example, if a slightly modified bicycle chain is used, then links forming a torque transmitting member chain or a single tooth link can be used. The front-view of a modified bicycle chain link is shown in FIG. 61A, this chain link is identical to a regular bicycle chain link, except that here left chain link 1 side plate 268-M1 is deeper than right chain link 1 side plate 268-M2 and the bottom surfaces of the left chain link 1 side plate 268-M1 and left chain link 1 side plate 268-M1 are angled so that the chain link 1 pin 268-M3 is parallel to the shaft of its cone when that chain link rest on the surface of its cone. A front-view of another modified bicycle chain link is shown in FIG. 61B, this chain link is identical to a regular bicycle chain link except that here a left chain link 2 rubber leg 269-M1 and right chain link 2 rubber leg 269-M2 are attached to the chain link plates so that chain link 2 pin 269-M3 is parallel to the shaft of its cone when that chain link rest on the surface of its cone. Now a torque transmitting member chain or a single tooth link that can be used with the modified bicycle chain described above will be described. Here, FIG. 62A shows a side-view of a link A 270, as seen from the right side of the link, and FIG. 62B shows a front-view of a link A 270. Each link A 270 consist of a link A tooth 270-S1, which is shaped so that can properly engage with the pins of its chain, a left link A plate 270-S2, a right link A plate 270-S3, and a link A base 270-S4, which connects the link A tooth to the left link A plate and the right link A plate. The link A tooth and the link A plates are parallel relative to each other. But the link A base 270-S4 is positioned at an angle relative to the link A tooth and the link A plates, so that when link A base 270-S4 is resting on the surface of the cone on which it is attached, the link A tooth and the link A plates are parallel relative to the end surface(s) of their cone. In case a single tooth link is used, then the link A plates are not needed. The left link A plate 270-S2, which is longer than the right link A plate 270-S3, and the right link A plate 270-S3 each have two rivet holes, which are used to insert link rivets 271, used to connect links A 270 to links B 272 to from a torque transmitting member chain, see FIGS. 63A and 63B. For smooth operation, it is recommended that the rivet holes are located so that when the links formed torque transmitting member is properly engaged with its chain, the bending axis of the links formed torque transmitting member chain coincides with the bending axis of the chain. Here, if this is the case, then a smooth arc can be drawn through the centers of the rivet holes and the centers of the pins of the chain. In addition to links A 270, links B 272 will also be used to from a torque transmitting member chain. A torque transmitting member chain is formed by connecting a link A 270 to a link B 272, which is then connected to another link A 270, and so forth, so that a chain that consist of alternating links A 270 and links B 272 is formed. A link B 272 is identical to a link A 270, except that the parallel distance between its link plates is slightly larger than that of link A 270 so that the link plates of a link A 270 can be placed between the link plates of a link B 272. Link rivets 271 are then used to connect the ends of the left link plates of links A 270 to the ends of the left link plates of links B 272; and to connect the ends of the right link plates of links A 270 to the ends of the right link plates of links B 272. The dimensions and materials of link rivets 271 should be selected so that once riveted together, the links A 270 can rotate with ease relative to their links B 272. Also the base of each link A 270 and the base of each link B 272 should be short enough so that they do not interfere with the required flexing motion of the torque transmitting member chain. And if the left link plates interfere with the required flexing motion of the torque transmitting member chain, than they can be reshaped to accommodate this. An example of a reshaped left link plate, which is labeled as left link plate 274, is shown in FIG. 66.

Furthermore, in order to attach a torque transmitting member chain to a cone assembly, the end links of the torque transmitting member chain each have a base to which a link attachment plate is attached. Each link attachment plate is identical to the attachment plate 1048 described in the Mover Mechanism section of this patent except that the disk shape at the top end of attachment plate 1048 is omitted. Hence the link attachment plates can be used to secure the end links to their cone and mover telescope in the same manner as an attachment plate 1048 is used to secure the ends of a torque transmitting member to its cone and mover telescope. The end link configuration for a link A 270, and its link A attachment plate 270-S5, which in its cone assembly's assembled state is slit into a slot of its cone and attached to a mover telescope, is shown as a side-view as seen from the right side of the link in FIG. 64A and as a front-view in FIG. 64B. The end link for a link B 272 has an identical link attachment plate as a link A 270. And in case single tooth link is used, which is shown in FIGS. 65A and 65B, than that tooth link needs to have an attachment plate at its base. For the single tooth link shown in FIGS. 65A and 65B, the tooth is labeled as single link tooth 273-S1, the base is labeled as single link base 273-S2, and the attachment plate is labeled as single link attachment plate 273-S3.

In addition, in order to maintain the shape of the torque transmitting member chain, it is recommended that the torque transmitting member chain is maintained under slight tension. Hence the engaging surfaces of the slots should be narrow enough and have sufficient depth to maintain the proper alignment of the link attachment plates.

Also, a molded torque transmitting member made out of flexible material, such as rubber for example, can also be used to accommodate a chain. In cases, where torque transmission is between the side surfaces of the torque transmitting members and their transmission belts, the neutral-axis of the torque transmitting members and their transmission belts coincide, almost coincide, or can be easily made to coincide by proper reinforcement placement or dimensioning. As should be known by somebody skilled in the art, the location of the neutral-axis of a torque transmitting member can easily be adjusted by adjusting the location of the reinforcement, as shown in FIG. 67A, and by adjusting the dimensions, as shown in FIG. 67B. In FIGS. 67A and 66B solid lines represent actual reinforcement location or dimension and dotted lines represent adjusted reinforcement location or dimension. Here the height of the neutral-axis increases as the location of the reinforcement is raised or the height of the side members of the torque transmitting member is increased, and the height of the neutral-axis decreases as the location of the reinforcement is lowered or the height of the side members is decreased. The same method of adjusting the neutral-axis of a torque transmitting member can also be used for a transmission belt. Here the location of the neutral-axis can also be adjusted by adjusting the location of the reinforcement, if used, and by adjusting the dimensions. However, for a molded torque transmitting member that can engage with a bicycle chain, torque transmission is not between the side surfaces of the torque transmitting member and the chain, hence the neutral-axis does not coincide, almost coincide, or can be easily made to coincide with the bending axis of the chain, which is located at the center-point of the pins of the chain. Here in order to adjust the location of the neutral-axis of the torque transmitting member, compensating shapes have to be used. An example of a torque transmitting member that can engage with a bicycle chain, which will be referred to as a chain torque transmitting member is shown as a front-view in FIG. 68. Here the chain torque transmitting member, consist of a chain torque transmitting member tooth 275-S1, a chain torque transmitting member base 275-S2, a chain torque transmitting member left compensating shape 275-S3, and a chain torque transmitting member right compensating shape 275-S4. The dimensions for the chain torque transmitting member left compensating shape 275-S3 and the chain torque transmitting member right compensating shape 275-S4 should be selected such that when the chain torque transmitting member is properly engaged with its chain, the neutral-axis of the chain torque transmitting member coincides with the bending axis of the chain.

For the designs described above for optimum performance, the surface of the cone utilizing a torque transmitting member chain, a single link tooth, or a chain torque transmitting member, should be shaped to accommodate the base(s) of the torque transmitting member chain links, single link tooth, or a chain torque transmitting member so that during operation no or minimal deformation of the transmission chain occurs as it comes in and out of contact with its torque transmitting member. This can be achieved by increasing the thickness of the side surface(s) of the cone which are never covered a torque transmitting member chain, single link tooth, or chain torque transmitting member, as to compensate for the thickness of the base(s) of the torque transmitting member chain links, single link tooth, or a chain torque transmitting member.

Using the description above, somebody skilled in the art should be able to construct a torque transmitting member for other chains, such as an inverted chain for example. And he/she should also be able to construct a torque transmitting member made out of chain links for various transmission belts. Here for smooth operation, the bending axis of the torque transmitting member made out of chain links, which location is determined by the location of the chain rivet holes, should coincide with the neutral-axis of its transmission belt.

Torque Transmitting Side Members (FIGS. 69, 70A, 70B, 70C)

Previously it was mentioned that a torque transmitting member can be constructed out of two separate side members. For smooth operations, it is recommended that the location of the height center-line of the teeth used for torque transmission of the side members and the neutral-axis of the side members, which under this configuration will be referred to as torque transmitting side members, are located in the same horizontal plane, see FIG. 69. In FIG. 69, the torque transmitting member is formed by a left torque transmitting side member 280A and by a right torque transmitting side member 280B.

A detailed view of a torque transmitting side member 280, which can be used as a left torque transmitting side member, is shown in FIG. 70A, which shows a partial top-view, in FIG. 70B, which shows a side-view, and in FIG. 70C, which shows an end-view. Here on the right surface of torque transmitting side member 280, its side member teeth 280-S1 are formed. And since torque transmitting side member 280 does not have a base that connects it to its opposite torque transmitting side member, which helps maintain the longitudinal shape of the torque transmitting member as torque is being transmitted, here on the left surface of torque transmitting side member 280, a lateral bending reinforcement 280-S2 is formed. Furthermore, in order to attach torque transmitting side member 280 to its cone, side member attachment pins 281 are inserted near each end of torque transmitting side member 280. The side member attachment pins 281 are tied together by a side member reinforcement 282, which is a rope embedded in the torque transmitting side member 280 that has looped shaped ends into which the side member attachment pins 281 are inserted. It is recommended that side member reinforcement 282 is located in the same horizontal plane as the center-line of side member teeth 280-S1. Furthermore, for attachment purposes each side member attachment pin 281 has a side member attachment plate 281-S1 shaped at its bottom end. In the assembled state of a cone assembly utilizing torque transmitting side members, the side member attachment plates 281-S1 are slid into the slots of their cone and then secured using an attachment wheel and a mover telescope, in the same manner as the torque transmitting member 1046 described earlier are attached to their cone. Here a pair of mover telescopes is needed for each torque transmitting side member. Hence here, a complete torque transmitting member needs four mover telescopes mounted on a common rotor instead of two, unless another method of attachment is used, such as joining the side member attachment plates of a pair of torque transmitting side members together so that only one mover telescopes is needed for the two side member attachment plates, which are joined together. And joining the side member attachment plates of a pair of torque transmitting side members together also increases the lateral stability of the torque transmitting side members. It is also recommended that frictional engagement between the members of the mover telescopes is used as to prevent the mover telescope members from sliding up and down relative to each other as its cone assembly is rotating. For even better performance, the frictional engagement between the members of the mover telescopes can be selected such that the mover telescopes extend and contract in a predetermined fashion. For example, for a three member mover telescope, the frictional engagement of the top mover telescope member with the middle mover telescope member can be made lower than the frictional engagement of the middle mover telescope member with the bottom mover telescope member so that when extended, the top mover telescope member extends before the middle mover telescope member does. Besides mover telescopes, slider and slides, which can also be used to transmit torque, can also be used to change the axial position of a torque transmitting side member or a torque transmitting member. Here the slider is preferably attached to the outer side surface of a torque transmitting member at the length mid-point of the torque transmitting member. And its slide can be welded, so that it extends radially outwards, on a collar that can be keyed to the shaft on which the torque transmitting member is rotating about. And the ends of the torque transmitting member can again be attached to their cone by the use of attachment plates. However, here the attachment plates are not used to transmit torque. Also here the torque transmitting member needs to be stiff enough or properly reinforced so that it can maintain its shape when torque is transmitted near its ends and when its teeth are only partially engaged. Furthermore, for a CVT 2, instead of having the base of the transmission belts angled, the leveling loop used for a CVT 1 can also be used here.

Alternate Cone Assemblies (FIGS. 71, 72, 73A, 73B, 74A, 74B, 75, 76)

An example of other CVT's that can benefit from the concepts and adjuster systems of this application are slightly modified CVT 2s that instead of the cone assemblies with torque transmitting members, uses a single tooth cone, which is a cone that has one fixed tooth 290-S3 that elongates from the single tooth cone smaller end 290-S1 to the cone's larger end on the single tooth cone side surface 290-S2, as shown as a top-view in FIG. 71. The main difference here is that for these CVT's an inverted chain or belt, for which an example is shown in FIG. 73A, which shows a side-view, and in FIG. 73B, which shows as sectional-view, has to be used. Another difference is that in most cases a fixed tooth 290-S3 covers a smaller arc length on the surface of its cone than torque transmitting members does. As described in this patent, for proper operation of a CVT 2, it is recommended that during its operation at all instances a torque transmitting surface is engaged with its transmission belt. Here, because of the smaller arc length covered by the fixed tooth 290-S3, the transmission ratio range is most likely more limited. Since here for proper operation, for all transmission ratios at least half of the surfaces of the single tooth cones need to be covered by their transmission belts.

One method to increase the transmission ratio range for a single tooth cone CVT 2 is by using a supporting wheel, which is used to increase the coverage of the transmission belt on the surface of its cone for transmission ratios where it is required. In order to properly adjust the position of the supporting wheel as the transmission ratio is changed, a slide and a slider similar to the ones used for a tensioning wheel can be used for the supporting wheel. An example of this configuration is shown in FIG. 76, which shows a sectional-view of a single tooth cone CVT 2 cut near the smaller end of one of its cones, which is labeled as single tooth cone 290, where its transmission belt, labeled as inverted belt 292, is currently positioned. The inverted belt 292 is used to couple single tooth cone 290 to an inverted belt pulley 295. And the tensioning wheel, which here is labeled as inverted belt tensioning wheel 294 and the supporting wheel 296 are positioned on the tense side of the belt. Placing the inverted belt tensioning wheel 294 and the supporting wheel 296 on the slack side of the belt should also work; however here it might be necessary to take precautions that prevent the transmission belt to lose contact with its tensioning wheel due to excessive slack. In some set-ups, placing the supporting wheel opposite of the tensioning wheel will also work. Furthermore, if desired supporting wheels can also be used in CVT's that use cone with a torque transmitting members. As for a CVT 2 utilizing cone assemblies, here the tensioning wheels and supporting wheel should also have side surface to help maintain the axial position of their transmission belt. And the base of the tensioning wheels and supporting wheels should also be shaped or tapered so as to prevent its transmission belt or chain from twisting.

Another method to increase the transmission ratio range for a single tooth cone CVT 2 is by using an adjuster to compensate for the limited coverage of the single tooth cones. Here in instances where the transmission belts are not providing sufficient coverage, the adjuster(s) rotate the cone currently not engaged in the direction that the cone is rotating a sufficient amount so that the cone currently not engaged comes into engagement before the cone currently engaged comes out of engagement.

Also in order to prevent bending of a tooth of a transmission belt due to the moment created by the force applied by the fixed tooth on a tooth of the transmission belt, a supporting surface can be shaped on the side surface of a single tooth cone, see FIG. 72. In FIG. 72, which shows as a top-view, the smaller end of the cone is labeled as supported single tooth cone smaller end 291-S1, the side surface of the cone is labeled as supported single tooth cone side surface 291-S2, the fixed tooth is labeled as supported single tooth cone fixed tooth 291-S3, and the supporting surface is labeled as supported single tooth cone supporting surface 291-S4. For smoother operation and less flexing of the teeth of the transmission belt used, it is recommended, but not necessary that the supported single tooth cone supporting surface 291-S4 is shorter than the supported single tooth cone fixed tooth 291-S3. The inverted belt shown in FIG. 73A and in FIG. 73B can also be used with this cone. Here the supported single tooth cone supporting surface 291-S4 has to be positioned and shaped so that it can properly engage with the back surfaces of the teeth of the inverted belt.

And a specialized transmission belt that can be used with a supported single tooth cone is shown as a top-view in FIG. 74A and as a side-view in FIG. 74B. This transmission belt, which is labeled as supported single tooth cone inverted belt 293 has a tooth constraining surface 293-S1 shaped at the base of its tooth which can engage with the supporting surface of its cone. The engagement of the tooth constraining surface 293-S1 with the supported single tooth cone supporting surface 291-S4 prevents excessive twisting of the tooth of a transmission belt. For smoother engagement and less flexing of the tooth constraining surfaces 293-S1, it is recommended that the surface of the tooth constraining surface 293-S1 is rounded about the z-axis, which is the axis that is horizontal and parallel to the engagement surfaces to the teeth. The supported single tooth cone supporting surface 291-S4 should be positioned so that it is parallel to the supported single tooth cone fixed tooth 291-S3. Here for better engagement some fine adjustment to the position of the single tooth cone supporting surface 291-S4 based on experimentation to account for the changing curvature of the side surface of the cone and the flexing of the bases of the teeth of the supported single tooth cone inverted belt 293 can also be made. Here if the supported single tooth cone supporting surface 291-S4 is not parallel to the supported single tooth cone fixed tooth 291-S3, it is recommended that the surface of the tooth constraining surface 293-S1 is rounded about the y-axis, which is the axis that is vertical. Also if an inverted belt that has a constraining surface shaped on its teeth is used, only the surfaces of the teeth that do not have a constraining surface should be used for torque transmission.

Many variation of a single tooth cone can be devised. For example, instead of being straight, the fixed tooth and the supporting surface, if used, can be positioned at an angle relative to the surface of their cone; or an involute or modified involute shaped surfaces can be used for the fixed tooth and/or the supporting surface; or an inverted chain which has links for which a tooth profile is cut out, which engagement with the fixed tooth help maintain the orientation of the link currently engaged during torque transmission, can also be used. Such an inverted chain can be construct from links and pins in a similar manner as the chains described in the Torque Transmitting Member for Chain section are constructed. However here, it is desirable to have the centers of the pins of the chain located at the height mid-point of the tooth cut out profile at the mid-cross-sections of the link or mid-section of a pair of parallel links. If this the case, then torque transmission does not cause the link transmitting torque to bend out of its ideal alignment. This allows the tooth cut-out profile of a link to be slightly wider than its mating fixed tooth, since the engagement of the back surface of the fixed tooth with the tooth cut-out profile of a link is not needed in order to main ideal alignment of that link. FIG. 75 shows a side-view of such a chain link. Here the chain link, which is labeled as inverted chain link 297, has a inverted chain pin hole 297-S1 and an inverted chain tooth cut out profile 297-S2.

Basically a cone with a single fixed tooth, can be treated like a cone with a torque transmitting member except that here the coverage provided by a fixed tooth is most likely less than the coverage provided by a torque transmitting member. Also here an inverted belt or chain has to be used as a transmission belt. The main disadvantage of a cone with a single fixed tooth over a cone with a torque transmitting member is that here uneven wear of the fixed tooth can cause problem during transmission ratio change; and an inverted belt or chain is most likely less efficient in transmitting torque than a belt or chain that can be used with a cone with a torque transmitting member.

Reinforced Transmission Belt (FIG. 77)

Since the adjusters can minimize transition flexing, it is desirable to stiffen the transmission belt using reinforcement. A reinforced transmission belt 300 is shown as a top-view in FIG. 77. Here a steel reinforcement plate 301 is embedded at each reinforced transmission belt tooth 300-S1. The steel reinforcement plate 301 is then connected to a wire reinforcement 302.

Alternate CVT's

Below is an alternate belt, which will be referred to as the pin belt that can be used as a means for coupling for a CVT 2. This belt, which is shown as side-view in FIG. 78A and as an end-view in FIG. 78B, can be used with torque transmitting members that have sprocket shaped tooth or teeth. This belt consists of two rubber belt members, belt member 1 411 and belt member 2 412, that are joined by pins 414, which are tightly and securely pressed into the belts. Adhesives can be added to the portions of the pins inserted into the belt members to further secure the axial position of the pins relative to the belt members. On the pins 414, tubes 415 are placed. The tubes are not absolutely necessary but they reduce the friction between the belts and the torque transmitting members during initial engagement. Hence it is recommended that friction between the tubes and the pins is minimized. If desired, the tubes can also be omitted. The neutral-axis of belt member 1 411 and belt member 2 412 should be at the same height, and the center of pins 414 should be located at the neutral-axis of belt member 1 411 and belt member 2 412. The area of belt member 1 411 is equal to the area of belt member 2 412, this is optional but recommended. In order to have the neutral-axis of belt member 1 and belt member 2 at the same height, the height of belt member 1 and belt member 2 is adjusted accordingly. And in order to have the area of belt member 1 equal to the area of belt member 2, the width of belt member 1 and belt member 2 is adjusted accordingly. In case only one tooth is used than the pins do not have to be located at the neutral-axis of their belt members, but it should be ensured that the tooth can properly engage with its belt for all diameters. For increased strength belt member 1 and belt member 2 are reinforced. In FIG. 78B, the reinforcement, which is labeled as reinforcement 416 is molded into belt member 111 and belt member 2 12. Since it is desirable to have the reinforcement located at the neutral-axis, in this case the ends of the pins can have pins cut 414-S1 into which the reinforcement can be slid-in. Furthermore in order to help align the belt when it is about to be engaged with its torque transmitting member, the upper outer surfaces of belt member 1 and belt member 2 are tapered inwards so that they can be better guided by tensioning/maintaining pulleys. In case no adjuster or adjustment device is used, the pin belt should be flexible enough so that it can stretch without failure to account for instances were the arc length(s) of the non-torque transmitting arc(s) of the cone(s) with which is used, do not correspond to a multiple of the width of the teeth or tooth of the cone assembly or cone assemblies with which is used. If necessary the reinforcement 416 can be omitted to ensure this or the transmission ratios where transition flexing occurs can be skipped.

A cone assembly that can be used with this belt and a chain is a cone assembly with a one tooth or two oppositely placed teeth, although many other conceivable cone assemblies could also be used. A design for a cone assembly with one tooth is shown as a front-view for which the front half surface of a cone 440 and its larger end cover 445 has been removed in FIG. 79, and as a partial sectional right-end-view in FIG. 80. It mainly consists of a cone 440, which right-end-view is shown in FIG. 81, that has a smaller end surface 440-S2 and an open larger end, which has flange 440-S4, which is used to bolt on a larger end cover 445, shown in FIG. 82. Cone 440 has a longitudinal cut 440-S1, which is located on a radial plane of spline 430, through which the tooth of a tooth carriage 450 can protrude. The tooth carriage 450, which is also shown in FIG. 80, consists of tooth 450-S1, which can engage with a pin or tube of a pin belt. It also has two radial slide holes 450-S2 and a longitudinal slide hole 450-S3. The cone 440 is slid onto a spline 430, which is shaped like a round shaft for which material has been removed so that a cross profile is formed. The outer surfaces of spline 430 form sections of a round shaft so that a matching round sleeve that can freely rotate relative spline 430 can be slid onto spline 430. Also spline 430 is used so that torque from the cone assemblies can be transferred to the spline and vice-versa, hence the smaller end of cone 440 has a profile that matches the profile of spline 430. For better performance purposes, the spline profile on the smaller end of cone 440 is shaped into a round rod, made out of a low friction material such as oil-impregnated bronze for example. This round rod is then tightly and securely pressed into the smaller end of cone 440, so as to prevent any movement between it and smaller end of cone 440. If very large loads are transmitted between spline 430 and its cone assembly, then in order to avoid any movement between the round rod, pressed into the smaller end of cone 440, and smaller end of cone 440, the round rod can be replaced with a square or hexagonal rod made out of a low friction material into which the spline profile is shaped.

In order to mount the tooth carriage 450 to cone 440, two radial slides 460 and one longitudinal slide 480 are used. The radial slides 460 are parallel to each other and extend radially outwards from spline 430. They are fixed to a radial slides sleeve 461 that can freely slide and freely rotate relative to spline 430. The radial slides 460 should be long enough so that they are engaged with their tooth carriage at the smallest pitch diameter and the largest pitch diameter of their cone. Although this is not absolutely required, in order to reduce the vibration due to the centrifugal force of the tooth carriage 450 and its mounting parts, a radial counter-balance slide 462 is fixed opposite of the radial slides 460 on the radial slides sleeve 461. The dimension of the radial counter-balance slide 462 should designed so that it weighs the same amount as the two radial slides 460, and it should be positioned in between the two radial slides an equal distance from each radial slide. The radial counter-balance slide 462 is used to control the axial position of a counter-balance 464 described later. Furthermore, at each end of the radial slides sleeve 461, an oversized flange is shaped. The longitudinal slide 480 is parallel to the centerline of longitudinal cut 440-S1 of cone 440, on the removed surface of cone 440. Because of the radial slides 460, which are positioned so that they can extend out through the longitudinal cut 440-S1 of the cone, the longitudinal slide cannot be placed directly below the longitudinal cut of the cone, hence the longitudinal slide 480 is placed either sufficiently in front of the longitudinal cut or to the back of the longitudinal cut. The ends of the longitudinal slide are threaded for mounting purposes. In order to mount the longitudinal slide to the cone 440, the smaller end of the cone, see FIG. 81, has a cone slide mounting hole 440-S3 through which the longitudinal slide can be slid in. At the outer surface of this hole, a tapered surface that can properly engage with a longitudinal slide nut 481 that is used to secure this end of the longitudinal slide to the smaller end of cone 440 is shaped. In order to mount the other end of the longitudinal slide to the cone, first the larger end cover 445 is bolted on to the cone using cover nuts 446 and cover bolts 447, that are inserted through radially positioned holes on flange 440-S4 of the cone and the matching holes on the larger end cover 445. The larger end cover 445 of the cone, for which a left-end-view is shown in FIG. 82, also has an end cover longitudinal slide hole 445-S1 through which the longitudinal slide 480 can be slid in. At the outer surface of this hole, a tapered surface that can properly engage with a nut that is used to secure this end of the longitudinal slide to the larger end cover is also shaped. Also spline 430 is used so that torque from the cone assemblies can be transferred to the spline and vice-versa, hence the larger end cover 445 has a profile that matches the profile of spline 430. For better performance purposes, the spline profile on the larger end cover 445 is shaped into round rod, made out of a low friction material such as oil-impregnated bronze for example. This round rod is then tightly and securely pressed into the larger end cover 445, so as to prevent any movement between it and larger end cover 445. If very large loads are transmitted between spline 430 and its cone assembly, then in order to avoid any movement between the round rod, pressed into the larger end cover 445, and larger end cover 445, the round rod can be replaced with a square or hexagonal rod made out of a low friction material into which the spline profile is shaped.

Although this is not absolutely necessary, in order to reduce or eliminate vibrations due to the centrifugal forces, a counter-balance longitudinal slide 482 is mounted opposite of the longitudinal slide 480. However, unlike the longitudinal slide, which is parallel to the tapered surface of the cone, the counter-balance longitudinal slide is parallel to spline 430, this will simplify the design considerably, although using this configuration, the counter-balance 464, which should have the same weight as the tooth carriage 450 and which has a vertical hole that can engage with the radial counter-balance slide 462, mounted on the counter-balance longitudinal slide 482, will not always be positioned perfectly opposite of the tooth carriage 450, hence the cone assembly will not always be perfectly balanced. In order to perfectly balance the cone assembly, a set-up identical to the tooth carriage, except that its tooth carriage is toothless while still having the same weight can be used. The counter-balance longitudinal slide 482 is mounted to the cone assembly in a similar manner as longitudinal slide 480. Here for cone 440, a counter-balance longitudinal slide hole 440-S5, through which one end of the counter-balance longitudinal slide 482 can be slid through, exist. And for the larger end cover 445, an end cover counter-balance longitudinal slide hole 445-S2 exist.

A slightly modified cone 440 that has two oppositely positioned tooth carriages 450, which are both toothed, can be used in a CVT 1. For this CVT 1 an adjuster can be used to increase the duration at which the transmission ratio can be changed, but no adjuster can be used to reduce transition flexing. Therefore, sufficient flexing in the pin belts needs to be allowed or the transmission ratios where transition flexing occurs can be skipped.

In order to mount the tooth carriage 450 to the radial slides 460, the tooth carriage has two parallel radial slider holes 450-S2, which should have an inner surface made out of a low friction material, that are straddling the tooth 450-S1 of the tooth carriage 450. Here the radial slides are simply slid into the radial slider holes of the tooth carriage. In order to mount the tooth carriage to the longitudinal slide 480, a longitudinal slider hole 450-S3, which should also have an inner surface made out of a low friction material, exists on the tooth carriage. Here the longitudinal slide is simply slid into the longitudinal slider hole 450-S3. Also, in order to mount the radial slides sleeve 461 to spline 430, radial slides sleeve 461 is slid onto spline 430 and then its axial position is secured by two spline collars 470 that are sandwiching the radial slides sleeve 461. For better performance, a radial slides sleeve axial bearing 72, which is a washer shaped item made out a low friction material, is placed between each spline collar 470 and the radial slides sleeve 461. In order secure the axial position of the spline collar 470 and hence the axial position of radial slides sleeve 461, at the positions where a spline collar 470 needs to be attached, a portion of the outer surface of spline 430 is machined down. The spline collar 470, which is of the split collar type (two halves joined and secured by set screws), has the profile of the machined down portion of spline 430. An end-view of a spline collar 470 mounted on a machined down portion of spline 430 is shown in FIG. 83.

Furthermore, a CVT needs two cones 440 in order to operate. The mounting of each cone is slightly different. Hence one cone assembly is labeled as front sliding tooth cone assembly 420A and the other cone assembly is labeled as back sliding tooth cone assembly 420B. Front sliding tooth cone assembly 420A is identical to back sliding tooth cone assembly 420B, the only difference between them is the front end portions of their cones used for mounting purposes, and the back end portions of their larger end covers used for mounting purposes. For front sliding tooth cone assembly 420A, shown in FIG. 79 and FIG. 81, the front end of cone 440 has a front cone bearing stop surface 440A-S1; a front cone bearing shaft 440A-S2, on which a mounting bearing is slid on; and a front cone locking ring groove 440A-S3, which is shaped on the front cone bearing shaft 440A-S2 and is used to lock the axial position of the mounting bearing relative to cone 440. The larger end cover 445 of front sliding tooth cone assembly 420A, see FIGS. 79 and 82, has front cone larger end cover bearing stop surface 445A-S2; and a front cone larger end cover bearing shaft 445A-S3, on which a mounting bearing for larger end cover 445 is slid on. For back sliding tooth cone assembly 420B, which is shown in FIG. 84 and which uses a back cone 440B, the front end of back cone 440B has a back cone bearing stop surface 440B-S1, which has the same diameter as the front cone bearing stop surface 440A-S1; and a back cone bearing shaft 440B-S2, on which the mounting bearing is slid on, this shaft has the same diameter as the front cone larger end cover bearing shaft 445A-S3. The larger end cover for back sliding tooth cone assembly 420B, which is also shown in FIG. 84 is labeled as back cone larger end cover 445B. Back cone larger end cover 445B is identical to larger end cover 445 except for the shaft and shoulder items used for mounting purposes described below. Back cone larger end cover 445B has a back cone larger end cover bearing stop surface 445B-S1, which has the same diameter as the front cone bearing stop surface 440A-S1; a back cone larger end cover bearing shaft 445B-S2, which has the same diameter as the front cone bearing shaft 440A-S2 and on which a mounting bearing for back cone larger end cover 445B is slid on; and a back cone larger end cover locking ring groove 445B-S3, which is shaped on the back cone larger end cover bearing shaft 445B-S2 and is used to lock the axial position of the mounting bearing relative to cone 440.

In order to transmit torque from or to the cone assemblies a gear 500, shown in FIG. 86, is used. In order to mount a gear 500, which has a gear set screw sleeve 500-S1, to spline 430, a spline shaft extension 432, shown in detail as a front-view in FIG. 85A and as a top-view in FIG. 85B, is used. The spline shaft extension 432, is shaped like round shaft, that along its length has three different diameters. At its left end, spline shaft portion A 432-S1 is shaped, which diameter is smaller than the next shaft portion which is spline shaft portion B 432-S2 so that a shaft shoulder is formed between spline shaft portion A 432-S1 and spline shaft portion B 432-S2. Also, the end of spline shaft portion A 432-S1 has a cavity that is shaped like spline 430 but is slightly smaller than the shape of spline 430, so that spline 430 can be tightly and securely pressed into spline shaft portion A 432-S1. And near the right end of spline shaft portion B 432-S2, a hole that runs through surface to surface exist, this hole will be used for the set-screw of a gear 500. After spline shaft portion B 432-S2, spline shaft portion C 432-S3 is shaped. Spline shaft portion C 432-S3 has a diameter that is smaller than the diameter of spline shaft portion B 432-S2 so that a shaft shoulder is formed between spline shaft portion B 432-S2 and spline shaft portion C 432-S3.

An assembled CVT 2 input/output shaft utilizing a front sliding tooth cone assembly 420A and a back sliding tooth cone assembly 420B is shown as a side-view in FIGS. 86 and 87 and as a top-view in FIG. 88. In FIG. 86, the tooth carriages 450 are positioned near the smallest end of their cone and in FIG. 87, the tooth carriages 450 are positioned near the largest end of their cone.

In order to assemble the CVT, first spline shaft extension 432 is securely pressed into spline 430, so that it is axially and radially fixed to spline 430. Then gear 500 is secured to spline shaft portion B 432-S2 of spline shaft extension 432 using a set-screw. Next spline 430 is slid into a spline bearing A 490A until the left shoulder of spline shaft extension 432 engages with the side surface of spline bearing A 490A facing it, obviously it should be a surface that allows the left shoulder of spline shaft extension 432 to rotate easily relative to the frame on which spline bearing A 490A is mounted. Next spline bearing A 490A is secured to a frame using bolts that engage with a spline bearing A mounting base 490A-S1. Next the spline bearing B 490B is slid into spline shaft portion C 432-S3 until the right shoulder of spline shaft extension 432 engages with the side surface of spline bearing B 490B facing it, obviously it should be surface that allows the right shoulder of spline shaft extension 432 to rotate easily relative to the frame on which spline bearing B 490B is mounted. Next spline bearing B 490B is secured to a frame using bolts that engage with a spline bearing B mounting base 490B-S1.

Once spline 430 is secured into position, front sliding tooth cone assembly 420A and back sliding tooth cone assembly 420B will be mounted on spline 430. In order to reduce the stress on spline 430, the cone assemblies are supported by cone supporting members. A cone supporting member is shaped like a 90 degree L with equal length legs. At the intersection of the legs a cone bearing, which has a round shaft shape low friction inner surface, exist. At the end of each leg a support slider, which also has a round shaft shape low friction inner surface, exist. Here, the cone bearings will be slid into the front or back portion of the cone assemblies; and one support slider will be slid unto a vertical supporting pipe 510, which is shaped like a round pipe, and the other support slider will be slid unto a horizontal supporting pipe 515, which is also shaped like a round pipe. Therefore, first a cone axial bearing 492 is slid into the front cone bearing shaft 440A-S2. Then cone bearing A 491A-S1 of cone supporting member A 491A is slid into the front cone bearing shaft 440A-S2. Next another cone axial bearing 492 is slid into the front cone bearing shaft 440A-S2. And finally a cone locking ring 493 is inserted into front cone locking ring groove 440A-S3. Here due to engagement of the front cone bearing stop surface 440A-S1 and the cone locking ring 493 with the cone axial bearings 492 sandwiching the cone bearing A 491A-S1, the axial position of front sliding tooth cone assembly 420A is fixed relative to the axial position of cone bearing A 491A-S1. Next the vertical support slider A 491A-S3, which is connected to cone bearing A 491A-S1 by a vertical support rod A 491A-S2, is slid into the vertical supporting pipe 510, while at the same time the horizontal support slider A 491A-S5, which is connected to the cone bearing A 491A-S1 by a horizontal support rod A 491A-S4, is slid into the horizontal supporting pipe 515, see FIGS. 86 and 88. During this assembly stage only the right end of the vertical supporting pipe 510 and the horizontal supporting pipe 515 are supported by a pipe support 511, the rest of the supporting pipes can be supported by temporary supports, which can be repositioned as required during the assembly stage, so that the vertical supporting pipe 510 and the horizontal supporting pipe 515 are parallel to spline 430. The temporary supports should be used until the left ends of the vertical supporting pipe 510 and the horizontal supporting pipe 515 are support by pipe supports 511. A pipe support 511 is shaped like a cylinder with one open end and one closed that can be tightly slid onto one end of a supporting pipe. In addition, pipe support 511 has a pipe support leg 511-S1, which extends radially outward and runs lengthwise along pipe support 511; and at the end of pipe support leg 511-S1, a pipe support base plate 511-S2 used to bolt pipe support 511 to the frame of the CVT exist.

Next the longitudinal slide 480 is slid through the cone slide mounting hole 440-S3, bolted to the front surface of that hole, and temporarily support. Then the counter-balance longitudinal slide 482 is also bolted on to the front surface of the cone and temporarily supported, see FIGS. 79 and 81. Next the spline collar 470 is fastened to the machined down portion of spline 430 adjacent to the smaller end of cone 440 and a radial slides sleeve axial bearing 472 is slid onto spline 430. Next the tooth carriage 450 is slid into the radial slides 460 of radial slides sleeve 461, and the counter-balance 464 is slid unto the radial counter-balance slide 462 of radial slides sleeve 461. Then the tooth carriage 450 is aligned with the longitudinal slide 480, the counter-balance 464 is aligned with the counter-balance longitudinal slide 482, and the radial slides sleeve 461 is aligned with spline 430. Once properly aligned the tooth carriage 450, the counter-balance 464, and the radial slides sleeve 461 are slid unto the items they were aligned with. Then another radial slides sleeve axial bearing 472 is slid unto spline 430. Then the radial slides sleeve 461 with its radial slides sleeve axial bearings 472 are secured to spline 430 so that they are axially fixed to spline 430 but are able to rotate relative to spline 430 using another spline collar 470. Next, the unsupported end of the longitudinal slide 480 and the counter-balance longitudinal slide 482 are slid into their designated holes of larger end cover 445, and the larger end cover 445 is secured to cone 440 of front sliding tooth cone assembly 420A using cover nuts 446 and cover bolts 447. Then the longitudinal slide 480 and the counter-balance longitudinal slide 482 are secured to larger end cover 445 using bolts.

Next a cone axial bearing 492, is slid unto front cone larger end cover bearing shaft 445A-S3 and this end of front sliding tooth cone assembly 420A is supported by sliding in cone bearing B 491B-S1 of cone supporting member B 491B into front cone larger end cover bearing shaft 445A-S3, see FIGS. 79 and 86. Next the vertical support slider B 491B-S3, which is connected to the cone bearing B 491B-S1 by a vertical support rod B 491B-S2, is slid into the vertical supporting pipe 510, while at the same time the horizontal support slider B 491B-S5, which is connected to the cone bearing B 491B-S1 by a horizontal support rod B 491B-S4, is slid into the horizontal supporting pipe 515, see FIGS. 86 and 88.

Then a cone axial bearing 492 is slid onto back cone bearing shaft 440B-S2 of back sliding tooth cone assembly 420B, see FIGS. 84 and 86, and back cone 440B is slid unto spline 430, in an orientation where the slot for tooth carriage 450 of back sliding tooth cone assembly 420B is positioned opposite of the slot for tooth carriage 450 of front sliding tooth cone assembly 420A until the front cone bearing shaft 440A-S2 is sufficiently inserted into the open end of cone bearing B 491B-S1 so that the cone axial bearing 492 mounted on back cone bearing shaft 440B-S2 is tightly sandwiched by the back cone bearing stop surface 440B-S1 and the open end surface of cone bearing B 491B-S1. Next the longitudinal slide 480, counter-balance longitudinal slide 482, spline collars 470, radial slides sleeve axial bearings 472, radial slides sleeve 461, tooth carriage 450, counter-balance 464, and back cone larger end cover 445B of back sliding tooth cone assembly 420B are attached in the same manner as the same or similar parts of front sliding tooth cone assembly 420A are attached.

Then the larger end of back sliding tooth cone assembly 420B is supported by first sliding in a cone axial bearing 492 into the back cone larger end cover bearing shaft 445B-S2 and then sliding in cone bearing C 491C-S1 of cone supporting member C 491C unto back cone larger end cover bearing shaft 445B-S2, while at the same time the vertical support slider C 491C-S3, which is connected to the cone bearing C 491C-S1 by a vertical support rod C 491C-S2, is slid into the vertical supporting pipe 510, and the horizontal support slider C 491C-S5, which is connected to the cone bearing C 491C-S1 by a horizontal support rod C 491C-S4, is slid into the horizontal supporting pipe 515, see FIGS. 84, 86 and 88. Next another cone axial bearing 492 is slid into back cone larger end cover bearing shaft 445B-S2. Then a cone locking ring 493 is inserted into back cone larger end cover locking ring groove 445B-S3. And finally, a pipe support 511 is slid onto the left end of vertical supporting pipe 510 and onto the left end of horizontal supporting pipe 515, and then secured to the frame of the CVT. Since now the supporting pipes are supported by the pipe supports 511, the temporary supports can be removed.

In order to attach the actuator used to change the transmission ratio to the CVT 2 input/output shaft described above, a cone supporting member actuator bar 1700 is attached to each cone supporting member, which for the CVT 2 input/output shaft described above are cone supporting member A 491A, cone supporting member B 491B, and cone supporting member C 491C. For each cone supporting member, the cone supporting member actuator bar 1700 is positioned so that it connects the horizontal support slider, which slides on a horizontal supporting pipe 515, with the vertical support slider, which slides on a vertical supporting pipe 510, of a cone supporting member. The cone supporting member actuator bar 1700 can be seen in FIG. 89, which show a front-view of a CVT utilizing a CVT 2 input/output shaft. The cone supporting member actuator bar 1700 should be shaped so that it does not interfere with any parts of the CVT 2 input/output shaft during transmission ratio change. In order to connect all cone supporting members to the actuator used to change the transmission ratio, each cone supporting member actuator bar has a actuator bar hole 1700-S1 at its the mid-length, see FIG. 89. Through each actuator bar hole 1700-S1 of the cone supporting member actuator bars, an actuator threaded rod 1701 is inserted; and the position of the cone supporting members relative to each other and relative to the actuator threaded rod 1701 is secured by having nuts, screwed on the actuator threaded rod 1701, that clamp each cone supporting member actuator bar 1700. This can be seen in FIG. 90, which show a partial top-view of a CVT utilizing a CVT 2 input/output shaft. In order to connect the CVT 2 input/output shaft to the actuator used to change the transmission ratio, on one end of the actuator threaded rod 1701, a threaded rod holed bar 1702 is attached. The threaded rod holed bar 1702 can then be used to connect a linear actuator, used to change the transmission ratio, to actuator threaded rod 1701. In FIG. 13, the linear actuator is connected to actuator threaded rod 1701 using a clevis and a locking pin. For proper operation the linear actuator should have a linear position sensor.

The design methods for the tooth carriage cone assembly described above, can also be used to design a cone assembly with one torque transmitting member, which here is labeled as pin belt torque transmitting member 590, and one non-torque transmitting member, which here is labeled as pin belt non-torque transmitting member 690 and is used to counter-balance the centrifugal force of pin belt torque transmitting member 590 and help maintain the alignment of the transmission belt when the transmission belt is not engaged with the torque transmitting member. Here this cone assembly, which labeled as front pin belt cone assembly 520A is shown in as a front-view where portions of it front surface has been removed in FIG. 91A, as a front-view where its entire front surface has been removed in FIG. 92A, and as an end-view in FIG. 91B and FIG. 91B. In FIGS. 91A and 91B, the pin belt torque transmitting member 590 and pin belt non-torque transmitting member 690 are positioned near the smaller end of the cone, and in FIGS. 92A and 92B they are positioned near the larger end of the cone. In addition, partial sectional-views referenced in FIG. 91A are shown in FIGS. 93 and 94, which only show the cut sections. Front front pin belt cone assembly 520A, which uses a pin belt cone 540 shown in FIGS. 91A, 91B, 92A, and 92B, is almost identical to the tooth carriage cone assembly described previously. However, here in order to balance the centrifugal forces better, two pin belt longitudinal slides 580, which are identical and attached in the same manner as longitudinal slide 480, are used. One pin belt longitudinal slide 580 will be used to mount a torque transmitting member carriage 550A, and the other pin belt longitudinal slide 580 will be used to mount a non-torque transmitting member carriage 550B, see FIGS. 92A and 93. The torque transmitting member carriage 550A like the tooth carriage 450, have a longitudinal slide hole and two radial slide holes, into which torque transmitting member slides 560-S2 of a torque transmitting member radial slider sleeve 560 are inserted. The sleeve of torque transmitting member radial slider sleeve 560 is shaped like the radial slides sleeve 461. The torque transmitting member radial slider sleeve 560 has two sets of oppositely positioned radial torque transmitting member slides 560-S2, one set will be used to maintain the axial position of the torque transmitting member carriage 550A relative to torque transmitting member radial slider sleeve 560, and the other set will be used to maintain the axial position of the non-torque transmitting member carriage 550B relative to torque transmitting member radial slider sleeve 560. The only difference between the tooth carriage 450 and torque transmitting member carriage 550A is that torque transmitting member carriage 550A does not have a tooth and that while for tooth carriage 450, its radial slides are positioned inside its radial slider holes, for torque transmitting member carriage 550A, the lower portions of a torque leading plate left sleeve 592-S1 and a torque leading plate right sleeve 592-S2 of a pin belt torque transmitting member 590, see FIGS. 97 and 92A, are positioned inside its radial slider holes and secured using torque leading plate locking rings 600; while the radial slides are positioned inside the torque leading plate left sleeve 592-S1 and the torque leading plate right sleeve 592-S2. The non-torque transmitting member carriage 550B which is identical to the torque transmitting member carriage 550A, except that here the lower portions of a non-torque leading plate left sleeve 692-S1 and a non-torque leading plate right sleeve 692-S2 of a pin belt non-torque transmitting member 690, see FIG. 106, are positioned inside the radial slider holes and secured using torque leading plate locking rings 600, while the radial slides are positioned inside the non-torque leading plate left sleeve 692-S1 and the non-torque leading plate right sleeve 692-S2. Also, in order to properly guide the other ends, which will be referred to as the trailing ends of pin belt torque transmitting member 590 and pin belt non-torque transmitting member 690 a trailing end slides sleeve 565 will be used. Trailing end slides sleeve 565 consist of sleeve, which can freely rotate relative to pin belt cone assembly spline 530, and two oppositely positioned trailing end slides 565-S1, see FIG. 94. The trailing end slides 565-S1 will be inserted into trailing end cuts 540-S6, see FIG. 112A, and will be used to secure the trailing plate 593 of pin belt torque transmitting member 590 and non-torque trailing plate 693 of pin belt non-torque transmitting member 690.

The pin belt torque transmitting member 590 and its parts are shown as a top-view in FIG. 95, and as sectional-views in FIGS. 96-98, it is channel shaped with two sides and a base and consist of a rubber segment that is reinforced with reinforcement plates and reinforcement wires. It consists of reinforcement plates 591 that are placed at regular intervals along the length of a pin belt torque transmitting member 590. The surface of the reinforcement plates should be selected or coated so that they can properly bond with the rubber of the torque transmitting member. Here epoxy might be used. Pin belt torque transmitting member 590 should have sufficient compressive and lateral stiffness so that pin belt torque transmitting member 590 can maintain its proper shape as required for smooth operation in instances when a load in the direction from trailing plate 593 to leading plate 592 is applied to pin belt torque transmitting member 590. The load in this direction should be carried by pin belt torque transmitting member 590 when the output shaft of the CVT where its cone assembly is used is pulling the input shaft of that CVT.

The reinforcement plates are flat channel shaped plates that have a round flange 591-S1 on which a pin belt tooth 591-S2, is shaped on both its inner facing surfaces. A pin belt tooth 591-S2 is shaped from a tubular section for which a radial section is removed. It consists of a tubular section, which starts at the center height of a round flange 591-S1 and ends near the bottom of round flange 591-S1, but extends slightly beyond the bottom of round flange 591-S1, see FIGS. 98 and 92B. The extension beyond the bottom of round flange 591-S1 of each pin belt tooth 591-S2 should be short enough so that the torque transmitting member can smoothly engage with its transmission belt. The exact dimension for the extension can easily be obtained experimentally or by using a CAD program. Also if required for smooth operation, the tooth shape does not have to start at the center height of the tooth, if required it can start slightly below that. The pin belt teeth 591-S2 are used for torque transmission. During operation the pin belt teeth 591-S2 engage with the transmission belt pins 630-M1 of a pin transmission belt 630, shown as a side-view in FIG. 102A and as an end-view in FIG. 102B. For pin transmission belt 630, the neutral-axis is located at the center-axis of the transmission belt pins 630-M1.

In addition, for reinforcement plate 591, near each round flange, a hole for a reinforcement wire 594 exist. For increased strength, once mounted on the reinforcement wires, before being coated with rubber, the reinforcement plates can be bonded to the reinforcement wires using epoxy. For smooth engagement and optimal performance, the neutral-axis of pin belt torque transmitting member 590 is positioned so that the centers of the round flanges 591-S1 are located on the neutral-axis, and the reinforcement wires 594 should also be located on the neutral-axis. And the area of the left channel side is identical to the area of the right channel side, although this might be ignored if this increases the cost of pin belt torque transmitting member 590 significantly. Also since the rubber surfaces of torque transmitting member are not used for torque transmission, in order minimize friction loses and wear, they have a low friction surface.

Furthermore, in order secure pin belt torque transmitting member 590 to front pin belt cone assembly 520A, the leading end of pin belt torque transmitting member 590, has a leading plate 592 molded in it. Leading plate 592, see FIG. 97, is identical to a reinforcement plate 591, except that to its left and right outer sides sleeves, labeled as torque leading plate left sleeve 592-S1 and torque leading plate right sleeve 592-S2, are shaped. As discussed earlier the lower portions of torque leading plate sleeves, which are not covered by rubber, are inserted into torque transmitting member carriage 550A. And in order to secure leading plate 592 and hence the leading end of pin belt torque transmitting member 590 to torque transmitting member carriage 550A, each torque leading plate right sleeve 592-S2 has two leading plate locking ring grooves 592-S3.

In addition, in order to secure the trailing end, of pin belt torque transmitting member 590 to front pin belt cone assembly 520A, at the trailing end, a trailing plate 593 is molded into pin belt torque transmitting member 590. Trailing plate 593, shown in FIG. 99, is identical to a reinforcement plate 591, except that to its right outer side a sleeve, labeled as trailing plate sleeve 593-S1 is shaped. In order to secure the trailing end of pin belt torque transmitting member 590 to pin belt cone 540, the lower portions of trailing plate sleeve 593-S1, which is not covered by rubber, is inserted into a trailing end cut 540-S6 of pin belt cone 540 and slid into trailing end slide 565-S1. Then a ball clamp 620 is slid onto trailing plate sleeve 593-S1 so that the surface of pin belt cone 540 is clamped by the bottom surface of the trailing end of pin belt torque transmitting member 590 and the balls 620-M1 of ball clamp 620, see FIG. 100. Ball clamp 620 consist of a ball plate 620-S1, which is a plate on which has two cavities into which two balls are pressed in exist. The balls 620-M1 can rotate without much friction relative to ball plate 620-S1. Below ball plate 620-S1, a ball clamp sleeve 620-S2, which is slid on trailing plate sleeve 593-S1, is shaped. The inner surface of ball clamp sleeve 620-S2 has a low friction coating so that ball clamp 620 can freely rotate relative to trailing plate sleeve 593-S1. Ball plate 620-S1 is shaped at an angle relative to ball clamp sleeve 620-S2 so that in its assembled state, ball plate 620-S1 can be oriented so that it is parallel relative to the surface of its pin belt cone 540. During assembly, ball plate 620-S1 should be oriented so that it is parallel relative to the surface of its pin belt cone 540. Since ball clamp 620 is free to rotate on trailing plate sleeve 593-S1, ball plate 620-S1 can reoriented itself so that it is always parallel to the surface of its pin belt cone 540 when its slide to a different position. During normal operation ball plate 620-S1 should be parallel to the surface of pin belt cone 540, since the surface of pin belt cone 540 will force it in that orientation. In order to secure ball clamp 620 to trailing plate sleeve 593-S1, a ball clamp locking ring 601, which is inserted into trailing plate locking ring grooves 593-S2, is used. If a simpler method is desired, ball clamp 620 can be replaced with a dome shaped nut 621, see FIG. 101. In order to allow some slight play between dome shaped nut 621 and the surface of the cone on which it is attached, it is recommended that dome shaped nut 621 is allowed to slightly slide axially relative to trailing end slides 565-S1 when it is secured to trailing plate sleeve 593-S1.

Also the pin belt torque transmitting member 590, has an extension 595, see FIG. 95, which is not used for torque transmission but is used to provide a resting surface for pin belt torque transmitting member 590, so as to minimize the uncovered surface of pin belt cone 540. Ideally, extension 595 is shaped so that it provides maximum coverage on the surface of pin belt cone 540 without ever overlapping the leveling surfaces 540-S7 of pin belt cone 540. The neutral-axis for extension 595, which is shown as an end-view in FIG. 101, should coincide with the neutral-axis of pin transmission belt 630. The tapered cut for extension 595 can be selected arbitrarily as long as it never overlaps leveling surfaces 540-S7 as pin belt torque transmitting member 590 is slid from its position for its largest pitch diameter to its position for its smallest pitch diameter.

Also, the arc length of a pin belt torque transmitting member 590 should be short enough so that for the CVT where it is used, its transmission belt will never cover the entire non-torque transmitting arc of its cone. However, the arc length of pin belt torque transmitting member 590 should be long enough so that for the CVT where it is used, at least a torque transmitting surface of at least one pin belt torque transmitting member 590 is always engaged with its transmission belt.

Furthermore, an increase in lateral stiffness of pin belt torque transmitting member 590 allows more torque to be transmitted when a load in the direction from trailing plate 593 to leading plate 592 is applied to pin belt torque transmitting member 590. Since this allows more load to be carried through the engagement of the lower portion of trailing plate sleeve 593-S1 with trailing end cuts 540-S6. Without sufficient lateral stiffness of pin belt torque transmitting member 590, a too big of a load carried through the engagement of trailing plate sleeve 593-S1 with trailing end cuts 540-S6 would cause too much lateral bending of pin belt torque transmitting member 590.

The lateral stiffness of pin belt torque transmitting member 590 can be increased by the following or combination of the following, by increasing the width of pin belt torque transmitting member 590; by increasing the stiffness of the rubber of pin belt torque transmitting member 590; by increasing the size of the reinforcements of pin belt torque transmitting member 590, by increasing the lateral distance between the reinforcements of pin belt torque transmitting member 590; by adding additional reinforcements, which like the reinforcements of pin belt torque transmitting member 590 should also be located at the neutral-axis of pin belt torque transmitting member 590, to pin belt torque transmitting member 590; and/or by having reinforcement shapes shaped on the outside side surfaces of pin belt torque transmitting member 590, similar to the lateral bending reinforcement 280-S2 of the torque transmitting side member 280 described in the Torque Transmitting Side Members section of this application and shown in FIGS. 69, 70A, 70B, and 70C.

Front pin belt cone assembly 520A and back pin belt cone assembly 520B, described later, are primarily designed to carry a large amount of load in the direction from leading plate 592 to trailing plate 593. The load in this direction should be carried when the input shaft of the CVT where the cone assemblies are used is pulling the output shaft of that CVT. Front pin belt cone assembly 520A and back pin belt cone assembly 520B are not designed to carry a large amount of load in the direction from trailing plate 593 to leading plate 592, which should be carried when the output shaft of the CVT where the cone assemblies are used is pulling the input shaft of that CVT. The load in the direction from trailing plate 593 to leading plate 592 can be limited by using friction clutches, or even eliminated by using one-way clutches.

The pin belt non-torque transmitting member 690 and its parts are shown in FIGS. 103-106. It is identical to pin belt torque transmitting member 590 except that its non-torque reinforcement plates 691, shown in FIG. 104, its non-torque leading plate 692, shown in FIG. 105, and its non-torque trailing plate 693, shown in FIG. 106, do not have any teeth, which for the plates of pin belt torque transmitting member 590 are formed by the round flanges and the partial circular surfaces. Hence pin belt non-torque transmitting member 690 will be slightly lighter than pin belt torque transmitting member 590. If this significantly affects the balance of the cone assembly, the plates for pin belt non-torque transmitting member 690 can be made slightly thicker so that they weight about the same as the plates of the pin belt torque transmitting member 590. Pin belt non-torque transmitting member 690 will not be used for torque transmission, its primary function is to maintain the axial alignment of a rotational energy conveying device, such as a transmission belt, when it is not in contact with a pin belt torque transmitting member 590. Hence for increased performance, it is recommended that the inner side surfaces of pin belt non-torque transmitting member 690 are coated with a low friction material.

Furthermore, if its desirable to use friction to transmit torque than a torque transmitting member similar to pin belt torque transmitting member 590, labeled as alternate friction torque transmitting member 1590, shown as a top-view in FIG. 107 can be used instead of pin belt torque transmitting member 590. Alternate friction torque transmitting member 1590 also has channel shaped cross-section, however since alternate friction torque transmitting member 1590 will be used with a tapered base V-belt, its cut-out portion has the shape of a tapered base V-belt. A tapered base V-belt is similar to regular V-belt except that it is base is tapered. Since the base of a tapered base V-belt rests on the outer surface of a cone assembly, the taper of the base of tapered base V-belt should match the taper of the outer surface of its cone assembly. Alternate friction torque transmitting member 1590 is identical to pin belt torque transmitting member 590, except that it's a rubber segment is not reinforced with reinforcement plates. However, it's a rubber segment is reinforced with reinforcement wires, which here are labeled as friction member reinforcement wires 1594, in the same manner pin belt torque transmitting member 590 is reinforced with reinforcement wires. Also, like pin belt torque transmitting member 590, alternate friction torque transmitting member 1590 has a leading plate, which is labeled as friction leading plate 1592, that is identical to leading plate 592 except that it does not have round flanges and pin belt teeth, and has a cut-out that has the shape of a tapered base V-belt. The friction leading plate 1592 can also be seen in FIG. 108, which shows a sectional-view of alternate friction torque transmitting member 1590. Alternate friction torque transmitting member 1590 also has a trailing plate, which is labeled as friction trailing plate 1593, that is identical to trailing plate 593 except that it does not have round flanges and pin belt teeth, and has a cut-out that has the shape of a tapered base V-belt. Friction trailing plate 1593 is also shown as a front-view in FIG. 109.

As described earlier, alternate friction torque transmitting member 1590 should have a cross-section that has a cut-out portion that has the shape of a tapered base V-belt. For smooth engagement and optimal performance, the neutral-axis of alternate friction torque transmitting member 1590 is positioned so that when it is engaged with its tapered base V-belt, the neutral-axis of the tapered base V-belt used with alternate friction torque transmitting member 1590 is located on the neutral-axis of alternate friction torque transmitting member 1590. Also, the reinforcement wires of alternate friction torque transmitting member 1590 should be located on the neutral-axis of alternate friction torque transmitting member 1590; and the reinforcement wires of its tapered base V-belt should also be located on the neutral-axis of that tapered base V-belt. A drawing that shows a cross-sectional-view of alternate friction torque transmitting member 1590 that is engaged with its V-belt, which is labeled as V-belt 1600, is shown in FIG. 110.

In order to have a wedging action between alternate friction torque transmitting member 1590 and its tapered base V-belt so as obtain proper frictional engagement, the width of the base of the cut-out portion of alternate friction torque transmitting member 1590 is slightly less than the width of the base of its tapered base V-belt. For optimal torque transmission, the surface finish or surface coating of alternate friction torque transmitting member 1590 should be selected such that a large coefficient of friction between alternate friction torque transmitting member 1590 and its tapered base V-belt can be obtained. Also if alternate friction torque transmitting member 1590 is used instead of pin belt torque transmitting member 590, than for its non-torque transmitting member instead of pin belt non-torque transmitting member 690, an alternate friction non-torque transmitting member 1690 is used. Alternate friction non-torque transmitting member 1690 is identical to alternate friction torque transmitting member 1590, except that instead of having a cut-out portion that has a base with a width that is slightly less than the width of the base of its tapered base V-belt, it has a cut-out portion that has a base with a width that is slightly more than the width of the base its tapered base V-belt so as to eliminate the wedging action. In order to maintain the radial position of the tapered base V-belt when it is engaged with alternate friction non-torque transmitting member 1690, the increase in the width of the base of the cut-out portion of alternate friction non-torque transmitting member 1690 has to accompanied by a corresponding increase in height of the base of the cut-out portion of alternate friction non-torque transmitting member 1690. Also the surfaces of alternate friction non-torque transmitting member 1690 that engage with its tapered base V-belt should have a low-friction surface finish. If a leveling loop, which was described earlier, is used, alternate friction torque transmitting member 1590 and alternate friction non-torque transmitting member 1690 can be used with a regular V-belt. A drawing that shows a cross-sectional-view of alternate friction non-torque transmitting member 1690 that is engaged with its tapered base V-belt, which is labeled as tapered base V-belt 1600, is shown in FIG. 111. The control method during transmission ratio change for a CVT that uses a cone assembly or cone assemblies that use alternate friction torque transmitting members 1590 and alternate friction non-torque transmitting members 1690, should be identical to the control method used in a CVT that uses cone assemblies with toothed torque transmitting members as described previously. However, here if desired, a control method were sliding between the torque transmitting surfaces occur, as is the case in most conventional CVT's, can also be used.

The pin belt cone 540 used for front pin belt cone assembly 520A is shown as a front-view in FIG. 112A and as an end-view in FIG. 112B. Except for the features described in the following paragraphs, this cone is identical to cone 440 described previously. While cone 440 has one longitudinal cut 440-S1, pin belt cone 540 has two oppositely positioned leading end cuts 540-S1. The leading end cuts 540-S1 and the pin belt cone assembly spline 530 are located on one radial plane, and the pin belt longitudinal slides 580 are aligned parallel to the width centerline of the leading end cuts 540-S1. In the cone's assembled state, the radial torque transmitting member slides 560-S2 will be placed in the leading end cuts 540-S1. Also since front pin belt cone assembly 520A has two pin belt longitudinal slides 580 and no counter-balance longitudinal slide, cone 540 has two pin belt cone slide mounting holes 540-S3, instead of one cone slide mounting hole 440-S3 and one counter-balance longitudinal slide hole 440-S5 that cone 440 has. The pin belt cone slide mounting holes 540-S3 should be aligned and positioned such that in the cone's assembled state, the pin belt longitudinal slides 580 are aligned parallel to the width centerline of the leading end cuts 540-S1.

In addition, pin belt cone 540 also has two oppositely positioned trailing end cuts 540-S6. In the cone's assembled state, into the trailing end cuts 540-S6, the lower portions of the sleeves of trailing plate 593 and non-torque trailing plate 693 into which the trailing end slides 565-S1 of the trailing end slides sleeve 565 are inserted, are inserted. The trailing end cuts 540-S6 are shaped so that for a pin belt torque transmitting member 590 attached between a leading end cut 540-S1 and a trailing end cut 540-S6, the neutral-axis arc length of that pin belt torque transmitting member 590 remains constant as that pin belt torque transmitting member 590 is moved to different axial locations on the surface of its cone; in addition, that pin belt torque transmitting member 590 should also wrap tightly around the surface of its cone without lifting. The exact shape of the trailing end cuts 540-S6 can be easily obtained experimentally by attaching the leading end of pin belt torque transmitting member 590 to the assembled cone and tracing the movement of the trailing plate sleeve 593-S1. For experimental purposes, a specialized pin belt torque transmitting member 590, for which the trailing plate sleeve 593-S1 does not extend beyond the bottom surface of pin belt torque transmitting member 590, can be used. Somebody skilled in the art should also be able to determine the shape of the trailing end cuts 540-S6 mathematically.

Also the percentage of circumferential surface of the axial section of pin belt cone 540 covered by its pin belt torque transmitting member 590 and its pin belt non-torque transmitting member 690 decreases as the pitch diameter is increased. In order to provide a level resting surface for the transmission belt at the surface of pin belt cone 540 that will not be covered by pin belt torque transmitting member 590 and pin belt non-torque transmitting member 690, leveling surfaces 540-S7 are glued on to the surface of pin belt cone 540. The leveling surfaces 540-S7 are rubber sheets that have the same thickness as the thickness of the base of pin belt torque transmitting member 590 and pin belt non-torque transmitting member 690, and are shaped as to cover as much surface of pin belt cone 540 without interfering with the operation of pin belt torque transmitting member 590 and pin belt non-torque transmitting member 690. Two identical leveling surfaces 540-S7 are glued on the surface of pin belt cone 540 opposite from each other.

As in the configuration for a CVT 2 input/output shaft utilizing a front sliding tooth cone assembly 420A and a back sliding tooth cone assembly 420B, in addition to a pin belt cone 540, a back pin belt cone 540B is also needed. Except the front shaft and shoulder portions of back pin belt cone 540B, which are identical to back cone 440B, back pin belt cone 540B is identical to pin belt cone 540, see FIG. 113.

The pin belt cone larger end cover 545 for pin belt cone 540, which can be seen in FIGS. 91A, is identical to larger end cover 445 except that it has two pin belt cone end cover longitudinal slide holes 545-S1, instead of one end cover longitudinal slide hole 445-S1 and one end cover counter-balance longitudinal slide hole 445-S2 that larger end cover 445 has. The pin belt cone end cover longitudinal slide holes 545-S1 should be aligned and positioned such that in the cone's assembled state, the pin belt longitudinal slides 580 are aligned parallel to the width centerline of the leading end cuts 540-S1. And the back pin belt cone larger end cover 545B, shown in FIG. 114, for back pin belt cone 540B is identical to back cone larger end cover 445B except that it has two holes for mounting pin belt longitudinal slides 580, instead of one hole for mounting the longitudinal slide and one hole for mounting the counter-balance longitudinal slide that back cone larger end cover 445B has. The holes for mounting pin belt longitudinal slides 580 are identical to the pin belt cone end cover longitudinal slide holes 545-S1. They are aligned and positioned such that in the cone's assembled state, the pin belt longitudinal slides 580 are aligned parallel to the width centerline of the leading end cuts 540-S1.

Back pin belt cone 540B and back pin belt cone larger end cover 545B are used for a back pin belt cone assembly 520B. The only difference between back pin belt cone assembly 520B and front pin belt cone assembly 520A is the front end portions of their cones used for mounting purposes, and the back end portions of their larger end covers used for mounting purposes.

CVT 2 input/output shaft utilizing a front pin belt cone assembly 520A and a back pin belt cone assembly 520B is identical to CVT 2 input/output shaft utilizing a front sliding tooth cone assembly 420A and a back sliding tooth cone assembly 420B, except that here instead of front sliding tooth cone assembly 420A, a back sliding tooth cone assembly 420B, and a spline 430, here a front pin belt cone assembly 520A, a back pin belt cone assembly 520B, and a pin belt cone assembly spline 530 are used. Since the teeth of front sliding tooth cone assembly 420A and a back sliding tooth cone assembly 420B are positioned opposite of each other on their CVT 2 input/output shaft, the torque transmitting members of front pin belt cone assembly 520A and a back pin belt cone assembly 520B are also positioned opposite of each other on their CVT 2 input/output shaft. Also if a pin belt cone assembly with two oppositely positioned torque transmitting members, toothed or friction dependent, or a sliding tooth cone assembly with two oppositely positioned sliding teeth is used, than the mounting of a single cone assembly on a shaft/spline as shown as a top-view in FIG. 115 can be used. Here the single mounted cone assembly can be coupled to a pulley or a sprocket; or to another single mounted cone assembly in the configuration of a CVT 1.

In order to assemble pin belt cone assembly 520A or back pin belt cone assembly 520B, first the trailing end slides 565-S1 of trailing end slides sleeve 565 are inserted into the trailing end cuts 540-S6 of a pin belt cone 540, then a radial slides sleeve axial bearing 472 is placed in front of trailing end slides sleeve 565. Next pin belt cone 540, radial slides sleeve axial bearing 472, and trailing end slides sleeve 565 are aligned with pin belt cone assembly spline 530 and slid onto with pin belt cone assembly spline 530. Then spline collar 470 is mounted on the designated cut on pin belt cone assembly spline 530 that is positioned near the smaller end of the pin belt cone 540.

The other parts, except the pin belt torque transmitting member 590 and the pin belt non-torque transmitting member 690, are then assembled in a similar manner as the parts for front sliding tooth cone assembly 420A are assembled. For example, in order to mount torque transmitting member carriage 550A and non-torque transmitting member carriage 550B, first the torque transmitting member slides 560-S2 of torque transmitting member radial slider sleeve 560 are inserted into the radial slider holes of torque transmitting member carriage 550A and non-torque transmitting member carriage 550B. Next, the torque transmitting member carriage 550A and non-torque transmitting member carriage 550B are aligned with their pin belt longitudinal slide 580 and the torque transmitting member radial slider sleeve 560 is aligned with pin belt cone assembly spline 530. Then torque transmitting member carriage 550A and non-torque transmitting member carriage 550B are slid onto their pin belt longitudinal slide 580 and torque transmitting member radial slider sleeve 560 is slid onto pin belt cone assembly spline 530. Once the torque transmitting member carriage 550A, non-torque transmitting member carriage 550B, and trailing end slides sleeve 565 are in position, pin belt torque transmitting member 590 and the pin belt non-torque transmitting member 690 can be mounted by sliding the leading plate sleeves onto the radial sliders and into the radial slider holes of their carriages and securing them using torque leading plate locking rings 600, and by sliding the trailing plate sleeves into the trailing end slides and into the trailing end cuts and securing them using a ball clamp 620 or dome shaped nut 621.

Pin transmission belt 630, see FIGS. 120A and 120B, consists of a rubber belt on which transmission belt pins 630-M1, which extend to the left and to the right of the rubber belt are inserted. The dimensions of the pins are such that they can properly engage with the pin belt teeth 591-S2 of pin belt torque transmitting member 590, and the distance/pitch between the transmission belt pins 630-M1 should match the distance/pitch between the pin belt teeth 591-S2 of pin belt torque transmitting member 590. And when pin transmission belt 630 is engaged with its pin belt torque transmitting member 590, the neutral-axis of bending of pin transmission belt 630 should coincide with the neutral-axis of bending of its pin belt torque transmitting member 590. For smooth operation and optimal performance the center of the transmission belt pins 630-M1 should be located at the neutral-axis of pin transmission belt 630. For increased strength, holes for reinforcements, labeled as pin reinforcement holes 630-M1-S1, are drilled into the transmission belt pins 630-M1. Like for the reinforcement plates, for increased strength, the pins should be bonded to their reinforcements, which here are labeled as pin belt reinforcements 630-M2. The base of pin transmission belt 630 rests on the outer surface of a cone assembly, hence the taper of the base of pin transmission belt 630 should match the taper of the outer surface of its cone assembly. The width of pin transmission belt 630 is slightly narrower than the bottom inner side surfaces of pin belt torque transmitting member 590 and pin belt non-torque transmitting member 690 so that pin transmission belt 630 can engage with the bottom inner side surfaces of pin belt torque transmitting member 590 and pin belt non-torque transmitting member 690 for alignment purposes. Also since the rubber surfaces of the transmission belt are not used for torque transmission, in order minimize friction loses and wear, they should have low friction surfaces. In case no adjuster or adjustment device is used, pin transmission belt 630 should be flexible enough so that it can stretch without failure to account for instances were the arc length(s) of the non-torque transmitting arc(s) of the cone(s) with which is used, do not correspond to a multiple of the width of the teeth or tooth of the cone assembly or cone assemblies with which is used. If necessary the pin belt reinforcements 630-M2 can be omitted to ensure this or the transmission ratios where transition flexing occurs can be skipped.

CVT 2 input/output shaft utilizing a front pin belt cone assembly 520A and a back pin belt cone assembly 520B and the CVT 2 input/output shaft utilizing a front sliding tooth cone assembly 420A and a back sliding tooth cone assembly 420B, can than be used to construct a CVT 2 by coupling each cone assembly to a matching transmission pulley or sprocket.

If front sliding tooth cone assembly 420A and a back sliding tooth cone assembly 420B are used, then each cone assembly can be coupled to a sprocket that can properly engage with the transmission belts used front sliding tooth cone assembly 420A and a back sliding tooth cone assembly 420B. Here the pitch of the teeth of the sprocket should match the pitch of its transmission belts. And the width of the teeth of the sprocket should match the width of the tooth of tooth carriage 450, which should be slightly less than the distance between the inner surfaces of belt member 1 411 and belt member 2 412 of its transmission belts.

If front pin belt cone assembly 520A and a back pin belt cone assembly 520B are used, then for each transmission pulley of a cone assembly, a twin sprocket pulley 700, shown as a front-view in FIG. 116A and as a sectional-view in FIG. 116B can be used. The twin sprocket pulley 700 consist of two pulley sprockets 700-S1 that sandwich a pulley conical surface 700-S2, which taper matches the taper of its cone assembly and the bottom surfaces of its transmission belts. The distance between the pulley sprockets 700-S1 should be selected such that distance between the inner surfaces of the pulley sprockets 700-S1 is slightly wider than the width of its transmission belt or chain. Also in order to mount twin sprocket pulley 700 to its shaft, it has a pulley mounting sleeve 700-S3, which has a threaded hole for keying twin sprocket pulley 700 to its shaft. The twin sprocket pulley 700 can also be replaced by two sprockets 702 mounted parallel to each other on a shaft as shown as a front-view in FIG. 117A and as a sectional-view in FIG. 117B. Each sprocket 702 has a sprocket mounting sleeve 702-S1, which has a threaded hole for keying that sprocket 702 to its shaft. The distance between the sprockets 702 should be selected such that distance between the inner surfaces of the sprockets 702 is slightly wider than the width of its transmission belt or chain. For both, the twin sprocket pulley 700 and the sprockets 702 mounted in parallel, the pitch of the teeth of the sprockets should match the pitch of their transmission belts. If the distance between the teeth of the transmission belt is larger than that of a regular sprocket chain, then the distance between the of the teeth of the sprockets can be increased while the pitch diameter of the teeth are maintained at the same diameter as a regular sprocket of the same tooth size. A transmission pulley for front pin belt cone assembly 520A and a back pin belt cone assembly 520B can also be formed by gluing the mid-portion of a pin belt torque transmitting member 590, such that only reinforcement plates 591 are used, on a matching conical surface in a manner such that the mid-portion of pin belt torque transmitting member 590 provides sufficient coverage for continuous torque transmission.

A CVT constructed from a front sliding tooth cone assembly 420A and a back sliding tooth cone assembly 420B is shown as a partial top-view in FIG. 90, and as partial back-views in FIGS. 89 and 118, because of time constraints, some parts such as front transmission sprocket 705A, are only symbolically drawn. In FIG. 89, the tooth carriages 450 are positioned near the largest end of their cone; and in FIG. 118, the tooth carriages 450 are positioned near the smallest end of their cone. Here front sliding tooth cone assembly 420A is coupled by a front transmission belt 704A to a front transmission sprocket 705A, and back sliding tooth cone assembly 420B is coupled by a back transmission belt 704B to a back transmission sprocket 705B. Furthermore, front transmission sprocket 705A is mounted to sliding tooth cone shaft 707 via a sliding tooth cone adjuster 706, so that the rotational position of front transmission sprocket 705A relative to the rotational position of sliding tooth cone shaft 707 can be adjusted by sliding tooth cone adjuster 706. Sliding tooth cone adjuster 706, is a stepper motor that has an sliding tooth cone adjuster body 706-M1 and an sliding tooth cone adjuster output shaft 706-M2, which rotational position can be adjusted relative to sliding tooth cone adjuster body 706-M1. Sliding tooth cone adjuster 706 has an axial hole so that it can be slid into sliding tooth cone shaft 707. In order to mount sliding tooth cone adjuster body 706-M1 on sliding tooth cone shaft 707 a setscrew is used. And in order to mount pulley 310 to sliding tooth cone adjuster output shaft 706-M2, front transmission sprocket 705A has a pulley sleeve 310-M1, which has two oppositely positioned set-screws, which partially screw into sliding tooth cone adjuster output shaft 706-M2, but do not penetrate into sliding tooth cone shaft 707. And back transmission sprocket 705B is also mounted to sliding tooth cone shaft 707 via another sliding tooth cone adjuster 706 in the same manner as front transmission sprocket 705A is mounted. In order to control the adjusters, the ring and brush method described earlier can be used. Here either spline 430 or sliding tooth cone shaft 707 can be the input shaft/spline. However the portions of the transmission belts under tension, should be the upper portions of the transmission belts. Therefore, if spline 430 is the input spline, then spline 430 should be rotating counter-clockwise; and if sliding tooth cone shaft 707 is the input shaft, then sliding tooth cone shaft 707 should be rotating clockwise. Also sliding tooth cone shaft 707 is supported by sliding tooth cone shaft bearings 708 and a sliding tooth cone shaft end bearing 710. In order to maintain the axial position of the shaft, the upper end of the shaft has a machined down portion that has threaded end portion for a sliding tooth cone nut 709. Here the engagement between the shoulder created by the machined down portion of the shaft with sliding tooth cone shaft end bearing 710, and the engagement of sliding tooth cone nut 709 with sliding tooth cone shaft end bearing 710 will be used to maintain the axial position of sliding tooth cone shaft 707.

Also in order for the CVT to operate properly, it needs to be ensured that at any instance during the operation of the CVT, at least one tooth of a tooth carriage 450 is engaged with its transmission belt. In order to ensure this and in order to maintain the axial alignment of the transmission belts, spring-loaded slider pulley assemblies 720 are used. A spring-loaded slider pulley assembly 720, shown in FIGS. 119A and 119B, consist of a spring-loaded slider housing 720-M1; a spring-loaded slider 720-M2, which lateral and rotational positions are constrained relative to spring-loaded slider housing 720-M1 and which is pushed out of spring-loaded slider housing 720-M1 by a spring; a spring-loaded slider pulley clevis 720-M3; a spring-loaded slider pulley 720-M4, which has a bearing; a slider pulley spring-loaded slider shaft 720-M5, which is inserted through designates holes in the spring-loaded slider pulley clevis 720-M3 and the bearing of spring-loaded slider pulley 720-M4; and two spring-loaded slider shaft locking pins 720-M6, which are inserted through designated holes in the spring-loaded slider pulley clevis 720-M3 and the slider pulley spring-loaded slider shaft 720-M5. In order to lock the spring-loaded slider shaft locking pins 720-M6 into place, they have locking caps that are not wider than then the width of the parallel clevis plates of spring-loaded slider pulley clevis 720-M3. It needs to be ensured that the spring-loaded slider pulley assemblies 720 do not interfere with the operation of the cone assemblies, hence the width of the portions of the spring-loaded slider pulleys 330 that are positioned between the radial slides 460 are less than the distance between their radial slides 460, see FIG. 119B.

In FIGS. 89 and 118, it can be seen that three spring-loaded slider pulley assemblies 720 are used for front sliding tooth cone assembly 420A, which are spring-loaded slider pulley assembly A 720A, spring-loaded slider pulley assembly B 720B, and spring-loaded slider pulley assembly C 720C. Here spring-loaded slider pulley assembly C 720C is used to ensure sufficient engagement coverage for the tooth of tooth carriage 450 of front sliding tooth cone assembly 420A, and spring-loaded slider pulley assembly A 720A and spring-loaded slider pulley assembly B 720B are used to maintain the axial alignment of transmission belt 400A. Depending on the lateral stiffness of the transmission belts and the taper of the cones more or less spring-loaded slider pulley assemblies 720 can be used. Sufficient amount of spring-loaded slider pulley assemblies 720 should be used to prevent bowing of the transmission belts that significantly affects the performance of the CVT. In order to prevent excessive bowing of the transmission belts, it is highly recommended that the taper of the cones, based on a horizontal reference, are less than 45 degrees. In case excessive bowing occurs, bowing of the transmission belts can be reduced by reducing the taper of the cones and by increasing the lateral stiffness and the width of the transmission belts. The same configuration of spring-loaded slider pulley assemblies used for front sliding tooth cone assembly 420A should also used for back sliding tooth cone assembly 420B.

Also in order to maintain the tension in the transmission belts, each transmission belt has a tensioner pulley assembly 740. A tensioner pulley assembly 740 is identical to a spring-loaded slider pulley assembly 720, except that it has a pulling spring and/or a pulling weight instead of a pushing spring. In addition, the sliding range of a tensioner pulley assembly 740 might also be different than the sliding range of a spring-loaded slider pulley assembly 720. Here the pulling spring and/or a pulling weight of a tensioner pulley assembly 740 is used to maintain the tension in a transmission belt. The pulling force of tensioner pulley assembly 740 should be large enough so that sufficient tension in its transmission belt is maintained so that no movements in the tensioner pulley assembly 740, hence no change in the shape of the transmission belt, occurs during normal operation and in instances where the direction of rotation is reversed such that the normally slack side of the transmission belt, where tensioner pulley assembly 740 is pulling, becomes the tense of the transmission belt, which occur in instances where the output shaft is pulling the input shaft. In other words, the pulling force of tensioner pulley assembly 740 should be larger than the force that tends to pull the slider of tensioner pulley assembly 740 out due to the tension in the transmission belt. However, the pushing force of spring-loaded slider pulley assembly 720 used to provide sufficient engagement coverage, such as spring-loaded slider pulley assembly C 720C, should be considerably larger than the pulling force of its tensioner pulley assembly 740 so that the pulling force of tensioner pulley assembly 740 will not affect the position of that spring-loaded slider pulley assembly C 720C, see FIG. 118.

In case front pin belt cone assembly 520A and a back pin belt cone assembly 520B are used instead of front sliding tooth cone assembly 420A and a back sliding tooth cone assembly 420B, then the same CVT configuration shown in FIGS. 89, 90, and 118 can be used as long as the torque transmitting orientation of the front pin belt cone assembly 520A and the back pin belt cone assembly 520B as shown in FIGS. 91A, 91B, 92A, and 92B is reversed (a mirror image is taken), see FIG. 120. Here in case the spline on which the cone assemblies are mounted is the input spline, it needs to rotate counter-clockwise; and in case the shaft on which its transmission pulleys are mounted is the input shaft, it needs to be rotated clockwise. Here in order to ensure smooth operation, unless the arc lengths of the tubular sections of pin belt pin belt teeth 591-S2 are reduced accordingly, the spline on which the cone assemblies are mounted should be the input spline. In addition since for cone assemblies with torque transmitting members, as described earlier, no instance should exist where a complete non-torque transmitting arc is covered by its transmission belt, the spring-loaded slider pulley assemblies 720 should be repositioned to ensure this.

In case the configuration shown in FIGS. 91A, 91B, 92A, and 92B is used for pin belt cone assembly 520A and a back pin belt cone assembly 520B, then the configuration for the CVT is the mirror image of the configuration shown in FIGS. 89, 90, and 118, see FIGS. 121 and 122. In FIGS. 121 and 122, because of time constraints, twin sprocket pulley 700 and pin transmission belt 630, are only symbolically drawn. Here in case pin belt cone assembly spline 530 is the input spline, it needs to rotate clockwise; and in case the shaft on which the twin sprocket pulleys 700 are mounted is the input shaft, it needs to be rotated counter-clockwise. Here in order to ensure smooth operation, unless the arc lengths of the tubular sections of pin belt pin belt teeth 591-S2 are reduced accordingly, the spline on which the cone assemblies are mounted should be the input spline. In addition since for cone assemblies with torque transmitting members, as described earlier, no instance should exist where a complete non-torque transmitting arc is covered by its transmission belt, the spring-loaded slider pulley assemblies 720 should be repositioned to ensure this. Also in case extension 595 gets in the way, it can simply be removed.

The spring-loaded slider pulley assemblies 720 and tensioner pulley assembly 740 used for a CVT using a front pin belt cone assembly 520A and a back pin belt cone assembly 520B are identical to the spring-loaded slider pulley assemblies 720 and tensioner pulley assembly 740 used for a CVT using a front sliding tooth cone assembly 420A and a back sliding tooth cone assembly 420B, except that spring-loaded slider pulley 720-M4 is replaced with a pin belt spring-loaded slider pulley 720-M4A, which is shown as a partial end-view in FIG. 123, and if required the dimension of the spring-loaded slider pulley assemblies 720 and tensioner pulley assembly 740 can be adjusted accordingly. It needs to be ensured that the spring-loaded slider pulley assemblies 720 using pin belt spring-loaded slider pulleys 720-M4A do not interfere with the operation of the cone assemblies, hence the width of the portions of the spring-loaded slider pulleys 720 using pin belt spring-loaded slider pulleys 720-M4A that are positioned between the pin belt torque transmitting member 590 side members are less than the distance between the side members of pin belt torque transmitting member 590, see FIG. 123.

In addition, cross-sections for various alternate pin transmission belts that can be used with front pin belt cone assembly 520A and back pin belt cone assembly 520B are shown in FIGS. 124, 125, and 126. The centerline of the teeth, which here are also pins, of the pin transmission belts should also be located at the neutral-axis of the pin transmission belts. In FIG. 124, the pin transmission belt is labeled as pin transmission belt A 630A, and it consists of a rubber belt A 630A-M1 and pin teeth A 630A-M2, which have the shape of a pin. This pin transmission belt is basically the same as pin transmission belt 630 described earlier. In FIG. 125, the pin transmission belt is labeled as pin transmission belt B 630B, and it consists of a rubber belt B 630B-M1 and pin teeth B 630B-M2, which have the shape of a pin. In FIG. 126, the pin transmission belt is labeled as pin transmission belt C 630C, and it consists of a rubber belt C 630C-M1 and pin teeth C 630C-M2, which have the shape of a pin.

Pulleys that can be used as spring-loaded slider pulleys, which are pulleys that are pressed by the spring-loaded slider pulley assemblies 720 against the surfaces of the cones and are used to maintain the axial alignment of the transmission belts and provide coverage, if required, for pin transmission belt A 630A, pin transmission belt B 630B, and pin transmission belt C 630C are shown in FIGS. 127, 128, and 129. FIG. 127 shows a pin belt spring-loaded slider pulley A 721A that can be used with pin transmission belt A 630A. FIG. 128 shows a pin belt spring-loaded slider pulley B 721B that can be used with pin transmission belt B 630B. FIG. 129 shows a pin belt spring-loaded slider pulley C 721C that can be used with pin transmission belt C 630C. In order to use these pulleys, these pulleys are mounted on the spring-loaded slider pulley assemblies 720 in-place of the spring-loaded slider pulleys 720-M4 described earlier. These pulleys should be mounted in the same manner slider pulleys 720-M4 are mounted.

It is recommended that the inner side surfaces of these pulleys, which engage with the side surfaces of their pin transmission belts, have a low friction coating, so as to minimize frictional losses. For optimum performance, friction between the inner side surfaces of these pulleys and the side surfaces of their pin transmission belts should be minimized. Hence for pin belt spring-loaded slider pulley A 721A and pin belt spring-loaded slider pulley B 721B, the distance between the inner side surfaces of these pulleys should not be narrower than distance between the side surfaces of their pin transmission belts. Also, here due to its V-shape, pin belt spring-loaded slider pulley C 721C should have the least amount of friction, since sliding friction between the inner side surfaces of this pulley with the surfaces of its pin transmission belt is minimized because contact between the side surfaces only occur at one section, which is the section where the transmission belt is closest to the center of rotation of pin belt spring-loaded slider pulley C 721C; and at this section, no relative sliding between side surfaces has to occur. Obviously like pin belt spring-loaded slider pulley 720-M4A, shown in FIG. 123, pin belt spring-loaded slider pulley A 721A, pin belt spring-loaded slider pulley B 721B, and pin belt spring-loaded slider pulley C 721C should be shaped so that they don't interfere with the operation of their torque transmitting members.

For the tensioning pulleys of tensioner pulley assemblies 740, which are used to apply tension to the slack side of the transmission belts, like for the spring-loaded slider pulleys described in the previous paragraph, for optimum performance it is desirable to have the friction between the inner side surfaces of the tensioning pulleys and the side surfaces of their transmission belts minimized. This can be achieved by utilizing alignment wheels pulley assembly 730 shown as a front-view in FIG. 130A and as an end-view in FIG. 130B. The alignment wheels pulley assembly 730, has a alignment wheels pulley shaft 731, which is shown as a front-view in FIG. 131A and as an end-view in FIG. 131B. Alignment wheels pulley shaft 731 consists of a round center shape, which is labeled as alignment wheels pulley shaft round shape 731-S2, and two symmetrical square shapes, which are centric to pulley shaft round shape 731-S2, located to the left and right of pulley shaft round shape 731-S2, labeled as alignment wheels pulley shaft square shapes 731-S1. A square cut extrudes through the entire length of alignment wheels pulley shaft 731. The center of the square cut coincides with the center of alignment wheels pulley shaft 731, and its surfaces are parallel to the surfaces of the alignment wheels pulley shaft square shapes 731-S1.

As described earlier, tensioner pulley assembly 740 is identical to spring-loaded slider pulley assembly 720, except that it has a pulling spring and/or a pulling weight instead of a pushing spring. There fore, it also has a clevis on which a pulley or in this case an alignment wheels pulley assembly can be mounted. The clevis for tensioner pulley assembly 740 is labeled as tensioner pulley clevis 740-M3. Tensioner pulley clevis 740-M3 is identical to spring-loaded slider pulley clevis 720-M3, except that it has square holes for a square rod 732 instead of round holes for a spring-loaded slider shaft 720-M5 that spring-loaded slider pulley clevis 720-M3 has. And obviously if tensioner pulley clevis 740-M3 is used for an alignment wheels pulley assembly 730, the dimension of tensioner pulley clevis 740-M3 has to be adjusted accordingly so that an alignment wheels pulley assembly can be mounted on it as shown in FIGS. 130A and 130B.

In the assembled state of alignment wheels pulley assembly 730, alignment wheels pulley shaft 731 is placed between the two parallel plates of tensioner pulley clevis 740-M3, and secured by sliding, a square rod 732, which has slightly smaller dimensions than the square cut of alignment wheels pulley shaft 731 through the square cut of alignment wheels pulley shaft 731 and square holes of the parallel plates of tensioner pulley clevis 740-M3. Once slid through, each end of square rod 732 is then secured in place using a square rod locking pin 733 that is slid into a matching hole at each end of square rod 732. In the alignment wheels pulley assembly 730 assembled state, a tensioning pulley 734 is positioned on the alignment wheels pulley shaft round shape 731-S2 of alignment wheels pulley shaft 731. Obviously all items on alignment wheels pulley shaft 731 are inserted into alignment wheels pulley shaft 731 before alignment wheels pulley shaft 731 is positioned between the two parallel plates of tensioner pulley clevis 740-M3. At the center of tensioning pulley 734 a tensioning pulley sleeve bearing 734-M1 is pressed in. Tensioning pulley sleeve bearing 734-M1 extends slightly to the left and right surface of tensioning pulley 734, so as to minimize friction between tensioning pulley 734 and the alignment frames 735 placed to the left and right of tensioning pulley 734. The top shape of each alignment frame 735 is shaped like a square frame that can be tightly slid into an alignment wheels pulley shaft square shape 731-S1 of alignment wheels pulley shaft 731. At the midpoint of the bottom surface of each alignment frame 735 a round shaft, that extends vertically downwards, is shaped. The bottom portion of the round shaft of each alignment frame 735 has a smaller diameter then the upper portion of the round shaft. Also, near the bottom end of the bottom portion of the round shaft of each alignment frame 735, a cut for an alignment wheel locking ring 736 exists. Into the bottom portion of the round shaft of each alignment frame 735, an alignment wheel 737 is slid in. The axial positions of the alignment wheels 737 are then secured by inserting a alignment wheel locking ring 736 into the designated cuts of the bottom portions of the round shafts of the alignment frames 735. The inner and side surfaces of the alignment wheels 737 have a low friction coating, so that alignment wheels 737 can rotate without much friction relative to their alignment frames 735 and their alignment wheel locking rings 736. Since the alignment wheels 737 are wider than the alignment frames 735, in order to allow the alignment wheels 737 to rotate properly, an alignment frame spacer 738 is positioned between each parallel plate of tensioner pulley clevis 740-M3 and alignment frame 735.

The alignment wheels pulley assembly 730 like a regular tensioning pulley should be mounted on a tensioner pulley assembly 740 such as shown in FIGS. 121 and 122. Also, the distance between the alignment wheels 737 should correspond to the width of its transmission belt 600, so that the alignment wheels 737 can sufficiently maintain the axial alignment of its transmission belt without applying any significant frictional resistance to its transmission belt.

If desired, in order to position the pulleys that maintain the axial alignment, engagement coverage, and tension of the transmission belts, instead of the spring-loaded sliders, sliders that slide on slides as described in the Sliding Cone Mounting Configuration section and similarly used for the tensioning wheels 1105 described in Continuous Variable Transmission Variation 2 (CVT 2) section can be used. If the required pushing force of a spring-loaded slider pulley assembly 720 used to provide sufficient engagement coverage, such as spring-loaded slider pulley assembly C 720C shown in FIG. 118, is quite large, than it might be more practical to use the slide on a slides configuration instead.

In order to control the adjusters of the CVT's described above, the methods described earlier can be used. Although the configuration of the CVT shown in FIGS. 121 and 122, is basically a mirror image of the configuration discussed in the Adjuster System for CVT 2 section, the same principles and methods used and described in the Adjuster System for CVT 2 section and other relevant sections of this application also apply here. In the Adjuster System for CVT 2 section, the amount of transmission ratio change rotation depends on the angle θ between point M and point N. For the CVT's described in this section, point N is identical to point N of the Adjuster System for CVT 2 section. Hence here the points N are also the points where the transmission belts first touch the upper surface of their cone assemblies. However, for the CVT's described in this section, point M is not the midpoint of the torque transmitting member, for front pin belt cone assembly 520A and back pin belt cone assembly 520B, the points M are located at the angular position where the centerline of the torque transmitting member slides 560-S2 are positioned see FIGS. 91B and 92B. And for front sliding tooth cone assembly 420A and back sliding tooth cone assembly 420B, the points M are located on the angular position where the mirror line of their teeth 450-S1 are located, see FIG. 80. From the description of the relevant sections of this application, such as the Adjuster System for CVT 2 section and the CVT 2.4 section for example, somebody skilled in the art should be able to determine proper configurations and controls for adjuster(s) for the CVT's described in the Alternate CVT's section.

Also in order to use the control methods described in the Gap In Teeth section, a gaps method pin belt torque transmitting member 590A can be used. A gaps method pin belt torque transmitting member 590A, shown as a front-view in FIG. 132 and as a top-view in FIG. 133, is similar to the pin belt torque transmitting member 590 described previously. The difference between the gaps method pin belt torque transmitting member 590A and pin belt torque transmitting member 590 is that it has two tooth shapes instead of just one. The leading end or leading end portion of gaps method pin belt torque transmitting member 590A has a quarter circular tubular section tooth shape, which tubular section starts at the center height of the tooth and ends at bottom surface of the tooth. This tooth shape is labeled as quarter circular pin belt tooth 591-S2A, and can be seen in FIGS. 132 and 133. The trailing end or trailing end portion of gaps method pin belt torque transmitting member 590A has the pin belt teeth 591-S2 described earlier, which have an extension that extends slightly beyond the bottom surfaces of their teeth. The distance between the teeth should be large enough such that the quarter circular pin belt teeth 591-S2A can be positioned between the teeth of its transmission belt without being in contact with the teeth of its transmission belt when its gaps method pin belt torque transmitting member 590A is mated with its transmission belt. However, the distance/pitch between the teeth of the gaps method pin belt torque transmitting member should match the distance/pitch between the teeth of its transmission belt. Here because the quarter circular pin belt teeth 591-S2A do not have front extensions, the gaps method pin belt torque transmitting member 590A about to be mated, which should be on the input shaft/spline, can be a little bit late relative to its transmission belt. In order to achieve this, the "gap offset value" described in the Gap In Teeth section can be used, so that during initial mating the quarter circular pin belt teeth 591-S2A are positioned between teeth of their transmission belt without touching the teeth of its transmission belt. If "engagement adjustment", where the adjuster rotates the cone assembly about to be engaged so that its teeth are touching the teeth of their transmission belt so that the engagement between the teeth can be used for desired torque transmission as described in the Gap In Teeth section, is used, then it is recommended that the amount of quarter circular pin belt teeth 591-S2A should be selected such that for all instances "engagement adjustment" occurs before pin belt teeth 591-S2 are engaged, otherwise, increase in tension in the respective transmission belt will occur. If "engagement adjustment" is not used, than to ensure smooth operation, the quarter circular pin belt teeth 591-S2A, should cover the leading end portion of gaps method pin belt torque transmitting member 590A in a manner such that for every transmission ratio of the CVT, while both cone assemblies are engaged, for gaps method pin belt torque transmitting member 590A just mated with its transmission belt only the quarter circular pin belt teeth 591-S2A are mated, but not necessarily engaged, with the teeth of its transmission belt.

Furthermore, in order to prevent damage to the CVT in case the adjusters did not properly position the transmission belt about to be engaged so as to allow smooth engagement, a "tension measurement engagement correction" method can be used. Here the adjustments/corrections provided is based on the amount of tension in the tense side of the transmission belts. The amount tension in the tense side of the transmission belts can be measured by torque sensors mounted on the input shaft/spline of the CVT, which measure the torque on the input shaft/spline of the CVT, or by maintaining pulleys that are positioned and configured so that they can measure the tension in the tense side of the transmission belts. In order for this method to work, the transmission belts should be able to resist flexing that compensates for improper engagement. Here a sudden increase in tension or sudden increase in torque can be an indication that improper engagement occurred. In order to determine whether the increase in tension or torque is an indication of improper engagement, a high torque limit value and/or high torque change limit value, programmed into the controlling computer can be used. Or if a tension measuring load-cell is used than a high tension limit value and/or high tension change limit value, programmed into the controlling computer can be used. The values for the high limit values can be obtained experimentally.

If "tension measurement engagement correction" method is used for a CVT that uses gaps method pin belt torque transmitting members 590A, because of the shape of the quarter circular pin belt teeth 591-S2A, initial improper engagement can only occur between the back portion of the leading circular pin belt tooth 591-S2A and its transmission belt, since circular pin belt teeth 591-S2A do not have a front portion. Hence improper engagement can only occur when the cone assembly about to be engaged is to early. Therefore, when the controlling computer senses that improper engagement occurred through the tension measurement in the transmission belt just engaged, or the torque measurement for the cone assembly just engaged, it rotates the transmission belt just engaged, which is not properly engaged, forward relative to its cone assembly or it rotates its cone assembly, which is not properly engaged, backward relative to its transmission belt, until the tension and/or torque measurement has dropped to an acceptable level. Here rotating forward means rotating in the direction the input and output shaft/spline are rotating and rotating backward means rotating in the opposite direction the input and output shaft/spline are rotating. The controlling computer can use the tension measurement of the currently engaged transmission belt or torque measurement of the currently engaged cone assembly before improper engagement occurred as a reference value, a sudden jump in tension and/or torque measurement is an indication of improper engagement. A high limit tension and/or torque measurement value can also used.

If "tension measurement engagement correction" method is used for a CVT that uses pin belt torque transmitting members 590 or other torque transmitting members, then once the controlling computer senses improper engagement, it first has to guess whether it is because the cone assembly about to be engaged is positioned to early or to late relative to its transmission belt and make arbitrary adjustments, and then based on the feed-back from the tension measuring load-cell or torque sensor it can determine whether cone assembly is positioned to early or to late and then provide adjustments until the tension and/or torque measurement has dropped to an acceptable level. For example, in case the torque transmitting member is positioned to early relative to its transmission belt, then because of the increased tension in the respective transmission belt or increased torque in the respective cone assembly, the adjuster arbitrarily rotates the respective transmission belt forward relative to its cone assembly, which is the proper direction. Then the controlling computer should sense that the tension in the respective transmission belt starts to decrease and hence keep on rotating in the same direction until the tension and/or torque measurement has dropped to an acceptable level. In case in the same situation, the adjuster arbitrarily rotates the respective transmission belt backward relative to its cone assembly, then the controlling computer should sense that the tension in the respective transmission belt starts to increase or stay level, and based on this information, the controlling computer knows that it is rotating the respective transmission belt in the wrong direction, hence it immediately changes direction and keeps on rotating in that direction until the tension and/or torque measurement has dropped to an acceptable level. In case the torque transmitting member is positioned to late relative to its transmission belt, then the controlling computer uses the same procedures described before in order to reduce the respective tension and/or torque measurement, except that here, in order to reduce the respective tension and/or torque measurement the adjuster needs to rotate the respective transmission belt backwards relative to its torque transmitting member, while rotating the respective transmission belt forward relative to its cone assembly increases the respective tension and/or torque measurement.

In order to ensure that the procedures described in the previous paragraph operate properly, it needs to be ensured that when the adjuster rotates in the proper direction the respective tension and/or torque measurement decreases and it also needs to be ensured that when the adjuster rotates in the wrong direction the respective tension and/or torque measurement increases. In order to ensure this, all surfaces of the pin belt teeth 591-S2 that come into contact with the teeth of its transmission belt, are shaped so that the contact surface increase in height as it is positioned further to the left and further to the right from the lowest point, which located at the vertical symmetry line of round flange 591-S1. An example of a tooth shape which end surfaces are reshaped to ensure this is shown in FIG. 134 and labeled as pin belt tooth B 591-S2B. This reshaping can also be applied to quarter circular pin belt teeth 591-S2A. A reshaped quarter circular pin belt tooth 591-S2A, which is labeled as pin belt tooth C 591-S2C, is shown in FIG. 135. for 591-S2C only the back surface since when a little too late no tense increase has no front surface no adjust Furthermore although during normal operation at no instance should a transmission belt cover the entire surface of its cone not covered by its torque transmitting member; an emergency transmission ratio, where this is the case can be added in case one transmission belt fails. For smooth operation for the emergency transmission ratio, the circumferential length of the surface of the cone not covered by its torque transmitting member should be a multiple of the width of its teeth. Also when the emergency transmission ratio is used a warning signal should be send to the user. A warning signal alarm should also be send when continuous or excessive improper engagement occurs.

Also if only quarter circular pin belt teeth 591-S2A are used for a torque transmitting member then in order to ensure smooth and proper operation, instances where the output shaft is pulling the input shaft should be minimized or eliminate. This can be done by mounting a one way clutch between the output shaft and the output device being rotated, so that the output shaft can rotate the output device in the driving direction but the output device can not rotate the output shaft in the driving direction, and by ensuring that the friction in the output shaft is larger than in the engine. A one way clutch which can be locked or which direction can be reversed on command can be used in case reverse rotation is required. In addition, if desired the pins on the transmission belts can be replaced with involute tooth shaped pieces that engage with an involute tooth shape or involute tooth shaped pieces mounted on the torque transmitting members.

In addition for the CVT's described previously, if friction torque transmitting members, which are not toothed are used, then a CVT that does not need adjusters can be constructed by using a configuration that is identical to the configuration for a CVT 2.

Chain for Single Tooth Cone and Block Belt for Single Tooth Cone

A link labeled as single tooth cone link A 800A that can be used to form a chain that can be used with a single tooth cone is shown as a side-view in FIG. 136B, as a front-view in FIG. 136A, as a sectional-view in FIG. 136C, and as a partial back-view, only showing the back surface, in FIG. 136D. The holes of single tooth cone link A 800A through which the single tooth cone link connecting pins 801 are inserted are labeled as single tooth cone link holes A 800A-S1 and the tooth profile of single tooth cone link A 800A is labeled as single tooth cone tooth profile A 800A-S2. In order to allow smooth engagement, it is recommended that single tooth cone tooth profile A 800A-S2 has an involute tooth shape. In FIGS. 136A-136D and FIGS. 137A-137B the tooth profile of the links might not show a proper involute tooth shape; however, they represent an involute tooth shape. The bottom surfaces of single tooth cone link A 800A, excluding the cut-out surface of single tooth cone tooth profile A 800A-S2, are labeled as single tooth cone bottom surfaces A 800A-S3 and are tapered as to match the taper of the surface of its single tooth cone. The cut-out surface of single tooth cone tooth profile A 800A-S2 is tapered as to match the taper of the tooth of its single tooth cone. The taper of the tooth of the single tooth cone might have a taper that matches the taper of the conical surface of the single tooth cone, however for optimum and smooth performance it is recommended that the taper of the tooth is shaped so that it does not affect the radial position of the chain while providing a maximum engagement surface.

Here because the links of the chain are mainly supported by their bottom surfaces, the change in curvature at different diameters affects where the tooth profiles of the links, which is located at the center of the links, is positioned relative to the surface of the cone; and this will affect the taper of the tooth of the single tooth cone that perfectly matches the tooth profiles of the links. Also if providing a maximum engagement surface is not that important, then smooth performance can be ensured by making the tooth of the single tooth cone sufficiently shorter than the tooth profile of its chain, so that the chain is only supported by the bottom surfaces of its links.

Also it needs to be ensured that when the chain is positioned at the smallest circumference of its cone, no bottom surfaces of any links are interfering with the tooth of its single tooth cone. This can be done by selecting the proper smallest circumference of the single tooth cone, or by slightly modifying the shape and dimension of the links. A shape of an alternate single tooth cone link A 800A, which is labeled as alternate single tooth cone link A 810A is shown in FIG. 137C. Here, as can be seen in FIG. 137C, the width of the tapered bottom surfaces are reduced. For this modified link shape, the surfaces that can cause interference with the tooth of its single tooth cone are reshaped so that a single tooth cone with a smaller circumference can be used.

A single tooth cone, labeled as chain single tooth cone 820, and its tooth, labeled as chain single tooth cone tooth 820-S1, is shown as a front-view in FIG. 138A and as an end-view in FIG. 138B. Chain single tooth cone tooth 820-S1, should have the same basic profile as the tooth profiles of the links. If with regular involute tooth shapes smooth engagement cannot be achieved then slightly modified involute tooth shapes can be used for the links and for the single tooth. Using a model the interfering surfaces can easily be identified and reshaped. The "gaps between teeth" method described earlier can also be used to resolve this issue.

Shown in FIG. 137A and FIG. 137B is a partial chain section that is constructed from a single tooth cone link B 800B which right end is sandwiched by single tooth cone link C 800C, not shown in FIG. 137A, and a single tooth cone link A 800A. Single tooth cone link B 800B and single tooth cone link C 800C, are identical to single tooth cone link A 800A, except that their bottom surfaces, labeled as single tooth cone bottom surfaces B 800B-S3 and single tooth cone bottom surfaces C 800C-S3, are longer than the bottom surfaces of single tooth cone link A 800A. Since single tooth cone link B 800B and single tooth cone link C 800C are located further towards smaller end of the cone relative to single tooth cone link A 900A, the bottom surfaces of single tooth cone link B 900B and single tooth cone link C 900C are longer so that when the chain portion is aligned in a straight line, the bottom surfaces from its links form a smooth continuous taper that matches the taper of the surface of its cone, see FIG. 137B. Because of the shape of the bottom surfaces of the links, when an unassembled chain section is placed at an axial position on the surface of its cone, the link holes of the links are aligned so that a pin parallel to the shaft of the cone can be inserted through a link hole of single tooth cone link A 800A, a link hole of single tooth cone link B 800B, and a link hole of single tooth cone link C 800C so that the links can be linked together. If required, a slight play between the link holes of the links and the single tooth cone link connecting pins 801 can be allowed. The chain portion shown in FIGS. 137A and 137B is linked together in a similar manner as a bicycle chain is linked together using single tooth cone link connecting pins 801 and single tooth cone link locking rings 802, which are inserted into designated grooves of single tooth cone link connecting pins 801. For optimum performance, friction between the parts of discussed above should be minimized.

A transmission pulley, labeled as chain transmission pulley 850, that can be used with a chain constructed in manner the shown in FIG. 137A and FIG. 137B is shown as front-view in FIG. 139A and as an end-view in FIG. 139B. Chain transmission pulley 850 is shaped like a toothed pulley. It has two chain transmission pulley side surfaces 850-S1 that sandwich a toothed conical surface 850-S2. The taper of the toothed conical surface 850-S2 should match the taper of its single tooth cone, and the distance between the chain transmission pulley side surfaces 850-S1 should correspond to the width of the chain, which in FIG. 137A and FIG. 137B depends on the length of the single tooth cone link connecting pins 801. The toothed conical surface 850-S2 has chain transmission pulley teeth 850-S3, which should have the same basic profile as the chain single tooth cone tooth 820-S1 of its single tooth cone. If interference between chain transmission pulley teeth 850-S3 and portions of the links of its chain exist, then some chain transmission pulley teeth 850-S3 can be skipped if this helps remedy the problem. However it needs to be ensured that for all transmission ratios of the CVT where chain transmission pulley 850 is used, at least one tooth of chain transmission pulley 850 is always engaged with its chain. For chain transmission pulley 850 shown in FIG. 139A and FIG. 139B, every other chain transmission pulley tooth 850-S3 is skipped. Also, the circumference of chain transmission pulley 850 should be large enough so that no bottom surface of any link of its chain is interfering with a chain transmission pulley tooth 850-S3.

In case the cone has only one tooth, then changes in the pitch of the teeth of the chain can be allowed. For the chain portion shown in FIGS. 137A and 137B, the neutral-axis or bending-axis is located at the centers of the single tooth cone link connecting pins 801. From FIGS. 136C and 136B, it can be seen that the top height of the tooth cut-out at the mid-cross-sectional surface of single tooth cone link A 800A is located at the bending-axis. Therefore, the distance between the top height of the tooth cut-out as measured from the center of a pin to the top height of a tooth cut-out to the center a pin to the top height of tooth cut-out and so forth, at the mid-cross-sectional surface of single tooth cone link A 800A remains constant regardless of the diameter of the surface of the cone where the chain is positioned. Hence in order to determine the arc length of the non-torque transmitting arc as needed for the graphs shown in FIGS. 21A/B/C, the axial position where the mid-cross-sectional surface of single tooth cone link A 800A is positioned should be used. And the arc radius that used to determine the arc length of the critical non-torque transmitting arc and the arc length of the required adjustment, as represented by the horizontal-axis and the vertical-axis of the graphs shown in FIGS. 21A/B/C, should correspond to the radius where the top height of the tooth cut-outs will be at for that axial position. And the width of a tooth, $w_t$, should be measured from the top height of a tooth cut-out to the next top height of a tooth cut-out at the mid-cross-sectional surfaces of single tooth cone links A 800A. Also, the arc length of the critical non-torque transmitting arc starts at the center-line of the tooth of one single tooth cone and ends at the center-line of the tooth of the other single tooth cone.

Since the chain is formed by links, it will not form a perfectly round segment, whereas the cone is perfectly round, hence the graphs shown in FIGS. 21A/B/C are not perfect for this application. In order to deal with this, the "gaps between teeth" method described earlier can be used to compensate for this. Modified graphs based on the graphs shown in FIGS. 21A/B/C, which are dependent on transmission ratio can also be made. A modifying term for the graphs, which can dependent on the transmission ratio and compensate for the fact that the chain will not form a perfectly round segment can be obtained experimentally and/or mathematically. An experimental method can also used, by moving the chain from the smaller end to the larger end of its cone and observing the required adjustments needed at different diameters and then programming these values into the controlling computer.

Besides the chain described in the previous paragraphs, a blocks transmission belt 842, shown as a front-view in FIG. 140A and as an end-view in FIG. 140B, that is formed by tooth blocks 840 that are joined together by rubber blocks 841 can be used. The rubber blocks 841 have rubber blocks steel reinforcements 841-M1, which increases the strength of the transmission belt but are optional, and are joined to the tooth blocks 840 using a strong adhesive. In case more flexing is desired, which might be the case if no or inaccurate adjusters are used, then the rubber blocks steel reinforcements 841-M1 can be omitted. Since it is desirable to have the transmission belt resting on the rubber blocks 841 instead on the tooth blocks 840, the tooth blocks 840 are not resting on the surface of their cone. Hence the tooth cut-outs of the tooth blocks 840 are positioned above the surface of their cone. In order to allow smooth engagement, between the tooth cut-outs of the tooth blocks 840 and the tooth of their single tooth cone, the tooth of their single tooth cone has a base that positions the tooth so that it can smoothly engage with the tooth blocks 840. A single tooth cone that can be used with blocks transmission belt 842 is shown as a front-view in FIG. 141A and as an end-view in FIG. 141B. It is labeled as blocks belt single tooth cone 860, and its tooth is labeled as blocks belt single tooth cone tooth 860-S1. If desired, this transmission belt can be used with a cone with two opposite positioned teeth as shown as a front-view in FIG. 142A and as an end-view in FIG. 142B. This cone is labeled as opposite teeth cone 861, and its teeth are labeled as opposite teeth cone teeth 861-S1. A transmission pulley that is identical to chain transmission pulley 850 except that it has teeth that have the same basic profile as blocks belt single tooth cone tooth 860-S1 of its single tooth cone can be used here. It is shown as a front-view in FIG. 143A and as an end-view in FIG. 143B.

As can be seen from FIG. 140B, the mid-height of the tooth cut-outs, shown as an angled center-line, at the mid-width of tooth blocks 840, are located at the neutral-axis, shown as a horizontal center-line, of blocks transmission belt 842. Therefore, the arc lengths between the mid-height of the tooth cut-outs at the mid-width of the tooth blocks 840 remain constant or almost constant regardless of the diameter of the surface of the cone where blocks transmission belt 842 is positioned. Hence in order to determine the arc length of the non-torque transmitting arc as needed for the graphs shown in FIGS. 21A/B/C, the axial position where the mid-width of the tooth blocks 840 is positioned should be used. And the arc radius that is used to determine the arc length of the critical non-torque transmitting arc and the arc length of the required adjustment, as represented by the horizontal-axis and the vertical-axis of the graphs shown in FIGS. 21A/B/C, should correspond to the radius where the mid-height of the tooth cut-outs will be at that axial position. And the arc length of the critical non-torque transmitting arc starts at the center-line of the tooth of one single tooth cone and ends at the center-line of the tooth of the other single tooth cone. Or if an opposite teeth cone 861 is used, it starts at the center-line of one tooth and ends at the center-line of the other tooth of that opposite teeth cone 861. And the width of a tooth, $w_t$, should be measured from the mid-height of a tooth cut-out to the next mid-height of a tooth cut-out at the mid-width of the tooth blocks 840.

Since the transmission belt described in the previous paragraph will not form a perfectly round segment, the graphs shown in FIGS. 21A/B/C are not perfect for this application. In order to deal with this, the "gaps between teeth" method described earlier can be used to compensate for this. Modified graphs based on the graphs shown in FIGS. 21A/B/C, which are dependent on transmission ratio can also be made. A modifying term for the graphs, which can dependent on the transmission ratio and compensate for the fact that the chain will not form a perfectly round segment can be obtained experimentally and/or mathematically. An experimental method can also used, by moving the chain from the smaller end to the larger end of its cone and observing the required adjustments needed at different diameters and then programming these values into the controlling computer.

Somebody skilled in the art should be able to construct a CVT 1 or a CVT 2 using the items described in this section based on the description of this patent. If the items described in this section are used to construct a CVT 2, then the same basic configuration used for a CVT 2 using a front sliding tooth cone assembly 420A and a back sliding tooth cone assembly 420B, as described in the Alternate CVT's section and shown in FIGS. 89 and 118, can be used here.

If the configuration shown in FIGS. 89 and 118 is used with the items described in this section, then pin belt spring-loaded slider pulleys 721B can be used for the pulleys for spring-loaded slider pulley assembly A 720A, spring-loaded slider pulley assembly B 720B, and spring-loaded slider pulley assembly C 720C. An arrangement where a pin belt spring-loaded slider pulley 721B is used with a chain constructed out of the links of this section is shown in FIG. 144. Pin belt spring-loaded slider pulley 721B can also be used with the blocks transmission belt 842. Obviously the pin belt spring-loaded slider pulleys 721B need to dimensioned so that they do not interfere with the tooth or teeth of their cone. And for tensioner pulley assembly 740, a pin belt spring-loaded slider pulley A 721A, shown in FIG. 127, can be used. Here the taper of the pin belt spring-loaded slider pulley A 721A should match the taper of the cone where the chain or transmission belt described in this section is used. Also, here during operation pin belt spring-loaded slider pulley 721B is forced up and down as it is engaged with different portions of the chain or blocks transmission belt. Hence there will be energy loses due to the compression and decompression of the spring of the spring-loaded sliders. Hence it might be better to replace spring-loaded slider pulley assembly A 720A and spring-loaded slider pulley assembly B 720B, which are used to maintain the axial alignment of their chain or blocks transmission belt, with guides described latter in this application. And for the chain described in this section, the pulleys for the spring-loaded slider pulley assembly C 720C and the tensioner pulley assembly 740, can each be replaced with two sprockets 702 mounted in parallel, as shown in FIGS. 117A and 117B. The sprockets 702 should be designed so that they can smoothly engage with the single tooth cone link connecting pins 801 of the chain. Hence the pitch of the teeth of the sprockets 702 should match the pitch of the single tooth cone link connecting pins 801 of the chain. And the distance between the sprockets 702 should be selected such that distance between the inner surfaces of the sprockets 702 is slightly wider than the width of the assembled links as shown in FIG. 119B. For spring-loaded slider pulley assembly C 720C, it needs to be ensured that the sprockets 702 mounted in parallel do not interfere with the tooth or teeth of its cone.

This can be achieved by replacing spring-loaded slider pulley assembly C 720C with a slider mounted on a slide configuration as described in the Sliding Cone Mounting Configuration section and similarly used for the tensioning wheels 1105 described in the Continuous Variable Transmission Variation 2 (CVT 2) section of this patent. Here the slide should be positioned and oriented sufficiently away from its cone so that the respective sprockets 702 mounted in parallel can provide sufficient engagement coverage without interfering with the tooth or teeth of its cone. Pins, labeled as rubber block pins 841-M2, can also be inserted into the rubber blocks 841 of the blocks transmission belt 842 described earlier, as shown in FIGS. 145A and 145B, so that the two sprockets 702 mounted in parallel described above can be used with the modified blocks transmission belt as shown in FIGS. 145A and 145B.

Obviously the engagement statuses for the cone assemblies, as discussed in the Adjuster System for CVT 2 section, can be modified so that they can be used for single tooth cones, such as, 1) single tooth cone A engaged and single tooth cone B not engaged, 2) single tooth cone A engaged and single tooth cone B almost engaged, 3) single tooth cone A engaged and single tooth cone B engaged, 4) single tooth cone A almost not engaged and single tooth cone B engaged, 5) single tooth cone A not engaged and single tooth cone B engaged, 6) single tooth cone A almost engaged and single tooth cone B engaged, 7) single tooth cone A engaged and single tooth cone B engaged, 8) single tooth cone A engaged and single tooth cone B almost not engaged. Also somebody skilled in the art should be able to apply the methods described in this application, such as the engagement statuses, to other CVT's 1 and CVT's 2.

Guides

In order to maintain the axial position of a transmission belt or a chain of a CVT where the cones move axially and the transmission belts are stationary, guides for moving cones 900, which is shown as a front-view in FIG. 146A and as an end-view in FIG. 146B, can be used. The guides consist of two parallel round guides for moving cones rods 901, which are aligned vertically. Each guides for moving cones rod 901 is slidably inserted into a guides for moving cones sleeve 902, which is fixed to the frame of the CVT. The bottom ends of the guides for moving cones rods 901 are welded on a guides for moving cones connector bar 903. Welded on the bottom surface of guides for moving cones connector bar 903 are two parallel guides for moving cones guiding plates 904. If the guides are used with a belt or chain that has tapered side surfaces, then the inner surfaces of the guides for moving cones guiding plates 904 can be tapered as to match the taper of its belt or chain. The inner surfaces of the guides for moving cones guiding plates 904 should have smooth and low friction surfaces, since a portion of a transmission belt or a chain will be placed between them. In order to able to use the guides for moving cones guiding plates 904, the transmission belt or the chain should be dimensioned so that a portion of the transmission belt or the chain can be placed between the guides for moving cones guiding plates 904, without having the guides for moving cones guiding plates 904 interfere with the torque transmitting member, non-torque transmitting member, single tooth, opposite teeth, or any other part of its cone or cone assembly. In order to control the vertical position of the guides, a guides for moving cones linear actuator 905 is used. The guides for moving cones linear actuator has a linear actuator extension sensor and is controlled by the controlling computer of the CVT. At the mid-length of the upper surface of the guides for moving cones connector bar 903, a plate with a hole is welded on. This plate will be used to mount the clevis of the bottom end of the guides for moving cones linear actuator 905 using a locking pin. The clevis of the top end of the guides for moving cones linear actuator 905 will be mounted to another plate with a hole also using locking pin. The plate with a hole for mounting the clevis of the top end of the guides for moving cones linear actuator 905 is fixed to the frame of the CVT and is positioned so that the guides for moving cones linear actuator 905 is oriented parallel to the guides for moving cones rods 901. In order to properly control the guides for moving cones linear actuator 905 so that the guides for moving cones guiding plates 904 are properly positioned as to help maintain the axial position their transmission belt or their chain without interfering with any part of their cone for all transmission ratios, a linear relationship between the required extension of the guides for moving cones linear actuator 905 versus the axial position of its cone, which gradient depends on the taper of its cone, can be programmed into the controlling computer. Here for each transmission ratio, the controlling computer then controls guides for moving cones linear actuator 905 based on the programmed linear relationship. If for some reasons some other positioning routine to control guides for moving cones linear actuator 905, which might be obtained experimentally, works better than a controlling routine based on a linear relationship, than that routine can be programmed into the controlling computer.

In order to maintain the axial position of a transmission belt or a chain of a CVT where the cones are stationary and the transmission belts move axially, guides for stationary cones 920, which is shown as an end-view in FIG. 147, can be used. Guides for stationary cones 920 is identical to guides for moving cones 900 except that its two parallel round guides are aligned at an angle that matches the angle of their cone instead of being vertical. Hence, like the guides for moving cones 900, guides for stationary cones 920 also has two parallel round guides, which here are labeled as guides for stationary cones rods 921, that are slidably inserted into sleeves, which here are labeled as guides for stationary cones sleeves 922, which are fixed to the frame of the CVT. And as for the guides for moving cones 900, here the bottom ends of the two parallel round guides are also welded on a horizontal bar, which here is labeled as guides for stationary cones connector bar 923. And as for the guides for moving cones 900, here welded on the bottom surface of the connector bar are two parallel guiding plates, which here are labeled as guides for stationary cones guiding plates 924. And as for the guides for moving cones 900, here the position of the guiding plates are also controlled by a linear actuator that is parallel to its parallel round rods, which here is labeled as guides for stationary cones linear actuator 925, that has a linear actuator extension sensor and is controlled by the controlling computer of the CVT. In order to properly control guides for stationary cones linear actuator 925, the controlling computer of the CVT controls the guides for stationary cones linear actuator 925 so that the axial position of the guides for stationary cones guiding plates 924 corresponds to the axial position of its transmission belt or chain. Based on the alignment of stationary cones linear actuator 925 somebody skilled in the art should be able to determine the relationship between the axial position of the guides for stationary cones guiding plates 924 and the extension of the guides for stationary cones linear actuator 925. This relationship can than be programmed into the controlling computer so that it can properly control the guides for stationary cones linear actuator 925.

Also if desired the movements of the guiding plates for guides for moving cones 900 and guides for stationary cones 920 can be controlled by connecting their connector bars to their mover frame used to control the transmission ratio. For the guiding plates for guides for moving cones 900, the connector bar should be connected to its mover frame in manner such that it is axially maintained stationary relative to its mover frame but is allowed to slide vertically relative to its mover frame. Here a similar set-up used to control the position of the tensioning sliders described in the Sliding Cone Mounting Configuration section can be used. For the guiding plates for guides for stationary cones 920, the connector bar should be connected to its mover frame in a manner such that its moves axially with its mover frame but is allowed to slide vertically relative to its mover frame. Here a similar set-up used to control the position of the tensioning wheels described in the Continuous Variable Transmission Variation 2 (CVT 2) section can be used.

The guides for moving cones 900 can be used to maintain the axial alignment of a transmission belt for all CVT's where the change in transmission ratio is achieved by moving the cones. And guides for stationary cones 920 can be used to maintain the axial alignment of a transmission belt for all CVT's where the change in transmission ratio is achieved by moving the transmission belt.

An example on how to use guides for moving cones 900 is shown in FIG. 148. FIG. 148 shows a partial front-view were 3 moving cones guiding plates 904 of guides for moving cones 900 are used to maintain the axial position of a guides transmission belt 930 of a guides cone 931, which has a guides torque transmitting member 932. Here depending on the amount of axial bowing of the transmission belt and the accuracy requirement of the CVT more or less moving cones guiding plates 904 can be used. The description in this paragraph also applies to guides for stationary cones guiding plates 924 of guides for stationary cones 920.

Preferred Tooth Shapes

Somebody skilled in the art should be able to select a tooth shape for the items described in this patent, since some well established theories about torque transmission using teeth could be applied here. Below the advantages and disadvantage of two tooth shapes recommended by the inventor are discussed. Obviously other tooth shapes can also be used. The simplest tooth shape is a square tooth shape. However the operation of this tooth shape is not very smooth, because some flexing of the transmission belt, if used, and the teeth occur when a tooth is only partially engaged with its mating tooth. If a gap is used between the teeth as described in the Gap in Teeth section of this application, then the gap should be wide enough so that adjusters can be used to adjust the rotational position of a torque transmitting device relative to another so that flexing due to partially engaged teeth can be eliminated. Another preferred tooth shape, is an involute tooth shape, this tooth shape offers the smoothest operation. By slightly modifying this tooth shape by increasing the width of the tooth at the base and continuously reducing the width of the tooth as the height is increased so that only perfectly aligned teeth engage, an even smoother operation can be achieved. However, this tooth shape might be more expensive to manufacture than the square tooth shape.

Best Mode Recommendation

The most recommended configuration of the invention based on optimal performance is the configuration for CVT 2.4. The recommended cone assemblies and associated parts used to construct the CVT 2.4, are the front pin belt cone assembly 520A, the back pin belt cone assembly 520B, and their associated parts as described in the Alternate CVT's section of this patent.

The configuration for this CVT allows the use of positive engagement devices that can theoretically engage perfectly due to the compensation for transition flexing. In addition, the transmission ratio can virtually, although maybe not actually, be changed at any instances due to the compensation of transmission ratio change rotation. Also the usage of two adjusters for CVT 2.4 minimizes the torque requirement of the adjusters by allowing the usage of the over adjustment method to compensate for transmission ratio change rotation, and by allowing the compensation for transition flexing by providing adjustments in the direction opposite of the direction the shaft on which the adjusters are mounted is rotating.

However other configurations for a CVT described in this patent have some merit as well. For example, for a configuration for a CVT 3, which uses a cone assembly with two friction torque transmitting members 1046F that is coupled by a friction belt 1067F to a friction pulley 1098F, there is no need for an adjuster to compensate for transition flexing and if some instances where the transmission ratio can not be changed is acceptable, than no adjusters are needed. If no adjusters are needed then no controlling computer, sensors, and source of electrical power are needed.

The most suitable configuration of a CVT for a given application depends mainly on the following requirements: torque transmission efficiency and rating, transmission ratio changing responsiveness, endurance, simplicity, weight, cost, and electrical power availability. For example, for an automobile, torque transmission efficiency and rating, transmission ratio changing responsiveness, and reliability is important. And since electrical power is readily available in an automobile, the configuration for CVT 2.4 as described in this section might be ideal here. If increased reliability is desired than torque sensors or other items described in this patent can be added to that CVT 2.4. However this will increase the cost of the CVT. For a bicycle on the other hand torque transmission efficiency and rating, and transmission ratio changing responsiveness might not be so important. While weight and no need for an electrical power source is critical. Hence for a bicycle, the configuration for CVT 3 as described in this section might be ideal.

Operation

In order to design a CVT using the methods described in this patent, it is recommended that the designer first determine the unadjusted configuration of the CVT, which is the configuration of the CVT that does not use any adjusters. Next, if desired or required, the designer adds adjusters to the unadjusted configuration of the CVT based on the performance requirement of the CVT.

In order to determine the unadjusted configuration of the CVT, the designer first determines the desired qualities of the CVT the designer wants to build. From there the designer can construct a CVT using one or several cone assemblies 1026 or 1026(A/B/C) according to the designer's need, by mounting one or several cone assemblies 1026 or 1026(A/B/C) to a first shaft, or first group of shafts, and coupling them, directly or by the use of a rotational energy conveying device such as a transmission belt or chain, with one or several rotational energy conveying devices, including but not limited to pulleys, other cone assemblies, or sprockets, mounted on a second shaft, or second group of shafts, in a manner such that for all axial positions of the torque transmitting arc(s) at least a portion of a torque transmitting arc, formed by the torque transmitting surfaces of torque transmitting member(s) 46, of at least one cone assembly 1026 or 1026(A/B/C) mounted on the first shaft, or first group of shafts, is always coupled to a torque transmitting surface of a rotational energy conveying device mounted on the second shaft, or second group of shafts. Also, the designer needs to ensure that changing the axial position of the torque transmitting member(s) relative to their cone 1024 or cone 1024A changes the transmission ratio of the CVT.

In addition, the designer also needs to ensure that for the CVT that the designer has designed, for every transmission ratio of the CVT, an instance exist where the transmission ratio can be changed without any significant circumferential sliding between the torque transmitting surfaces of the torque transmitting member(s) 46 and the torque transmitting surfaces(s) of the rotational energy conveying device(s) engaged with them. This can easily be done through experimentation.

Next, in order to be able to change the transmission ratio, the designer adds a mechanism controlled by an actuator or manually that can change the axial position of the torque transmitting member(s) 1046 and the rotational energy conveying device(s) directly or indirectly engaged to them relative to the surface of the cones 1024 or cones 1024A when their axial positions can be changed without causing any significant circumferential sliding between the torque transmitting surfaces of the torque transmitting member(s) and the torque transmitting surfaces(s) of the rotational energy conveying device(s) engaged with them. If required or desired a computer can be used to control the actuator to perform the relative axial position change specified in the previous sentence as specified in the previous sentence. Otherwise stalling of the actuator or slippage at the actuator can be used to ensure that the relative axial position change specified in this paragraph is performed as specified.

Next the designer designates the input shaft of the CVT, which is the shaft that will be coupled to the driving source; and the output shaft of the CVT, which is the shaft that will be coupled to the member to be driven. The first shaft, or a shaft from the first group of shafts, can be selected as the input shaft; and the second shaft, or a shaft from the second group of shafts, can be selected as the output shaft. The input and output shafts can be reversed if necessary.

Once the unadjusted configuration of the CVT has been determined, one or several adjusters can be added to increase the performance of that CVT. The adjuster system described in this patent can also be used to improve the performance of other CVT's that are not described in this patent that also suffer from either or both transition flexing and a limited duration at which the transmission ratio can be changed.

In order to use an adjuster system described in this patent to improve the performance of a CVT that suffers from either or both transition flexing and a limited duration at which the transmission ratio can be changed, the designer uses one or several adjusters, which can adjust the rotational position of a torque transmitting device, such as a torque transmitting member of a cone assembly, a transmission pulley, a cone assembly, etc., relative to another torque transmitting device. The adjuster(s) should be mounted so that transition flexing can be eliminated and/or so that the duration at which the transmission ratio can be changed can be substantially increased.

In order to eliminate transition flexing, the amount of adjusters needed depend on the configuration of the CVT. One method of eliminating transition flexing is to adjust the rotational position of the alternating torque transmitting device(s) that causes transition flexing. Here an alternating torque transmitting device is a device that alternates between transmitting torque and not transmitting torque. For CVT 1, the alternating torque transmitting devices are the torque transmitting members. And for CVT 2, the alternating torque transmitting devices are the cone assemblies and the transmission pulleys, since they alternately transmit torque to/from a shaft from/to a transmission belt. Each alternating torque transmitting devices is coupled to a common torque transmitting device, which is a torque transmitting device that transmits torque to/receives torque from at least two alternating torque transmitting devices. For CVT 1, the common torque transmitting devices are the transmission belt, the input shaft, and the output shaft. And for CVT 2, the common torque transmitting devices are the input shaft and the output shaft.

Another method to eliminate transition flexing is to adjust the rotational position of the common torque transmitting devices. For example, for a CVT that comprises of a cone assembly with one torque transmitting member that is sandwiched by two gears, which are coupled to a common output shaft and alternately transmit torque from the torque transmitting member of the cone assembly, transition flexing can be eliminated by adjusting the rotational position of the cone assembly. The rotational position of the cone assembly should only be adjusted when the torque transmitting member of the cone assembly is only engaged with one gear. Also, for this configuration, the adjusting rotation at the cone assembly also affects the rotation of the gear with which it is engaged, unless there are instances where there is no torque being transmitted between the gears and the cone assembly. Hence, here it might be better to adjust the rotational position of a gear before it is coupled to the common output shaft.

When adjusters are used to adjust the rotational position of the alternating torque transmitting devices, then in most cases the following method can be used to determine how many adjuster are needed for a common torque transmitting device and how to mount them. When for a common torque transmitting device two alternating torque transmitting devices, which are coupled to each other, are used to transmit torque, then only one adjuster, which can be used on any of the alternating torque transmitting devices, is needed.

When more than two torque transmitting members are used, then the amount of adjusters needed depend on the configuration of the CVT. When for a rotational position two alternating torque transmitting devices can simultaneously be transmitting torque to/receiving torque from their common torque transmitting device, than one of those torque transmitting devices need to be mounted on an adjuster, so that its rotational position can be adjusted relative to the rotational position of the other alternating torque transmitting device. And when for a rotational position three alternating torque transmitting devices can simultaneously be transmitting torque to/receiving torque from their common torque transmitting device, than most likely two of those alternating torque transmitting devices need to be mounted on an adjuster, so that the rotational position of those two alternating torque transmitting devices can be adjusted relative to the rotational position of the non-adjuster mounted alternating torque transmitting device. So basically, if for a rotational position, n number of alternating torque transmitting devices can be simultaneously transmitting torque to/receiving torque from their common torque transmitting device, than most likely n−1 of those alternating torque transmitting devices need to be mounted on an adjuster. For all other rotational positions, the same rule applies. By determining all the different configurations of how the alternating torque transmitting devices can transmit torque to/receive torque from their common torque transmitting device and how many common torque transmitting devices are used, the amount of adjusters needed and how to mount them can be determined. Here for each common torque transmitting device, most likely the configuration obtained consist of groups of adjuster mounted alternating torque transmitting devices, preferably the same amount of adjuster mounted alternating torque transmitting devices in each group, that alternate with non-adjuster mounted torque transmitting devices to form a sequential and continuous torque transmitting means where at any instance only one non-adjuster mounted torque transmitting devices is transmitting torque.

Furthermore, in most cases the amount of adjusters needed determined from the method described in the previous paragraph can be reduced by coupling the alternating torque transmitting devices, which need to be mounted on adjusters but are never simultaneously engaged to a common torque transmitting device, to a common adjuster. The common adjuster can then be used to adjust the rotational position of the alternating torque transmitting device about to be engaged or engaged. Also here the common adjuster needs to be able to adjust the rotational position of the alternating torque transmitting device about to be engaged before it becomes engaged. For configuration where an instance exist where an alternating torque transmitting device coupled to a common adjuster is engaged while another alternating torque transmitting device coupled to the same common adjuster is about to come into engagement, the time available for the common adjuster to provide the adjustment can be very short so that an adjuster fast enough is needed. This time can be increased by using more adjusters, which can be common adjusters or otherwise.

And when adjusters are used to adjust the rotational position of the common torque transmitting device(s), then in most cases the rotational position of the common torque transmitting device(s) need to be adjustable. This can be achieved by using an adjuster for each common torque transmitting device. For certain configurations this can also be achieved by using one adjuster to adjust the rotational position of one or several common torque transmitting devices. A possible scenario for this method is having an adjuster adjust the rotational position of a shaft on which one or several common torque transmitting device(s) are mounted. In this case, in instances where the rotational position of a common torque transmitting device is being adjusted, it should not be engaged with any alternating torque transmitting device. Since here there might be instances where no torque is transmitted between a common torque transmitting devices and an alternating torque transmitting device, it is recommended to adjust the rotational position of the alternating torque transmitting device(s) instead.

Furthermore, adjusters can also be used to substantially increase the duration at which the transmission ratio of a CVT can be changed. One method to achieve this is to use an adjuster to mount each cone assembly to its shaft/spline. If the transmission ratio needs to be changed, these adjusters can then be used to rotate the cone assemblies relative to their shaft such that are maintained in a moveable configuration. This method is used for CVT 1.1 described earlier.

In a configuration of a CVT where a complete non-torque transmitting arc, which is the space of a cone assembly that is not covered by a torque transmitting member, is never completely covered by its coupled torque transmitting device, then the duration at which the transmission ratio can be changed can be substantially increased by compensating for transmission ratio change rotation. This method is used in CVT 2.1. In order to compensate for transmission ratio change rotation, the rotation of the alternating torque transmitting device(s), for which changes in transmission ratio causes them to rotate differently than a referenced alternating torque transmitting device, need to be adjusted using adjuster(s). The adjustment should aim to eliminate any difference in rotation of the alternating torque transmitting devices due to change in transmission ratio. Or the rotation of the alternating torque transmitting devices engaged or coupled to the alternating torque transmitting devices mentioned in the previous sentence need to be adjusted in the same manner.

In order to determine the transmission ratio change rotation of an alternating torque transmitting device, first all other alternating torque transmitting devices should be removed from the CVT while the rest of the CVT should be left alone. Next the CVT should be placed in either its highest or lowest transmission ratio. Then the alternating torque transmitting device, for which its transmission ratio change rotation needs to be determined, should be positioned so that it can transmit torque at a recorded initial rotational position. Next the transmission ratio should be changed while the rotation of that alternating torque transmitting member as the transmission ratio is changed is recorded. The recorded results provide the amount of transmission ratio change rotation for that initial rotational position. Using the same method the amount of transmission ratio change rotation for different initial rotational positions can be determined. From the collected data an equation that estimates the amount of transmission ratio change rotation for different initial rotational positions and different initial and final transmission ratios can be constructed. Mathematics can also be used to obtain such equation. An example on how to obtain such equation mathematically can be found in the Adjuster System for CVT 2 section and the CVT 2.2 section of this patent. Based on those examples, it should not be difficult for someone with a mathematics background to obtain such equation for different configurations of CVT's.

When the transmission ratio change rotation of each alternating torque transmitting device is different, then the method to determine the amount of adjusters needed and the basic configuration on how to mount them is identical to the method used in the case where adjusters are used to adjust the rotational position of the alternating torque transmitting devices in eliminating transition flexing.

In order to properly control the adjusters to compensate for transmission ratio change rotation the following methods can be used. The first method is by controlling the adjusters so that the differences in torque being transmitted by the alternating torque transmitting devices that are transmitting torque are within a predetermined range. In that predetermined range, the difference in torque being transmitted by the torque transmitting devices due to transmission ratio change rotation can be compensated by flexing of the torque transmitting devices used to transmit torque. And when the differences in torque being transmitted exceed the predetermined range, stalling of the transmission ratio changing actuator should occur. If this method is used, then each alternating torque transmitting device need to have a device that measures the torque being transmitted by it, such as a torque sensor or load cell for example. Another method to compensate for transmission ratio change rotation is to determine the equations that estimates transmission ratio change rotation for each alternating torque transmitting device, and then control the adjusters based on those equations to compensate for the difference(s) in transmission ratio change rotation between the alternating torque transmitting devices. One method of adjustment is by having referenced alternating torque transmitting devices, which rotations are not adjusted, and adjusted alternating torque transmitting devices, which rotations are adjusted. The amount of adjustment rotation for an adjusted alternating torque transmitting devices is calculated by subtracting the amount of transmission ratio change rotation of that adjusted alternating torque transmitting device from the amount of transmission ratio change rotation of its referenced alternating torque transmitting device. Although not absolutely necessary, it is preferred that counter-clockwise rotations are considered positive and clockwise rotations are considered negative. Since the torque transmitting devices are rotating, the amount of adjustments required continuously change. Hence the value for the amount of adjustments needed should be updated at short enough intervals so that the amount of adjustments provided are accurate enough to prevent excessive stalling of transmission ratio changing actuator. An example on how to use this method is discussed in the explanation for CVT 2.2. Furthermore, in case every alternating torque transmitting device is mounted on an adjuster, another method of adjustment is to cancel out transmission ratio change rotation for each alternating torque transmitting device by having the adjusters provide their alternating torque transmitting devices an equal amount of rotation as their transmission ratio change rotation but reversely directed.

Furthermore, as discussed in detail in the Adjuster System for CVT 2 section, for an adjuster, it is preferred that in order to compensate for transmission ratio change rotation, it only needs to provide rotation which direction is opposite from the rotation of the shaft on which its alternating torque transmitting device is mounted. Since this will lower the torque requirement of the adjuster, since it only needs to provide releasing rotation. This is can be achieved by using an adjuster on each alternating torque transmitting device. This method is described in the CVT 2.3 section and the CVT 2.4 section of this patent. And for a CVT that consist of a cone assembly with one torque transmitting member that is sandwiched by two gears, here each gear need to have an adjuster that can adjust its rotational position relative to the rotational position of its shaft, which is coupled to the shaft of the other gear. Besides using an adjuster on each alternating torque transmitting member, another method to having an adjuster compensate for transmission ratio change rotation by only providing a releasing torque can be achieved by using a differential between each alternating torque transmitting device and have an adjuster control the rotational position of one differential shaft relative to the other. Examples of this method are described in the Differential Adjuster Shaft for CVT 2 section of this application. And for a CVT that consist of a cone assembly with one torque transmitting member that is sandwiched by two gears, each gear needs to be coupled to a differential shaft of a differential, while the input/output shaft is coupled to the housing of the differential.

Once the proper configuration for the adjuster utilizing CVT has been determined, the designer needs to determine what kind of adjuster the designer wants to or can use. The most versatile adjuster is the electrical adjuster, which can be used to eliminate transition flexing, maintain a cone assembly in a moveable configuration, and compensate for transmission ratio change rotation in almost all applications. However, in order to properly control an electrical adjuster, the designer needs to use a computer and various sensors, such as transmission ratio sensors, rotational position sensors, relative rotational position sensors, torque sensors, etc. The methods of utilizing the sensors and the methods for controlling an electrical adjuster are described in detail in the previous sections of this application.

Another, less versatile, adjuster that might be useful for some CVT's is the mechanical adjuster. This adjuster can only be used to eliminate transition flexing. For the mechanical adjuster, it is not absolutely necessary, although it might be beneficial, to use a computer and various sensors in order to control it. Hence this adjuster might be preferred in machines where electrical power is not available, such as bikes for example.

Another adjuster that can be used, is the spring-loaded adjuster. This adjuster can be used to eliminate transition flexing and allow some relative rotation that slightly increase the moveable duration of a CVT. This adjuster is the simplest and most likely cheapest of the adjusters described in this patent. However, for this adjuster, shock loads occur when the pins of its gap mounted torque transmitting member hit a surface of the cone assembly that forms that gap. These shock loads might be negligible in low torque applications. But in high torque applications, unless properly damped, these shock loads can significantly decrease the live of the CVT and can cause undesirable driving conditions. However, damping these shock loads can also significantly reduce the efficiency of the CVT.

Based on the description in this patent, a machine designer can determine how to properly mount adjusters so that transition flexing can be eliminated and/or so that the duration at which the transmission ratio can be changed can be substantially increased in CVT's suffering from these problems.

CONCLUSION, RAMIFICATION, AND SCOPE

Accordingly the reader will see that the cone assemblies and adjuster systems of this application can be used to construct various Continuous Variable Transmissions (CVT's), which have the following advantages over existing Variable Transmissions:

Compared to Discrete Variable Transmissions, they are able to provide a more efficient transmission ratio for a driving source under most circumstances due to their infinite transmission ratios over a predetermined range.

They can be constructed such that torque is transmitted by positive engagement devices, such as teeth. Hence they can provide torque transmission ability and efficiency almost as good as transmissions utilizing gears, sprocket and chains, and timing belts and timing pulleys, which have not yet been effectively used to construct CVT's. Gears, and sprocket and chains are currently almost used in any high torque transmission application due to their superior torque transmission ability and efficiency over any other torque transmission devices. Hence the CVT's constructed out of the cone assemblies of this application will most likely have higher torque transmission ability and efficiency than many CVT's of prior art.

They have less frictional energy losses than many CVT's of prior art, since significant circumferential sliding between the designated torque transmitting surfaces due to transmission ratio change can be eliminated.

Although the description above contains many specificities, these should not be construed as limiting the scope of the invention but as merely providing illustrations of some of the presently preferred embodiments of this invention. For example, by using a gear cone assembly, which is identical to a cone assembly 1026 described in the General Cone section, except for having a torque transmitting member with a square shaped cross-section instead of a channel shaped one, such that it can be coupled to a gear, one or several gear cone assemblies on a driver shaft can be coupled to one or several gears on one or several driven shafts and vice-versa. For example, if the arc length of the torque transmitting member at the largest end of its gear cone assembly is not less than half of the circumference of that gear cone assembly, than a CVT can be constructed where two gears, which are attached so that they can engage with the teeth of the torque transmitting member, are positioned as to sandwich that gear cone assembly. Also a CVT, which consist of several gear cone assemblies, which engage directly with each other can also be designed.

Also the designs in this patent are only exemplification on how to utilize the invention. Many other designs utilizing this invention, such as designs that use other types/designs of pulleys, sprockets, belts, chains, teeth, or any other part of this invention can be conceived.

Also, although in this patent only cones or cone assemblies with one or two oppositely positioned torque transmitting devices are shown. Cones or cone assemblies with more than one or two torque transmitting devices can also be used as long as for the CVT where they are used, an instance exist where only one torque transmitting device is engaged with it means for coupling. For example, a CVT 3 using a cone or cone assembly with three teeth, evenly spaced on its cone or cone assembly, can be constructed as long an instance where only tooth is engaged with its chain or belt exist. Or a CVT 2 with three single tooth cones or three cone assemblies with one tooth that are mounted on a shaft in a manner such that the teeth are 120 degrees from each other can also be constructed as long an instance where only one tooth is engaged with its chain or belt exist. Obviously more teeth can be used as long as an instance where only one tooth is engaged with its chain or belt exists. In the same manner a CVT 3 using a cone assembly with three torque transmitting members or a CVT 2 using three cone assemblies, each with a torque transmitting member, can be constructed.

Given the time and need, detailed designs for the configurations mentioned, as well as many other configurations could be conceived.

Furthermore, besides improving the performance of CVT's utilizing the cones and cone assemblies described in this patent, the adjuster systems described in this patent can also be used to improve the performance of other CVT's that suffer from either or both transition flexing and/or a limited duration at which the transmission ratio can be changed. First of all, they can eliminate or significantly reduce transition flexing. Excessive cycles of transition flexing can reduce the life of a CVT. Furthermore, the adjuster systems of this invention can also be used so that the duration at which the transmission ratio can be changed can be substantially increased so as to improve the transmission ratio changing responsiveness of a CVT. In addition, the adjuster systems of this invention can also improve the engagement between a means for transmitting torque, such as a pulley, sprocket, or gear for example, and another a means for transmitting torque, such as a belt, chain, or another gear for example, by compensating for tooth wear for example.

Accordingly, the scope of the invention should be determined not by the embodiments illustrated, but by the appended claims and their legal equivalents.

I claim:
1. A transmission comprising:
a) first and second positive engagement belts;
b) first and second transmission pulleys each comprising of a plurality of teeth and an axis of rotation, wherein said first and second transmission pulleys rotate about a common axis of rotation; and
wherein said first transmission pulley engages with said first positive engagement belt and wherein said second transmission pulley engages with said second positive engagement belt;

c) first and second cones, wherein each said first and second cones consists of:
   a smooth conical body having a large diameter end and a small diameter end, each said conical body rotates about an axis of rotation;
   a projection of the form of a single tooth projecting radially outwards from the outer surface of its said conical body and extending in a straight line from said larger diameter end to said smaller diameter end of its said conical body such that the axial alignment of each said tooth is parallel to said axis of rotation of its said conical body;
   wherein said tooth of said first cone engages said first positive engagement belt and said tooth of said second cone engages said second positive engagement belt; and
   wherein said first and second cones rotate about a common axis of rotation and said first and second cones are constrained from rotation relative to each other in a manner such that said tooth of said first cone is disposed substantially 180 degrees out of phase with said tooth of said second cone;
d) first and second support pulleys;
   wherein said first support pulley engages said first positive engagement belt and is positioned to control the coverage of said first positive engagement belt on said first cone; and
   wherein said second support pulley engages said second positive engagement belt and is positioned to control the coverage of said second positive engagement belt on said second cone.

2. A transmission comprising:
a) a positive engagement belt;
b) a drive cone consisting of:
   a smooth conical body having a large diameter end and a small diameter end and wherein said conical body rotates about an axis of rotation;
   a projection in the form of two diametrically opposed teeth, each projecting radially outward from an outer surface of said conical body and extending in a straight line from said large diameter end to said small diameter end such that the axial alignment of said teeth is parallel to said axis of rotation of said conical body; and
   wherein said teeth engage said positive engagement belt;
c) a driven cone consisting of:
   a smooth conical body having a large diameter end and a small diameter end and wherein said conical body rotates about an axis of rotation;
   a projection in the form of two diametrically opposed teeth, each projecting radially outward from an outer surface of said conical body and extending in a straight line from said large diameter end to said small diameter end such that the axial alignment of said teeth is parallel to said axis of rotation of said conical body; and
   wherein said teeth engage said positive engagement belt.

* * * * *